United States Patent
Messina et al.

(10) Patent No.: US 12,083,922 B2
(45) Date of Patent: Sep. 10, 2024

(54) ELECTRIC VEHICLE WITH ACCESSORY MODULE

(71) Applicant: Oshkosh Corporation, Oshkosh, WI (US)

(72) Inventors: Robert S. Messina, Oshkosh, WI (US); Chris K. Yakes, Oshkosh, WI (US); Nader Nasr, Neenah, WI (US); Chad K. Smith, Omro, WI (US); Mike Bolton, Oshkosh, WI (US); Loren DeVries, Oshkosh, WI (US); Neil Dekarske, Oshkosh, WI (US); Jon J. Morrow, Neenah, WI (US); David J. Steinberger, Oshkosh, WI (US); Yanming Hou, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/064,271

(22) Filed: Oct. 6, 2020

(65) Prior Publication Data

US 2021/0031649 A1 Feb. 4, 2021

Related U.S. Application Data

(63) Continuation of application No. 16/839,790, filed on Apr. 3, 2020, now Pat. No. 11,511,642, which is a
(Continued)

(51) Int. Cl.
*B60L 53/80* (2019.01)
*B28C 5/42* (2006.01)
(Continued)

(52) U.S. Cl.
CPC .............. *B60L 53/80* (2019.02); *B28C 5/421* (2013.01); *B28C 5/4265* (2013.01);
(Continued)

(58) Field of Classification Search
CPC .......... B60L 53/80; B60L 58/18; B60L 50/66; B60L 58/26; B28C 5/421; B28C 5/42; B28C 5/4251; B28C 5/4265
(Continued)

(56) References Cited

U.S. PATENT DOCUMENTS 2,055,563 A 9/1936 Sorensen et al.
3,410,538 A 11/1968 Potter
(Continued)

FOREIGN PATENT DOCUMENTS

CN 203694470 U 7/2014
CN 104002813 A 8/2014
(Continued)

OTHER PUBLICATIONS

International Search Report and Written Opinion received for PCT App. No. PCT/US2020/054847, Feb. 12, 2021, 21 pages.
(Continued)

*Primary Examiner* — Hau V Phan
(74) *Attorney, Agent, or Firm* — Foley & Lardner LLP

(57) ABSTRACT

A vehicle includes a chassis, tractive elements coupled to the chassis, an electric motor coupled to the chassis and coupled to the tractive elements such that the electric motor drives the tractive elements to propel the vehicle, an accessory module coupled to the chassis and coupled to an output of the electric motor. The accessory module is configured to receive mechanical energy provided by the electric motor and provide at least one of electrical energy or fluid energy.

20 Claims, 73 Drawing Sheets

Related U.S. Application Data continuation of application No. 16/839,925, filed on Apr. 3, 2020, now Pat. No. 11,472,308.

(60) Provisional application No. 62/830,267, filed on Apr. 5, 2019, provisional application No. 62/830,108, filed on Apr. 5, 2019, provisional application No. 62/830,038, filed on Apr. 5, 2019, provisional application No. 62/830,262, filed on Apr. 5, 2019, provisional application No. 62/830,256, filed on Apr. 5, 2019.

(51) Int. Cl.
| | | |
|---|---|---|
| *B60K 1/04* | (2019.01) | |
| *B60K 17/04* | (2006.01) | |
| *B60L 50/60* | (2019.01) | |
| *B60L 58/18* | (2019.01) | |
| *B60L 58/26* | (2019.01) | |
| *B60P 3/16* | (2006.01) | |
| *B60S 5/06* | (2019.01) | |
| *B62D 21/02* | (2006.01) | |
| *B62D 33/06* | (2006.01) | |
| *B62D 63/08* | (2006.01) | |
| *H01M 10/613* | (2014.01) | |
| *H01M 10/625* | (2014.01) | |
| *H01M 50/20* | (2021.01) | |
| *H01M 50/249* | (2021.01) | |
| *B60K 6/28* | (2007.10) | |
| *B60L 1/00* | (2006.01) | |

(52) U.S. Cl.
CPC .............. *B28C 5/4272* (2013.01); *B60K 1/04* (2013.01); *B60K 17/04* (2013.01); *B60L 50/66* (2019.02); *B60L 58/18* (2019.02); *B60L 58/26* (2019.02); *B60P 3/16* (2013.01); *B60S 5/06* (2013.01); *B62D 21/02* (2013.01); *B62D 33/06* (2013.01); *B62D 63/08* (2013.01); *H01M 10/613* (2015.04); *H01M 10/625* (2015.04); *H01M 50/20* (2021.01); *H01M 50/249* (2021.01); *B60K 2001/0416* (2013.01); *B60K 6/28* (2013.01); *B60L 1/003* (2013.01); *B60L 2200/40* (2013.01); *B60Y 2200/91* (2013.01); *B60Y 2200/92* (2013.01); *H01M 2220/20* (2013.01)

(58) Field of Classification Search
USPC .......................................................... 366/54
See application file for complete search history.

(56) References Cited

U.S. PATENT DOCUMENTS

| | | | |
|---|---|---|---|
| 3,429,192 A * | 2/1969 | Allen | F01P 7/048 |
| | | | 192/84.21 |
| 3,881,706 A | 5/1975 | McCollum | |
| 4,189,005 A | 2/1980 | McLoughlin | |
| 4,335,429 A | 6/1982 | Kawakatsu | |
| 4,533,011 A | 8/1985 | Heidemeyer et al. | |
| 5,171,121 A | 12/1992 | Smith et al. | |
| 5,192,178 A | 3/1993 | Silbernagel | |
| 5,495,912 A | 3/1996 | Gray et al. | |
| 5,559,420 A | 9/1996 | Kohchi | |
| 5,635,805 A | 6/1997 | Ibaraki et al. | |
| 5,669,842 A | 9/1997 | Schmidt | |
| 6,105,984 A | 8/2000 | Schmitz et al. | |
| 6,247,713 B1 | 6/2001 | Konop | |
| 6,328,670 B1 | 12/2001 | Minowa et al. | |
| 6,478,317 B2 | 11/2002 | Konop | |
| 6,516,914 B1 | 2/2003 | Andersen et al. | |
| 6,561,718 B1 | 5/2003 | Archer et al. | |
| 6,666,022 B1 | 12/2003 | Yoshimatsu et al. | |
| 6,686,724 B2 | 2/2004 | Coates et al. | |
| 6,725,581 B2 | 4/2004 | Naruse et al. | |
| 6,757,597 B2 | 6/2004 | Yakes et al. | |
| 6,764,085 B1 | 7/2004 | Anderson | |
| 6,779,806 B1 | 8/2004 | Breitbach et al. | |
| 6,789,335 B1 | 9/2004 | Kinugawa et al. | |
| 6,817,964 B2 | 11/2004 | Kayukawa et al. | |
| 6,852,063 B2 * | 2/2005 | Takahashi | B60W 20/11 |
| | | | 475/5 |
| 6,882,917 B2 | 4/2005 | Pillar et al. | |
| 6,883,815 B2 | 4/2005 | Archer | |
| 6,885,920 B2 | 4/2005 | Yakes et al. | |
| 6,952,057 B2 | 10/2005 | Tajima et al. | |
| 6,976,688 B2 | 12/2005 | Archer et al. | |
| 6,988,974 B2 | 1/2006 | Kobayashi et al. | |
| 7,055,880 B2 | 6/2006 | Archer | |
| 7,069,673 B2 | 7/2006 | Kagoshima et al. | |
| 7,073,847 B2 | 7/2006 | Morrow et al. | |
| 7,111,858 B2 | 9/2006 | Manser et al. | |
| 7,117,963 B2 | 10/2006 | Saito et al. | |
| 7,140,461 B2 | 11/2006 | Morrow | |
| 7,164,977 B2 | 1/2007 | Yakes et al. | |
| 7,198,130 B2 | 4/2007 | Schimke | |
| 7,207,582 B2 | 4/2007 | Siebers et al. | |
| 7,226,080 B2 | 6/2007 | Humphries | |
| 7,237,634 B2 * | 7/2007 | Severinsky | B60K 6/442 |
| | | | 180/65.265 |
| 7,270,346 B2 | 9/2007 | Rowe et al. | |
| 7,277,782 B2 | 10/2007 | Yakes et al. | |
| 7,302,320 B2 | 11/2007 | Nasr et al. | |
| 7,343,992 B2 | 3/2008 | Shingo et al. | |
| 7,349,797 B2 | 3/2008 | Donnelly et al. | |
| 7,357,203 B2 | 4/2008 | Morrow et al. | |
| 7,379,797 B2 | 5/2008 | Nasr et al. | |
| 7,380,620 B2 | 6/2008 | Suzuki | |
| 7,388,301 B2 | 6/2008 | Komiyama et al. | |
| 7,389,826 B2 | 6/2008 | Linsmeier et al. | |
| 7,392,122 B2 | 6/2008 | Pillar et al. | |
| 7,419,021 B2 | 9/2008 | Morrow et al. | |
| 7,439,711 B2 | 10/2008 | Bolton | |
| 7,448,460 B2 | 11/2008 | Morrow et al. | |
| 7,451,028 B2 | 11/2008 | Pillar et al. | |
| 7,461,710 B2 | 12/2008 | Egen et al. | |
| 7,472,914 B2 | 1/2009 | Anderson et al. | |
| 7,520,354 B2 | 4/2009 | Morrow et al. | |
| 7,521,814 B2 | 4/2009 | Nasr | |
| 7,525,206 B2 | 4/2009 | Kagoshima et al. | |
| 7,597,172 B1 | 10/2009 | Kovach et al. | |
| 7,669,413 B2 | 3/2010 | Komiyama et al. | |
| 7,689,332 B2 | 3/2010 | Yakes et al. | |
| 7,695,400 B2 | 4/2010 | McGee | |
| 7,711,460 B2 | 5/2010 | Yakes et al. | |
| 7,748,482 B2 | 7/2010 | Holmes et al. | |
| 7,756,621 B2 | 7/2010 | Pillar et al. | |
| 7,848,857 B2 | 12/2010 | Nasr et al. | |
| 7,874,373 B2 | 1/2011 | Morrow et al. | |
| 7,878,750 B2 | 2/2011 | Zhou et al. | |
| 7,931,103 B2 | 4/2011 | Morrow et al. | |
| 7,937,194 B2 | 5/2011 | Nasr et al. | |
| 8,000,850 B2 | 8/2011 | Nasr et al. | |
| 8,056,661 B2 | 11/2011 | Bissontz | |
| 8,139,109 B2 | 3/2012 | Schmiedel et al. | |
| 8,190,320 B2 | 5/2012 | Kelty et al. | |
| 8,276,831 B2 * | 10/2012 | Rutherford | B60P 3/00 |
| | | | 296/182.1 |
| 8,287,425 B2 | 10/2012 | Omote et al. | |
| 8,333,390 B2 | 12/2012 | Linsmeier et al. | |
| 8,337,352 B2 | 12/2012 | Morrow et al. | |
| 8,376,077 B2 | 2/2013 | Venton-Walters | |
| 8,395,355 B2 | 3/2013 | Kaita et al. | |
| 8,408,341 B2 | 4/2013 | Dalum et al. | |
| 8,421,415 B2 | 4/2013 | Kagoshima | |
| 8,429,924 B2 | 4/2013 | Ratliff et al. | |
| 8,448,731 B2 | 5/2013 | Heap et al. | |
| 8,465,025 B2 | 6/2013 | Venton-Walters et al. | |
| 8,550,196 B2 | 10/2013 | Ross | |
| 8,561,735 B2 | 10/2013 | Morrow et al. | |
| 8,596,648 B2 | 12/2013 | Venton-Walters et al. | |

(56) References Cited

U.S. PATENT DOCUMENTS

| | | | |
|---|---|---|---|
| 8,606,448 B2 | 12/2013 | Anders et al. | |
| 8,606,450 B2 | 12/2013 | Holmes et al. | |
| 8,638,070 B2 | 1/2014 | Maluf et al. | |
| 8,662,220 B2* | 3/2014 | Burkholder | B60W 10/30 |
| | | | 180/65.285 |
| 8,669,855 B2 | 3/2014 | Suzuki et al. | |
| 8,714,287 B2 | 5/2014 | Kim et al. | |
| 8,739,906 B2 | 6/2014 | Kawashima | |
| 8,764,029 B2 | 7/2014 | Venton-Walters et al. | |
| 8,791,669 B2 | 7/2014 | Ghantous et al. | |
| 8,801,017 B2 | 8/2014 | Ellifson et al. | |
| 8,808,124 B2 | 8/2014 | Major et al. | |
| 8,818,588 B2 | 8/2014 | Ambrosio et al. | |
| 8,820,444 B2 | 9/2014 | Nguyen | |
| 8,839,876 B2 | 9/2014 | McLoughlin et al. | |
| 8,864,613 B2 | 10/2014 | Morrow et al. | |
| 8,876,133 B2 | 11/2014 | Ellifson | |
| 8,905,166 B2 | 12/2014 | Dalum et al. | |
| 8,909,434 B2 | 12/2014 | Anders et al. | |
| 8,939,240 B2* | 1/2015 | Wehrwein | B60K 25/00 |
| | | | 180/53.8 |
| 8,947,531 B2 | 2/2015 | Fischer et al. | |
| 8,950,529 B2 | 2/2015 | Ross | |
| 8,955,859 B1 | 2/2015 | Richmond et al. | |
| 8,955,880 B2 | 2/2015 | Malcolm et al. | |
| 8,970,178 B2 | 3/2015 | Berkowitz et al. | |
| 8,974,108 B2 | 3/2015 | Ruf | |
| 8,978,798 B2 | 3/2015 | Dalum et al. | |
| 8,991,834 B2 | 3/2015 | Venton-Walters et al. | |
| 8,991,840 B2 | 3/2015 | Zuleger et al. | |
| 9,000,718 B2 | 4/2015 | Park | |
| 9,008,913 B1 | 4/2015 | Sears et al. | |
| 9,016,703 B2 | 4/2015 | Rowe et al. | |
| 9,045,014 B1 | 6/2015 | Verhoff et al. | |
| 9,061,169 B2 | 6/2015 | Linsmeier | |
| 9,061,680 B2* | 6/2015 | Dalum | B60K 25/02 |
| 9,114,804 B1 | 8/2015 | Shukla et al. | |
| 9,132,736 B1 | 9/2015 | Shukla et al. | |
| 9,145,905 B2 | 9/2015 | Hou | |
| 9,157,347 B2 | 10/2015 | Jerwick et al. | |
| 9,174,686 B1 | 11/2015 | Messina et al. | |
| 9,205,832 B2 | 12/2015 | Tsutsumi et al. | |
| 9,291,230 B2 | 3/2016 | Ellifson et al. | |
| 9,315,187 B2* | 4/2016 | Stenson | B60W 30/1888 |
| 9,315,210 B2 | 4/2016 | Sears et al. | |
| 9,327,576 B2 | 5/2016 | Ellifson | |
| 9,328,986 B1 | 5/2016 | Pennau et al. | |
| 9,329,000 B1 | 5/2016 | Richmond et al. | |
| 9,376,102 B1 | 6/2016 | Shukla et al. | |
| 9,420,203 B2 | 8/2016 | Broggi et al. | |
| 9,428,042 B2 | 8/2016 | Morrow et al. | |
| 9,434,321 B2 | 9/2016 | Perron et al. | |
| 9,452,750 B2 | 9/2016 | Shukla et al. | |
| 9,457,666 B2 | 10/2016 | Caldeira et al. | |
| 9,475,385 B1 | 10/2016 | Pritchard et al. | |
| 9,492,695 B2 | 11/2016 | Betz et al. | |
| 9,493,921 B2 | 11/2016 | Amin et al. | |
| 9,494,170 B2 | 11/2016 | Hou | |
| 9,573,585 B2* | 2/2017 | Severinsky | B60K 6/46 |
| 9,579,969 B2 | 2/2017 | Crist et al. | |
| 9,637,890 B2 | 5/2017 | Hirozawa | |
| 9,651,120 B2 | 5/2017 | Morrow et al. | |
| 9,656,640 B1 | 5/2017 | Verhoff et al. | |
| 9,657,705 B2 | 5/2017 | Holmes et al. | |
| 9,669,679 B2 | 6/2017 | Zuleger et al. | |
| 9,688,112 B2 | 6/2017 | Venton-Walters et al. | |
| 9,694,671 B2 | 7/2017 | Wildgrube et al. | |
| 9,694,776 B2 | 7/2017 | Nelson et al. | |
| 9,707,869 B1 | 7/2017 | Messina et al. | |
| 9,731,594 B2 | 8/2017 | Wildgrube | |
| 9,748,548 B2 | 8/2017 | Malcolm et al. | |
| 9,751,518 B2 | 9/2017 | Dalum et al. | |
| 9,758,053 B2 | 9/2017 | Kim | |
| 9,764,613 B2 | 9/2017 | Rowe et al. | |
| 9,809,080 B2 | 11/2017 | Ellifson et al. | |
| 9,821,789 B2 | 11/2017 | Shukla et al. | |
| 9,878,616 B2 | 1/2018 | Dalum | |
| 9,884,431 B2 | 2/2018 | Pirri et al. | |
| 9,890,024 B2 | 2/2018 | Hao et al. | |
| 9,906,172 B2 | 2/2018 | Ross | |
| 9,919,695 B2* | 3/2018 | Shimakami | B60W 10/08 |
| 9,919,702 B1 | 3/2018 | Wang et al. | |
| 9,963,142 B2* | 5/2018 | Takuda | B60W 10/06 |
| 9,970,515 B2 | 5/2018 | Morrow et al. | |
| 10,029,556 B2 | 7/2018 | Morrow et al. | |
| 10,035,648 B2 | 7/2018 | Haddick et al. | |
| 10,077,040 B2 | 9/2018 | Chen et al. | |
| 10,099,622 B2 | 10/2018 | Handschke et al. | |
| 10,106,032 B2 | 10/2018 | Crist et al. | |
| 10,144,389 B2 | 12/2018 | Archer et al. | |
| 10,167,027 B2 | 1/2019 | Perron et al. | |
| 10,196,205 B2 | 2/2019 | Betz et al. | |
| 10,201,913 B2 | 2/2019 | McNeilus et al. | |
| 10,214,199 B2 | 2/2019 | Dalum et al. | |
| D843,281 S | 3/2019 | Gander et al. | |
| 10,221,055 B2 | 3/2019 | Hao et al. | |
| 10,232,731 B2 | 3/2019 | Kim | |
| 10,239,403 B2 | 3/2019 | Broker et al. | |
| 10,267,390 B2 | 4/2019 | Morrow et al. | |
| 10,286,239 B2 | 5/2019 | Shively et al. | |
| 10,309,871 B2 | 6/2019 | Hagan, Jr. | |
| 10,315,643 B2 | 6/2019 | Shukla et al. | |
| 10,351,340 B2 | 7/2019 | Haddick et al. | |
| 10,369,860 B2 | 8/2019 | Ellifson et al. | |
| 10,370,003 B2 | 8/2019 | Linsmeier et al. | |
| 10,392,000 B2 | 8/2019 | Shukla et al. | |
| 10,392,005 B2 | 8/2019 | Hatsuda et al. | |
| 10,392,056 B2 | 8/2019 | Perron et al. | |
| 10,407,288 B2 | 9/2019 | Hao et al. | |
| 10,414,067 B2 | 9/2019 | Datema et al. | |
| 10,414,266 B1 | 9/2019 | Wiegand et al. | |
| 10,414,385 B2 | 9/2019 | Linsmeier et al. | |
| 10,421,332 B2 | 9/2019 | Venton-Walters et al. | |
| 10,421,350 B2 | 9/2019 | Morrow et al. | |
| 10,427,520 B2 | 10/2019 | Dalum | |
| 10,434,949 B2 | 10/2019 | Handschke et al. | |
| 10,434,995 B2 | 10/2019 | Verhoff et al. | |
| 10,435,026 B2 | 10/2019 | Shively et al. | |
| 10,456,610 B1 | 10/2019 | Betz et al. | |
| 10,457,134 B2 | 10/2019 | Morrow et al. | |
| 10,464,389 B2 | 11/2019 | Zuleger et al. | |
| 10,466,699 B2 | 11/2019 | Hirata et al. | |
| 10,479,664 B2 | 11/2019 | Linsmeier et al. | |
| D869,332 S | 12/2019 | Gander et al. | |
| D871,283 S | 12/2019 | Gander et al. | |
| 10,513,392 B2 | 12/2019 | Haddick et al. | |
| 10,525,297 B2 | 1/2020 | Kay et al. | |
| 10,544,556 B2 | 1/2020 | Amin et al. | |
| 10,556,622 B1 | 2/2020 | Calliari et al. | |
| 10,578,195 B2 | 3/2020 | Steinberger et al. | |
| 10,584,775 B2 | 3/2020 | Steinberger et al. | |
| 10,596,913 B2 | 3/2020 | Healy et al. | |
| 10,611,204 B1 | 4/2020 | Zhang et al. | |
| 10,617,900 B1 | 4/2020 | Linsmeier et al. | |
| 10,618,405 B2 | 4/2020 | Crist et al. | |
| 10,632,805 B1 | 4/2020 | Rositch et al. | |
| D888,629 S | 6/2020 | Gander et al. | |
| 10,685,510 B2 | 6/2020 | Linsmeier et al. | |
| 10,723,282 B2 | 7/2020 | Perron et al. | |
| 10,752,075 B1 | 8/2020 | Shukla et al. | |
| 10,758,759 B2 | 9/2020 | Shively et al. | |
| 10,759,251 B1 | 9/2020 | Zuleger | |
| 10,766,478 B2 | 9/2020 | Healy et al. | |
| D899,452 S | 10/2020 | Klimes et al. | |
| 10,792,993 B2 | 10/2020 | Dalum et al. | |
| 10,843,017 B2 | 11/2020 | Shively et al. | |
| D905,713 S | 12/2020 | Linsmeier et al. | |
| 11,007,894 B2 | 5/2021 | Zenner et al. | |
| 2002/0071336 A1 | 6/2002 | Smith et al. | |
| 2002/0092687 A1 | 7/2002 | Forster | |
| 2002/0103055 A1 | 8/2002 | Tani et al. | |
| 2003/0037978 A1 | 2/2003 | Hofbauer | |
| 2004/0002794 A1 | 1/2004 | Pillar et al. | |
| 2004/0112171 A1 | 6/2004 | Kuhstrebe et al. | |

(56) References Cited

U.S. PATENT DOCUMENTS

| | | |
|---|---|---|
| 2005/0284672 A1 | 12/2005 | Egen et al. |
| 2006/0091730 A1* | 5/2006 | Chiao ............... B60K 6/46 |
| | | 307/10.1 |
| 2006/0207659 A1 | 9/2006 | Shaefer et al. |
| 2007/0108805 A1 | 5/2007 | Manning |
| 2007/0284163 A1 | 12/2007 | Heap et al. |
| 2008/0215700 A1 | 9/2008 | Pillar et al. |
| 2008/0275624 A1 | 11/2008 | Snyder |
| 2009/0095549 A1 | 4/2009 | Dalum et al. |
| 2009/0101465 A1* | 4/2009 | Hart ............... B60W 10/06 |
| | | 475/5 |
| 2009/0118971 A1 | 5/2009 | Heap et al. |
| 2009/0260836 A1 | 10/2009 | Laskaris et al. |
| 2010/0065344 A1 | 2/2010 | Collings, III |
| 2010/0219007 A1* | 9/2010 | Dalum ............... B60K 6/48 |
| | | 180/65.21 |
| 2012/0013132 A1 | 1/2012 | Lebeau et al. |
| 2012/0116624 A1 | 5/2012 | Reith |
| 2012/0138318 A1 | 6/2012 | Weisz et al. |
| 2012/0193109 A1 | 8/2012 | Moore et al. |
| 2012/0207620 A1 | 8/2012 | Dalum et al. |
| 2012/0266701 A1 | 10/2012 | Yamada et al. |
| 2013/0211665 A1 | 8/2013 | Deimel et al. |
| 2014/0091736 A1* | 4/2014 | Chen ............... H02J 7/1415 |
| | | 318/3 |
| 2014/0334169 A1 | 11/2014 | Ewert |
| 2015/0246331 A1 | 9/2015 | Broker et al. |
| 2015/0367300 A1 | 12/2015 | McNeilus et al. |
| 2016/0082824 A1 | 3/2016 | Inoue |
| 2016/0199999 A1 | 7/2016 | Pirri et al. |
| 2016/0238110 A1 | 8/2016 | Morrow et al. |
| 2016/0288780 A1 | 10/2016 | Shukla et al. |
| 2017/0028837 A1* | 2/2017 | Welschoff ............... B60L 58/12 |
| 2017/0050063 A1 | 2/2017 | Shively et al. |
| 2017/0092023 A1 | 3/2017 | Ishii et al. |
| 2017/0108085 A1 | 4/2017 | Morrow et al. |
| 2017/0361491 A1 | 12/2017 | Datema et al. |
| 2017/0361492 A1 | 12/2017 | Datema et al. |
| 2017/0363180 A1 | 12/2017 | Steinberger et al. |
| 2017/0370446 A1 | 12/2017 | Steinberger et al. |
| 2018/0022338 A1 | 1/2018 | Dalum et al. |
| 2018/0031085 A1 | 2/2018 | Steinberger et al. |
| 2018/0086215 A1 | 3/2018 | Yoo et al. |
| 2018/0215597 A1 | 8/2018 | Linsmeier et al. |
| 2018/0257637 A1* | 9/2018 | Fukuchi ............... B60K 6/448 |
| 2018/0319389 A1 | 11/2018 | Felsch et al. |
| 2019/0001805 A1 | 1/2019 | Colavincenzo et al. |
| 2019/0015692 A1 | 1/2019 | Fieber et al. |
| 2019/0032586 A1* | 1/2019 | Fracchia ............... B60K 6/387 |
| 2019/0039407 A1 | 2/2019 | Smith |
| 2019/0039448 A1 | 2/2019 | Korner et al. |
| 2019/0047541 A1 | 2/2019 | Dockter et al. |
| 2019/0078666 A1 | 3/2019 | Duhaime et al. |
| 2019/0106083 A1 | 4/2019 | Archer et al. |
| 2019/0143957 A1 | 5/2019 | Dalum et al. |
| 2019/0157869 A1 | 5/2019 | Gadh et al. |
| 2019/0160957 A1 | 5/2019 | Hooker |
| 2019/0161272 A1 | 5/2019 | Betz et al. |
| 2019/0178350 A1 | 6/2019 | Steinberger et al. |
| 2019/0185077 A1 | 6/2019 | Smith et al. |
| 2019/0185301 A1 | 6/2019 | Hao et al. |
| 2019/0217698 A1 | 7/2019 | Broker et al. |
| 2019/0225071 A1 | 7/2019 | Klucsarits et al. |
| 2019/0242460 A1 | 8/2019 | Morrow et al. |
| 2019/0262643 A1 | 8/2019 | Shively et al. |
| 2019/0262646 A1 | 8/2019 | Linsmeier et al. |
| 2019/0263408 A1 | 8/2019 | Linsmeier et al. |
| 2019/0276102 A1 | 9/2019 | Zuleger et al. |
| 2019/0291711 A1 | 9/2019 | Shukla et al. |
| 2019/0292975 A1 | 9/2019 | Hou et al. |
| 2019/0322321 A1 | 10/2019 | Schwartz et al. |
| 2019/0337348 A1 | 11/2019 | Venton et al. |
| 2019/0337350 A1 | 11/2019 | Ellifson et al. |
| 2019/0344475 A1 | 11/2019 | Datema et al. |
| 2019/0344838 A1 | 11/2019 | Perron et al. |
| 2019/0351758 A1 | 11/2019 | Wiegand et al. |
| 2019/0351883 A1 | 11/2019 | Verhoff et al. |
| 2019/0352157 A1 | 11/2019 | Hao et al. |
| 2019/0359184 A1 | 11/2019 | Linsmeier et al. |
| 2019/0359460 A1 | 11/2019 | Linsmeier et al. |
| 2019/0366828 A1 | 12/2019 | Morrow et al. |
| 2019/0381990 A1 | 12/2019 | Shukla et al. |
| 2020/0038700 A1 | 2/2020 | Betz et al. |
| 2020/0039341 A1 | 2/2020 | Morrow et al. |
| 2020/0065071 A1 | 2/2020 | Brabender et al. |
| 2020/0087063 A1 | 3/2020 | Haddick et al. |
| 2020/0094671 A1 | 3/2020 | Wildgrube et al. |
| 2020/0108285 A1 | 4/2020 | Kay et al. |
| 2020/0130746 A1 | 4/2020 | Calliari et al. |
| 2020/0139804 A1 | 5/2020 | Holmes et al. |
| 2020/0200237 A1 | 6/2020 | Steinberger et al. |
| 2020/0200238 A1 | 6/2020 | Steinberger et al. |
| 2020/0223277 A1 | 7/2020 | Zhang et al. |
| 2020/0230841 A1 | 7/2020 | Datema et al. |
| 2020/0230842 A1 | 7/2020 | Datema et al. |
| 2020/0231035 A1 | 7/2020 | Crist et al. |
| 2020/0238115 A1 | 7/2020 | Linsmeier et al. |
| 2020/0254840 A1 | 8/2020 | Rositch et al. |
| 2020/0279444 A1 | 9/2020 | Linsmeier et al. |
| 2020/0290236 A1 | 9/2020 | Bjornstad et al. |
| 2020/0290237 A1 | 9/2020 | Steffens et al. |
| 2020/0290238 A1 | 9/2020 | Andringa et al. |
| 2020/0307017 A1 | 10/2020 | Schubart et al. |
| 2020/0308854 A1 | 10/2020 | Schubart et al. |
| 2020/0316816 A1 | 10/2020 | Messina et al. |
| 2020/0317083 A1 | 10/2020 | Messina et al. |
| 2020/0384823 A1 | 12/2020 | Shukla et al. |
| 2020/0391569 A1 | 12/2020 | Zuleger |
| 2020/0398697 A1 | 12/2020 | Rocholl et al. |
| 2021/0031770 A1 | 2/2021 | Knorr |

FOREIGN PATENT DOCUMENTS

| | | |
|---|---|---|
| CN | 206719010 U | 12/2017 |
| CN | 110182038 A | 8/2019 |
| DE | 10 2004 017 115 | 10/2005 |
| EP | 2 055 563 A2 | 5/2009 |
| EP | 2 055 587 A2 | 5/2009 |
| JP | 2006-233843 A | 9/2006 |
| JP | 2010-221946 A | 10/2010 |
| JP | 2013-005932 | 1/2013 |
| JP | 2013-068313 A | 4/2013 |
| WO | WO-2007/108805 A1 | 9/2007 |
| WO | WO-2019/046758 A1 | 3/2019 |

OTHER PUBLICATIONS

International Search Report and Written Opinion received for PCT App. No. PCT/US2020/054800, Jan. 29, 2021, 15 pages.

International Search Report and Written Opinion received for PCT App. No. PCT/US2020/054847, Feb. 16, 2021, 21 pages.

International Search Report and Written Opinion Received for PCT Application No. PCT/US2020/054843, Feb. 12, 2021, 18 pages.

Oshkosh Corporation, Striker, Airport Fire Trucks, ARFF, site accessed Oct. 7, 2020, 4 pages, https://www.oshkoshairport.com/arfftrucks/newstriker.

Rosenbauer America, Aircraft Rescue Fire Fighting, site accesse Oct. 7, 2020, 3 pages. https://www.rosenbaueramerica.com/fire-trucks/aircraft-rescue-fire-fighting.

Third Party Submission filed in U.S. Appl. No. 17/968,487 dated Aug. 8, 2023.

Striker 4×4 brochure (Year: 2012).

Striker 6×6 brochure (Year: 2011).

\* cited by examiner

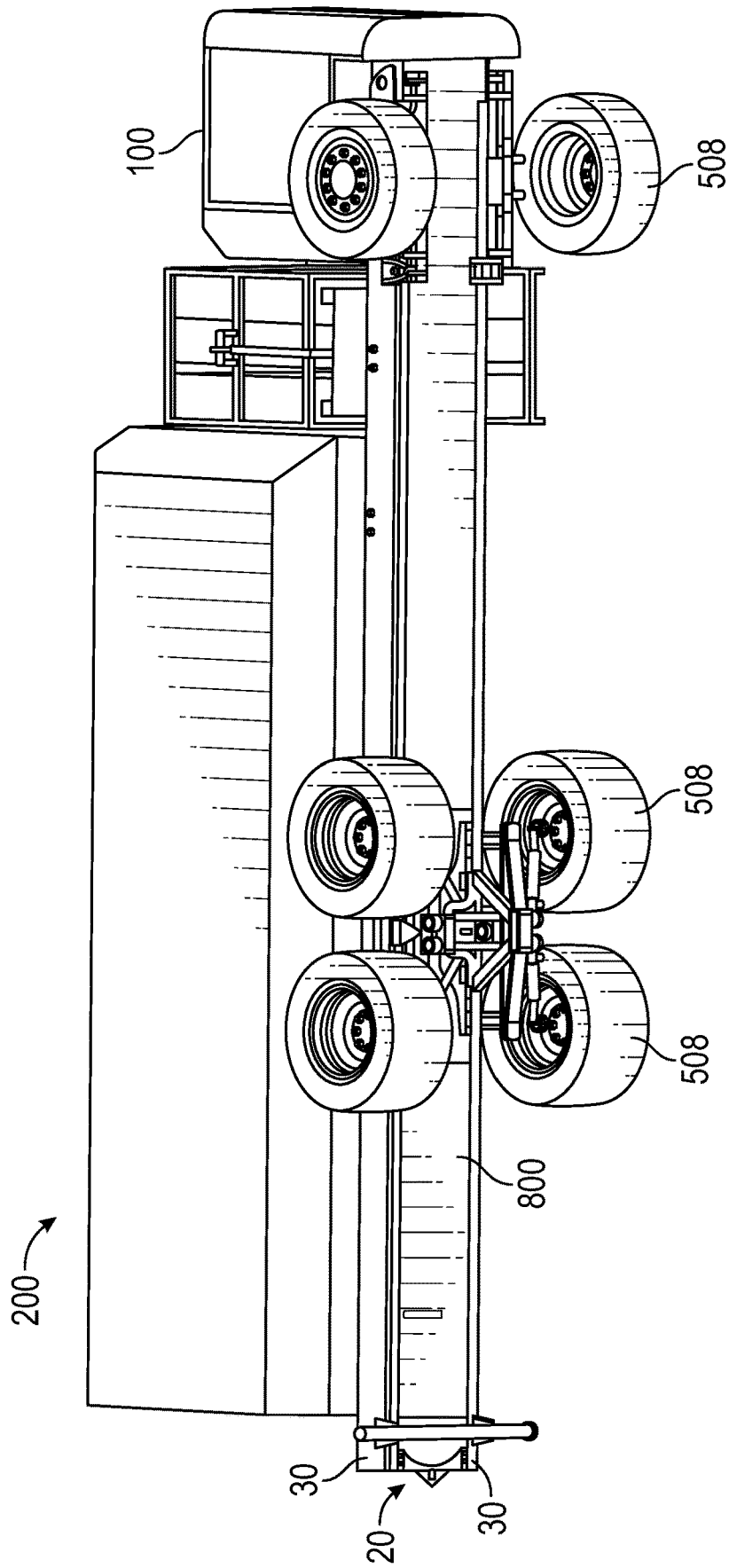

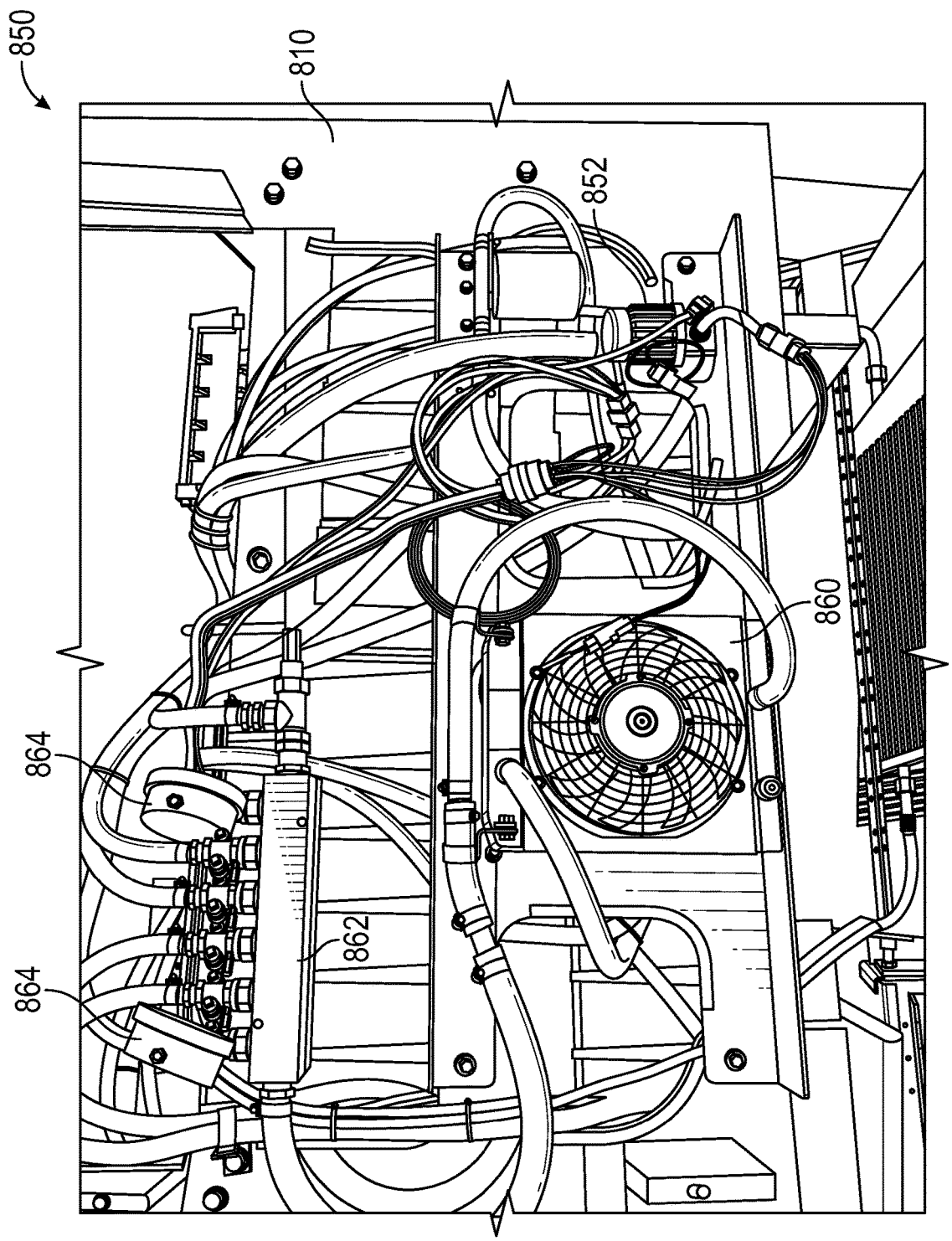

ELECTRIC VEHICLE WITH ACCESSORY MODULE

CROSS-REFERENCE TO RELATED PATENT APPLICATIONS

The present application is a continuation of: (a) U.S. application Ser. No. 16/839,790, filed Apr. 3, 2020, which claims priority to and the benefit of U.S. Provisional Application No. 62/830,038, filed Apr. 5, 2019, U.S. Provisional Application No. 62/830,108, filed Apr. 5, 2019, U.S. Provisional Application No. 62/830,256, filed Apr. 5, 2019, U.S. Provisional Application No. 62/830,262, filed Apr. 5, 2019, and U.S. Provisional Application No. 62/830,267, filed Apr. 5, 2019; and (b) U.S. Ser. No. 16/839,925, filed Apr. 3, 2020, which claims priority to and the benefit of U.S. Provisional Application No. 62/830,038, filed Apr. 5, 2019, U.S. Provisional Application No. 62/830,108, filed Apr. 5, 2019, U.S. Provisional Application No. 62/830,256, filed Apr. 5, 2019, U.S. Provisional Application No. 62/830,262, filed Apr. 5, 2019, and U.S. Provisional Application No. 62/830,267, filed Apr. 5, 2019, all of which are incorporated herein by reference in their entireties.

BACKGROUND

Concrete mixer vehicles are configured to receive, mix, and transport wet concrete or a combination of ingredients that when mixed form wet concrete to a job site. Concrete mixing vehicles include a rotatable mixing drum that mixes the concrete disposed therein. Concrete mixer vehicles are normally driven by an onboard internal combustion engine.

In conventional, internal combustion engine concrete mixer trucks, the concrete mixer trucks may be relatively quickly and easily refueled. In contrast, the resupplying of an exclusively electric-powered concrete mixer truck requires a charging of the battery module used to power the vehicle. With the current state of battery technology, and in light of the significant power requirements of a concrete mixer vehicle, recharging of the battery module is time consuming process, which may interfere with the availability of the concrete mixer for use.

Accordingly, it would be advantageous to provide a battery module and battery module removal assembly that would allow the battery module to be easily and quickly removed from the concrete mixer truck.

SUMMARY

One embodiment relates to a vehicle including a chassis, tractive elements coupled to the chassis, an electric motor coupled to the chassis and coupled to the tractive elements such that the electric motor drives the tractive elements to propel the vehicle, an accessory module coupled to the chassis and coupled to an output of the electric motor. The accessory module is configured to receive mechanical energy provided by the electric motor and provide at least one of electrical energy or fluid energy.

Another embodiment relates to an accessory system for a vehicle including an energy storage device, an electric motor electrically coupled to the energy storage device and including an output shaft, and an accessory module coupled to the electric motor. The accessory module includes at least one of (a) an electrical energy generator coupled to the output shaft of the electric motor and configured to provide electrical energy, (b) a pump coupled to the output shaft of the electric motor and configured to provide pressurized liquid, or (c) a compressor coupled to the output shaft of the electric motor and configured to provide compressed gas.

Still another embodiment relates to a method of operating a vehicle. The method includes providing, by an energy storage device, first electrical energy to an electric motor and driving, by the electric motor, a tractive element to propel the vehicle. The method further includes at least one of: driving, by the electric motor, an electrical energy generator to generate second electrical energy; driving, by the electric motor, a compressor to provide compressed gas; or driving, by the electric motor, a pump to provide a flow of pressurized liquid.

BRIEF DESCRIPTION OF THE DRAWINGS

The disclosure will become more fully understood from the following detailed description, taken in conjunction with the accompanying figures, wherein like reference numerals refer to like elements, in which:

FIGS. 43A-43C illustrate the battery module configured as a frame slide out, according to various exemplary embodiments;

FIGS. 58-62A illustrate topologies of a power management system circuit, according to an exemplary embodiments;

FIGS. 70 and 71 are perspective views of a cooling system of the battery module arranged on the frame of the battery module, according to an exemplary embodiment.

DETAILED DESCRIPTION

Figure 1:
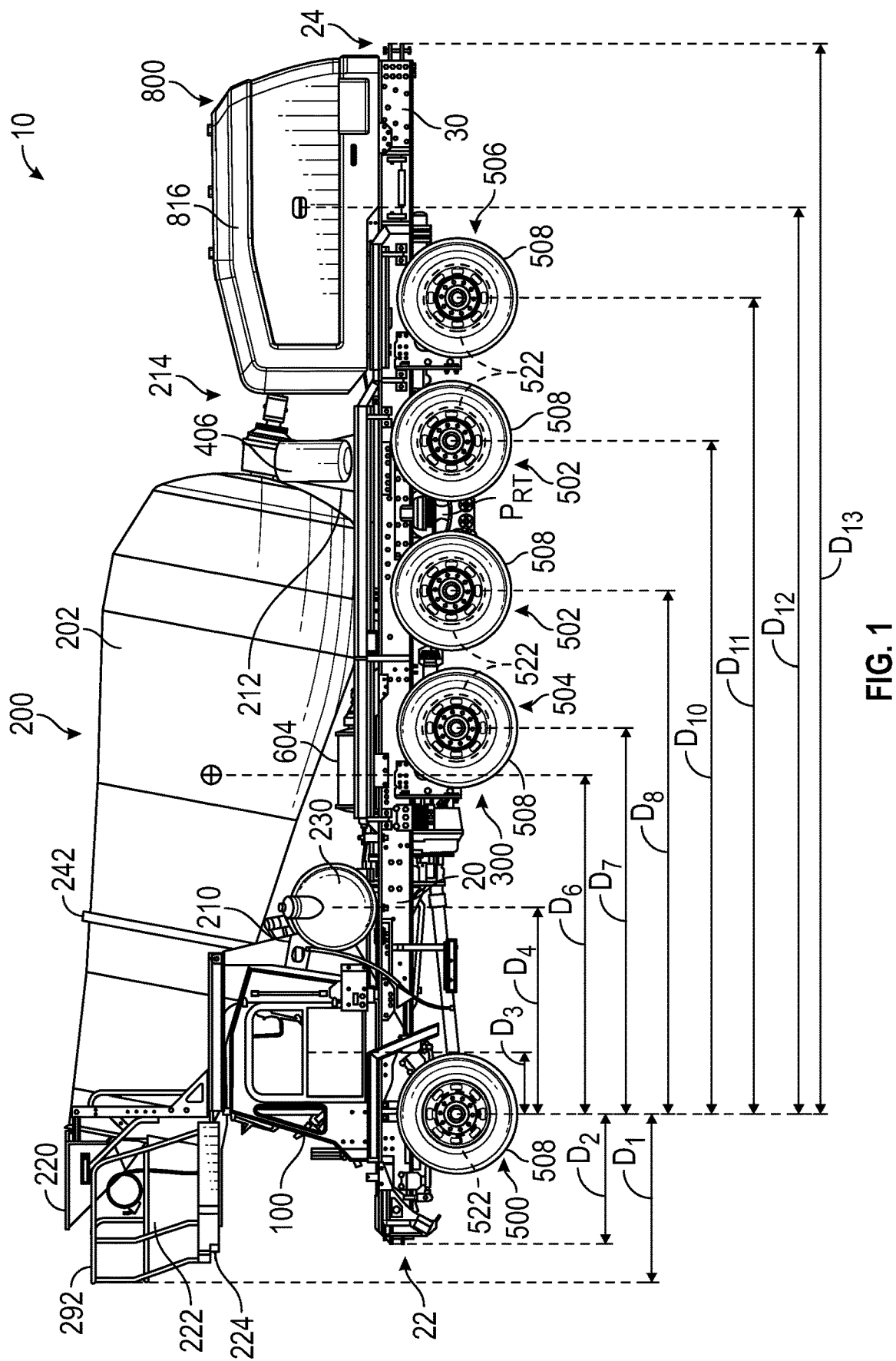
FIG. 1 is a side view of a concrete mixer truck, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

According to an exemplary embodiment, a concrete mixer truck is shown. The concrete mixer truck includes a chassis, a cab coupled the chassis near a front end of the chassis, and a drum assembly coupled to the chassis and extending behind the mixing drum assembly. The drum assembly includes a mixing drum rotatably coupled to the chassis by a front pedestal and a rear pedestal. The mixing drum defines an aperture near a front end of the drum assembly such that the concrete mixer truck is configured as a front discharge concrete mixer vehicle. The drum assembly further includes a hopper configured to direct concrete through the aperture and into the mixing drum and a chute configured to direct concrete dispensed from the mixing drum onto a desired location near the truck.

The concrete mixer truck further includes a drive system configured to propel the concrete mixer truck and to drive the various systems of the concrete mixer truck. The drive system includes a power plant module coupled to the chassis. The power plant module includes a first electromagnetic device and a second electromagnetic device coupled to the transmission. The first and second electromagnetic devices are each configured to consume electrical energy and provide rotational mechanical energy to the transmission. The drive system further includes a series of tractive assemblies including a front axle assembly and a pair of rear axle assemblies. The front axle assembly and the rear axle assemblies are driven by the power plant module and engage a support surface (e.g., the ground) to propel the vehicle.

The drive system further includes an accessory module configured to drive other functions of the concrete mixer truck. A power take off (PTO) shaft transfers rotational mechanical energy from the power plant module to the accessory module. The accessory module includes pumps, compressors, and an alternator. The pumps consume the rotational mechanical energy from the PTO shaft and provide pressurized hydraulic fluid to drive actuators that operate the mixing drum, the hopper, and the chute. The compressors consume the rotational mechanical energy from the PTO shaft and provide (a) compressed air to drive braking and suspension components of the drive system and (b) compressed refrigerant for use in a climate control system of the concrete mixer truck. The alternator consumes the rotational mechanical energy from the PTO shaft and provides electrical energy for use throughout the concrete mixer truck.

The concrete mixer truck includes a battery module configured to store and provide electrical energy. The battery module includes a series of individual battery assemblies electrically coupled to one another and configured to store electrical energy. The batteries are charged with electrical energy from an external power source (e.g., a generator, mains power from a power grid, etc.). The electrical energy from the battery assemblies is used to power the electromagnetic devices, propelling the concrete mixer truck and driving the accessory module.

Concrete Mixer Truck

According to the exemplary embodiment shown in FIGS. 1-4, a vehicle, shown as concrete mixer truck 10, is illustrated. Concrete mixer truck 10 may be a front discharge or rear discharge concrete mixer truck, configured to transport concrete from a mixing location to a point of use. In other embodiments, concrete mixer truck 10 is another type of vehicle (e.g., a refuse vehicle, a skid-loader, a telehandler, a plow truck, a boom truck, a fork lift, a scissor lift, a military vehicle, etc.). As shown in FIGS. 1-4, the concrete mixer truck 10 is a front discharge concrete mixer vehicle. According to an alternative embodiment, the concrete mixer truck 10 is a rear discharge concrete mixer vehicle. The concrete mixer truck 10 includes a chassis 20 configured to support the various components that transport concrete. The chassis 20 has a front end 22 and a rear end 24 defined with respect to the direction of travel of the concrete mixer truck 10. The chassis 20 includes a pair of frame rails 30 coupled with intermediate cross members, according to an exemplary embodiment. As shown in FIG. 1, the frame rails 30 extend in a generally-horizontal and longitudinal direction (e.g., extend within 10 degrees of perpendicular relative to a vertical direction, extend within ten degrees of parallel relative to a ground surface when concrete mixer truck 10 is positioned on flat ground, etc.) between the front end 22 and the rear end 24. The frame rails 30 may be elongated "C"-channels or tubular members, according to various exemplary embodiments. In other embodiments, the frame rails 30 include another type of structural element (e.g., monocoque, a hull, etc.). In still other embodiments, the frame rails 30 include a combination of elongated C-channels, tubular members, a monocoque element, and/or a hull element.

According to the exemplary embodiment shown in FIGS. 1-4, the concrete mixer truck 10 includes an operator cabin or front cabin, shown as cab 100. The cab 100 is coupled to the frame rails 30 near the front end 22. The cab 100 is configured to house one or more operators during operation of the concrete mixer truck 10 (e.g., when driving, when dispensing concrete, etc.). The cab 100 may include various components that facilitate operation and occupancy of the concrete mixer truck 10 (e.g., one or more seats, a steering wheel, control panels, screens, etc.).

Figure 5:
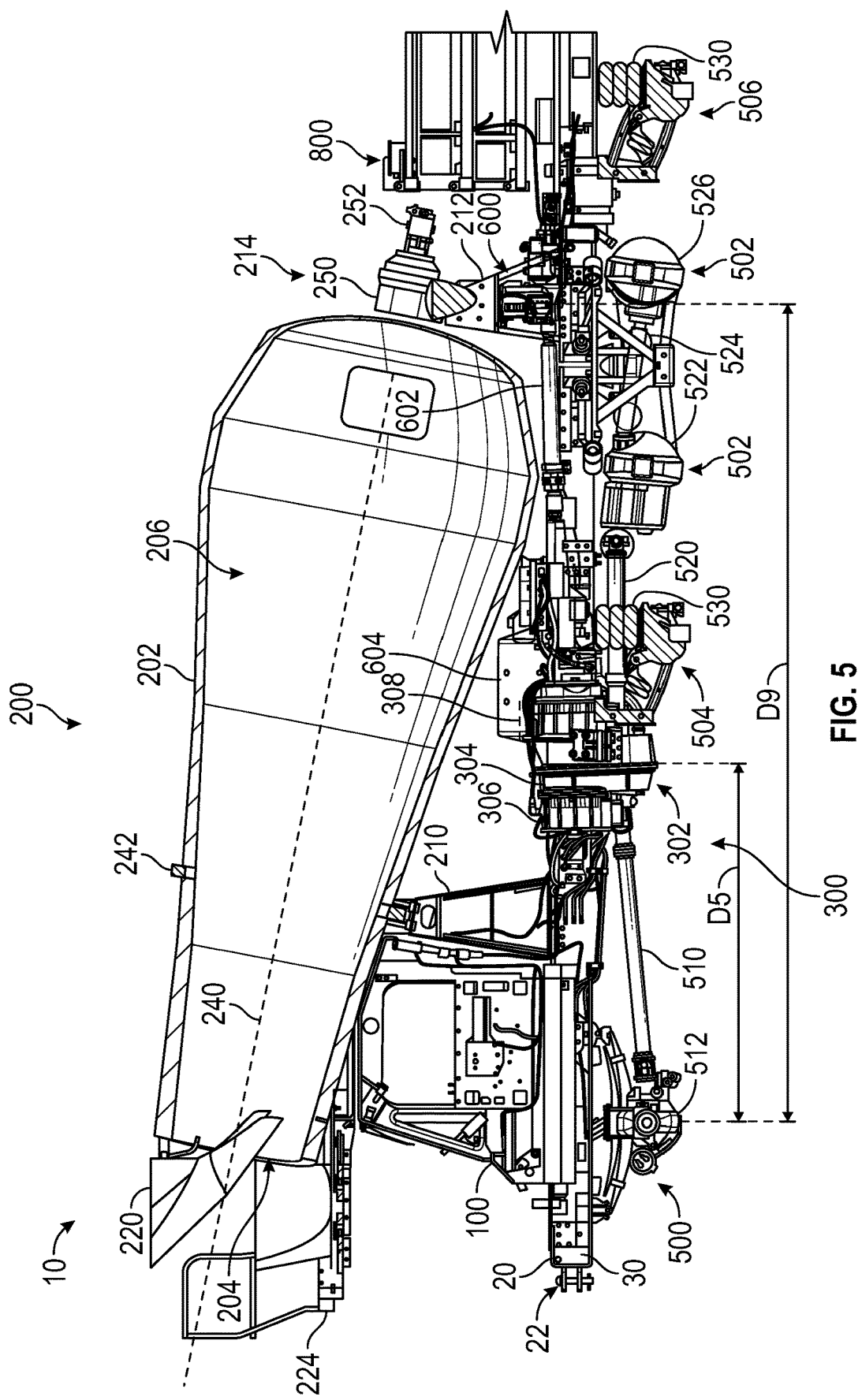
FIG. 5 is a side section view of the concrete mixer truck of FIG. 1.

The concrete mixer truck 10 further includes an assembly for mixing, storing, and dispensing concrete, shown as drum assembly 200. The drum assembly 200 includes a concrete mixing drum, shown as mixing drum 202. The mixing drum 202 extends longitudinally along the length of concrete mixer truck 10. According to an exemplary embodiment, the mixing drum 202 is angled relative to frame rail 30 (e.g., when viewed from the side of concrete mixer truck 10, etc.). The mixing drum 202 may include a front end that extends over the cab 100. As shown in FIG. 5, the front end of the mixing drum 202 defines an aperture 204 through which a mixture, such as a concrete mixture (e.g., cementitious material, aggregate, sand, etc.), can enter and exit an internal volume 206 of the mixing drum 202. The mixing drum 202 may include a mixing element (e.g., fins, etc.) positioned within the internal volume 206. The mixing element may be configured to (i) agitate the contents of mixture within the mixing drum 202 when the mixing drum 202 is rotated in a first direction (e.g., counterclockwise, clockwise, etc.) and (ii) drive the mixture within the mixing drum 202 out through the aperture 204 when the mixing drum 202 is rotated in an opposing second direction (e.g., clockwise, counterclockwise, etc.).

As shown in FIG. 1, the mixing drum 202 is coupled to frame rails 30 with a front drum pedestal, shown as front pedestal 210, and a rear drum pedestal, shown as rear pedestal 212. The mixing drum 202 may be rotatably coupled to the front pedestal 210 (e.g., with a plurality of wheels or rollers, etc.). A motor or driver assembly, shown as drum driver 214, couples the mixing drum 202 to the rear pedestal 212. In other embodiments, the mixing drum 202 is otherwise coupled to the frame rails 30. The drum driver 214 is configured to apply a torque to the mixing drum 202 to rotate the mixing drum 202 relative to the chassis 20. The drum driver 214 may be configured to selectively rotate the mixing drum 202 clockwise or counterclockwise, depending on the mode of operation of the concrete mixer truck 10 (e.g., whether concrete is being mixed or dispensed).

A hopper assembly, shown as hopper 220, and a chute assembly, shown as chute 222, are positioned near the aperture 204. The hopper 220 acts as an inlet to the drum assembly 200 and is used to direct material through the aperture 204 and into the internal volume 206. The chute 222 acts as an outlet of the drum assembly 200 and is used to direct concrete dispensed from the internal volume 206 of the mixing drum 202 to a target location near the concrete mixer truck 10. An operator platform, shown as work platform 224, is positioned above the cab 100 near the aperture 204 and facilitates access by an operator to the aperture 204, the hopper 220, and the chute 222 for maintenance and cleaning.

Figure 4:
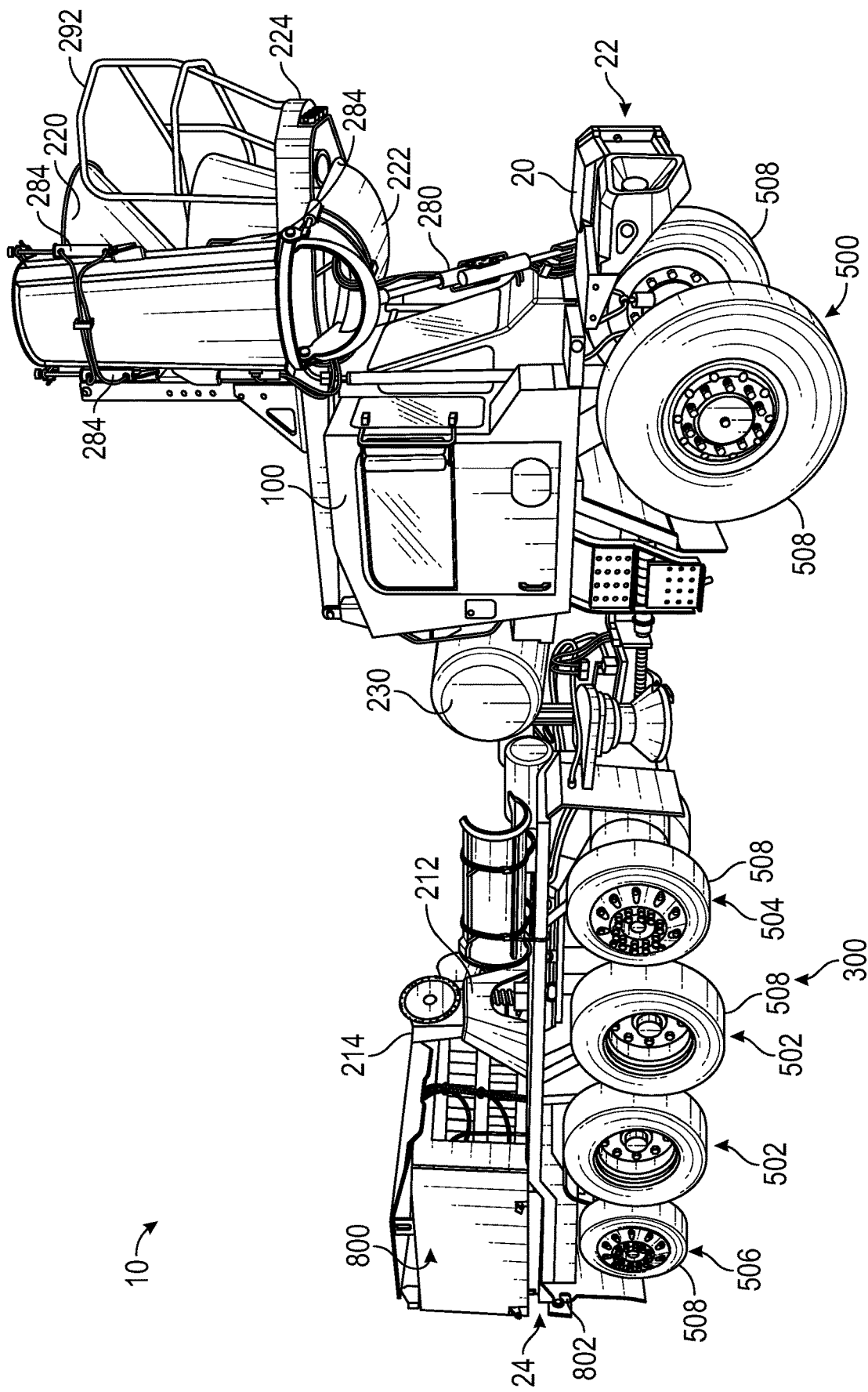
FIG. 4 is a side perspective view of the concrete mixer truck of FIG. 1.

Referring again to FIG. 1, the concrete mixer truck 10 includes a water tank 230. The water tank 230 is coupled to frame rails 30 and positioned beneath the mixing drum 202, according to an exemplary embodiment. As shown in FIGS. 1 and 4, the water tank 230 extends laterally across the width of the chassis 20. The water tank 230 may be used to supply water to wash the concrete mixer truck 10 after pouring a concrete load and/or to add water to the concrete at the construction site, among other uses.

Referring to FIGS. 1 and 5, the concrete mixer truck 10 includes a drive system 300 that is configured to propel the concrete mixer truck 10 and drive the other systems of the concrete mixer truck 10 (e.g., the drum driver 214, etc.). The drive system 300 includes a power plant module, prime mover module, or driver module, shown as power plant module 302, that is configured to supply rotational mechanical energy. As shown in FIG. 5, the power plant module 302 includes a transmission 304 and a first electrical machine, electromagnetic device, and/or motor/generator, shown as first electromagnetic device 306 and a second electrical machine, electromagnetic device, and/or motor/generator, shown as second electromagnetic device 308, coupled to the transmission 304. The first electromagnetic device 306 and the second electromagnetic device 308 are each configured provide a mechanical energy input to the transmission 304.

By way of example, the first electromagnetic device 306 and the second electromagnetic device 308 may be configured to supply a rotational mechanical energy input to the transmission 304.

The drive system 300 further includes a series of tractive assemblies coupled to the chassis 20 and configured to engage a support surface (e.g., the ground) to support the concrete mixer truck 10. As shown in FIG. 1, the drive system 300 includes a first driven tractive assembly, shown as front axle assembly 500, and a pair of second driven tractive assemblies, shown as rear axle assemblies 502. The front axle assembly 500 and the rear axle assemblies 502 are coupled to the power plant module 302 (e.g., through drive shafts, etc.) such that the front axle assembly 500 and the rear axle assemblies 502 at least selectively receive mechanical energy (e.g., rotational mechanical energy) and propel the concrete mixer truck 10. The drive system 300 further includes a pair of non-driven or non-powered tractive assemblies (e.g., pusher axles, lift axles, tag axles, etc.), shown as pusher axle assembly 504 and tag axle assembly 506. The pusher axle assembly 504 is positioned between the front axle assembly 500 and the rear axle assemblies 502. The tag axle assembly 506 is positioned rearward of the rear axle assemblies 502. The pusher axle assembly 504 and the tag axle assembly 506 are configured to be raised and lowered to selectively engage the support surface (e.g., based on the loading of the concrete mixer truck 10). In other embodiments, the drive system 300 includes other tractive assemblies and/or the tractive assemblies are otherwise configured.

The front axle assembly 500, the rear axle assemblies 502, the pusher axle assembly 504, and/or the tag axle assembly 506 may include brakes (e.g., disc brakes, drum brakes, air brakes, etc.), gear reductions, steering components, wheel hubs, wheels, tires, and/or other features. As shown in FIG. 1, front axle assembly 500, the rear axle assemblies 502, the pusher axle assembly 504, and the tag axle assembly 506 each include tractive elements, shown as wheel and tire assemblies 508. In other embodiments, at least one of the front axle assembly 500, the rear axle assemblies 502, the pusher axle assembly 504, and the tag axle assembly 506 include a different type of tractive element (e.g., a track, etc.).

Referring to FIG. 5, the drive system 300 further includes an assembly, shown as accessory module 600. The accessory module 600 is configured to receive mechanical energy (e.g., rotational mechanical energy) from the power plant module 302 and provide energy (e.g., pressurized fluid, compressed gas, electricity, etc.) to drive other systems throughout the concrete mixer truck 10. As shown in FIG. 5, the drive system 300 includes a driveshaft, shown as power take off (PTO) shaft 602, configured to transfer rotational mechanical energy from the power plant module 302 to the accessory module 600. The accessory module 600 can include pumps (hydraulic fluid pumps, water pumps, etc.), compressors (e.g., air compressors, air conditioning compressors, etc.), generators, alternators, and/or other types of energy generation and/or distribution devices configured to transfer the energy from the PTO shaft 602 to other systems.

As shown in FIG. 1, the drive system 300 includes a first vessel, container, reservoir, or tank, shown as air tank 604, and a second vessel, container, reservoir, or tank, shown as hydraulic fluid tank 606. The air tank 604 is configured to store compressed air (e.g., for use in an air brake system, for use when raising and lowering the pusher axle assembly 504 and/or the tag axle assembly 506, etc.). The hydraulic fluid tank 606 acts as a reservoir, storing hydraulic fluid for use in one or more hydraulic circuits (e.g., a circuit that includes the drum driver 214). The air tank 604 is coupled to the chassis 20 and positioned directly beneath the mixing drum 202. The hydraulic fluid tank 606 is coupled to a side of the rear pedestal 212. In other embodiments, the air tank 604 and/or the hydraulic fluid tank 606 are positioned elsewhere on the concrete mixer truck 10.

The concrete mixer truck 10 further includes an energy storage device, shown as battery module 800. The battery module 800 is coupled to the frame rails 30 near the rear end 24 of the chassis 20. In other embodiments, the concrete mixer truck 10 includes multiple battery modules spread throughout the concrete mixer truck 10, which cooperate to act as battery module 800. The battery module 800 includes one or more energy storage devices (e.g., batteries, capacitors, ultra-capacitors, etc.) configured to store energy. The battery module 800 is configured to provide the stored energy in the form of mechanical energy (e.g., rotational mechanical energy) to the first electromagnetic device 306 and/or the second electromagnetic device 308 to power the power plant module 302. The battery module 800 can be charged through an onboard energy source (e.g., through use of an onboard generator powered by an internal combustion engine, by operating the first electromagnetic device 306 and/or the second electromagnetic device 308 as generators, such as during regenerative braking, etc.) or through an external energy source (e.g., when receiving mains power from a power grid, etc.). Referring to FIG. 4, the concrete mixer truck 10 includes a connector or port, shown as charging port 802, which is configured to electrically couple the battery module 800 to an external energy source. In some embodiments, the concrete mixer truck 10 is a purely electric vehicle that does not include an engine and as such is driven by electrical energy in all modes of operation. In such embodiments, the concrete mixer truck 10 may not include a fuel tank.

In some embodiments, the concrete mixer truck 10 additionally or alternatively includes another type of prime mover, such as an engine. Such an engine may be configured to utilize one or more of a variety of fuels (e.g., gasoline, diesel, bio-diesel, ethanol, natural gas, etc.) and output mechanical energy. Such fuels may be stored in a fuel tank onboard the concrete mixer truck 10. This mechanical energy may be used directly (e.g., as a rotational mechanical energy input to the transmission 304, etc.) or converted into electrical energy that is subsequently used to charge the battery module 800 or to power the first electromagnetic device 306, the second electromagnetic device 308, and/or other electrical systems of the concrete mixer truck 10. In some embodiments that include an engine, one or more of the first electromagnetic device 306, the second electromagnetic device 308, and the battery module 800 are omitted. Accordingly, the concrete mixer truck 10 may be a purely electric vehicle, a hybrid vehicle, or a purely internal combustion vehicle.

Cab

Referring to FIGS. 2, 4, and 6-8, the cab 100 is shown according to an exemplary embodiment. The cab 100 includes at least one seat configured to support an operator. In one embodiment, the cab 100 includes one seat from which a single operator can control the concrete mixer truck 10 (e.g., a driver's seat). In another embodiment, the cab 100 includes two seats (e.g., a driver's seat and a passenger seat). The cab 100 may be configured such that functions of the concrete mixer truck 10 (e.g., the direction of rotation of the mixing drum 202, the orientation of the chute 222, etc.) are controlled from the driver's seat, from the passenger seat, or from both. In some embodiments, one or more functions of the concrete mixer truck 10 can be controlled from outside of the cab 100 (e.g., using a panel located on the exterior of the concrete mixer truck 10, using a portable device in communication with the concrete mixer truck 10 such as a smartphone, tablet, or laptop, etc.).

Figure 6:
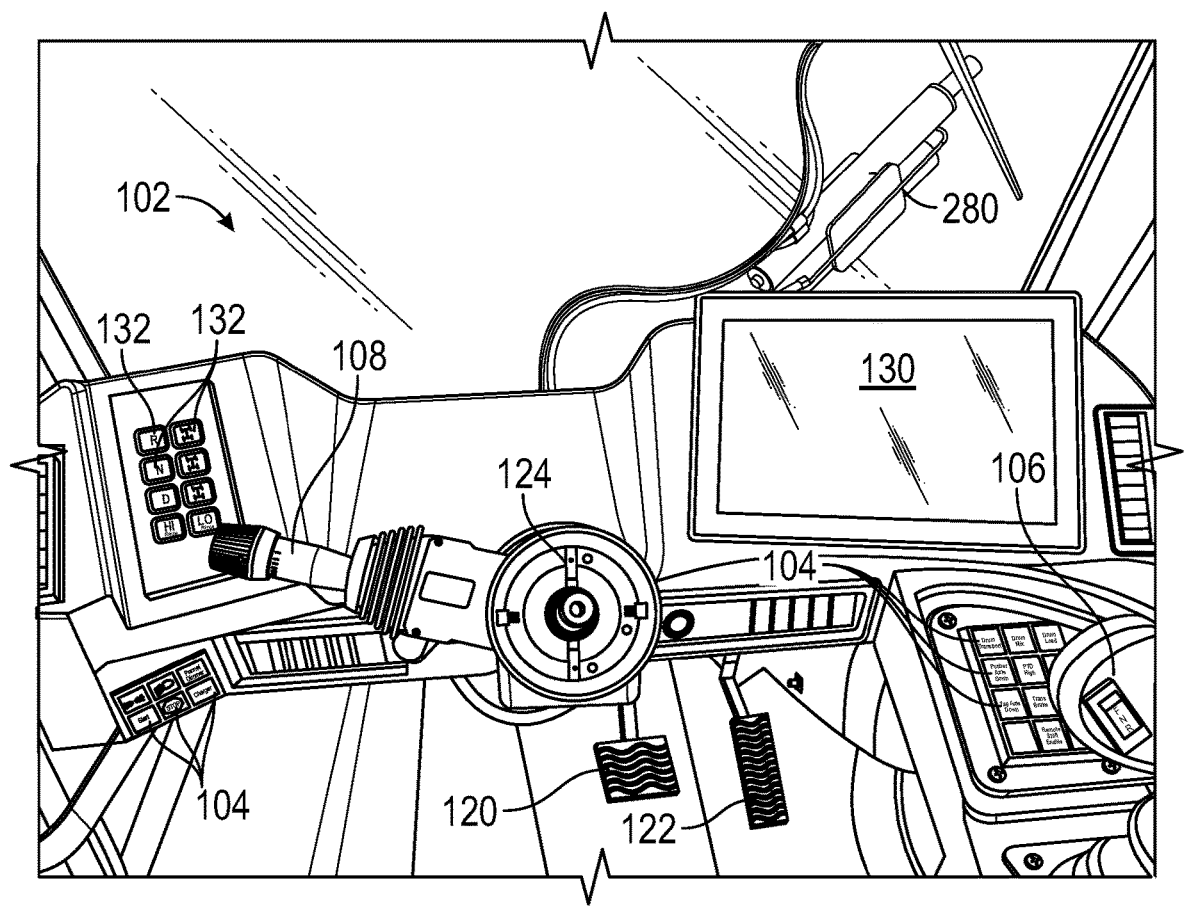
FIGS. 6-8 are perspective views from inside a cab of the concrete mixer truck of FIG. 1, according to an exemplary embodiment.
Figure 7:
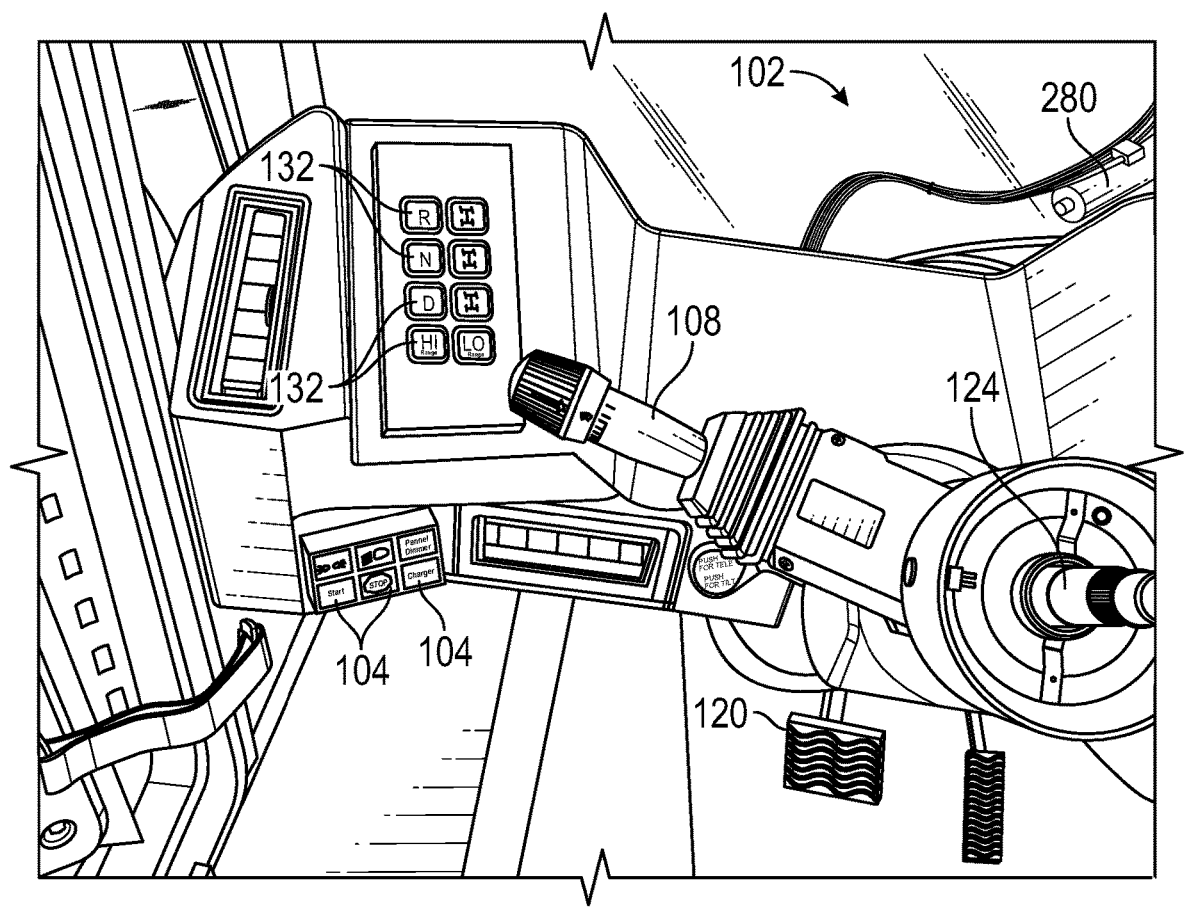
Figure 8:
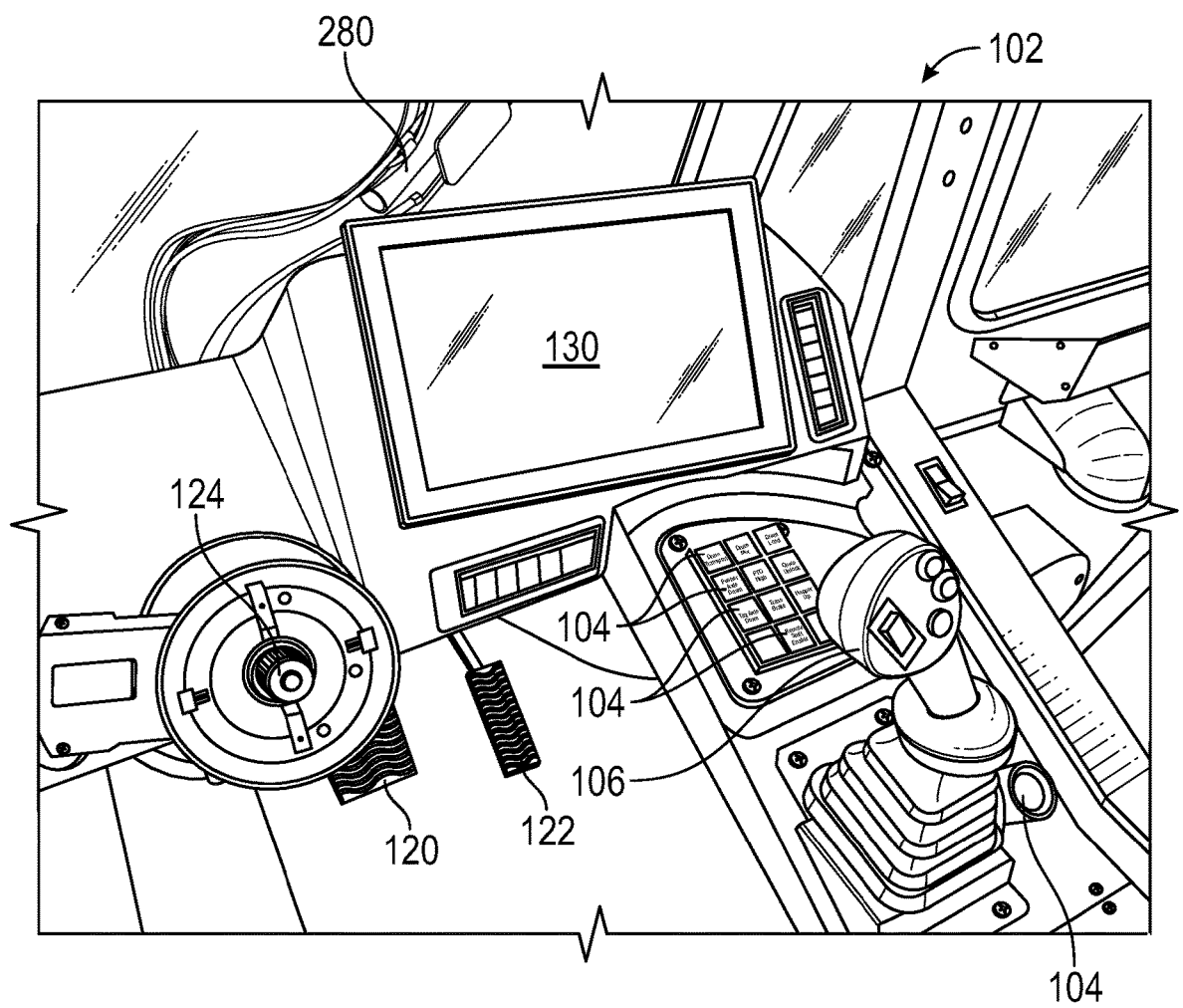

FIGS. 6-8 show the interior of the cab 100 from the perspective of an operator seated in a driver's seat of the cab 100. The cab 100 includes a control interface, shown as user interface 102, that facilitates control of the functions of the concrete mixer truck 10. The user interface 102 may be configured to accept commands from an operator and/or provide information to the operator regarding the operation of the concrete mixer truck 10. The user interface 102 may be operatively coupled to a controller of the concrete mixer truck 10. The user interface 102 can include buttons, switches, joysticks, steering wheels, pedals, levers, knobs, touchscreens, lights, screens, gauges, or other devices configured to receive operator inputs or provide information to an operator.

As shown in FIGS. 6-8, the user interface 102 includes a series of user interface devices, shown as buttons 104, each configured to control one or more functions. By way of example, the buttons 104 can control the drum assembly 200 (e.g., the rotation speed and rotation direction of the mixing drum 202, the position of the hopper 220, locking or unlocking the position of the chute 222, etc.). By way of another example, the buttons 104 can control the positions of the pusher axle assembly 504 and the tag axle assembly 506 (e.g., to raise or lower the axle assemblies). By way of another example, the buttons 104 can control the transmission 304 (e.g., shifting gears, braking an output, controlling the speed of an output such as the PTO shaft 602, etc.). By way of another example, the buttons 104 can control the headlights of the concrete mixer truck 10. By way of another example, the buttons 104 can turn the concrete mixer truck 10 on or off. The cab 100 further includes a user interface device, shown as joystick 106. The joystick 106 can be configured to control the orientation of the chute 222 (e.g., raising, lowering, rotating, etc.). The joystick 106 can include one or more buttons and/or switches that control the rotation speed and the rotation direction of the mixing drum 202. The user interface 102 further includes a user interface device, shown as signal lever 108. The signal lever 108 may be configured to control a windshield wiper (e.g., a windshield wiper speed, applying windshield wiper fluid, etc.). The signal lever 108 may additionally be configured to control one or more indicators (e.g., turn signals, etc.).

The user interface 102 further includes a pair of user interface devices, shown as brake pedal 120 and accelerator pedal 122. The brake pedal 120 may be configured to activate a brake system of the concrete mixer truck 10 (e.g., the brakes 532) when depressed. The accelerator pedal 122 may be configured to control the drive system 300 to propel the concrete mixer truck 10 when depressed. By way of example, a greater amount of electrical energy may be provided to the first electromagnetic device 306 and the second electromagnetic device 308 in response to the accelerator pedal 122 being depressed. The brake pedal 120 and the accelerator pedal 122 may be mechanically coupled (e.g., through one or more cables) to the systems that they control. Alternatively, the brake pedal 120 and the accelerator pedal 122 may be electrically coupled to the systems that they control. By way of example, the brake pedal 120 and the accelerator pedal 122 may be sensors, and a controller maybe configured to control the concrete mixer truck 10 in response to user input detected by those sensors. The user interface further includes a user interface device, shown as steering shaft 124. The steering shaft 124 may be directly coupled to a steering wheel to facilitate user input. The steering shaft 124 may be configured to control one or more steering components to steer the concrete mixer truck 10.

The user interface 102 further includes a user interface device (e.g., a screen, a touchscreen, a display, etc.), shown as tablet 130. The tablet 130 may be configured to display information regarding the current operation of the concrete mixer truck 10 (e.g., the speed of the concrete mixer truck 10, the amount of material in the mixing drum 202, the characteristics of the material in the mixing drum 202 such as slump, the charge level of the battery module 800, etc.). The tablet 130 may be a touchscreen such that the tablet 130 is configured to receive user inputs (e.g., user preferences, to navigate through menus, etc.). In one embodiment, the tablet 130 is removable from the cab 100 and is configured to communicate wirelessly with the concrete mixer truck 10 such that the tablet 130 can be used to control the concrete mixer truck 10 from outside of the cab 100. The user interface 102 further includes one or more indicators, shown as lights 132. The lights 132 may be configured to illuminate to indicate information to the operator, such as the current configuration of the transmission 304 (e.g., a drive gear, a neutral gear, a reverse gear, a high or low speed range, etc.).

Drum Assembly

Referring to FIGS. 1-5, the drum assembly 200 is shown according to an exemplary embodiment. The mixing drum 202 is rotatably coupled to the front pedestal 210 and the rear pedestal 212 such that the mixing drum 202 rotates about an axis of rotation, shown in FIG. 5 as axis 240, that is angled relative to the chassis 20, raising the aperture 204 relative to a base of the mixing drum 202. Specifically, the drum assembly 200 includes an annular member, shown as bearing ring 242. The bearing ring 242 is fixedly coupled to the exterior of the mixing drum 202. The bearing ring 242 has a hardened surface (e.g., formed from hardened steel, etc.) that engages the front pedestal 210 (e.g., one or more rollers of the front pedestal 210, etc.). In some embodiments, the hardened surface of the bearing ring 242 is centered about the axis 240. The bearing ring 242 supports a front portion of the mixing drum 202 and the material therein, and the hardened surface of the bearing ring 242 reduces wear as the mixing drum 202 rotates. The drum driver 214 is coupled to a rear or base portion of the mixing drum 202 and a top end of the rear pedestal 212. The drum driver 214 supports a rear portion of the mixing drum 202 and the material therein.

As shown in FIG. 5, the drum driver 214 includes a transmission, shown as drum drive transmission 250, and a driver, shown as drum drive motor 252, coupled to drum drive transmission 250. According to the exemplary embodiment shown in FIG. 5, the drum drive motor 252 is a hydraulic motor. In other embodiments, the drum drive motor 252 is another type of actuator (e.g., an electric motor, etc.). The drum drive motor 252 is configured to provide an output torque to the drum drive transmission 250, according to an exemplary embodiment, which rotates the mixing drum 202 about the axis 240. As shown in FIG. 5, the drum drive transmission 250 extends rearward (i.e., toward the rear end 24 of the chassis 20, toward the battery module 800, etc.) from the base portion of the mixing drum 202, and the drum drive motor 252 extends rearward from the drum drive transmission 250. The drum drive transmission 250 extends directly above the rear pedestal 212. The drum drive transmission 250 includes a plurality of gears (e.g., a planetary gear reduction set, etc.) configured to increase the turning torque applied to mixing drum 202, according to an exemplary embodiment. The plurality of gears may be disposed within a housing.

Figure 2:
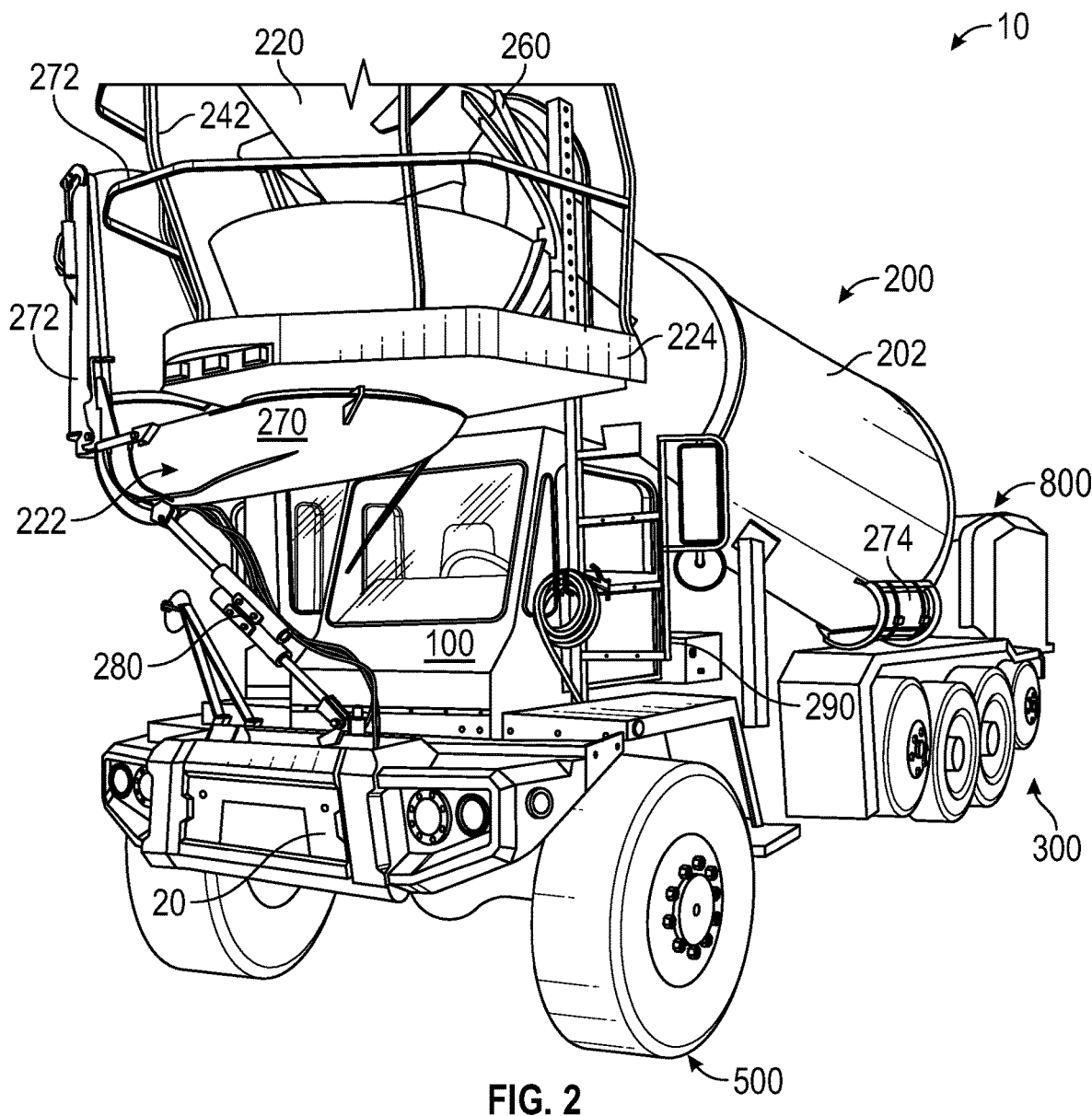
FIG. 2 is a front perspective view of the concrete mixer truck of FIG. 1.

The hopper 220 is pivotally coupled to the work platform 224 such that the hopper 220 is configured to rotate about a horizontal, lateral axis. Specifically, the hopper 220 is configured to move between a lowered position, shown in FIG. 5, and a raised position above the lowered position. In the lowered position, the hopper 220 is configured to direct material (e.g., concrete) from a source positioned above the concrete mixer truck 10 (e.g., a batch plant) through the aperture 204 and into the internal volume 206 of the mixing drum 202. The lowered position may also facilitate transport of the concrete mixer truck 10 by lowering the overall height of the concrete mixer truck 10. In the raised position, the hopper 220 moves away from the aperture 204 and facilitates material flowing unobstructed out of the aperture 204 and into the chute 222. As shown in FIG. 2, the drum assembly 200 includes a driver, shown as hopper actuator 260, configured to move the hopper 220 between the raised and lowered positions. The hopper actuator 260 is coupled to the hopper 220 and the work platform 224. According to the exemplary embodiment shown in FIG. 2, the hopper actuator 260 is a hydraulic cylinder. In other embodiments, the hopper actuator 260 is another type of actuator (e.g., a pneumatic cylinder, a lead screw driven by an electric motor, etc.).

Referring to FIGS. 2, 3, 9A, and 9B, the chute 222 is pivotally coupled to the work platform 224 such that the chute 222 is configured to rotate about both a vertical axis and a horizontal axis. The chute 222 includes a first chute section, shown as base section 270 that is directly pivotally coupled to the work platform 224. A second chute section, shown as folding section 272, is pivotally coupled to the distal end of the base section 270. Another folding section 272 is pivotally coupled to the distal end of the first folding section 272. A third chute section, shown as removable section 274, is removably coupled to the end of the second folding section 272. The chute 222 is selectively reconfigurable between a storage or transport configuration, shown in FIGS. 2 and 3, and a use configuration, shown in FIGS. 9A and 9B. In the transport configuration, the base section 270 is oriented substantially horizontal and extends laterally outward. The folding sections 272 are arranged adjacent one another and extend substantially vertically. The removable sections 274 are removed from the folding sections 272 and stored elsewhere in the concrete mixer truck 10 (e.g., coupled to the chassis beneath the mixing drum 202, etc.). In the transport configuration, the chute 222 minimally obscures the view of an operator positioned within the cab 100. In the use configuration, the base section 270 and the folding sections 272 are aligned with one another to form a continuous path through which material can flow. One or more of the removable sections 274 can be coupled to the distal end of the folding sections 272 to increase the length of the chute 222 (e.g., to distribute concrete farther away from the aperture 204).

The drum assembly 200 includes a first driver or actuator, shown as chute height actuator 280, extending between the chute 222 and the chassis 20. Specifically, the chute height actuator 280 is pivotally coupled to the chassis 20 near the front end 22 and the base section 270. The chute height actuator 280 is configured to raise and lower the chute 222 to control the orientation of the chute 222 relative to a horizontal plane (e.g., the ground). According to the exemplary embodiment shown in FIG. 2, the chute height actuator 280 is a pair of opposing hydraulic cylinders. In other embodiments, the chute height actuator 280 is another type of actuator (e.g., a pneumatic cylinder, a lead screw driven by an electric motor, etc.). In some embodiments, the chute height actuator 280 and the chute 222 are both configured to rotate about the same or substantially the same vertical axis. Accordingly, the chute 222 remains at a constant or substantially constant height as the chute 222 rotates about the vertical axis.

The drum assembly 200 includes a second driver or actuator, shown as chute rotation actuator 282 coupled to the base section 270 of the chute 222 and the work platform 224. The chute rotation actuator 282 is configured to rotate the chute 222 about the vertical axis. The chute rotation actuator 282 is configured to move the distal end of the chute 222 through an arc along the left, front, and right sides of the chassis 20 (e.g., a 150 degree arc, a 180 degree arc, a 210 degree arc, etc.). In one embodiment, the chute rotation actuator 282 is a hydraulic motor. In other embodiments, the chute rotation actuator 282 is another type of actuator (e.g., a pneumatic motor, an electric motor, etc.).

The drum assembly 200 further includes a series of third drivers or actuators, shown as chute folding actuators 284. The chute folding actuators 284 are configured to rotate both (a) the first folding section 272 relative to the base section 270 and (b) the second folding section 272 relative to the first folding section 272. One pair of chute folding actuators 284 are coupled to the base section 270 and the first folding section 272. Another pair of chute folding actuators 284 are coupled to both of the folding sections 272. The chute folding actuators 284 are configured to extend to move the folding sections 272 toward the transport configuration and to retract to move the folding sections 272 toward the use configuration. According to the exemplary embodiment shown in FIGS. 2 and 3, the chute folding actuators 284 are hydraulic cylinders. In other embodiments, the chute folding actuators 284 are another type of actuator (e.g., a pneumatic cylinder, a lead screw driven by an electric motor, etc.).

Figure 3:
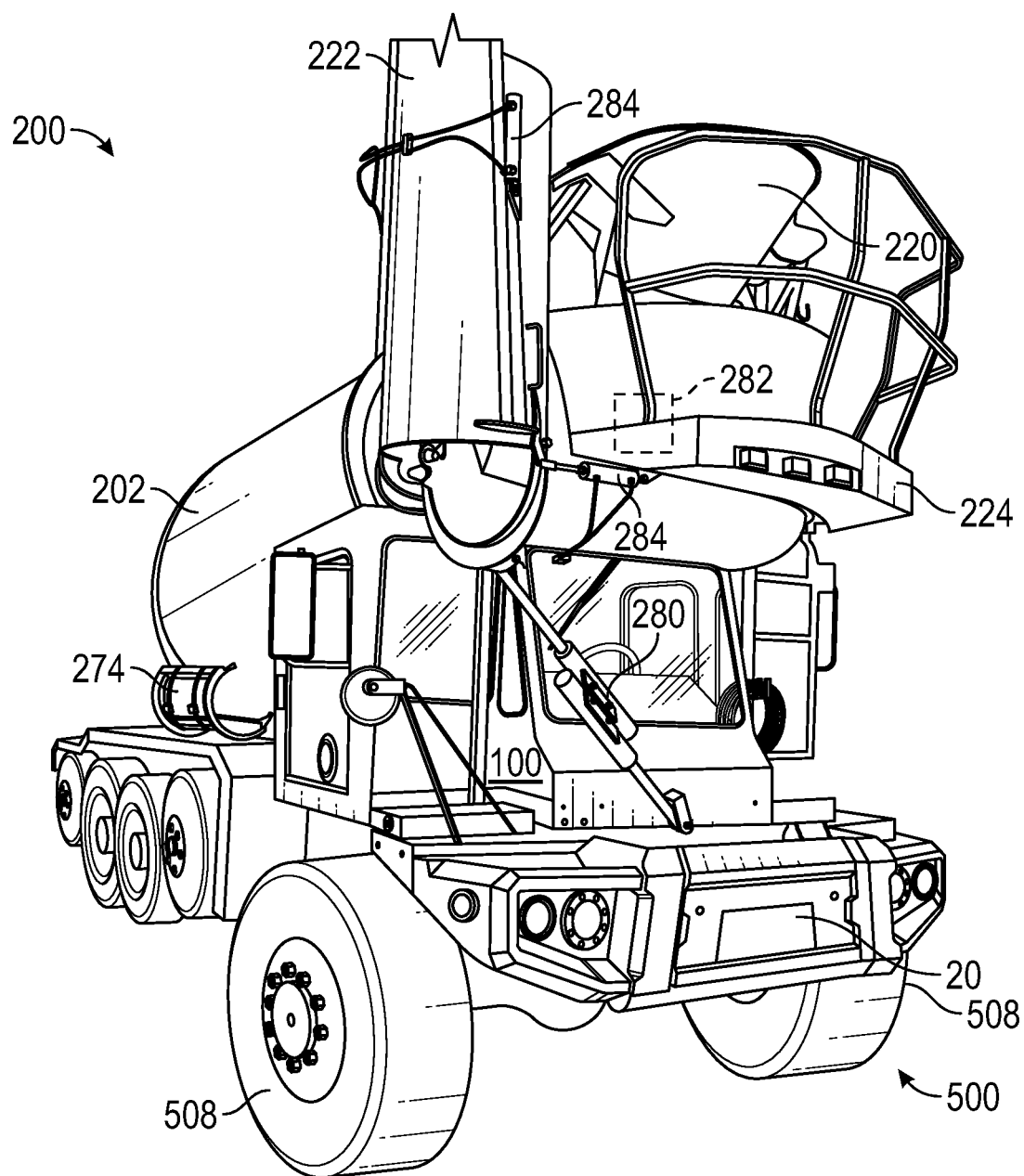
FIG. 3 is another front perspective view of the concrete mixer truck of FIG. 1.
Figure 9A:
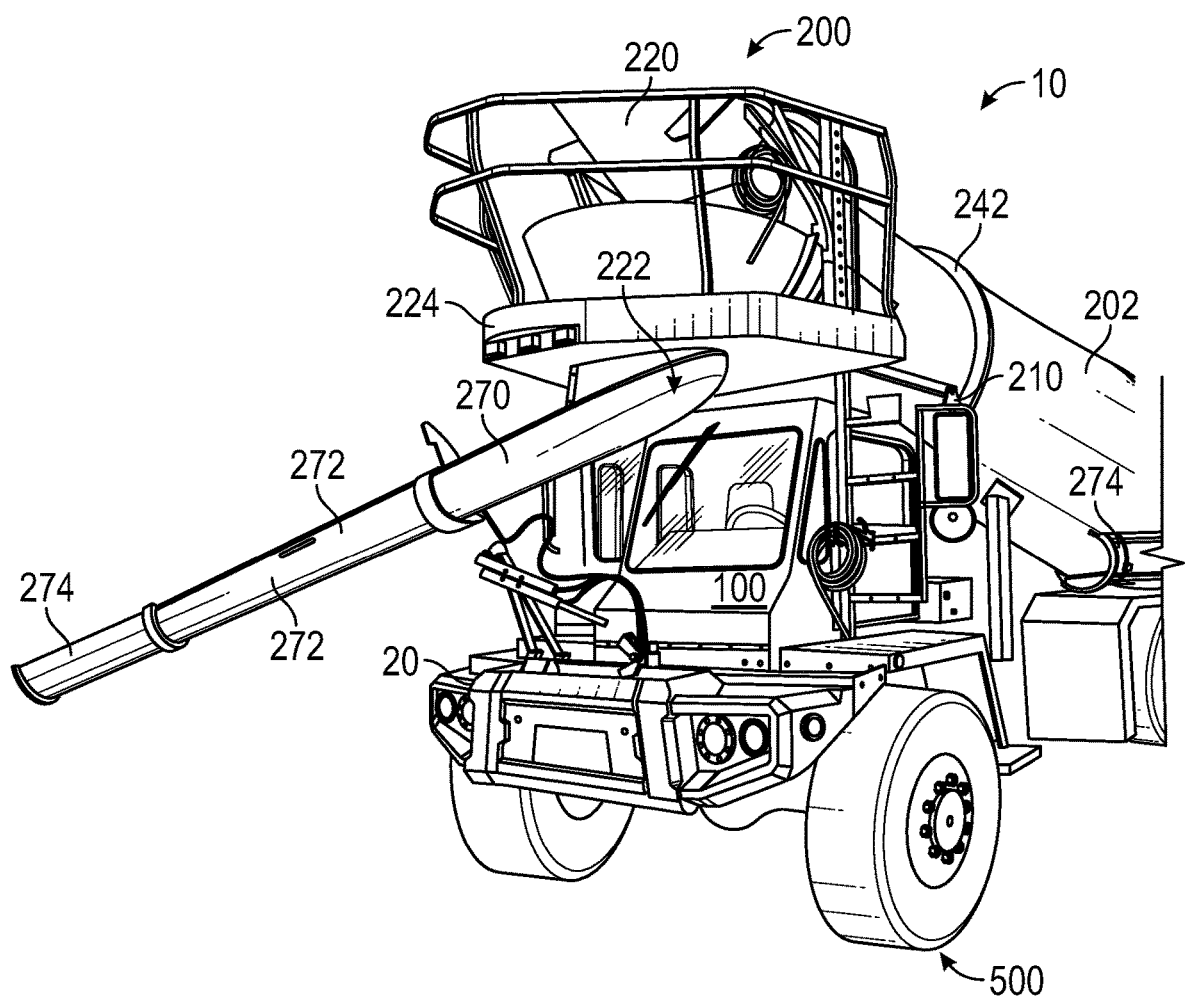
FIGS. 9A and 9B are perspective views of the concrete mixer truck of FIG. 1 with a chute of the concrete mixer truck in a use configuration, according to an exemplary embodiment.
Figure 9B:
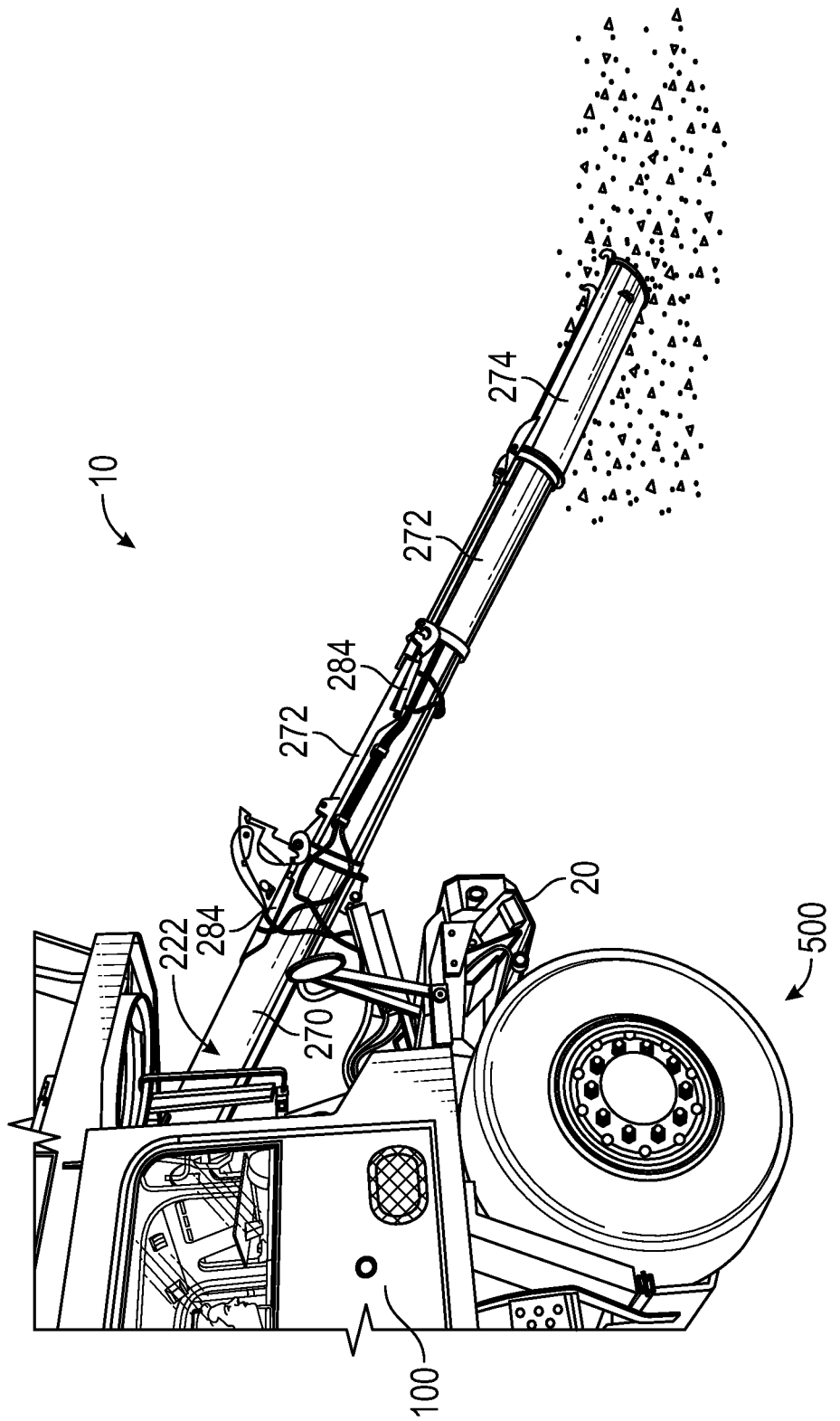

Referring to FIGS. 2-4, the work platform 224 is shown according to an exemplary embodiment. The work platform 224 is coupled to the cab 100 and the front pedestal 210 (e.g., as shown in FIG. 9A). The work platform 224 is positioned above the cab 100 such that the work platform 224 minimally obscures the vision of an operator positioned within the cab 100. The work platform 224 defines a substantially flat surface configured to support an operator (e.g., for maintenance purposes, to view or access the internal volume 206 of the mixing drum 202, etc.). The work platform 224 partially surrounds the aperture 204. To facilitate access to the work platform 224, the drum assembly 200 includes an access assembly, shown as ladder 290. The ladder 290 extends between and is coupled to the chassis 20 and the work platform 224 laterally outward from the cab 100. The drum assembly 200 further includes a divider, shown as railing 292, configured to support and contain operators positioned atop the work platform 224.

In operation, the concrete mixer truck 10 is configured to receive material (e.g., concrete, etc.), transport the material to a job site where the material will be used while mixing the material, and dispense the material in a target location at the job site. The concrete mixer truck 10 may be configured to receive material from a source positioned above the concrete mixer truck 10, such as a concrete batch plant. When receiving the material, the hopper 220 is in the lowered position and the chute 222 is in the transport configuration. Accordingly, material can be deposited into the hopper 220, and the hopper 220 directs the material into the internal volume 206 of the mixing drum 202 through the aperture 204. While material is being added to the mixing drum 202, the drum driver 214 may drive the mixing drum in the first direction to agitate the material and facilitate fully packing the mixing drum 202. Alternatively, the mixing drum 202 may be stationary while material is added to the mixing drum 202. In some embodiments, the concrete mixer truck 10 remains in the same configuration both when receiving material and when transporting material to a job site.

Once at the job site, the concrete mixer truck 10 is configured to dispense the material onto a desired location (e.g., into a form, onto the ground, etc.). The hopper 220 is rotated into the raised position by the hopper actuator 260 (e.g., in response to the operator pressing a button 104, etc.). The folding sections 272 of the chute 222 are extended by the chute folding actuators 284 to reconfigure the chute 222 into the use configuration. An operator can then couple one or more removable sections 274 to the distal end of the second folding section 272 to increase the overall length of the chute 222. Once the chute 222 is in the use configuration, the operator can control the chute height actuator 280 and/or the chute rotation actuator 282 to adjust the orientation of the chute 222 and thereby direct the material onto the desired location. By way of example, the operator may control the chute height actuator 280 and the chute rotation actuator 282 using the joystick 106. Once the chute 222 is in the desired orientation, the operator can control the drum driver 214 to rotate the mixing drum 202 in the second direction, expelling material through the aperture 204 and into the chute 222. The operator may control the speed of the mixing drum 202 to adjust the rate at which material is delivered through the chute 222. By way of example, the operator may control the speed and direction of rotation of the drum driver 214 using one or more buttons positioned on the joystick 106. Throughout the process of dispensing the material, the operator can change the location onto which the material is dispensed by varying the orientation of the chute 222 and/or by controlling the drive system 300 to propel the concrete mixer truck 10.

Drive System

A primary power source of the cement mixer truck 10 is configured to directly, or indirectly, supply the various components of the cement mixer truck 10 with the power needed to operate the concrete mixer truck 10. The primary power source may be defined by any number of different types of power sources. According to various embodiments, users may take advantage of the ability to easily and quickly substitute a first type of primary power source with a second, different type of power source to retrofit the concrete mixer truck 10 with a new, more efficient primary power source one or more times over the life of the concrete mixer truck 10, so as to take advantage of such options as they become available.

According to some embodiments, the primary power source may comprise an internal combustion engine configured to utilize one or more of a variety of fuels (e.g., gasoline, diesel, bio-diesel, ethanol, natural gas, etc.) to output mechanical energy. However, in light of the advances and improvements in battery/electric vehicle technologies, according to some embodiments, the primary power source may comprise one or more battery modules 800 configured to store energy that is subsequently converted to mechanical energy to power the various components of the concrete mixer truck 10. In such embodiments, the battery module 800 may comprise one or more battery assemblies 820 that store chemical energy (e.g., lithium ion batteries, lead acid batteries, nickel-cadmium batteries, etc.) and/or electrical energy (e.g. capacitors or supercapacitors).

Figure 10:
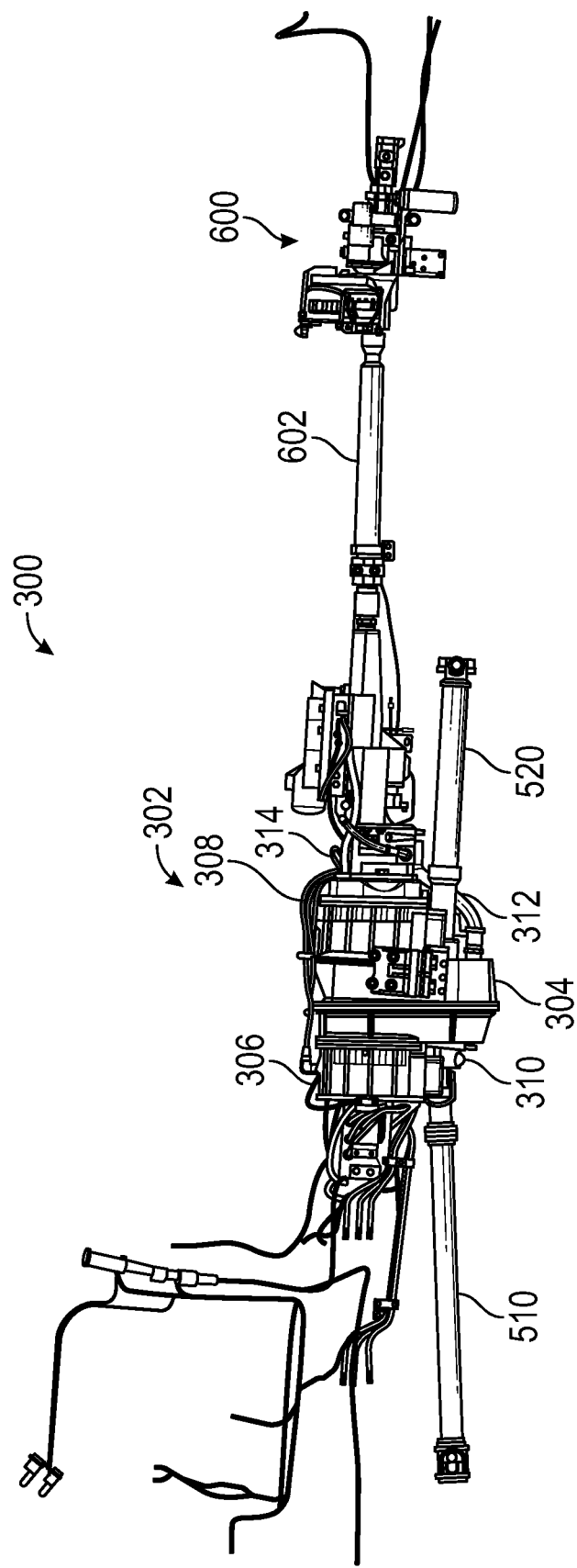
FIG. 10 is a side view of a drive system of the concrete mixer truck of FIG. 1, according to an exemplary embodiment.
Figure 11:
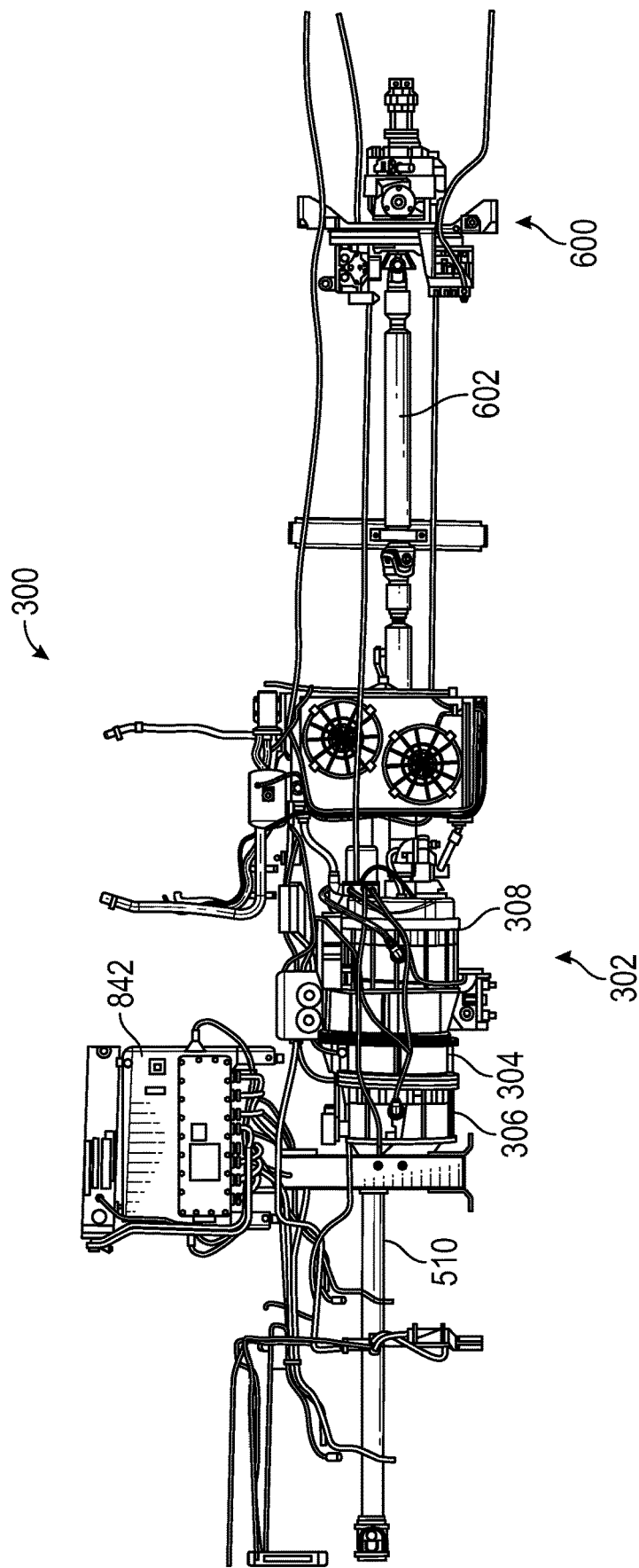
FIG. 11 is a top view of the drive system of FIG. 10.

Referring to FIGS. 5, 10, and 11, the power plant module 302 is shown according to an exemplary embodiment. The power plant module 302 is coupled the chassis 20 and positioned near the longitudinal center of the concrete mixer truck 10 beneath the mixing drum 202. In the power plant module 302, the first electromagnetic device 306 and the second electromagnetic device 308 are coupled to the transmission 304. The first electromagnetic device 306 is positioned on a front side of the transmission 304, and the second electromagnetic device 308 is positioned on an opposite, rear side of the transmission 304. Accordingly, the transmission 304 extends directly between the first electromagnetic device 306 and the second electromagnetic device 308. The first electromagnetic device 306 and the second electromagnetic device 308 are coupled to the transmission 304 such that rotational mechanical energy can be transferred between the first electromagnetic device 306 and the transmission 304 and between the second electromagnetic device 308 and the transmission 304.

The power plant module 302 includes three rotational mechanical energy inputs and/or outputs (e.g., shafts, joints, couplers, receptacles, etc.), shown as front drive output 310, rear drive output 312, and PTO output 314. The front drive output 310, the rear drive output 312, and the PTO output 314 transfer rotational mechanical energy from the power plant module 302 to other systems of the concrete mixer truck 10. The front drive output 310, the rear drive output 312, and the PTO output 314 may additionally or alternatively be configured to transfer rotational mechanical energy from outside of the power plant module 302 into the power plant module 302 (e.g., to perform regenerative braking, etc.). As shown in FIG. 10, the PTO output 314 is radially aligned (i.e., concentric) with the first electromagnetic device 306 and the second electromagnetic device 308. The front drive output 310 and the rear drive output 312 are radially aligned with one another and radially offset below the PTO output 314.

The first electromagnetic device 306 and the second electromagnetic device 308 are configured to receive electrical energy (e.g., from the battery module 800) and provide rotational mechanical energy to the transmission 304. According to the embodiment shown in FIG. 10, the first electromagnetic device 306 and the second electromagnetic device 308 operate using alternating current. In other embodiments, one or both of the first electromagnetic device 306 and the second electromagnetic device 308 operate using direct current. The first electromagnetic device 306 and the second electromagnetic device 308 can each be configured to provide rotational mechanical energy separately, or both electromagnetic devices can provide rotational mechanical energy simultaneously. The first electromagnetic device 306 the second electromagnetic device 308 may have variable speeds and/or torques to facilitate varying the output speeds and/or torques of the front drive output 310, the rear drive output 312, and the PTO output 314.

The first electromagnetic device 306 and the second electromagnetic device 308 may additionally be configured to receive a mechanical energy output from the transmission 304 (e.g., when the concrete mixer truck 10 is traveling downhill and/or braking) and provide an electrical energy output. By way of example, at least one of the first electromagnetic device 306 and the second electromagnetic device 308 may be configured to receive rotational mechanical energy from the transmission 304 and provide an electrical energy output (i.e., at least one of the first electromagnetic device 306 and the second electromagnetic device 308 may operate as a generator, etc.). The operational condition of the first electromagnetic device 306 and the second electromagnetic device 308 (e.g., as a motor, as a generator, etc.) may vary based on a mode of operation associated with the transmission 304 and/or based on an operating condition of the concrete mixer truck 10 (e.g., a loaded weight of the concrete mixer truck 10, grade that the concrete mixer truck 10 is climbing, a load on the accessory module 600, etc.).

The transmission 304 is configured to transfer the rotational mechanical energy from the first electromagnetic device 306 and the second electromagnetic device 308 to the front drive output 310, the rear drive output 312, and the PTO output 314. The transmission 304 can include gears (e.g., planetary gear sets, spur gear sets, etc.), clutches, brakes, and other power transmission devices. The transmission 304 may be configured to vary the output speed, output torque, and rotation direction of the front drive output 310, the rear drive output 312, and the PTO output 314 (e.g., by engaging one or more clutches or brakes, etc.). By way of example, the transmission 304 may be selectively reconfigurable between low speed, medium or mid speed, and high speed configurations. By way of another example, the transmission 304 may be configured to selectively vary a rotation direction of one or more of the outputs (e.g., entering a reverse configuration). The transmission 304 may be configured to selectively decouple one or more of the front drive output 310, the rear drive output 312, and the PTO output 314 from the first electromagnetic device 306 and the second electromagnetic device 308. By way of example, the transmission 304 may be configured to drive the PTO output 314 without operating the front drive output 310 or the rear drive output 312.

The front drive output 310 is coupled to a first drive shaft, shown as front drive shaft 510 (e.g., through a universal joint or constant velocity joint). As shown in FIG. 10, the front drive shaft 510 includes one single segment. In other embodiments, the front drive shaft 510 includes two or more segments. The front drive shaft 510 is coupled to a power transfer device of the front axle assembly 500, shown as front differential 512. The front differential 512 is coupled to the wheel and tire assemblies 508 of the front axle assembly 500 through a pair of half shafts. In operation, rotational mechanical energy from the front drive output 310 is transferred through the front drive shaft 510, the front differential 512, and the half shafts to the wheel and tire assemblies 508 of the front axle assembly 500, and the wheel and tire assemblies 508 propel the concrete mixer truck 10.

The rear drive output 312 is coupled to a second drive shaft, shown as rear drive shaft 520 (e.g., through a universal joint or a constant velocity joint). As shown in FIG. 10, the rear drive shaft 520 includes one single segment. In other embodiments, the rear drive shaft 520 includes two or more segments. The rear drive shaft 520 is coupled to a power transfer device of the front most rear axle assembly 502, shown as rear differential 522. The rear differential 522 is coupled to the wheel and tire assemblies 508 of the front most rear axle assembly 502 through a pair of half shafts. A third drive shaft, shown as rear drive shaft 524, is coupled to the rear differential 522. As shown in FIG. 5, the rear drive shaft 524 includes one single segment. In other embodiments, the rear drive shaft 524 includes two or more segments. The rear drive shaft 524 is coupled to a power transfer device of the rearmost rear axle assembly 502, shown as rear differential 526. The rear differential 526 is coupled to the wheel and tire assemblies 508 of the rearmost rear axle assembly 502 through a pair of half shafts. In operation, rotational mechanical energy from the rear drive output 312 is transferred through the rear drive shaft 520, the rear differential 522, and the half shafts to the wheel and tire assemblies 508 of the front most rear axle assembly 502, and rotational mechanical energy from the rear differential 522 is transferred through the rear drive shaft 524, the rear differential 526, and the half shafts to the wheel and tire assemblies 508 of the rearmost rear axle assembly 502. The wheel and tire assemblies 508 then propel the concrete mixer truck 10.

The pusher axle assembly 504 and the tag axle assembly 506 are each configured to be raised and lowered to selectively engage a support surface (e.g., the ground, etc.), redistributing the loads imparted on the axle assemblies by the weight of the concrete mixer truck 10. As shown in FIG. 5, the pusher axle assembly 504 and the tag axle assembly 506 each include a set of actuators, shown as airbags 530. The airbags 530 are coupled to and extend between the chassis 20 and the corresponding pusher axle assembly 504 or tag axle assembly 506. The airbags 530 are configured to receive or release compressed gas (e.g., air, etc.) to extend or retract. When the airbags 530 are filled with gas, the airbags 530 expand, forcing the pusher axle assembly 504 and/or the tag axle assembly 506 downward against the ground. This force causes the pusher axle assembly 504 and/or the tag axle assembly 506 to lift the chassis 20 and the components supported by the chassis 20, lessening the load on the front axle assembly 500 and/or the rear axle assembly 502. Such a configuration reduces the pressure exerted on the ground by the concrete mixer truck 10 and may be required when traveling through certain municipalities under load. When the gas is removed from the airbags 530, the pusher axle assembly 504 and the tag axle assembly 506 are lifted off of contact with the ground, and the front axle assembly 500 and the rear axle assembly 502 experience higher loading. The airbags 530 may be configured such that the pusher axle assembly 504 and the tag axle assembly 506 can be raised and lowered independently or together. By way of example, the pusher axle assembly 504 may be lowered when the mixing drum 202 is loaded to support the weight of the material within the mixing drum 202. By way of another example, the tag axle assembly 506 can be lowered to support the weight of the battery module 800.

The front axle assembly 500, the rear axle assemblies 502, the pusher axle assembly 504, and the tag axle assembly 506 can include various suspension components (e.g., shock absorbers, sway bars, control arms, etc.), steering components, braking components, or power transmission components. As shown in FIG. 1, the front axle assembly 500, the rear axle assemblies 502, the pusher axle assembly 504, and the tag axle assembly 506 all include braking components or brake assemblies, shown as brakes 532. The brakes 532 are coupled to each wheel and tire assembly 508 and configured to impart a braking force on the corresponding wheel and tire assemblies 508. This braking force opposes rotation of the wheel and tire assemblies 508, reducing the speed of the concrete mixer truck 10 and/or preventing the concrete mixer truck 10 from moving. In one embodiment, the brakes 532 are air brakes that are configured to impart a braking force in response to receiving compressed gas (e.g., air, etc.). In other embodiments, one or more of the front axle assembly 500, the rear axle assemblies 502, the pusher axle assembly 504, and the tag axle assembly 506 do not include the brakes 532.

In other embodiments, the concrete mixer truck 10 includes other axle configurations. In some embodiments, one or more of the pusher axle assembly 504 and the tag axle assembly 506 are omitted. Additional pusher axle assemblies 504 or tag axle assemblies 506 can be included. In some embodiments, one of the rear axle assemblies 502 are omitted such that the concrete mixer truck 10 has a single rear axle instead of a tandem rear axle. One or more of the front axle assembly 500 and the rear axle assemblies 502 may be unpowered.

Referring to FIGS. 1 and 5, the longitudinal positions of the components of the concrete mixer truck 10 are shown relative to the center of the front axle assembly 500. The front most point of the concrete mixer truck 10, which is defined by the railing 292, is offset a distance $D_1$ forward from the center of the front axle assembly 500. The front 22 of the chassis 20 is offset a distance $D_2$ forward from the center of the front axle assembly 500. Distance $D_1$ is greater than distance $D_2$.

The center of gravity of the cab 100 is offset a distance $D_3$ rearward from the center of the front axle assembly 500. The center of gravity of the water tank 230 is offset a distance $D_4$ rearward from the center of the front axle assembly 500. The center of gravity of the of the power plant module 302 is offset a distance $D_5$ rearward from the center of the front axle assembly 500. The center of gravity of the power plant module 302 may be located in the transmission 304, approximately centered between the first electromagnetic device 306 and the second electromagnetic device 308. The center of gravity of the mixing drum 202 is offset a distance $D_6$ rearward from the center of the front axle assembly 500. The center of gravity shown in FIG. 1 is the location of the center of gravity of the mixing drum 202 when the mixing drum 202 is empty. The location of the center of gravity of the mixing drum 202 filled with material (e.g., concrete) may be offset (e.g., rearward) from the position shown, depending on the density and volume of material within the mixing drum 202.

Figure 14:
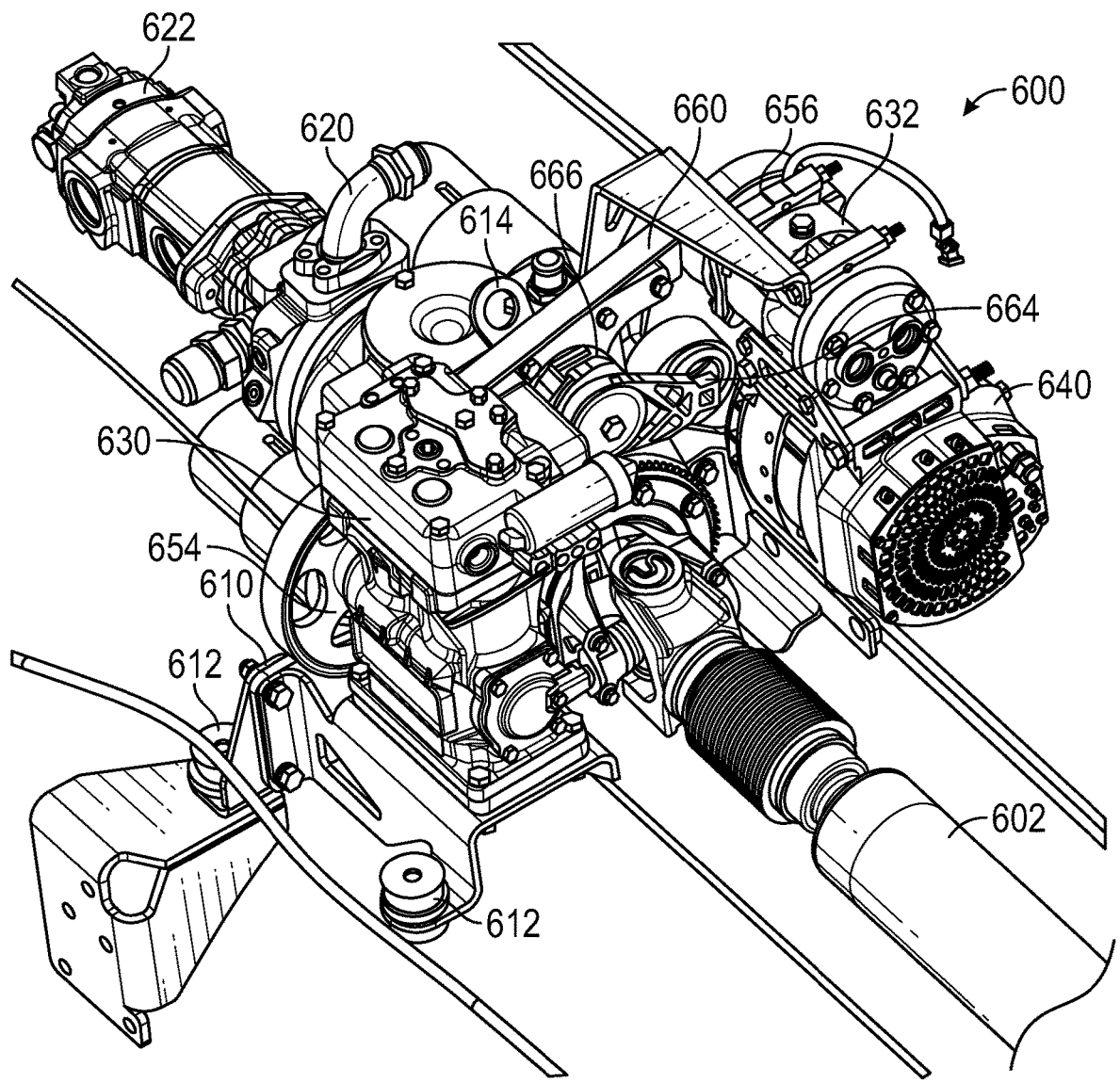
Figure 15:
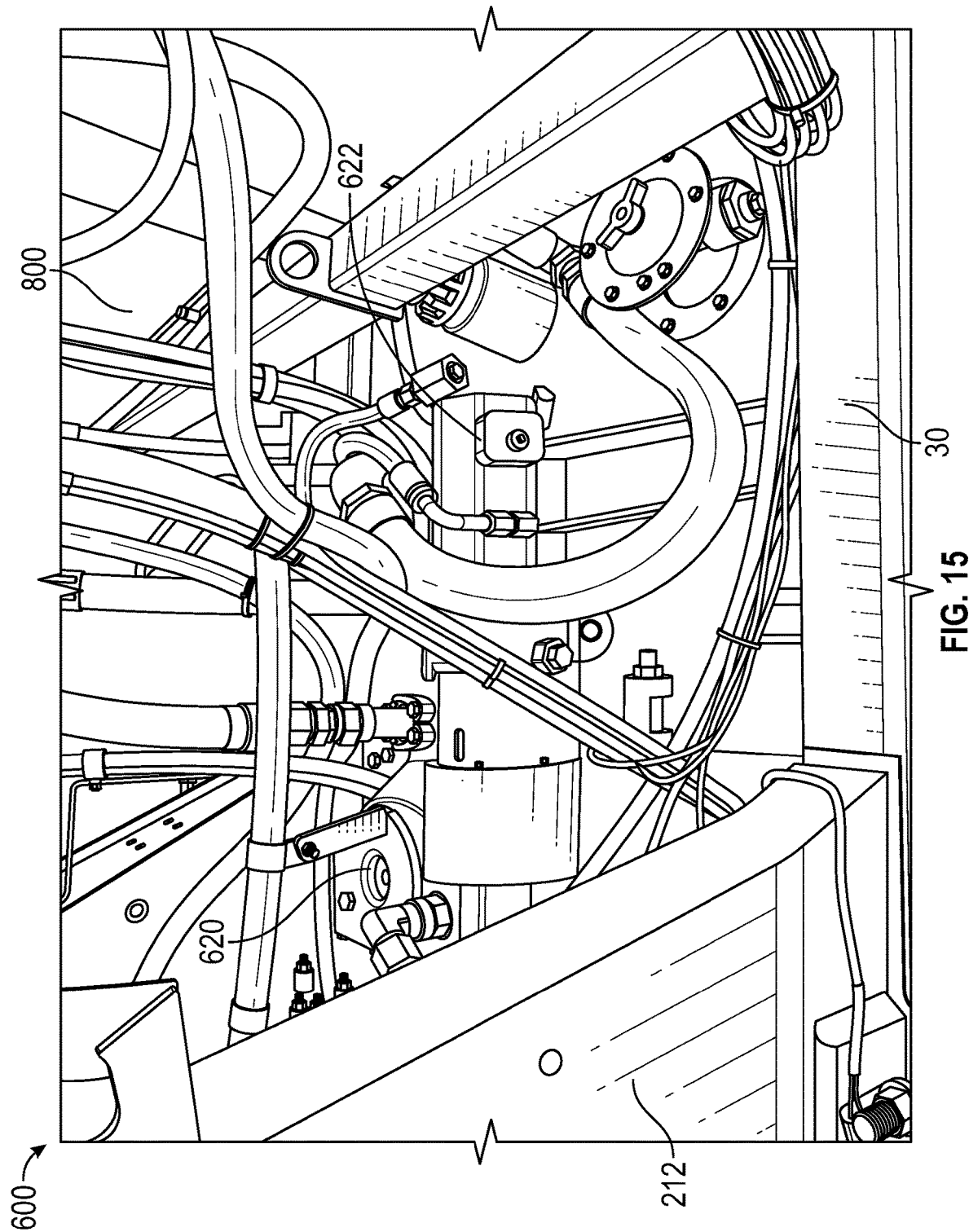

The center of the pusher axle assembly 504 is offset a distance $D_7$ rearward from the center of the front axle assembly 500. The center of the front most rear axle assembly 502 is offset a distance $D_8$ rearward from the center of the front axle assembly 500. The center of gravity of the accessory module 600 is offset a distance $D_9$ rearward from the center of the front axle assembly 500. As shown in FIGS. 5, 14, and 15, the accessory module 600 is positioned directly beneath and at approximately the same longitudinal position as the rear pedestal 212 and the drum driver 214. The center of the rear most rear axle assembly 502 is offset a distance $D_{10}$ rearward from the center of the front axle assembly 500. The center of the tag axle assembly 506 is offset a distance $D_{11}$ rearward from the center of the front axle assembly 500. The center of gravity of the battery module 800 is offset a distance $D_{12}$ rearward from the center of the front axle assembly 500. The rear most point of the concrete mixer truck 10, which is defined by the rear end 24 of the chassis 20, is offset a distance $D_{13}$ rearward from the center of the front axle assembly 500. The distances $D_3$-$D_{13}$ are arranged in order of increasing length such that $D_3$ is smaller than $D_4$, which is smaller than $D_5$, etc.

The centers of gravity of the cab 100, the power plant module 302, and the mixing drum 202 (e.g., both when full and empty) are positioned forward of the rear axle assemblies 502, and the center of gravity of the battery module 800 is positioned rearward of the rear axle assemblies 502. Specifically, the centers of gravity of the cab 100, the power plant module 302, and the mixing drum 202 are positioned forward a point PRT centered between the rear axle assemblies 502, and the center of gravity of the battery module 800 is positioned rearward of the point PRT. Accordingly, the moments of the weights of the cab 100, the power plant module 302, and the mixing drum 202 about the point PRT oppose the moments of the weight of the battery module 800 about the point PRT. This ensures that the weight of the concrete mixer truck 10 and its payload is substantially evenly distributed between the axle assemblies. This also ensures that the front axle assembly 500 is not lifted away from the ground due to the moment effect of the weight of the battery module 800 about the point PRT, which may otherwise make the concrete mixer truck 10 more difficult to steer.

Figure 12:
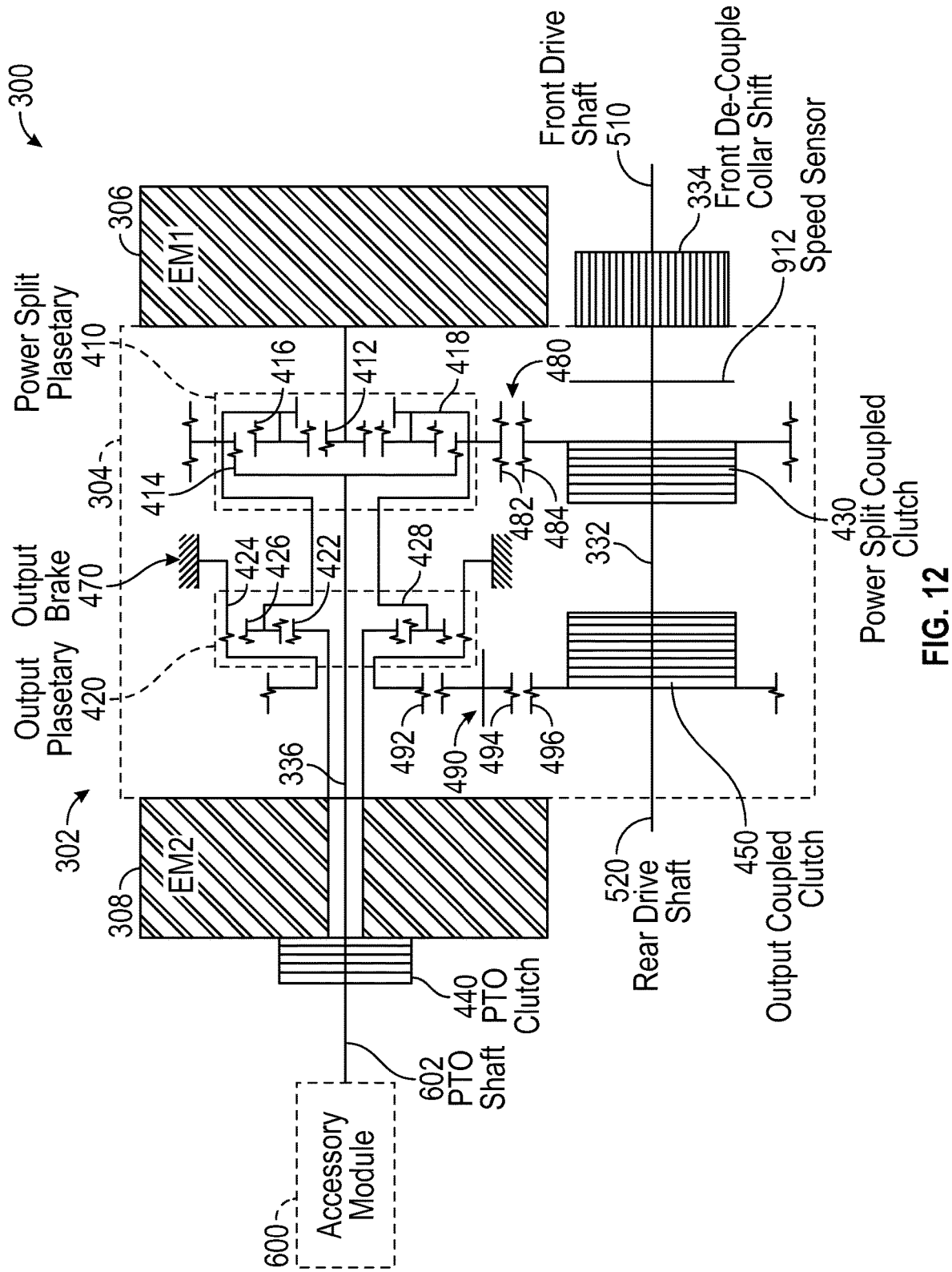
FIG. 12 is a detailed schematic view of the drive system of FIG. 10, according to an exemplary embodiment.

Referring to FIG. 12 the drive system 300 includes the transmission 304, the first electromagnetic device 306, the second electromagnetic device 308, a first drive shaft, shown as front drive shaft 510, a second drive shaft, shown as rear drive shaft 520, and the PTO shaft 602. The transmission 304 is configured to transfer the rotational mechanical energy between the first electromagnetic device 306 and the second electromagnetic device 308 and the front drive shaft 510, the rear drive shaft 520, and the PTO shaft 602. According to the exemplary embodiment shown in FIG. 12, the transmission 304 includes a first gear set or power transmission device, shown as power split planetary 410, and a second gear set or power transmission device, shown as output planetary 420. In one embodiment, the power split planetary 410 and the output planetary 420 are disposed between the first electromagnetic device 306 and the second electromagnetic device 308. In an alternative embodiment, one or both of the power split planetary 410 and the output planetary 420 are positioned outside of (i.e., not between, etc.) the first electromagnetic device 306 and the second electromagnetic device 308.

Referring to the exemplary embodiment shown in FIG. 12, the power split planetary 410 is a planetary gear set that includes a first rotatable portion, shown as sun gear 412, a second rotatable portion, shown as ring gear 414, and a plurality of connecting members, shown as planetary gears 416. The plurality of the planetary gears 416 couple the sun gear 412 to the ring gear 414, according to an exemplary embodiment. As shown in FIG. 12, a carrier 418 rotationally supports the plurality of the planetary gears 416. In one embodiment, the first electromagnetic device 306 is directly coupled to the sun gear 412 such that the power split planetary 410 is coupled to the first electromagnetic device 306. By way of example, the first electromagnetic device 306 may include a shaft (e.g., a first shaft, an input shaft, an output shaft, etc.) directly coupled to the sun gear 412.

Referring still to the exemplary embodiment shown in FIG. 12, the output planetary 420 is a planetary gear set that includes a first rotatable portion, shown as sun gear 422, a second rotatable portion, shown as ring gear 424, and a plurality of connecting members, shown as planetary gears 426. The plurality of planetary gears 426 couple the sun gear 422 to the ring gear 424, according to an exemplary embodiment. As shown in FIG. 12, a carrier 428 rotationally supports the plurality of planetary gears 426. In one embodiment, the second electromagnetic device 308 is directly coupled to the sun gear 422 such that the output planetary 420 is coupled to the second electromagnetic device 308. By way of example, the second electromagnetic device 308 may include a shaft (e.g., a second shaft, an input shaft, an output shaft, etc.) directly coupled to the sun gear 422. The carrier 418 is directly coupled to the carrier 428, thereby coupling the power split planetary 410 to the output planetary 420, according to the exemplary embodiment shown in FIG. 12. In one embodiment, directly coupling the carrier 418 to the carrier 428 synchronizes the rotational speeds of the carrier 418 and the carrier 428.

According to an exemplary embodiment, the transmission 304 includes a first clutch, shown as power split coupled clutch 430. In one embodiment, the power split coupled clutch 430 is positioned downstream of the power split planetary 410 (e.g., between the power split planetary 410 and the front drive shaft 510 or the rear drive shaft 520, etc.). As shown in FIG. 12, the power split coupled clutch 430 is positioned to selectively couple the power split planetary 410 and the output planetary 420 with a shaft, shown as output shaft 332. Specifically, the power split coupled clutch 430 is positioned to selectively couple the carrier 418 and the carrier 428 with the output shaft 332. In one embodiment, the power split coupled clutch 430 allows the concrete mixer truck 10 to be towed without spinning the components within the transmission 304 (e.g., the power split planetary 410, the output planetary 420, etc.). The output shaft 332 may be coupled to the rear drive shaft 520 and selectively coupled to front drive shaft 510 with a declutch assembly, shown as front de-couple collar shift 334. The front de-couple collar shift 334 may be engaged and disengaged to selectively couple the front drive shaft 510 to the output shaft 332 of the transmission 304 (e.g., to facilitate operation of the concrete mixer truck 10 in a rear-wheel-drive-only mode, an all-wheel-drive mode, a six-wheel-drive mode, etc.).

As shown in FIG. 12, the transmission 304 includes a second clutch, shown as PTO clutch 440. The PTO clutch 440 is positioned to selectively couple the second electromagnetic device 308 with the accessory module 600 through the PTO shaft 602, according to an exemplary embodiment. The PTO clutch 440 may thereby selectively couple the accessory module 600 and the PTO shaft 602 to the output planetary 420. As shown in FIG. 12, the transmission 304 includes a shaft, shown as connecting shaft 336, coupled to the PTO shaft 602. According to an exemplary embodiment, the connecting shaft 336 extends from the PTO shaft 602, through the second electromagnetic device 308, and through the output planetary 420 to the power split planetary 410. The connecting shaft 336 couples the PTO shaft 602 with the power split planetary 410, according to the exemplary embodiment shown in FIG. 9. In one embodiment, the connecting shaft 336 directly couples the PTO shaft 602 with the ring gear 414 of the power split planetary 410. The PTO clutch 440 may selectively couple the second electromagnetic device 308 with the connecting shaft 336. According to an exemplary embodiment, the shaft (e.g., input/output shaft, etc.) of the first electromagnetic device 306 and the shaft (e.g., input/output shaft, etc.) of the second electromagnetic device 308 are radially aligned with the power split planetary 410, the output planetary 420, and the connecting shaft 336 (e.g., centerlines thereof are aligned, etc.). One end of the PTO shaft 602 (e.g., a universal joint or constant velocity joint of the PTO shaft 602) may be radially aligned with the connecting shaft 336. The PTO shaft 602 may not be aligned with the connecting shaft 336 as the PTO shaft 602 extends away from the transmission 304 (e.g., may extend at an angle relative to the connecting shaft 336). As shown in FIG. 12, the transmission 304 includes a third clutch, shown as output coupled clutch 450. The output coupled clutch 450 is positioned to selectively couple the output planetary 420 with the output shaft 332, according to an exemplary embodiment. In on embodiment, the output coupled clutch 450 is positioned to selectively couple the ring gear 424 with the output shaft 332. In one embodiment, the output shaft 332 is radially offset from the power split planetary 410, the output planetary 420, and the connecting shaft 336 (e.g., radially offset from centerlines thereof, etc.).

Referring again to the exemplary embodiment shown in FIG. 12, the transmission 304 includes a brake, shown as output brake 470. The output brake 470 is positioned to selectively inhibit the movement of at least a portion of the output planetary 420 (e.g., the ring gear 424, etc.), according to an exemplary embodiment. In one embodiment, the output brake 470 is biased into an engaged position (e.g., with a spring, etc.) and selectively disengaged (e.g., with application of pressurized hydraulic fluid, etc.). In other embodiments, the output brake 470 is hydraulically-biased and spring released. In still other embodiments, the components of the transmission 304 are still otherwise engaged and disengaged (e.g., pneumatically, etc.). By way of example, the output brake 470 and the output coupled clutch 450 may be engaged simultaneously to function as a driveline brake (e.g., a braking mechanism to slow down the concrete mixer truck 10, etc.).

As shown in FIG. 12, the transmission 304 includes a gear set 480 that couples the carrier 418 and the carrier 428 to the output shaft 332. In one embodiment, the gear set 480 includes a first gear, shown as gear 482, in meshing engagement with a second gear, shown as gear 484. As shown in FIG. 12, the gear 482 is rotatably coupled to the carrier 418 and the carrier 428. By way of example, the gear 482 may be fixed to a component (e.g., shaft, tube, etc.) that couples the carrier 418 and the carrier 428. As shown in FIG. 12, the power split coupled clutch 430 is positioned to selectively couple the gear 484 with the output shaft 332 when engaged. With the power split coupled clutch 430 disengaged, relative movement (e.g., rotation, etc.) may occur between the gear 484 and the output shaft 332.

According to an exemplary embodiment, the transmission 304 includes a gear set, shown as gear set 490 that couples the output planetary 420 to the output shaft 332. As shown in FIG. 12, the gear set 490 includes a first gear, shown as gear 492, coupled to the ring gear 424 of the output planetary 420. The gear 492 is in meshing engagement with a second gear, shown as gear 494, according to an exemplary embodiment. As shown in FIG. 12, the gear 494 is coupled to a third gear, shown as gear 496. In other embodiments, the gear 492 is directly coupled with the gear 496. By way of example, the gear set 490 may not include the gear 494, and the gear 492 may be directly coupled to (e.g., in meshing engagement with, etc.) the gear 496. As shown in FIG. 12, the output coupled clutch 450 is positioned to selectively couple the gear 496 with the output shaft 332 when engaged. With the output coupled clutch 450 disengaged, relative movement (e.g., rotation, etc.) may occur between the gear 496 and the output shaft 332. By way of example, the output coupled clutch 450 may be engaged to couple the ring gear 424 to the output shaft 332. The output brake 470 is positioned to selectively limit the movement of the gear 492 when engaged to thereby also limit the movement of the ring gear 424, the gear 494, and the gear 496.

Tractive Assemblies

Referring to FIGS. 10-12, the front de-couple collar shift 334 is coupled to the front drive shaft 510 (e.g., through a universal joint or constant velocity joint). Accordingly, the front drive shaft 510 is coupled to the output shaft 332 through the front de-couple collar shift 334. As shown in FIG. 10, the front drive shaft 510 includes one single segment. In other embodiments, the front drive shaft 510 includes two or more segments. The front drive shaft 510 is coupled to a power transfer device of the front axle assembly 500, shown as front differential 512. The front differential 512 is coupled to the wheel and tire assemblies 508 of the front axle assembly 500 through a pair of half shafts. In operation, rotational mechanical energy from the output shaft 332 is transferred through the front de-couple collar shift 334, the front drive shaft 510, the front differential 512, and the half shafts to the wheel and tire assemblies 508 of the front axle assembly 500, and the wheel and tire assemblies 508 propel the concrete mixer truck 10.

The output shaft 332 is coupled to the rear drive shaft 520 (e.g., through a universal joint or a constant velocity joint). As shown in FIG. 10, the rear drive shaft 520 includes one single segment. In other embodiments, the rear drive shaft 520 includes two or more segments. The rear drive shaft 520 is coupled to a power transfer device of the front most rear axle assembly 502, shown as rear differential 522. The rear differential 522 is coupled to the wheel and tire assemblies 508 of the front most rear axle assembly 502 through a pair of half shafts. A third drive shaft, shown as rear drive shaft 524, is coupled to the rear differential 522. As shown in FIG. 5, the rear drive shaft 524 includes one single segment. In other embodiments, the rear drive shaft 524 includes two or more segments. The rear drive shaft 524 is coupled to a power transfer device of the rearmost rear axle assembly 502, shown as rear differential 526. The rear differential 526 is coupled to the wheel and tire assemblies 508 of the rearmost rear axle assembly 502 through a pair of half shafts. In operation, rotational mechanical energy from the output shaft 332 is transferred through the rear drive shaft 520, the rear differential 522, and the half shafts to the wheel and tire assemblies 508 of the front most rear axle assembly 502, and rotational mechanical energy from the rear differential 522 is transferred through the rear drive shaft 524, the rear differential 526, and the half shafts to the wheel and tire assemblies 508 of the rearmost rear axle assembly 502. The wheel and tire assemblies 508 then propel the concrete mixer truck 10.

The pusher axle assembly 504 and the tag axle assembly 506 are each configured to be raised and lowered to selectively engage a support surface (e.g., the ground, etc.), redistributing the loads imparted on the axle assemblies by the weight of the concrete mixer truck 10. As shown in FIG. 5, the pusher axle assembly 504 and the tag axle assembly 506 each include a set of actuators, shown as airbags 530. The airbags 530 are coupled to and extend between the chassis 20 and the corresponding pusher axle assembly 504 or tag axle assembly 506. The airbags 530 are configured to receive or release compressed gas (e.g., air, etc.) to extend or retract. When the airbags 530 are filled with gas, the airbags 530 expand, forcing the pusher axle assembly 504 and/or the tag axle assembly 506 downward against the ground. This force causes the pusher axle assembly 504 and/or the tag axle assembly 506 to lift the chassis 20 and the components supported by the chassis 20, lessening the load on the front axle assembly 500 and/or the rear axle assembly 502. Such a configuration reduces the pressure exerted on the ground by the concrete mixer truck 10 and may be required when traveling through certain municipalities under load. When the gas is removed from the airbags 530, the pusher axle assembly 504 and the tag axle assembly 506 are lifted off of contact with the ground, and the front axle assembly 500 and the rear axle assembly 502 experience higher loading. The airbags 530 may be configured such that the pusher axle assembly 504 and the tag axle assembly 506 can be raised and lowered independently or together. By way of example, the pusher axle assembly 504 may be lowered when the mixing drum 202 is loaded to support the weight of the material within the mixing drum 202. By way of another example, the tag axle assembly 506 can be lowered to support the weight of the battery module 800.

The front axle assembly 500, the rear axle assemblies 502, the pusher axle assembly 504, and the tag axle assembly 506 can include various suspension components (e.g., shock absorbers, sway bars, control arms, etc.), steering components, braking components, or power transmission components. As shown in FIG. 1, the front axle assembly 500, the rear axle assemblies 502, the pusher axle assembly 504, and the tag axle assembly 506 all include braking components or brake assemblies, shown as brakes 532. The brakes 532 are coupled to each wheel and tire assembly 508 and configured to impart a braking force on the corresponding wheel and tire assemblies 508. This braking force opposes rotation of the wheel and tire assemblies 508, reducing the speed of the concrete mixer truck 10 and/or preventing the concrete mixer truck 10 from moving. In one embodiment, the brakes 532 are air brakes that are configured to impart a braking force in response to receiving compressed gas (e.g., air, etc.). In other embodiments, one or more of the front axle assembly 500, the rear axle assemblies 502, the pusher axle assembly 504, and the tag axle assembly 506 do not include the brakes 532.

In other embodiments, the concrete mixer truck 10 includes other axle configurations. In some embodiments, one or more of the pusher axle assembly 504 and the tag axle assembly 506 are omitted. Additional pusher axle assemblies 504 or tag axle assemblies 506 can be included. In some embodiments, one of the rear axle assemblies 502 are omitted such that the concrete mixer truck 10 has a single rear axle instead of a tandem rear axle. One or more of the front axle assembly 500 and the rear axle assemblies 502 may be unpowered.

Accessory Module

As shown in FIGS. 10 and 11, the PTO shaft 602 is coupled to the PTO output 314 and the accessory module 600 (e.g., through a universal joint or a constant velocity joint). The PTO shaft 602 is configured to transfer rotational mechanical energy from the PTO output 314 to the accessory module 600. In the embodiment shown in FIG. 10, the PTO shaft 602 includes two segments coupled to one another. In other embodiments, the PTO shaft 602 includes more or fewer segments.

Figure 13:
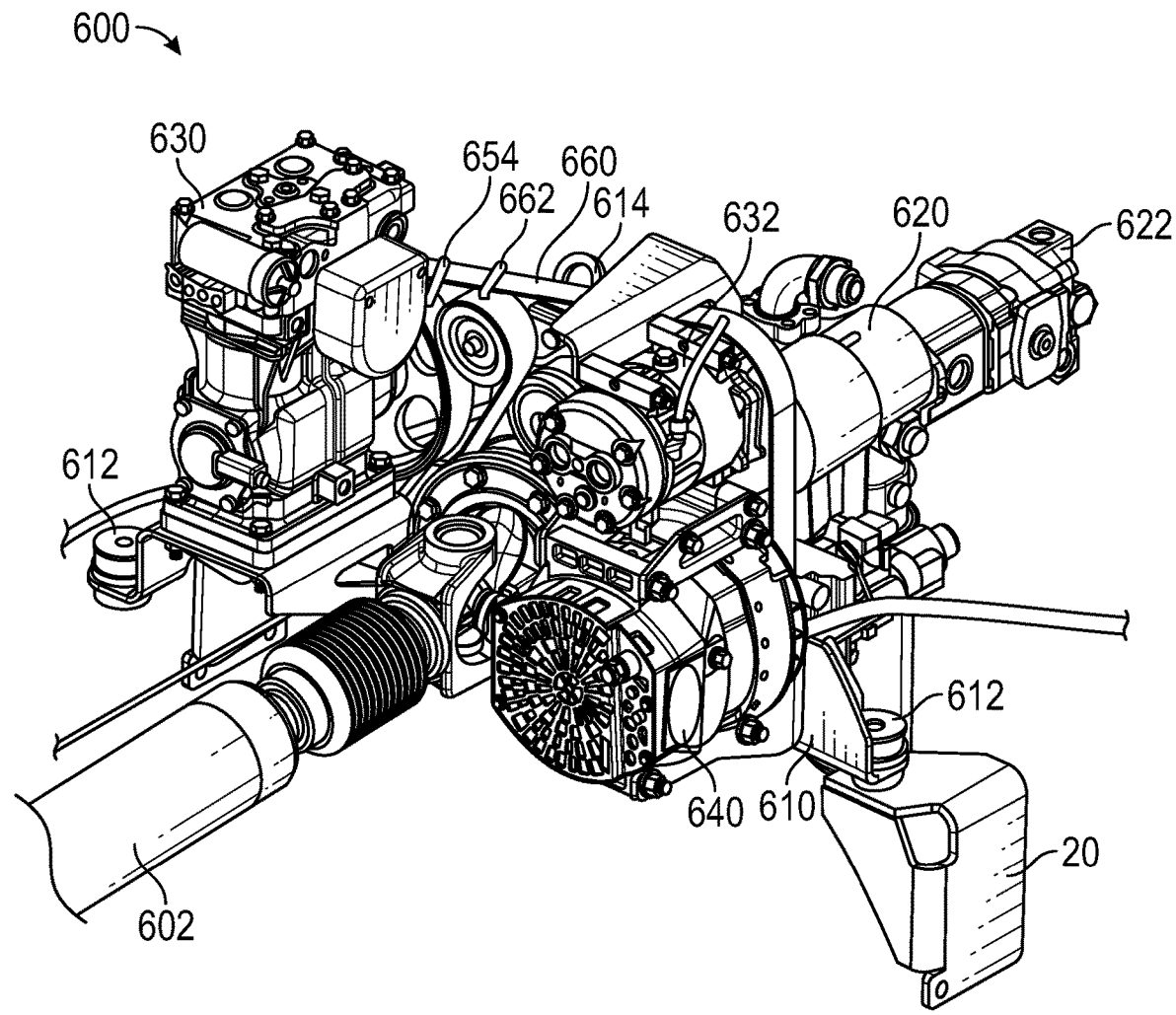
FIGS. 13-16 are various perspective views of an accessory module of the concrete mixer truck of FIG. 1, according to an exemplary embodiment.

Referring to FIGS. 13-16, the accessory module 600 is shown according to an exemplary embodiment. The accessory module 600 includes a frame 610 that supports the various components of the accessory module 600. The frame 610 is coupled to the chassis 20 through a series of isolating mounts, shown as isolators 612. The isolators 612 are made of a complaint material, such as rubber, and configured to reduce the transfer of vibrations between the accessory module 600 and the chassis 20. The frame 610 is formed from multiple pieces of bent sheet metal. In other embodiments, the frame 610 is otherwise formed (e.g., including one or more tubular frame members, etc.). As shown in FIG. 13, the frame 610 includes an interface, shown as lift eye 614, having an aperture extending therethrough. The lift eye 614 facilitates lifting the accessory module 600 such that the entire accessory module 600 can be manipulated as a subassembly for assembly and/or maintenance.

The accessory module 600 includes a series of power transfer devices configured to convert rotational mechanical energy from the PTO output 314 to other forms (e.g., electricity, a flow of pressurized working fluid, etc.). The accessory module 600 includes a first hydraulic pump, shown as drum drive pump 620, and a second hydraulic pump, shown as accessory pump 622. One or both of the drum drive pump 620 and the accessory pump 622 may be fluidly coupled to the hydraulic fluid tank 606 and configured to receive a working fluid, specifically hydraulic fluid, at a low pressure (e.g., atmospheric pressure) from the hydraulic fluid tank 606. The drum drive pump 620 and the accessory pump 622 are configured to receive rotational mechanical energy and output a flow of pressurized hydraulic fluid to drive other functions. The concrete mixer truck 10 may include other hydraulic components (e.g., valves, filters, pipes, hoses, etc.) that facilitate operation and control of a hydraulic circuit including the drum drive pump 620 and/or the accessory pump 622. By way of example, the concrete mixer truck 10 may include directional control valves that are controlled by a controller of the concrete mixer truck 10 (e.g., in response to an operator input through the user interface 102, automatically in response to sensor inputs, etc.).

The drum drive pump 620 is fluidly coupled to the drum drive motor 252 such that the drum drive pump 620 provides a flow of pressurized hydraulic fluid to power the drum driver 214. In one embodiment, the drum drive pump 620 powers only the drum driver 214. In some embodiments, the drum drive pump 620 is a variable displacement pump configured to selectively vary the flow rate of hydraulic fluid that it provides for a given rotational mechanical energy input. This facilitates control over the speed of the mixing drum 202 with minimal energy losses. In other embodiments, the drum drive pump 620 is a fixed displacement pump. Additionally or alternatively, the drum drive motor 252 may be a variable displacement motor.

The accessory pump 622 is fluidly coupled to the other hydraulic actuators of the concrete mixer truck 10 such that the accessory pump 622 provides pressurized hydraulic fluid to power the hydraulic actuators. By way of example, the accessory pump 622 may provide pressurized hydraulic fluid to power the hopper actuator 260, the chute height actuator 280, the chute rotation actuator 282, and the chute folding actuators 284. The accessory pump 622 may be a variable displacement pump or a fixed displacement pump. In an alternative embodiment, the drum drive pump 620 and the accessory pump 622 are replaced with a single hydraulic pump that supplies pressurized hydraulic fluid to all of the hydraulic actuators of the concrete mixer truck 10 (e.g., the drum drive motor 252, the hopper actuator 260, the chute height actuator 280, the chute rotation actuator 282, and the chute folding actuators 284).

The accessory module 600 further includes a first compressor, shown as drivetrain compressor 630. The drivetrain compressor 630 is configured to receive rotational mechanical energy and a working fluid, specifically gas, at a low pressure and provide compressed gas at a high pressure to drive other functions of the concrete mixer truck 10. In some embodiments, the drivetrain compressor 630 is configured to compress air. In such an embodiment, the drivetrain compressor 630 is configured to receive air at atmospheric pressure from the surrounding atmosphere and output compressed air at greater than atmospheric pressure. The drivetrain compressor 630 is fluidly coupled to the air tank 604 such that the compressed gas from the drivetrain compressor 630 is stored within the air tank 604 prior to use. The concrete mixer truck 10 may include other pneumatic components (e.g., valves, filters, pipes, hoses, etc.) that facilitate operation and control of a pneumatic circuit including the drivetrain compressor 630. By way of example, the concrete mixer truck 10 may include pneumatic solenoids that are controlled by a controller of the concrete mixer truck 10 (e.g., in response to an operator input through the user interface 102, automatically in response to sensor inputs, etc.). The drivetrain compressor 630 is fluidly coupled to the airbags 530 and the brakes 532 such that the drivetrain compressor 630 provides compressed air to expand the airbags 530 and activate the brakes 532.

The accessory module 600 further includes a second compressor, shown as air conditioning compressor 632. The air conditioning compressor 632 is configured to receive rotational mechanical energy and a working fluid, specifically gas, at a low pressure and provide compressed gas at a high pressure. Specifically, the air conditioning compressor 632 is configured to compress a refrigerant (e.g., R-134a, etc.) for use in a climate control or air conditioning system of the concrete mixer truck 10. The air conditioning compressor 632 may be part of an air conditioning circuit including a first heat transfer device or radiator acting as a condenser, an expansion valve, and a second heat transfer device or radiator acting as an evaporator. The air conditioning compressor 632 is configured to receive refrigerant at a low pressure from the evaporator and supply high pressure refrigerant to the condenser. The evaporator may be in fluid communication with the cab 100 such that the air conditioning system provides cooled air to the cab 100 to improve operator comfort. The concrete mixer truck 10 may include other components (e.g., valves, hoses, switches, fans, etc.) that facilitate operation and control of the air conditioning system. In other embodiments, the concrete mixer truck 10 does not include an air conditioning system for the cab 100, and the air conditioning compressor 632 is omitted.

Figure 49:
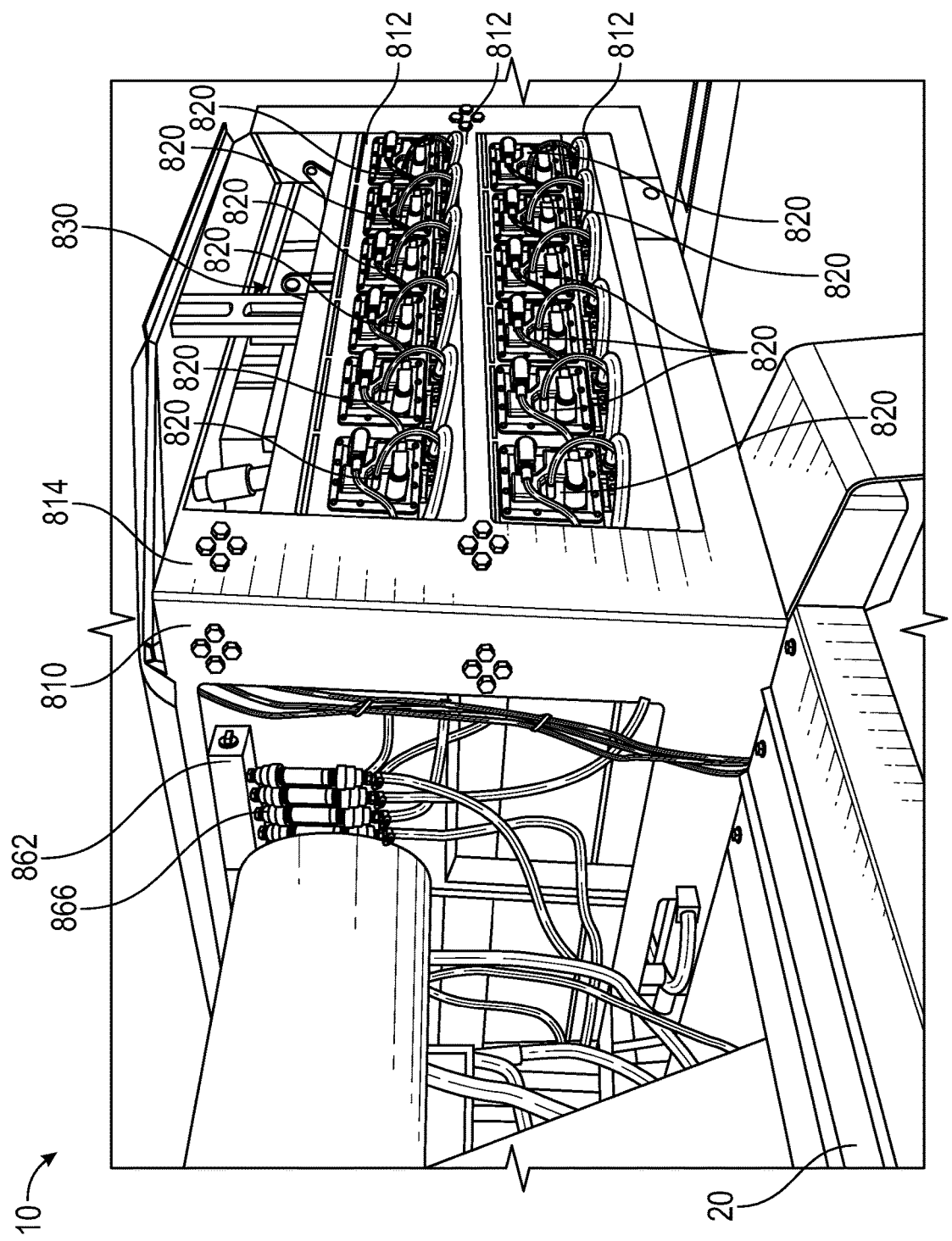
FIG. 49 is a perspective view of the battery module, according to an exemplary embodiment.
Figure 50:
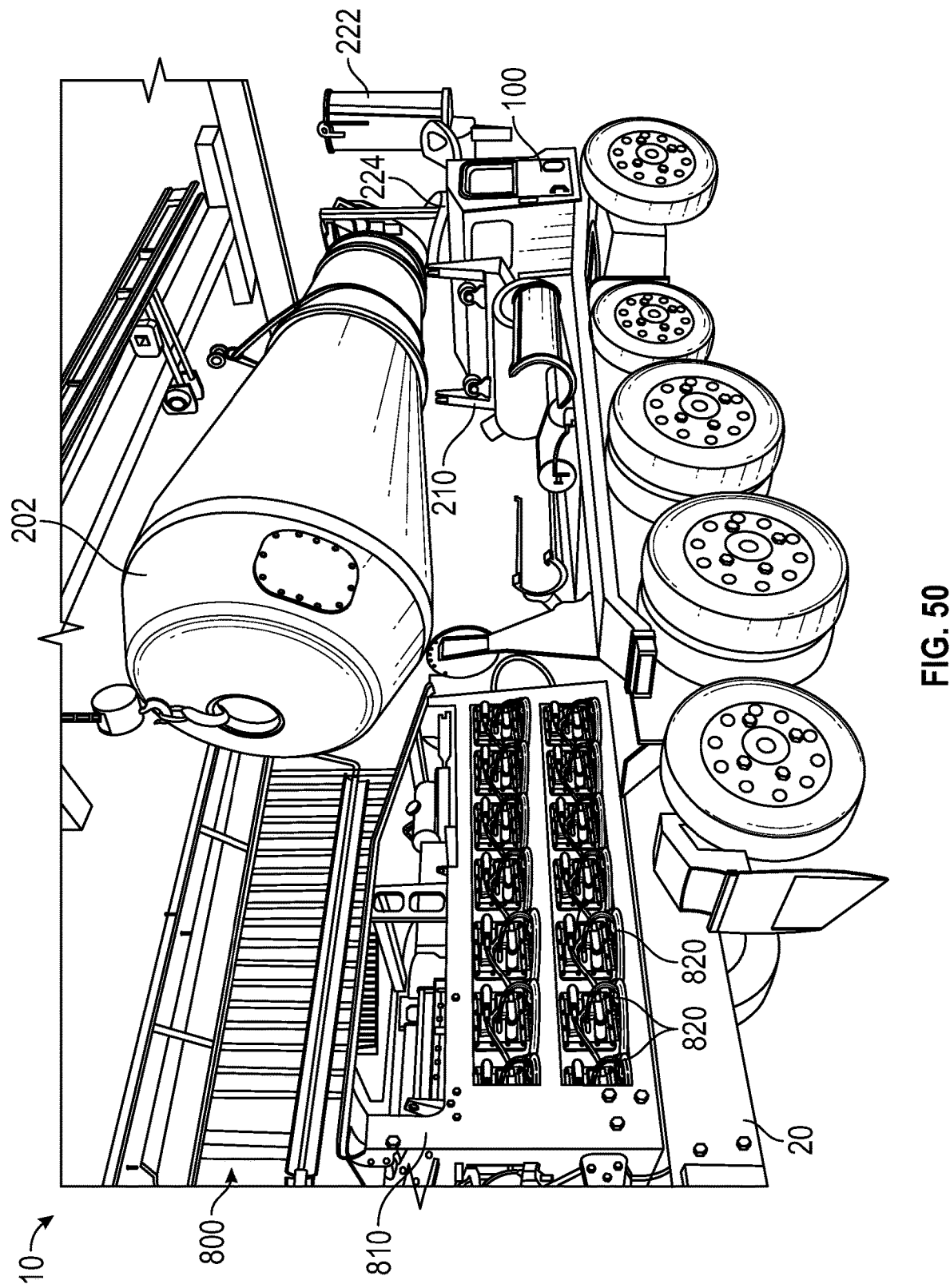
FIG. 50 is a rear perspective view of the concrete mixer truck of FIG. 1, according to an exemplary embodiment.

The accessory module 600 further includes an electrical machine, electromagnetic device, and/or generator, shown as alternator 640. The alternator 640 is configured to receive a rotational mechanical energy input and provide electrical energy. In some embodiments, the alternator 640 is configured to provide direct current electrical energy. The alternator 640 is electrically coupled to an energy storage device, shown in FIG. 49, described in detail below, as battery 642, configured to store the electrical energy from the alternator 640. In one embodiment, the battery 642 is a 12 volt battery. The electrical energy from the alternator 640 and the battery 642 is used to power one or more functions of the concrete mixer truck 10. By way of example, the battery 642 may be configured to provide electrical energy to power the user interface 102, one or more lights of the concrete mixer truck 10, or a controller of the concrete mixer truck. In some embodiments, the alternator 640 and the battery 642 are electrically decoupled from the battery module 800 such that the alternator 640 and the battery module 800 each provide electrical energy to different components. In other embodiments, the alternator 640 and the battery 642 are omitted, and the battery module 800 provides electrical energy to the components that would have otherwise been powered by the alternator 640.

Figure 17:
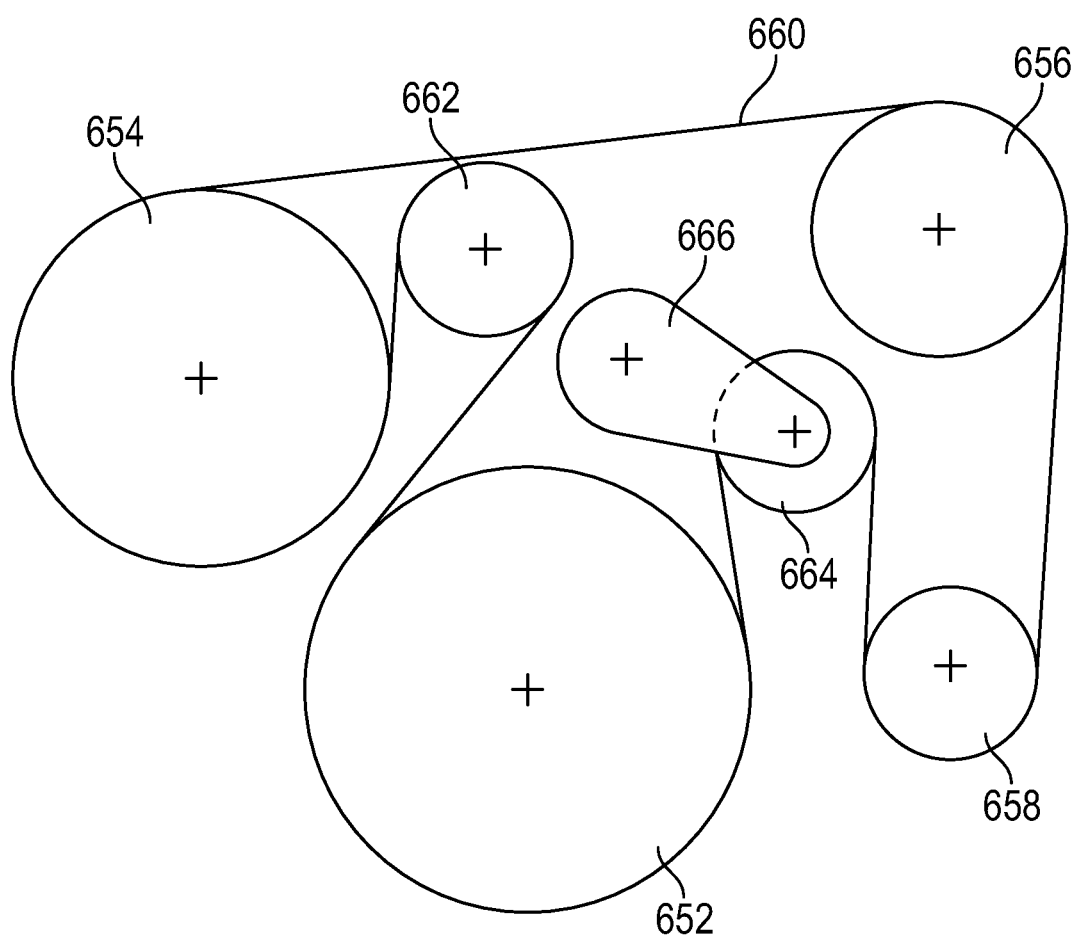
FIG. 17 is a diagram of a serpentine belt assembly of the accessory module of FIG. 13, according to an exemplary embodiment.

Referring to FIGS. 13, 14, and 17, the drum drive pump 620, the accessory pump 622, the drivetrain compressor 630, the air conditioning compressor 632, and the alternator 640 are coupled (e.g., directly or indirectly) to the PTO shaft 602 and configured to receive rotational mechanical energy from the PTO shaft 602. The drum drive pump 620 is directly coupled to the PTO shaft 602 and configured to receive rotational mechanical energy directly from the PTO shaft 602. The accessory pump 622 is coupled to the drum drive pump 620, and the drum drive pump 620 is configured to transfer a portion of the rotational mechanical energy received from the PTO shaft 602 to the accessory pump 622. In one embodiment, one shaft coupled to the PTO shaft 602 extends through both the drum drive pump 620 and the accessory pump 622 to transfer rotational mechanical energy.

The drivetrain compressor 630, the air conditioning compressor 632, and the alternator 640 are each radially offset from the PTO shaft 602. The accessory module 600 further includes a power transfer device, shown as serpentine belt assembly 650, which is configured to transfer rotational mechanical energy from the PTO shaft 602 to the drivetrain compressor 630, the air conditioning compressor 632, and the alternator 640. The serpentine belt assembly 650 includes a first pulley, shown as PTO pulley 652, directly coupled to the PTO shaft 602. A second pulley, shown as drivetrain compressor pulley 654, is coupled to the drivetrain compressor 630. A third pulley, shown as air conditioning compressor pulley 656, is coupled to the air conditioning compressor 632. A fourth pulley, shown as alternator pulley 658, is coupled to the alternator 640. A power transfer band, shown as serpentine belt 660, extends between the pulleys, transferring rotational mechanical energy from the PTO shaft 602 to the drivetrain compressor 630, the air conditioning compressor 632, and the alternator 640.

Figure 16:
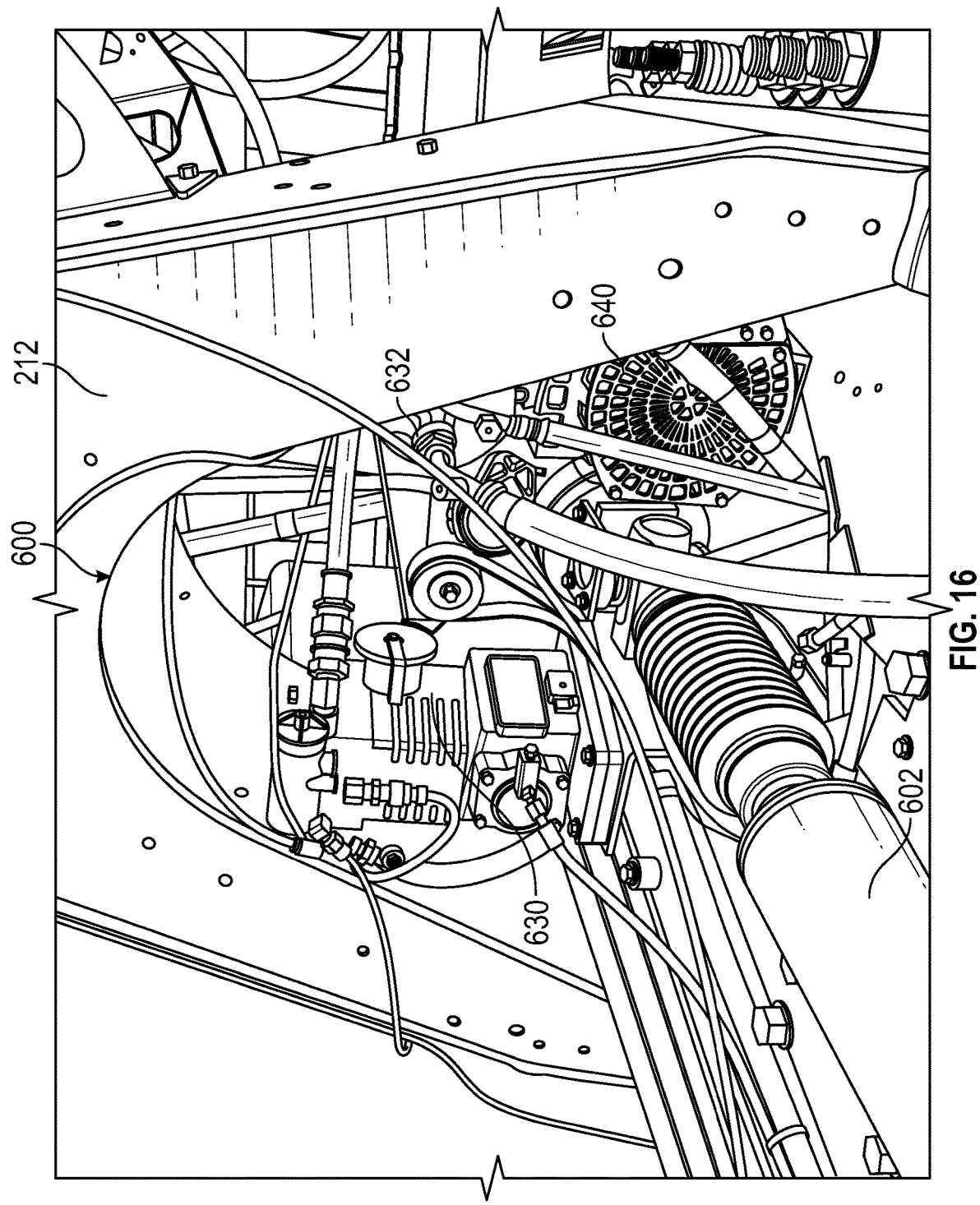

The serpentine belt assembly 650 further includes a pair of idler pulleys, shown as idler pulley 662 and idler pulley 664. The idler pulley 662 is rotatably coupled to the frame 610. The idler pulley 664 is rotatably coupled to a mount or linkage, shown as tensioning link 666. The tensioning link 666 is rotatably coupled to the frame 610. The serpentine belt 660 forms a closed loop, extending between the PTO pulley 652, the idler pulley 662, the drivetrain compressor pulley 654, the air conditioning compressor pulley 656, the alternator pulley 658, and the idler pulley 664, respectively. The serpentine belt 660 couples the pulleys such that each of the pulleys rotate simultaneously in response to rotation of the PTO shaft 602. The idler pulley 662 and the idler pulley 664 direct the serpentine belt 660 such that more surface area of the serpentine belt 660 contacts the alternator pulley 658, the PTO pulley 652, and the drivetrain compressor pulley 654, facilitating a secure connection. The tensioning link 666 is biased (e.g., by a torsion spring, etc.) to rotate relative to the frame 610 (e.g., counter clockwise as shown in FIG. 16). This applies a biasing force on the idler pulley 664, which in turn tensions the serpentine belt 660, strengthening the connections between the serpentine belt 660 and the pulleys.

Power Plant Module Including Variators

Figure 18:
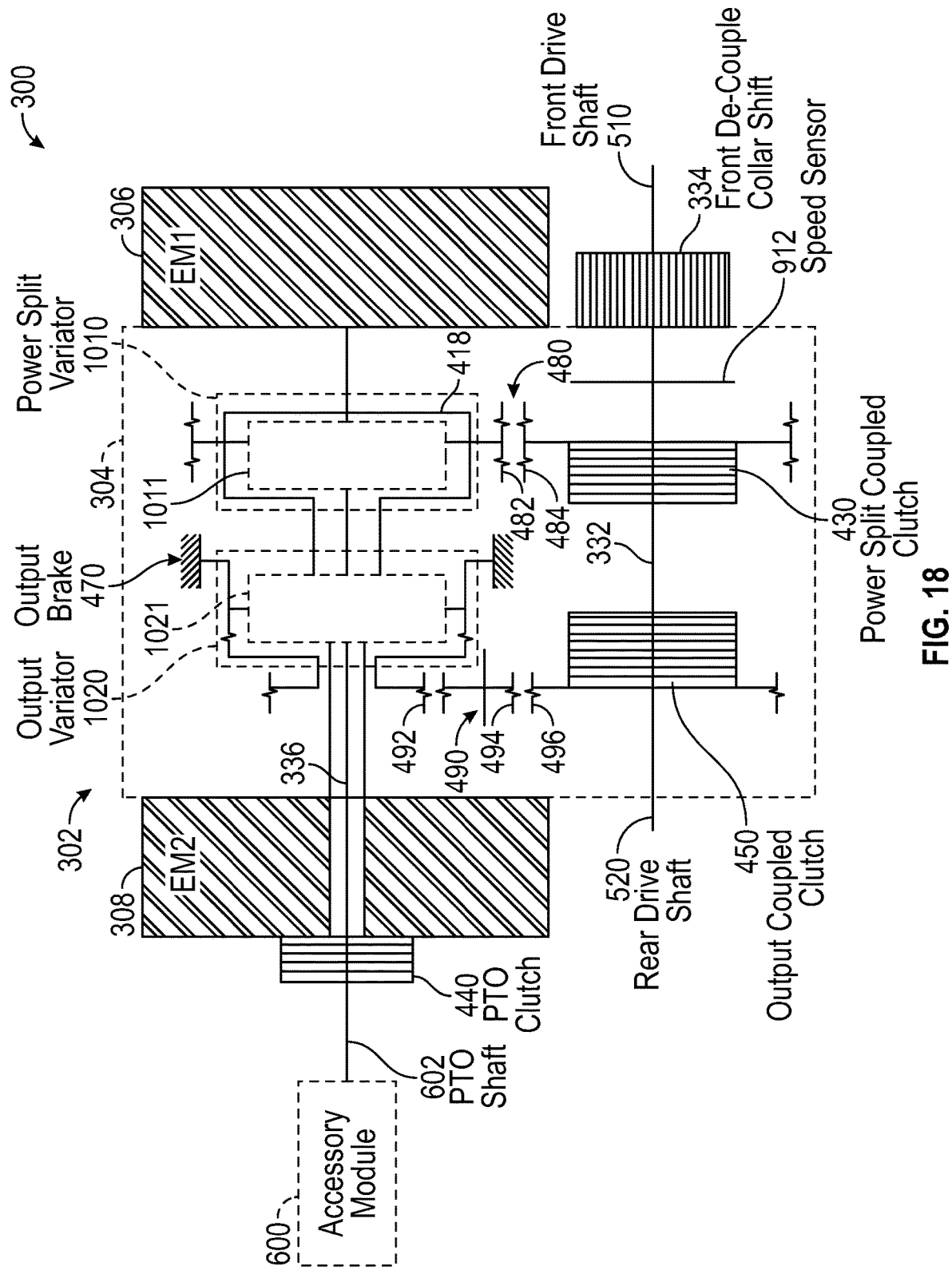
FIG. 18 is a detailed schematic view of the drive system of FIG. 10, according to another exemplary embodiment.

Referring to FIG. 18, a drive system 1000 is shown as an alternative embodiment to the drive system 300. The drive system 1000 is substantially similar to the drive system 300 except the power split planetary 410 and the output planetary 420 are replaced with variable ratio power transmission devices or planetary assemblies, shown as power split variator 1010 and output variator 1020, respectively. In other embodiments, only one of the power split planetary 410 and the output planetary 420 are replaced. The power split variator 1010 and the output variator 1020 are each configured to vary a ratio (e.g., a torque ratio, a gear ratio, a speed ratio, etc.) between an input to the variator and an output from the variator. The power split variator 1010 and the output variator 1020 may have various arrangements (e.g., an epicyclic or planetary arrangement, a radially offset arrangement, etc.). The power split variator 1010 and the output variator 1020 may utilize various types of variator configurations. By way of example, the power split variator 1010 and the output variator 1020 may belt and/or chain variators (e.g., include one or more belts or chains rotationally coupling variable diameter pulleys, etc.). In such an example, varying the pulley diameters may adjust the relative speeds between various components within the power split variator 1010. Such a belt variator and/or a chain variator may be a planetary device.

Figure 19:
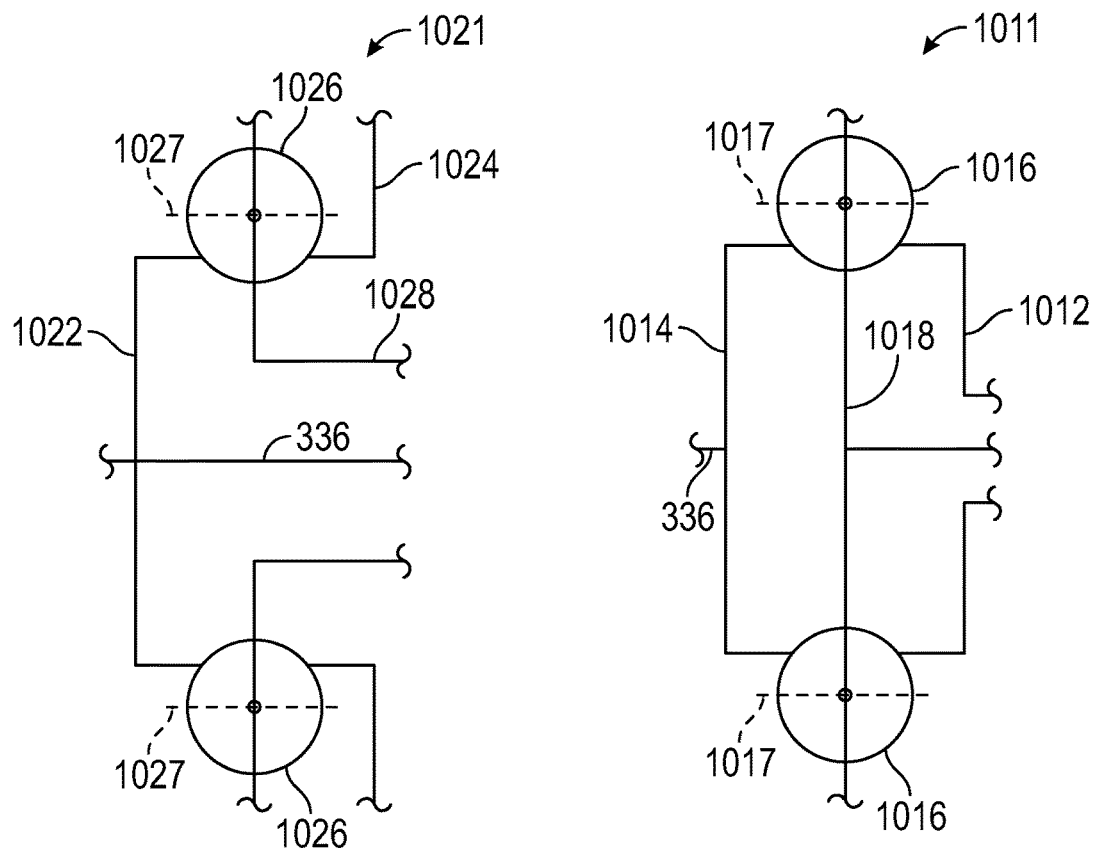
FIG. 19 is a detailed schematic view of variators of the drive system of FIG. 18, according to an exemplary embodiment.
Figure 20:
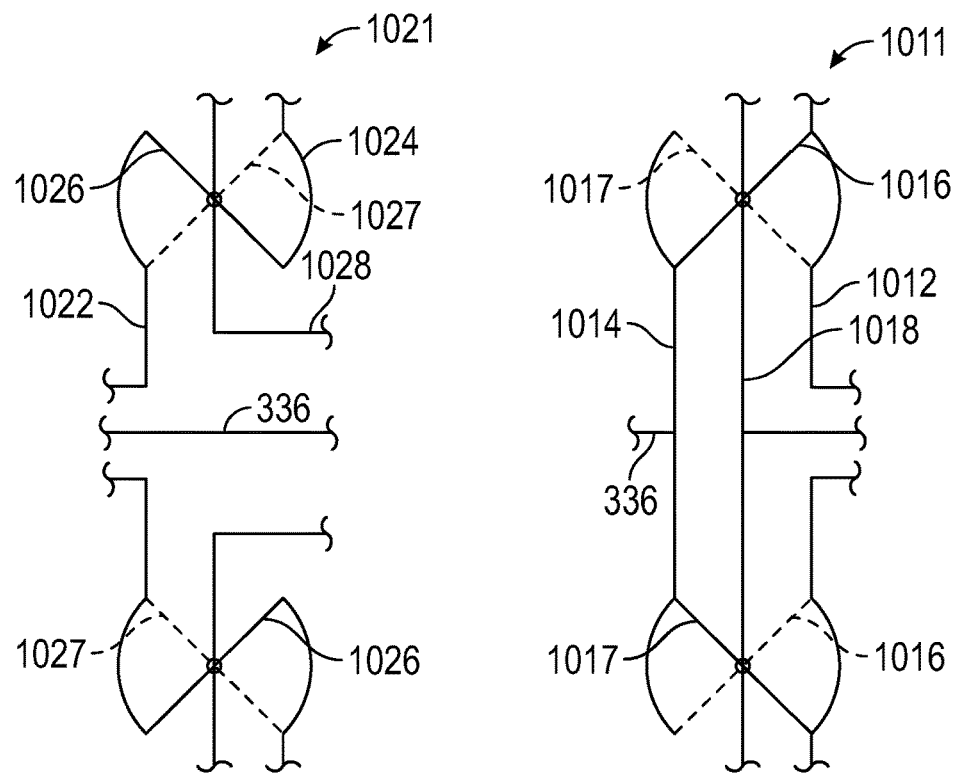
FIG. 20 is a detailed schematic view of variators of the drive system of FIG. 18, according to another exemplary embodiment.

As shown in FIG. 18, the power split variator 1010 includes an inner portion 1011 and the output variator 1020 includes an inner portion 1021. The inner portion 1011 and the inner portion 1021 are shown according to various exemplary embodiments in FIGS. 19 and 20. In FIGS. 19 and 20, the power split variator 1010 and the output variator 1020 are epicyclic or planetary devices. The power split variator 1010 includes a first rotatable portion 1012, a second rotatable portion 1014, and one or more adjustable members or connecting members 1016 each configured to rotate about a corresponding the axis 1017. The connecting members 1016 engage (e.g., rotationally) both the first rotatable portion 1012 and the second rotatable portion 1014, thereby coupling the first rotatable portion 1012 to the second rotatable portion 1014, according to an exemplary embodiment. A carrier 1018 rotationally supports the connecting members 1016 such that each connecting member 1016 rotates relative to the carrier 1018 about the corresponding the axis 1017. In some embodiments, the connecting members 1016 are selectively repositionable such that the axes 1017 rotate relative to the carrier 1018. As the orientations of the connecting members 1016 change relative to the carrier 1018, the connecting members 1016 may engage the first rotatable portion 1012 and the second rotatable portion 1014 at different locations, varying the speed ratios between the first rotatable portion 1012, the second rotatable portion 1014, and the carrier 1018.

The output variator 1020 includes a first rotatable portion 1022, a second rotatable portion 1024, and one or more adjustable members or connecting members 1026 each configured to rotate about a corresponding axis 1027. The connecting members 1026 engage (e.g., rotationally) both the first rotatable portion 1022 and the second rotatable portion 1024, thereby coupling the first rotatable portion 1022 to the second rotatable portion 1024, according to an exemplary embodiment. A carrier 1028 rotationally supports the connecting members 1026 such that each connecting member 1026 rotates relative to the carrier 1028 about the corresponding axis 1027. In some embodiments, the connecting members 1026 are selectively repositionable such that the axes 1027 rotate relative to the carrier 1028. As the orientations of the connecting members 1026 change relative to the carrier 1028, the connecting members 1026 may engage the first rotatable portion 1022 and the second rotatable portion 1024 at different locations, varying the speed ratios between the first rotatable portion 1022, the second rotatable portion 1024, and the carrier 1028.

In the embodiment shown in FIG. 19, the power split variator 1010 and the output variator 1020 are epicyclic or planetary devices configured as friction ball variators. Although the power split variator 1010 is described hereinafter, it should be understood that a similar description applies to the corresponding components of the output variator 1020 (e.g., the connecting members 1016 corresponding to the connecting members 1026, etc.). In this embodiment, the connecting members 1016 are balls (e.g., spheres, etc.) that are rotatable relative to the carrier 1018 about the axes 1017. In the embodiment shown in FIG. 19, the power split variator 1010 is shown to include two the connecting members 1016, however, the power split variator 1010 may include more or fewer connecting members 1016 (e.g., 1, 3, 4, 10, etc.). The first rotatable portion 1012 and the second rotatable portion 1014 each include an engagement surface that extends along a circular path and is configured to engage the connecting members 1016 (e.g., through friction, etc.). Accordingly, the first rotatable portion 1012 is rotationally engaged with the second rotatable portion 1014 through the connecting members 1016. Each connecting member 1016 is configured to rotate relative to the carrier 1018 about an axis 1017 in response to a rotational mechanical energy input (e.g., through the first rotatable portion 1012, through the second rotatable portion 1014, through the carrier 1018, etc.).

In some embodiments, the axes 1017 are fixed (e.g., permanently, selectively, etc.) relative to the carrier 1018. In other embodiments, to facilitate varying speed ratios between inputs to the power split variator 1010 and outputs from the power split variator 1010, each axis 1017 is rotatable relative to the carrier 1018 (e.g., such that the axis 1017 rotates about an axis extending perpendicular to the plane of FIG. 19). The connecting members 1016 may have a curved profile such that rotating the axes 1017 of the connecting members 1016 varies the ratios between the speed of the first rotatable portion 1012, the speed of the second rotatable portion 1014, and the speed of the carrier 1018. Rotating the axis 1017 corresponding to one of the connecting members 1016 in a first direction both (a) reduces the distance between that the axis 1017 and the point where the first rotatable portion 1012 engages that connecting member 1016 and (b) increases the distance between that the axis 1017 and the point where the second rotatable portion 1014 engages that connecting member 1016. In one such arrangement, with the carrier 1018 held fixed, the first rotatable portion 1012 rotates more slowly than the second rotatable portion 1014. Rotating the axis 1017 in the opposite direction may have the opposite effect. In some embodiments, the axes 1017 are rotationally coupled such that they rotate in unison.

In the embodiment shown in FIG. 20, the power split variator 1010 and the output variator 1020 are epicyclic or planetary devices configured as toroidal variators. Although the power split variator 1010 is described hereinafter, it should be understood that a similar description applies to the corresponding components of the output variator 1020 (e.g., the connecting members 1016 corresponding to the connecting members 1026, etc.). In this embodiment, each connecting member 1016 is a wheel or disc that is rotatable relative to the carrier 1018. In the embodiment shown in FIG. 20, the power split variator 1010 is shown to include two the connecting members 1016, however, the power split variator 1010 may include more or fewer the connecting members 1016 (e.g., 1, 3, 4, 10, etc.). The first rotatable portion 1012 and the second rotatable portion 1014 each include a toroidal engagement surface that is configured to engage the connecting members 1016 (e.g., through friction, etc.). Accordingly, the first rotatable portion 1012 is rotationally engaged with the second rotatable portion 1014 through the connecting members 1016. Each connecting member 1016 is configured to rotate relative to the carrier 1018 about an axis 1017 in response to a rotational mechanical energy input (e.g., through the first rotatable portion 1012, through the second rotatable portion 1014, through the carrier 1018, etc.).

In some embodiments, the axes 1017 are fixed relative to the carrier 1018. In other embodiments, to facilitate varying speed ratios between inputs to the power split variator 1010 and outputs from the power split variator 1010, each axis 1017 is rotatable relative to the carrier 1018 (e.g., such that the axis 1017 rotates about an axis extending perpendicular to the plane of FIG. 20). To facilitate continuous engagement between the connecting members 1016, the first rotatable portion 1012, and the second rotatable portion 1014 as the axis 1017 rotates, the toroidal engagement surfaces may be concave with a constant radius cross sectional curvature. In such embodiments, rotating the axes 1017 varies the ratios between the speed of the first rotatable portion 1012, the speed of the second rotatable portion 1014, and the speed of the carrier 1018. Rotating the axis 1017 corresponding to one of the connecting members 1016 in a first direction both (a) increases the radius between the axis of rotation of the first rotatable portion 1012 and the point where that connecting member 1016 engages the first rotatable portion 1012 and (b) decreases the radius between the axis of rotation of the second rotatable portion 1014 and the point where that connecting member 1016 engages the second rotatable portion 1014. In one such arrangement, with the carrier 1018 held fixed, the first rotatable portion 1012 rotates more slowly than the second rotatable portion 1014. Rotating the axis 1017 in the opposite direction has the opposite effect. In some embodiments, the axes 1017 are rotationally coupled such that they rotate in unison.

Figure 21:
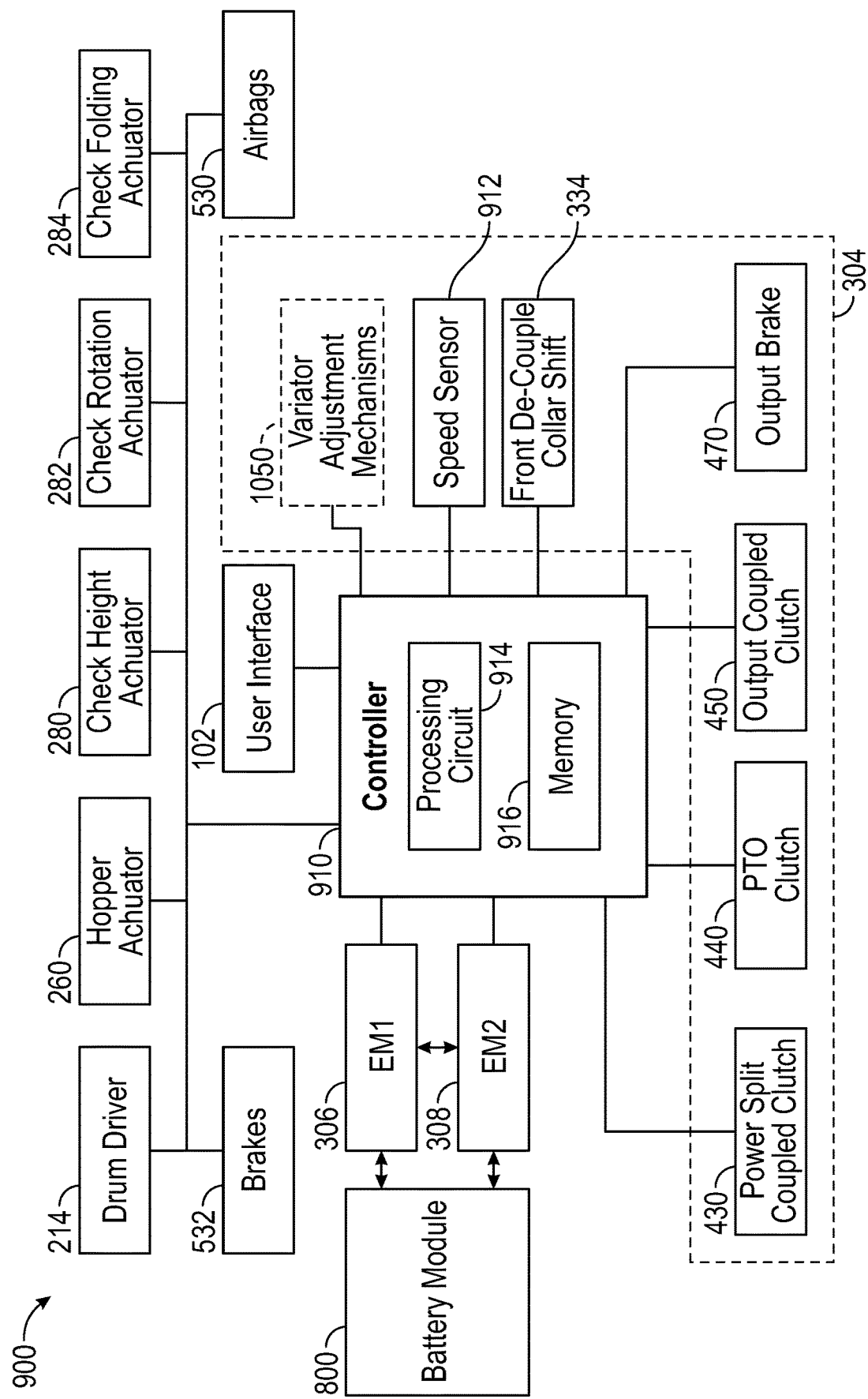
FIG. 21 is a schematic diagram of a control system of the concrete mixer truck of FIG. 1, according to an exemplary embodiment.

As shown in FIG. 21, described in detail below, the power split variator 1010 and the output variator 1020 each include an adjustment mechanism or actuator, shown as variator adjustment mechanism 1050. The variator adjustment mechanisms 1050 are configured to rotate the axes 1017 relative to the carrier 1018, rotate the axes 1027 relative to the carrier 1028, or otherwise vary speed ratios of the power split variator 1010 and the output variator 1020. The variator adjustment mechanism 1050 may be a hydraulic actuator, a pneumatic actuator, an electric motor, or another type of actuator that is controlled by another component (e.g., a controller). By way of example, a controller (e.g., controller 910, described below with respect to FIG. 21) may control the variator adjustment mechanism 1050 to control the speed of the output shaft 332 and/or the PTO shaft 602. Alternatively, the variator adjustment mechanism 1050 may be controlled passively (e.g., using a flyweight system). By way of example, the variator adjustment mechanism 1050 may include a spring loaded flyweight coupled to a component of the power split variator 1010 (e.g., the carrier 1018) such that the variator adjustment mechanism 1050 varies the orientation of the axes 1017 based on a rotational speed of the component. In other embodiments, the axes 1017 are fixed relative to the carrier 1018, and the variator adjustment mechanism 1050 is omitted.

Control System

According to the exemplary embodiment shown in FIG. 21, a control system 900 for the concrete mixer truck 10 includes a controller 910. In one embodiment, the controller 910 is configured to selectively engage, selectively disengage, or otherwise communicate with components of the concrete mixer truck 10 according to various modes of operation. The controller 910 is coupled to the first electromagnetic device 306 and the second electromagnetic device 308, according to an exemplary embodiment, and may send and receive signals therewith. By way of example, the controller 910 may send command signals relating to at least one of a target rotational speed, a target torque, and a target rotation direction for the first electromagnetic device 306 and the second electromagnetic device 308. The controller 910 is coupled to the drum driver 214, the hopper actuator 260, the chute height actuator 280, the chute rotation actuator 282, the chute folding actuators 284, the airbags 530, and the brakes 532, according to an exemplary embodiment, and may send and receive signals therewith (e.g., indirectly through one or more valves).

As shown in FIG. 21, the first electromagnetic device 306 and the second electromagnetic device 308 are electrically coupled (e.g., through an electrical connection provided by a bus). By way of example, power generated by the first electromagnetic device 306 (e.g., in response to a rotational input from the rear drive shaft 520 and/or the front drive shaft 510 through the transmission 304, etc.) may be utilized by the second electromagnetic device 308 (e.g., to provide an output torque as a motor, etc.), or power generated by the second electromagnetic device 308 may be utilized by the first electromagnetic device 306 (e.g., to provide an output torque as a motor, etc.). In other embodiments, the first electromagnetic device 306 and the second electromagnetic device 308 are electrically decoupled from one another and/or the first electromagnetic device 306 and the second electromagnetic device 308 are selectively electrically coupled to one another (e.g., using a switch). The first electromagnetic device 306 and the second electromagnetic device 308 are both electrically coupled to the battery module 800. By way of example, power generated by the first electromagnetic device 306 and/or the second electromagnetic device 308 may be stored within the battery module 800, or power stored within the battery module 800 or generated elsewhere on the concrete mixer truck 10 may be utilized by the first electromagnetic device 306 and/or the second electromagnetic device 308 (e.g., to provide an output torque as a motor, etc.).

According to the exemplary embodiment shown in FIG. 21, the control system 900 includes a user interface 102 that is coupled to the controller 910. In one embodiment, the user interface 102 includes a display and an operator input. The display may be configured to display a graphical user interface, an image, an icon, or still other information. In one embodiment, the display includes a graphical user interface configured to provide general information about the vehicle (e.g., vehicle speed, fuel level, warning lights, etc.). The graphical user interface may also be configured to display a current mode of operation, various potential modes of operation, or still other information relating to transmission 304, the accessory module 600, or the drive system 300. By way of example, the graphical user interface may be configured to provide specific information regarding the operation of drive system 400 (e.g., whether the power split coupled clutch 430, the PTO clutch 440, the output coupled clutch 450, and the output brake 470 are engaged or disengaged, a fault condition where at least one of the power split coupled clutch 430, the PTO clutch 440, the output coupled clutch 450, and the output brake 470 fail to engage or disengage in response to a command signal, etc.). By way of another example, the graphical user interface may be configured to provide specific information regarding the accessory module 600 (e.g., whether an accessory is connected, what type of accessory is connected, status information for the accessory, etc.).

The operator input may be used by an operator to provide commands to at least one of the transmission 304, the first electromagnetic device 306, the second electromagnetic device 308, the accessory module 600, the drive system 300, the drum driver 214, the hopper actuator 260, the chute height actuator 280, the chute rotation actuator 282, the chute folding actuators 284, the airbags 530, the brakes 532, or still another component of the concrete mixer truck 10. The operator input may include one or more buttons, knobs, touchscreens, switches, levers, joysticks, or handles. In one embodiment, an operator may press a button to change the mode of operation for at least one of the transmission 304, the drive system 300, the drum assembly 200, and the concrete mixer truck 10. The operator may be able to manually control some or all aspects of the operation of transmission 304 using the display and the operator input. The operator input may also control operation of the accessory module 600, the mixing drum 202, the hopper 220, the chute 222, the airbags 530, and the brakes 532 (e.g., by controlling one or more valves, by selectively supplying electrical energy to one or more components, by engaging or disengaging one or more clutches, etc.). In should be understood that any type of display or input controls may be implemented with the systems and methods described herein.

As shown in FIGS. 12 and 21, the control system 900 further includes a rotational speed sensor, shown as speed sensor 912, coupled to the output shaft 332 within the transmission 304. The speed sensor 912 may be an optical encoder, a Hall Effect gear tooth sensor, or any other type of sensor capable of detecting a rotational speed. The speed sensor 912 is configured to provide the rotational speed of the output shaft 332 to the controller 910. As the output shaft 332 drives the front axle assembly 500 and/or the rear axle assemblies 502, the controller 910 may be configured to use the rotational speed of the output shaft 332 to determine a speed of the concrete mixer truck 10 (e.g., a speed of travel of the concrete mixer truck 10).

The controller 910 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 21, the controller 910 includes a processing circuit 914 and a memory 916. The processing circuit 914 may include an ASIC, one or more FPGAs, a DSP, circuits containing one or more processing components, circuitry for supporting a microprocessor, a group of processing components, or other suitable electronic processing components. In some embodiments, the processing circuit 914 is configured to execute computer code stored in the memory 916 to facilitate the activities described herein. The memory 916 may be any volatile or non-volatile computer-readable storage medium capable of storing data or computer code relating to the activities described herein. According to an exemplary embodiment, the memory 916 includes computer code modules (e.g., executable code, object code, source code, script code, machine code, etc.) configured for execution by the processing circuit 914. The memory 916 includes various actuation profiles corresponding to modes of operation (e.g., for the transmission 304, for the drive system 300, for the drum assembly 200, etc.), according to an exemplary embodiment. In some embodiments, the controller 910 may represent a collection of processing devices (e.g., servers, data centers, etc.). In such cases, the processing circuit 914 represents the collective processors of the devices, and the memory 916 represents the collective storage devices of the devices.

Operating Modes of the Power Plant Module

Referring next to the exemplary embodiments shown in FIGS. 22-28, the transmission 304 is configured to operate according to a plurality of modes of operation. Various modes of operation for the transmission 304 are identified below in Table 1. In other embodiments, the concrete mixer truck 10 having the transmission 304 is configured to operate according to the various modes of operation shown in FIGS. 13-19 and identified below in Table 1.

TABLE 1

| Mode of Operation | Power Split Coupled Clutch 430 | Output Coupled Clutch 450 | Output Brake 470 | PTO Clutch 440 |
|---|---|---|---|---|
| Mid Speed Reverse | X | | X | |
| Low Speed Reverse | X | X | | |
| Active Neutral | | | X | X |
| Low Range | X | X | | |
| Mid Range | X | | X | |
| Shift | X | | X | X |
| High Range | X | | | X |

As shown in Table 1, an "X" represents a component of the drive system 300 (e.g., the output brake 470, the power split coupled clutch 430, etc.) that is engaged or closed during the respective modes of operation. In one embodiment, all of the components in Table 1 are disengaged to selectively reconfigure the transmission 304 in a neutral mode.

Figure 22:
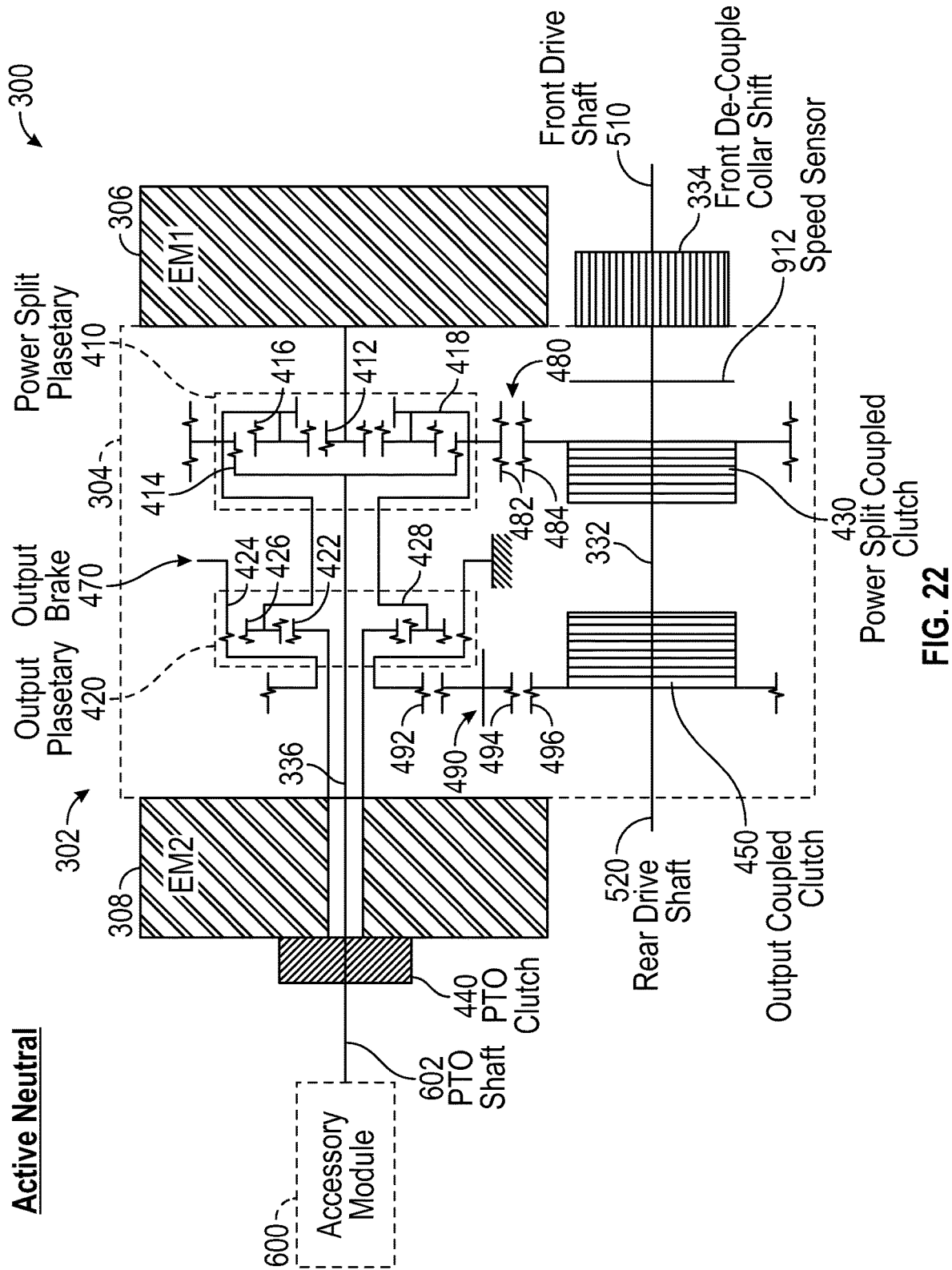
FIG. 22 is a detailed schematic view of the drive system of FIG. 12 configured in an active neutral mode of operation, according to an exemplary embodiment.

As shown in FIG. 22, the transmission 304 is selectively reconfigured into an active neutral mode of operation (e.g., a PTO only mode of operation, etc.). The controller 910 may selectively configure the transmission 304 into the active neutral mode of operation from a passive neutral mode of operation (e.g., a mode whereby the power split coupled clutch 430, the PTO clutch 440, the output coupled clutch 450, and the output brake 470 are disengaged such that the first electromagnetic device 306 and the second electromagnetic device 308 can rotate without rotating the PTO shaft 602 or the output shaft 332, etc.). In one embodiment, the controller 910 first selectively configures the transmission 304 into the passive neutral mode of operation (e.g., by disengaging the power split coupled clutch 430, the PTO clutch 440, the output coupled clutch 450, and the output brake 470) and thereafter selectively configures the transmission 304 into the active neutral mode of operation in response to a request to use the accessory module 600. The transmission 304 may be reconfigured into the passive neutral mode of operation at various times during the operation of the concrete mixer truck 10 (e.g., when entering a park mode of operation from a driving mode of operation, in order to tow the concrete mixer truck 10, etc.). By way of example, the active neutral mode of operation may be used when the concrete mixer truck 10 is mixing and/or dispensing concrete while stationary (e.g., while in position at a job site).

In one embodiment, rotation of the first electromagnetic device 306 rotates the PTO shaft 602 to power the accessory module 600. By way of example, the first electromagnetic device 306 may be configured to use the electrical energy from the battery module 800 and provide a rotational mechanical energy input (e.g., a torque, etc.) to the PTO shaft 602 through the power split planetary 410 and the connecting shaft 336. In another embodiment, rotation of the second electromagnetic device 308 rotates the PTO shaft 602 (e.g., where the PTO clutch 440 is engaged, etc.) to power the accessory module 600. By way of example, the second electromagnetic device 308 may be configured to use the electrical energy from the battery module 800 and provide a rotational mechanical energy input (e.g., a torque, etc.) to the PTO shaft 602 through the engagement of the PTO clutch 440 with the connecting shaft 336. In yet another embodiment, simultaneous rotation of both the first electromagnetic device 306 and the second electromagnetic device 308 rotates the PTO shaft 602 to power the accessory module 600.

As shown in FIG. 22 and Table 1, the PTO clutch 440 and the output brake 470 are engaged when the transmission 304 is configured in the active neutral mode. As shown in FIG. 22, the PTO clutch 440 directly couples the second electromagnetic device 308 to the connecting shaft 336 and the PTO shaft 602. The output brake 470 rotationally fixes the ring gear 424. According to the exemplary embodiment shown in FIG. 22, a first energy flow path for the active neutral mode includes: the battery module 800 providing electrical energy to the first electromagnetic device 306; the first electromagnetic device 306 using the electrical energy and providing a rotational mechanical energy input to the sun gear 412 that is received by the plurality of the planetary gears 416; the plurality of the planetary gears 416 conveying the rotational mechanical energy to the ring gear 414; and the ring gear 414 transferring the rotational mechanical energy to the connecting shaft 336 such that the rotational mechanical energy provided by the first electromagnetic device 306 rotates the PTO shaft 602. A second energy flow path for the active neutral mode includes: the battery module 800 providing electrical energy to the second electromagnetic device 308; and the second electromagnetic device 308 using the electrical energy and providing a rotational mechanical energy input to the connecting shaft 336 through the PTO clutch 440 such that the rotational mechanical energy rotates the PTO shaft 602. The first and second energy flow paths may occur independently (e.g., by running only one electromagnetic device at one time) or simultaneously.

In an alternative to the active neutral mode of operation, only the PTO clutch 440 engaged, coupling the second electromagnetic device 308 to the PTO shaft 602. This alternative mode of operation would utilize the second energy flow path, which includes: the battery module 800 providing electrical energy to the second electromagnetic device 308; and the second electromagnetic device 308 using the electrical energy and providing a rotational mechanical energy input to the connecting shaft 336 through the PTO clutch 440 such that the rotational mechanical energy rotates the PTO shaft 602.

In some embodiments, these energy flow paths may be followed in a reverse sequence to generate electrical energy. By way of example, the second electromagnetic device 308 may be used to apply a braking torque on the PTO shaft 602. In such an example, rotational mechanical energy is transferred from the PTO shaft 602 to the second electromagnetic device 308 through the connecting shaft 336 and the PTO clutch 440. The second electromagnetic device 308 removes rotational mechanical energy from the PTO clutch 440 and generates electrical energy to charge the battery module 800. By way of another example, the first electromagnetic device 306 may be used to apply a braking torque on the PTO shaft 602. In such an example, rotational mechanical energy is transferred from the PTO shaft 602 to the first electromagnetic device 306 through the connecting shaft 336 and the power split planetary 410. The first electromagnetic device 306 removes rotational mechanical energy from the sun gear 412 and generates electrical energy to charge the battery module 800. By way of example, such a configuration may be used when slowing or changing the direction of rotation of the mixing drum 202 (e.g., to change between mixing material and dispensing material). The rotating mixing drum 202 may contain a large amount of kinetic energy, especially when filled with material. When slowing or changing the direction of the mixing drum 202, the momentum of the mixing drum 202 may back drive the drum drive motor 252 (e.g., operating the drum drive motor 252 as a hydraulic pump). The drum drive motor 252 provides a flow of pressurized hydraulic fluid to the drum drive pump 620, driving the drum drive pump 620 to provide rotational mechanical energy (e.g., operating the drum drive pump 620 as a hydraulic motor). The drum drive pump 620 then provides rotational mechanical energy to the PTO shaft 602.

According to the exemplary embodiment shown in FIG. 22, engaging the PTO clutch 440 rotates the second electromagnetic device 308 at the rotational speed of the connecting shaft 336. The connecting shaft 336 may rotate at the same speed as the PTO shaft 602 such that the PTO shaft 602 and the second electromagnetic device 308 operate at a 1:1 speed ratio. According to the exemplary embodiment shown in FIG. 22, engaging the PTO clutch 440 and the output brake 470 rotates the carrier 418 (e.g., through the output planetary 420, etc.) while the ring gear 414 rotates with the connecting shaft 336. Engaging the PTO clutch 440 and the output brake 470 may drive the first electromagnetic device 306 at a rotational speed that is related to the rotational speed of the carrier 418 and the rotational speed of the ring gear 414. In one embodiment, the active neutral mode locks the first electromagnetic device 306 and the second electromagnetic device 308 in a fixed speed ratio with the PTO shaft 602 (e.g., 1:1 between the second electromagnetic device 308 and the PTO shaft 602; 1.06:1 between the first electromagnetic device 306 and the PTO shaft 602, etc.).

Referring still to FIG. 22, the transmission 304 isolates the first electromagnetic device 306 and the second electromagnetic device 308 from the output shaft 332 during the active neutral mode (e.g., the power split coupled clutch 430 and the output coupled clutch 450 may be disengaged, etc.). Such isolation may reduce (e.g., substantially eliminate, etc.) a forward lurch potential of the concrete mixer truck 10 (e.g., the transmission 304 does not provide an output torque to the front axle assembly 500 and/or the rear axle assemblies 502 when in the active neutral mode, etc.).

In some embodiments, at least one of the PTO clutch 440 and the output brake 470 are disengaged to prepare the transmission 304 to be selectively reconfigured into a drive mode (e.g., low range, mid range, high range, etc.). By way of example, the PTO clutch 440 may be disengaged in response to a command from a user (e.g., through the user interface 102) to enter a drive mode. Only the power split coupled clutch 430 may need to be engaged to selectively reconfigure the transmission 304 into the mid range mode, thereby providing a simple and efficient process by which the concrete mixer truck 10 may be shifted into a drive mode and driven. In some embodiments, when preparing to shift modes of operation, the controller 910 controls the first electromagnetic device 306 and/or the second electromagnetic device 308 in a motoring mode where the first electromagnetic device 306 and/or the second electromagnetic device 308 provide an input torque to the transmission 304 and are commanded to operate at a target speed. Such a speed may be based on the current speed of the concrete mixer truck 10 (e.g., zero if the concrete mixer truck 10 is not moving on flat ground, non-zero if the concrete mixer truck 10 is rolling up or down a slope at startup, etc.). Commanding the operation of the first electromagnetic device 306 and/or the second electromagnetic device 308 may prepare the transmission 304 for a shift from the active neutral mode of operation (i.e., a selective reconfiguration, etc.) to another driving mode of operation (e.g., a mid range mode of operation, etc.). Such preparation may decrease an inertial jerk on the output shaft 332 during the shift.

Figure 23:
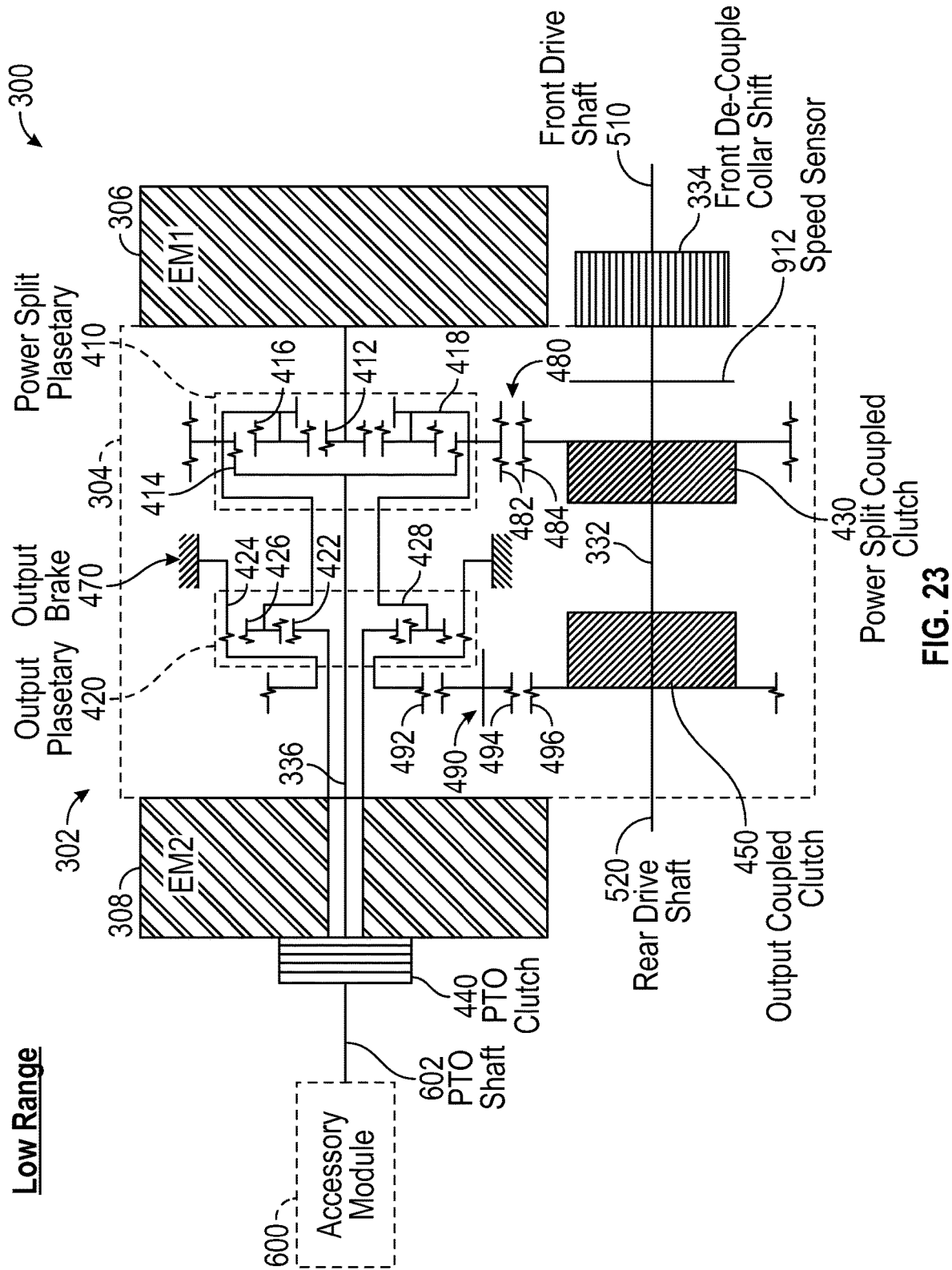
FIG. 23 is a detailed schematic view of the drive system of FIG. 12 configured in a low range mode of operation, according to an exemplary embodiment.

As shown in FIG. 23, the transmission 304 is selectively reconfigured into a low range mode of operation such that the transmission 304 allows for a low output speed operation with a high output torque. The low range mode increases the gradability of the concrete mixer truck 10 (e.g., facilitates the concrete mixer truck 10 maintaining speed on a grade, etc.). In one embodiment, the second electromagnetic device 308 uses the electrical energy from the battery module 800 and provides a rotational mechanical energy input to the transmission 304 to drive at least one of the front axle assembly 500 and the rear axle assemblies 502. The rotational mechanical energy input from the second electromagnetic device 308 may additionally drive the PTO shaft 602. In another embodiment, the first electromagnetic device 306 uses the electrical energy from the battery module 800 and provides a rotational mechanical energy input to the transmission 304 to drive at least one of the front axle assembly 500, the rear axle assemblies 502, and the PTO shaft 602 in the low range mode. In another embodiment, both the first electromagnetic device 306 and the second electromagnetic device 308 provide a rotational mechanical energy input to the transmission 304 in the low range mode. In still another alternative embodiment, one or both of the first electromagnetic device 306 and the second electromagnetic device 308 operate as a generator in the low range mode.

In some embodiments, while in the low range mode, the first electromagnetic device 306 only provides rotational mechanical energy when it is desired to operate the accessory module 600. Upon receiving a request to operate the accessory module 600, the first electromagnetic device 306 provides rotational mechanical energy to drive the PTO shaft 602. The first electromagnetic device 306 may begin providing rotational mechanical energy to the output shaft 332 when the transmission 304 is transitioned into another mode of operation (e.g., the mid range mode, the high range mode, etc.). In other embodiments, when the concrete mixer truck 10 is traveling at less than a threshold speed (e.g., as measured using the speed sensor 912), the first electromagnetic device 306 only provides rotational mechanical energy when it is desired to operate the accessory module 600. Upon receiving a request to operate the accessory module 600, the first electromagnetic device 306 provides rotational mechanical energy to drive the PTO shaft 602. The first electromagnetic device 306 may begin providing rotational mechanical energy to the output shaft 332 when the concrete mixer truck 10 reaches the threshold speed. In yet other embodiments, the first electromagnetic device 306 provides rotational mechanical energy to drive the output shaft 332 and/or the accessory module 600 when the first electromagnetic device 306 is in the low range mode and/or regardless of the speed of the concrete mixer truck 10.

As shown in FIG. 23 and Table 1, the power split coupled clutch 430 and the output coupled clutch 450 are engaged when the transmission 304 is configured in the low range mode. As shown in FIG. 23, the power split coupled clutch 430 and the output coupled clutch 450 couple the gear set 480 and the gear set 490 to the output shaft 332, respectively. Accordingly, when the first electromagnetic device 306 and/or the second electromagnetic device 308 provide a rotational mechanical energy input to the transmission 304, both the power split planetary 410 and the output planetary 420 drive the output shaft 332 through the gear set 480 and the gear set 490, respectively. According to the exemplary embodiment shown in FIG. 23, an exemplary energy flow path for the low range includes: the second electromagnetic device 308 receiving electrical energy from the battery module 800; the second electromagnetic device 308 operating as a motor, providing a rotational mechanical energy input to the sun gear 422; the sun gear 422 causing the plurality of planetary gears 426 to rotate about central axes thereof, as well as about the sun gear 422 such that both the carrier 428 and the ring gear 424 rotate; the rotation of the ring gear 424 driving the gear set 490. The rotation of the carrier 428 drives both the carrier 418 and the gear set 480. According to the exemplary embodiment shown in FIG. 23, the gear set 480 and the gear set 490 transfer a torque to and from the output shaft 332 with the power split coupled clutch 430 and the output coupled clutch 450 engaged. As such, the second electromagnetic device 308 moves the concrete mixer truck 10 at a low speed with a high output torque. This energy flow path may additionally include: the carrier 418 causing the plurality of the planetary gears 416 to rotate about central axes thereof, as well as about the sun gear 412 such that the ring gear 414 rotates; the ring gear 414 providing a rotational mechanical energy input to the connecting shaft 336; and the connecting shaft 336 conveying the rotational mechanical energy to the PTO shaft 602 to drive the accessory module 600

According to the exemplary embodiment shown in FIG. 23, a second exemplary energy flow path for the low range includes: the first electromagnetic device 306 receiving electrical energy from the battery module 800; the first electromagnetic device 306 operating as a motor, providing a rotational mechanical energy input to the sun gear 412; the sun gear 412 causing the plurality of the planetary gears 416 to rotate about central axes thereof, such that the ring gear 414 rotates; the ring gear 414 providing a rotational mechanical energy input to the connecting shaft 336; and the connecting shaft 336 conveying the rotational mechanical energy to the PTO shaft 602 to drive the accessory module 600. This energy flow path may additionally or alternatively include the plurality of the planetary gears 416 rotating about the sun gear 412 such that the carrier 418 and the gear set 480 rotate. According to the exemplary embodiment shown in FIG. 23, the gear set 480 transfers a torque to and from the output shaft 332 with the power split coupled clutch 430 and the output coupled clutch 450 engaged. As such, the first electromagnetic device 306 moves the concrete mixer truck 10 at a low speed with a high output torque.

In some embodiments, the second electromagnetic device 308 is coupled to the output shaft 332 at a fixed ratio through the output planetary 420, the gear set 490, and the output coupled clutch 450 during the low range mode. Accordingly, the rotational speed of the output shaft 332 is entirely dependent on the rotational speed of the second electromagnetic device 308. The speed of the PTO shaft 602 is dependent on the relative rotational speed between the first electromagnetic device 306 and the second electromagnetic device 308. In the low range mode, the first electromagnetic device 306 controls the speed of the sun gear 412, and the second electromagnetic device 308 controls the speed of the carrier 418. Depending on the relative rotational speeds and directions of the sun gear 412 and the carrier 418, the plurality of the planetary gears 416 cause the ring gear 414, and thus the PTO shaft 602, to rotate at different speeds and in different directions. Accordingly, the relative rotational speed and direction of the first electromagnetic device 306 and the second electromagnetic device 308 may be varied to cause the first electromagnetic device 306 to drive the PTO shaft 602, the output shaft 332, or both, and the second electromagnetic device 308 to drive the output shaft 332 or both the output shaft 332 and the PTO shaft 602.

In some embodiments, these energy flow paths may be followed in a reverse sequence to generate electrical energy. By way of example, the second electromagnetic device 308 may be used to apply a braking torque on the output shaft 332. In such an example, rotational mechanical energy is transferred from the output shaft 332 to the second electromagnetic device 308 through the output coupled clutch 450, the gear set 490, and the output planetary 420. The second electromagnetic device 308 removes rotational mechanical energy from the sun gear 422 and generates electrical energy to charge the battery module 800 or power the first electromagnetic device 306. By way of another example, the first electromagnetic device 306 may be used to apply a braking torque on the PTO shaft 602. In such an example, rotational mechanical energy is transferred from the PTO shaft 602 to the first electromagnetic device 306 through the connecting shaft 336 and the power split planetary 410. The first electromagnetic device 306 removes rotational mechanical energy from the sun gear 412 and generates electrical energy to charge the battery module 800 or power the second electromagnetic device 308.

Figure 24:
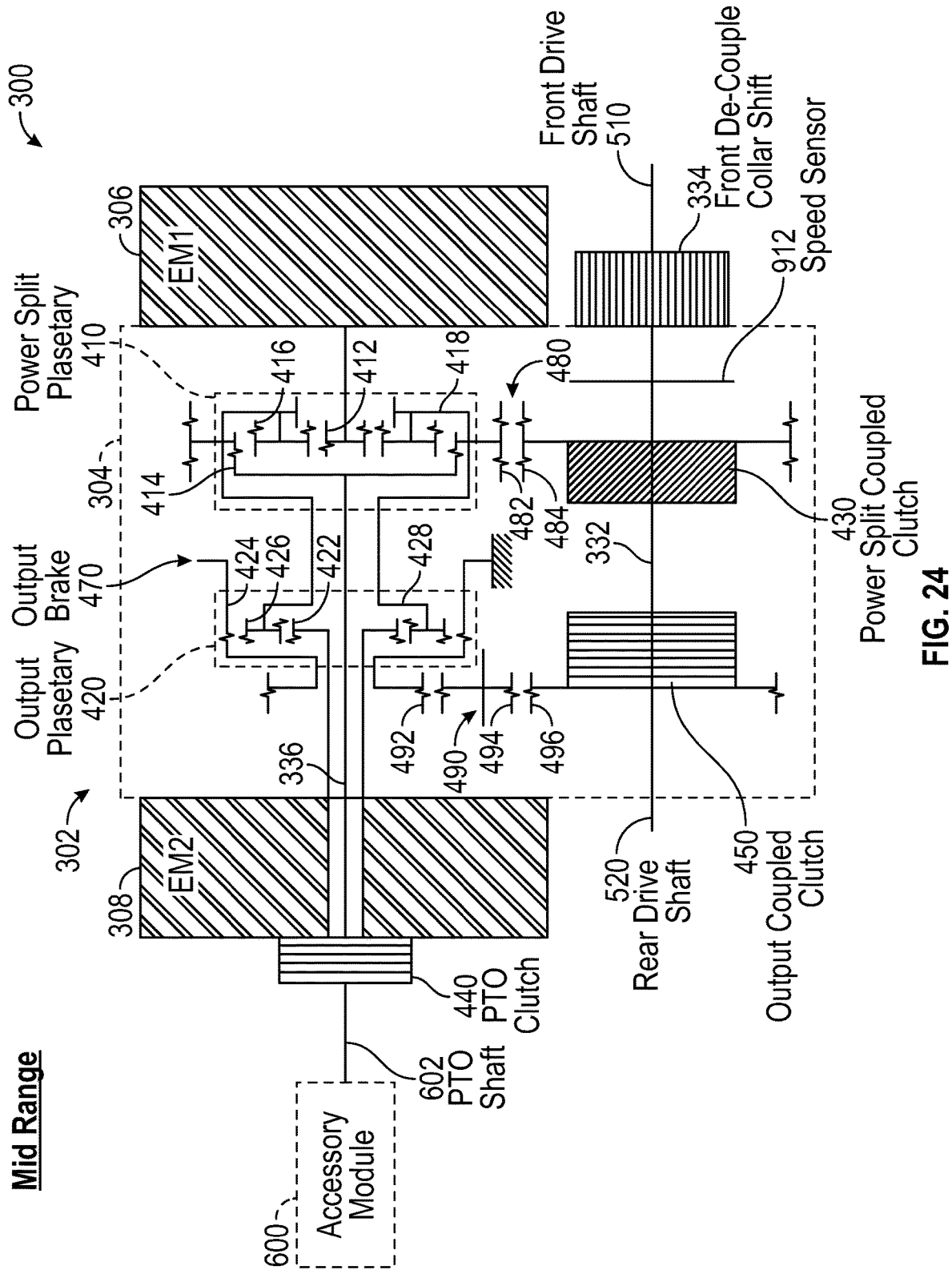
FIG. 24 is a detailed schematic view of the drive system of FIG. 12 configured in a mid range mode of operation, according to an exemplary embodiment.

As shown in FIG. 24, the transmission 304 is selectively reconfigured into a mid range mode of operation such that the transmission 304 allows for a mid range output speed operation. The mid range mode may improve low output speed torque and high output speed power. In one embodiment, the second electromagnetic device 308 uses the electrical energy from the battery module 800 and provides a rotational mechanical energy input to the transmission 304 to drive at least one of the front axle assembly 500 and the rear axle assemblies 502. The rotational mechanical energy input from the second electromagnetic device 308 may additionally drive the PTO shaft 602. In another embodiment, the first electromagnetic device 306 uses the electrical energy from the battery module 800 and provides a rotational mechanical energy input to the transmission 304 to drive at least one of the front axle assembly 500, the rear axle assemblies 502, and the PTO shaft 602 in the mid range mode. In another embodiment, both the first electromagnetic device 306 and the second electromagnetic device 308 provide a rotational mechanical energy input to the transmission 304 in the mid range mode. In still another alternative embodiment, one or both of the first electromagnetic device 306 and the second electromagnetic device 308 operate as a generator in the mid range mode.

As shown in FIG. 24 and Table 1, the power split coupled clutch 430 and the output brake 470 are engaged when the transmission 304 is configured in the mid range mode. As shown in FIG. 24, the output brake 470 inhibits the rotation of the gear set 490 (e.g., the gear 492, the gear 494, the gear 496, etc.) and rotationally fixes the ring gear 424. In one embodiment, engaging the output brake 470 substantially eliminates a power dip between output and input modes of the transmission 304. According to the exemplary embodiment shown in FIG. 24, an energy flow path for the mid range mode includes: the second electromagnetic device 308 receiving electrical energy from the battery module 800; the second electromagnetic device 308 operating as a motor, providing a rotational mechanical energy input to the sun gear 422; the sun gear 422 causing the plurality of planetary gears 426 to rotate about central axes thereof, as well as about the sun gear 422 such that the carrier 428 rotates; and the rotation of the carrier 428 driving both the carrier 418 and the gear set 480. As shown in FIG. 24, the power split coupled clutch 430 couples the gear set 480 to the output shaft 332 such that the rotational mechanical energy of the gear set 480, received from the second electromagnetic device 308, drives the output shaft 332 at a mid range output speed and may thereby drive the concrete mixer truck 10 at a mid range output speed. The energy flow path may additionally include: the carrier 418 causing the plurality of the planetary gears 416 to rotate about central axes thereof, as well as about the sun gear 412 such that the ring gear 414 rotates; the ring gear 414 providing a rotational mechanical energy input to the connecting shaft 336; and the connecting shaft 336 conveying the rotational mechanical energy to the PTO shaft 602 to drive the accessory module 600.

According to the exemplary embodiment shown in FIG. 24, a second exemplary energy flow path for the mid range includes: the first electromagnetic device 306 receiving electrical energy from the battery module 800; the first electromagnetic device 306 operating as a motor, providing a rotational mechanical energy input to the sun gear 412; the sun gear 412 causing the plurality of the planetary gears 416 to rotate about central axes thereof, such that the ring gear 414 rotates; the ring gear 414 providing a rotational mechanical energy input to the connecting shaft 336; and the connecting shaft 336 conveying the rotational mechanical energy the PTO shaft 602 to drive the accessory module 600. This energy flow path may additionally or alternatively include the plurality of the planetary gears 416 rotating about the sun gear 412 such that the carrier 418 and the gear set 480 rotate. As shown in FIG. 24, the power split coupled clutch 430 couples the gear set 480 to the output shaft 332 such that the rotational mechanical energy of the gear set 480, received from the first electromagnetic device 306, drives the output shaft 332 at a mid range output speed and may thereby drive the concrete mixer truck 10 at a mid range output speed.

In some embodiments, the second electromagnetic device 308 is coupled to the output shaft 332 at a fixed ratio through the output planetary 420, the power split planetary 410, the gear set 480, and the power split coupled clutch 430 during the mid range mode. Accordingly, the rotational speed of the output shaft 332 is entirely dependent on the rotational speed of the second electromagnetic device 308. The speed of the PTO shaft 602 is dependent on the relative rotational speed between the first electromagnetic device 306 and the second electromagnetic device 308. In the mid range mode, the first electromagnetic device 306 controls the speed of the sun gear 412, and the second electromagnetic device 308 controls the speed of the carrier 418. Depending on the relative rotational speeds and directions of the sun gear 412 and the carrier 418, the plurality of the planetary gears 416 cause the ring gear 414, and thus the PTO shaft 602, to rotate at different speeds and in different directions. Accordingly, the relative rotational speed and direction of the first electromagnetic device 306 and the second electromagnetic device 308 may be varied to cause the first electromagnetic device 306 to drive the PTO shaft 602, the output shaft 332, or both, and the second electromagnetic device 308 to drive the output shaft 332 or both the output shaft 332 and the PTO shaft 602.

In some embodiments, these energy flow paths may be followed in reverse to generate electrical energy. By way of example, the second electromagnetic device 308 may be used to apply a braking torque on the output shaft 332. In such an example, rotational mechanical energy is transferred from the output shaft 332 to the second electromagnetic device 308 through the power split coupled clutch 430, the gear set 480, the power split planetary 410, and the output planetary 420. The second electromagnetic device 308 removes rotational mechanical energy from the sun gear 422 and generates electrical energy to charge the battery module 800 or power the first electromagnetic device 306. By way of another example, the first electromagnetic device 306 may be used to apply a braking torque on the PTO shaft 602. In such an example, rotational mechanical energy is transferred from the PTO shaft 602 to the first electromagnetic device 306 through the connecting shaft 336 and the power split planetary 410. The first electromagnetic device 306 removes rotational mechanical energy from the sun gear 412 and generates electrical energy to charge the battery module 800 or power the second electromagnetic device 308.

Figure 25:
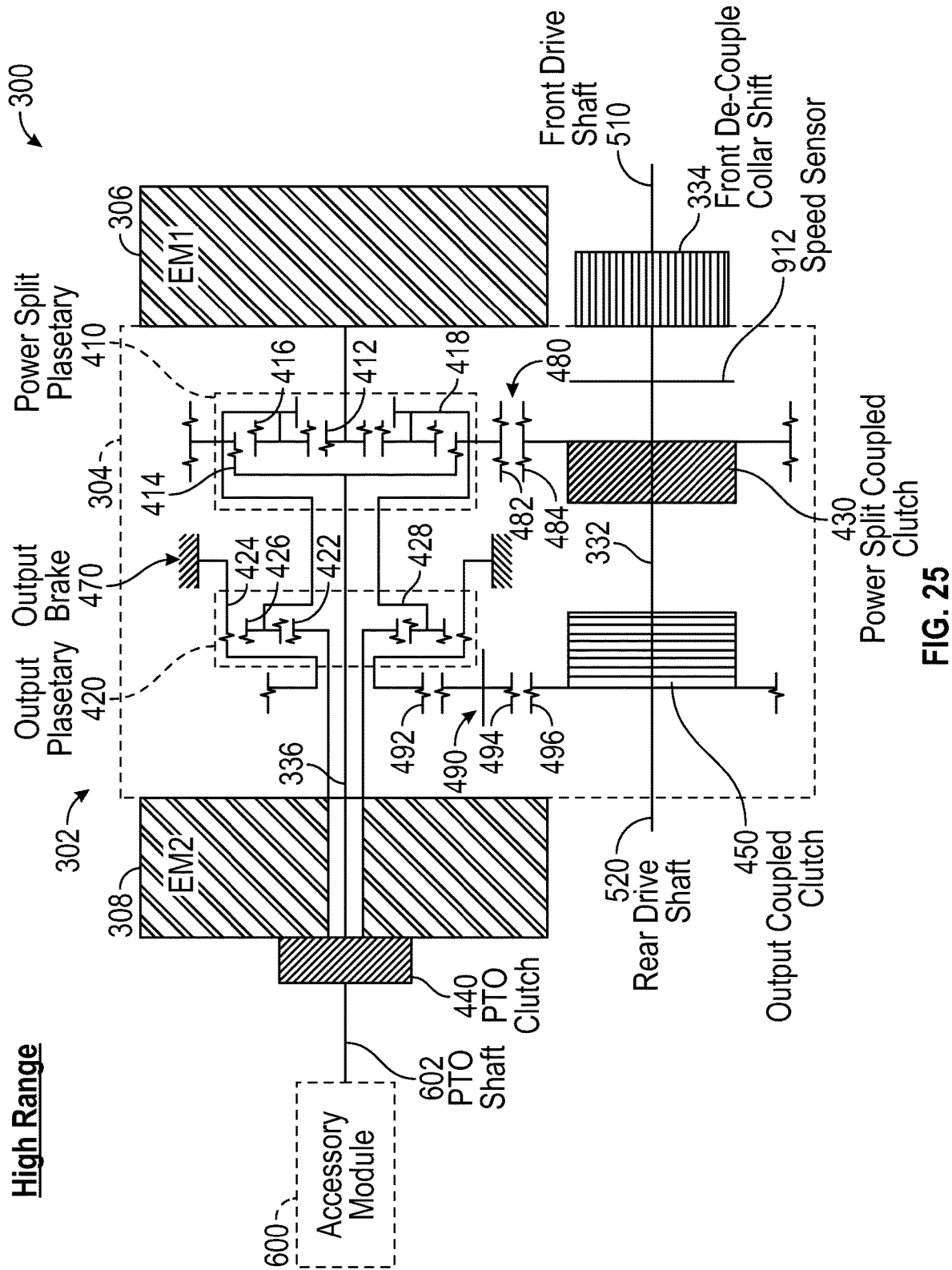
FIG. 25 is a detailed schematic view of the drive system of FIG. 12 configured in a high range mode of operation, according to an exemplary embodiment.

As shown in FIG. 25, the transmission 304 is selectively reconfigured into a high range mode of operation such that the transmission 304 allows for a high output speed operation. In one embodiment, the second electromagnetic device 308 uses the electrical energy from the battery module 800 and provides a rotational mechanical energy input to the transmission 304 to drive the PTO shaft 602 and at least one of the front axle assembly 500 and the rear axle assemblies 502. In another embodiment, the first electromagnetic device 306 uses the electrical energy from the battery module 800 and provides a rotational mechanical energy input to the transmission 304 to drive at least one of the front axle assembly 500, the rear axle assemblies 502, and the PTO shaft 602 in the high range mode. In another embodiment, both the first electromagnetic device 306 and the second electromagnetic device 308 provide a rotational mechanical energy input to the transmission 304 in the high range mode. In still another alternative embodiment, one or both of the first electromagnetic device 306 and the second electromagnetic device 308 operate as a generator in the high range mode.

As shown in FIG. 25 and Table 1, the power split coupled clutch 430 and the PTO clutch 440 are engaged when the transmission 304 is configured in the high range mode. As shown in FIG. 25, the engagement of the PTO clutch 440 with the connecting shaft 336 rotationally couples the second electromagnetic device 308 and the PTO shaft 602. By way of example, the second electromagnetic device 308 may use electrical energy from the battery module 800 and provide a rotational mechanical energy input to the connecting shaft 336 to drive the PTO shaft 602. The PTO shaft 602 may also be driven by the first electromagnetic device 306 in the high range mode. By way of example, the first electromagnetic device 306 may use electrical energy from the battery module 800 and provide a rotational mechanical energy input to the sun gear 412 that drives the ring gear 414 through the planetary gears 416. The ring gear 414 transfers rotational mechanical energy to the connecting shaft 336, which drives the PTO shaft 602.

Referring to FIG. 25, in one embodiment, both the first electromagnetic device 306 and the second electromagnetic device 308 receive electrical energy from the battery module 800 and provide rotational mechanical energy to the transmission 304 to drive the output shaft 332. The first electromagnetic device 306 operates as a motor, providing a rotational mechanical energy input to the sun gear 412 that drives the plurality of the planetary gears 416 and the carrier 418. The second electromagnetic device 308 also acts as a motor. Rotational mechanical energy from the second electromagnetic device 308 is transferred to the plurality of the planetary gears 416 through the connecting shaft 336 and the ring gear 414. The plurality of the planetary gears 416 are driven by both the second electromagnetic device 308 (e.g., through the ring gear 414, etc.) and the first electromagnetic device 306 (e.g., through the sun gear 412, etc.). The carrier 418 rotates, which drives the gear set 480. As shown in FIG. 25, the power split coupled clutch 430 couples the gear set 480 to the output shaft 332 such that the rotational mechanical energy provided by the first electromagnetic device 306 and second electromagnetic device 308 drives the concrete mixer truck 10 at a high range speed.

In some embodiments, the second electromagnetic device 308 is coupled to the PTO shaft 602 at a fixed ratio (e.g., 1:1) through the PTO clutch 440 and the connecting shaft 336 during the high range mode. Accordingly, the rotational speed and direction of the PTO shaft 602 is entirely dependent on the rotational speed of the second electromagnetic device 308. The speed of the output shaft 332 is dependent on the relative rotational speed between the first electromagnetic device 306 and the second electromagnetic device 308. In the high range mode, the first electromagnetic device 306 controls the speed of the sun gear 412, and the second electromagnetic device 308 controls the speed of the ring gear 414. Depending on the relative rotational speeds and directions of the sun gear 412 and the ring gear 414, the plurality of the planetary gears 416 cause the carrier 418, and thus the output shaft 332, to rotate at different speeds and in different directions.

In some embodiments, these energy flow paths may be followed in reverse to generate electrical energy. By way of example, the first electromagnetic device 306 and the second electromagnetic device 308 may be used to apply a braking torque on the output shaft 332. In such an example, rotational mechanical energy is transferred from the output shaft 332 to the second electromagnetic device 308 through the power split coupled clutch 430, the gear set 480, the power split planetary 410, the connecting shaft 336, and the PTO clutch 440. Rotational mechanical energy is transferred from the output shaft 332 to the first electromagnetic device 306 through the power split coupled clutch 430, the gear set 480, and the power split planetary 410. The first electromagnetic device 306 and the second electromagnetic device 308 remove rotational mechanical energy from the sun gear 412 and the connecting shaft 336, respectively, and generate electrical energy to charge the battery module 800. By way of another example, the second electromagnetic device 308 may be used to apply a braking torque on the PTO shaft 602. In such an example, rotational mechanical energy is transferred from the PTO shaft 602 to the second electromagnetic device 308 through the connecting shaft 336 and the PTO clutch 440. The first electromagnetic device 306 removes rotational mechanical energy from the sun gear 412 and generates electrical energy to charge the battery module 800 or power the second electromagnetic device 308.

Figure 26:
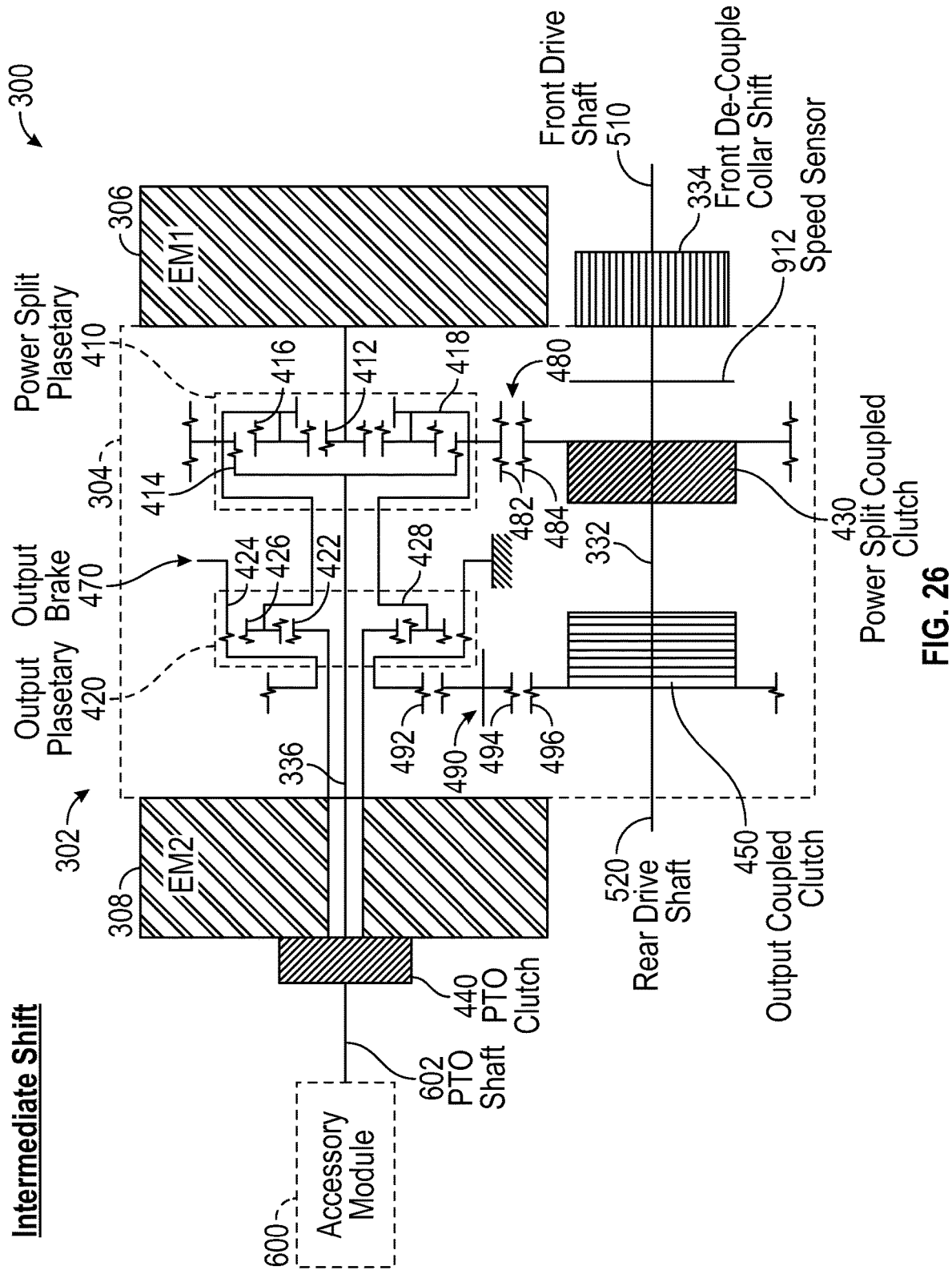
FIG. 26 is a detailed schematic view of the drive system of FIG. 12 configured in an intermediate shift mode of operation, according to an exemplary embodiment.

As shown in FIG. 26, the transmission 304 is selectively reconfigured into an intermediate shift mode of operation that facilitates transitioning the transmission 304 (i.e., shifting, changing modes, etc.) between the mid range mode of operation and the high range mode of operation. According to the embodiment shown in FIG. 26, the PTO clutch 440, the power split coupled clutch 430, and the output brake 470 are engaged when the transmission 304 is selectively reconfigured into the intermediate shift mode of operation. According to an exemplary embodiment, the intermediate shift mode provides a smooth and robust shifting strategy that functions reliably even in a wide variety of operating conditions, when using various types of oil for the components of the transmission 304, and when experiencing valve nonlinearities that may be present in one or more valves of the transmission 304. The intermediate shift mode may provide a zero inertia shift through and across two or more overlapping ranges (e.g., the mid range and the high range, etc.). According to the exemplary embodiment shown in FIGS. 15-17, the intermediate shift mode eliminates the need to simultaneously disengage the output brake 470 and engage the PTO clutch 440 to shift from the mid range mode to the high range mode, or vice versa. The intermediate shift mode reduces jerking sensations associated with simultaneously disengaging the output brake 470 and engaging the PTO clutch 440 to shift from the mid range to high range, providing a smoother ride.

During operation, the intermediate shift mode may be used to shift from the mid range mode to the high range mode or from the high range mode to the mid range mode. In one embodiment, the transmission 304 is configured in the mid range mode of operation with the power split coupled clutch 430 and the output brake 470 engaged and configured in the high range mode of operation with the power split coupled clutch 430 and the PTO clutch 440 engaged. The transmission 304 may be selectively reconfigured into the intermediate shift mode in response to the difference between a rotational speed of the second electromagnetic device 308 and a rotational speed of the connecting shaft 336 falling below or equaling a threshold level (e.g., approximately zero, five revolutions per minute, fifty revolutions per minute, etc.). The transmission 304 may enter the intermediate shift mode when the rotational speed of the second electromagnetic device 308 substantially corresponds with (e.g., matches, is substantially equal to, etc.) the rotational speed of the connecting shaft 336. In one embodiment, the transmission 304 enters the intermediate shift mode when the rotational speeds of the second electromagnetic device 308 and the connecting shaft 336 are between 1,600 and 1,800 revolutions per minute (RPM). By way of example, the transmission 304 may enter the intermediate shift mode when the rotational speeds of the second electromagnetic device 308 and the connecting shaft 336 are about 1,600 RPM. One or more sensors may be positioned to monitor the rotational speed of at least one of the connecting shaft 336, a portion of the second electromagnetic device 308, or still another component. A controller (e.g., the controller 910, etc.) may reconfigure the transmission 304 into the intermediate shift mode in response to sensing signals provided by the one or more sensors.

Shifting into the intermediate shift mode occurs when there is limited (if any) relative movement between clutch disks of the PTO clutch 440. The transmission 304 may be reconfigured into the intermediate shift mode without compromising performance of the concrete mixer truck 10 (e.g., since torque is not removed from the output shaft 332, etc.). The intermediate shift mode reduces (e.g., minimizes, etc.) heat generation and clutch wear during shifts by limiting the relative movement between clutch disks of the PTO clutch 440 upon engagement. The intermediate shift mode may thereby increase clutch life.

In operation, the concrete mixer truck 10 may be accelerating in the mid range mode. In one embodiment, the second electromagnetic device 308 provides an output torque in the mid range mode of operation and its speed thereby increases with the speed of the concrete mixer truck 10. As the speed of the second electromagnetic device 308 continues to increase with the speed of the concrete mixer truck 10, the second electromagnetic device 308 may begin to operate at a rotational speed similar to that of the connecting shaft 336. The controller 910 may engage the PTO clutch 440 to selectively reconfigure the transmission 304 into the intermediate shift mode from the mid range mode. The concrete mixer truck 10 may alternatively be decelerating in the high range mode. In one embodiment, the first electromagnetic device 306 operates as a motor in the high range mode of operation with its speed related to that of the connecting shaft 336 and/or the speed of the concrete mixer truck 10. The speed of the concrete mixer truck 10 and/or the speed of the first electromagnetic device 306 may decrease to a speed designated for the mid range mode. The controller 910 may be configured to utilize the speed of the output shaft 332 provided by the speed sensor 912 to determine the speed of the concrete mixer truck 10. The controller 910 may engage the output brake 470 to selectively reconfigure the transmission 304 into the intermediate shift mode from the high range mode.

As shown in FIGS. 15-17, the power split coupled clutch 430 is engaged (i.e., is not disengaged, is not open, transfers torque, etc.) in each of the mid range mode, the intermediate shift mode, and the high range mode. The transmission 304 having the power split coupled clutch 430 engaged in each of these modes facilitates the continuous transfer of power from the first electromagnetic device 306 and the second electromagnetic device 308 to the output shaft 332 during the shift from the mid range mode to the high range mode. According to an exemplary embodiment, the first electromagnetic device 306 and the second electromagnetic device 308 are also coupled to the output shaft 332 through the power split coupled clutch 430 at a fixed ratio during the intermediate shift mode. Maintaining a power path to the output shaft 332 during the shift reduces (e.g., eliminates, etc.) jerking associated with shifting traditional transmission systems. In the intermediate shift mode, an acceleration of the first electromagnetic device 306 and the second electromagnetic device 308 causes an acceleration of the concrete mixer truck 10, and a deceleration of the first electromagnetic device 306 and the second electromagnetic device 308 causes a deceleration of the concrete mixer truck 10.

The transmission 304 may be configured in the intermediate shift mode for an extended period of time and/or while the while the concrete mixer truck 10 traverses an extended distance. The controller 910 may selectively reconfigure the transmission 304 out of the intermediate shift mode (e.g., into the mid range mode of operation, into the high range mode of operation, etc.) automatically in response to at least one of an elapsed shift time (e.g., a time that has elapsed while in the intermediate shift mode, etc.), a traveled shift distance (e.g., a distance the concrete mixer truck 10 has traveled while in the intermediate shift mode as determined using the speed sensor 912, etc.), a change in speed of the connecting shaft 336, the speed of the concrete mixer truck 10 (e.g., as determined using the speed sensor 912, etc.) exceeding or falling below a threshold speed of the concrete mixer truck 10, and a request, among other conditions.

In one embodiment, the controller 910 transitions the transmission 304 out of the intermediate shift mode in response to an indication that the shift has satisfied at least one of a time-based and a distance-based condition. By way of one example, the controller 910 may transition the transmission 304 out of the intermediate shift mode in response to an indication that the transmission 304 has been in the intermediate shift mode for longer than a predetermined period of time. By way of another example, the controller 910 may transition the transmission 304 out of the intermediate shift mode in response to an indication that the concrete mixer truck 10 has traversed more than a threshold distance (e.g., as determined using the speed sensor 912).

In another embodiment, the controller 910 transitions the transmission 304 out of the intermediate shift mode in response to a change in speed of the connecting shaft 336. The controller 910 may selectively reconfigure the transmission 304 into the high range mode from the intermediate shift mode (e.g., by disengaging the output brake 470, etc.) in response to an increase in speed of the connecting shaft 336 (e.g., in response to the speed of the connecting shaft 336 exceeding a threshold speed, etc.). By way of example, the speed of the connecting shaft 336 may increase based on a command (e.g., provided by an operator using an accelerator pedal or another input device, provided by a controller as part of an autonomous operation of the concrete mixer truck 10, etc.) that prompts the speed of the connecting shaft 336 to increase. The controller 910 may selectively reconfigure the transmission 304 into the mid range mode from the intermediate shift mode (e.g., by disengaging the PTO clutch 440, etc.) in response to a decrease in speed of the connecting shaft 336 (e.g., in response to the speed of the connecting shaft 336 falling below a threshold speed, etc.). By way of example, the speed of the connecting shaft 336 may decrease based on a command (e.g., provided by an operator using a brake pedal or another input device, provided by an operator releasing an accelerator pedal or another input device, provided by a controller as part of an autonomous operation of the concrete mixer truck 10, etc.) that prompts the speed of the connecting shaft 336 to decrease.

In still another embodiment, the controller 910 transitions the transmission 304 out of the intermediate shift mode in response to a request. By way of example, the request may come from an operator (e.g., provided by way of a user interface, etc.) and indicate the operator's command to enter either the mid range mode of operation or the high range mode of operation. The request may also be provided by a controller as part of an autonomous operation of the concrete mixer truck 10. Such requests may be provided in order to reenter a mode of operation whereby the concrete mixer truck 10 operates more efficiently. Such requests may prompt the transmission 304 to complete the shift from the mid range mode of operation to the high range mode of operation, complete the shift from the high range mode of operation to the mid range mode of operation, toggle back into the mid range mode of operation from the intermediate shift mode, and/or toggle back into the high range mode of operation from the intermediate shift mode.

In some embodiments, the transmission 304 is selectively reconfigured into the intermediate shift mode from one of the mid range mode and the high range mode, and then is selectively reconfigured back into the previous mode (e.g., mid range mode to intermediate shift mode to mid range mode, etc.). By way of example, the transmission 304 may be reconfigured into the intermediate shift mode from the mid range mode in response to the second electromagnetic device 308 and the connecting shaft 336 having a speed differential below a threshold level. An operator may keep the connecting shaft 336 operating at substantially the same speed for a period of time, driving the output shaft 332 with the first electromagnetic device 306 and/or the second electromagnetic device 308, and then release the accelerator pedal whereby the transmission 304 may be returned to the mid range mode.

Figure 27:
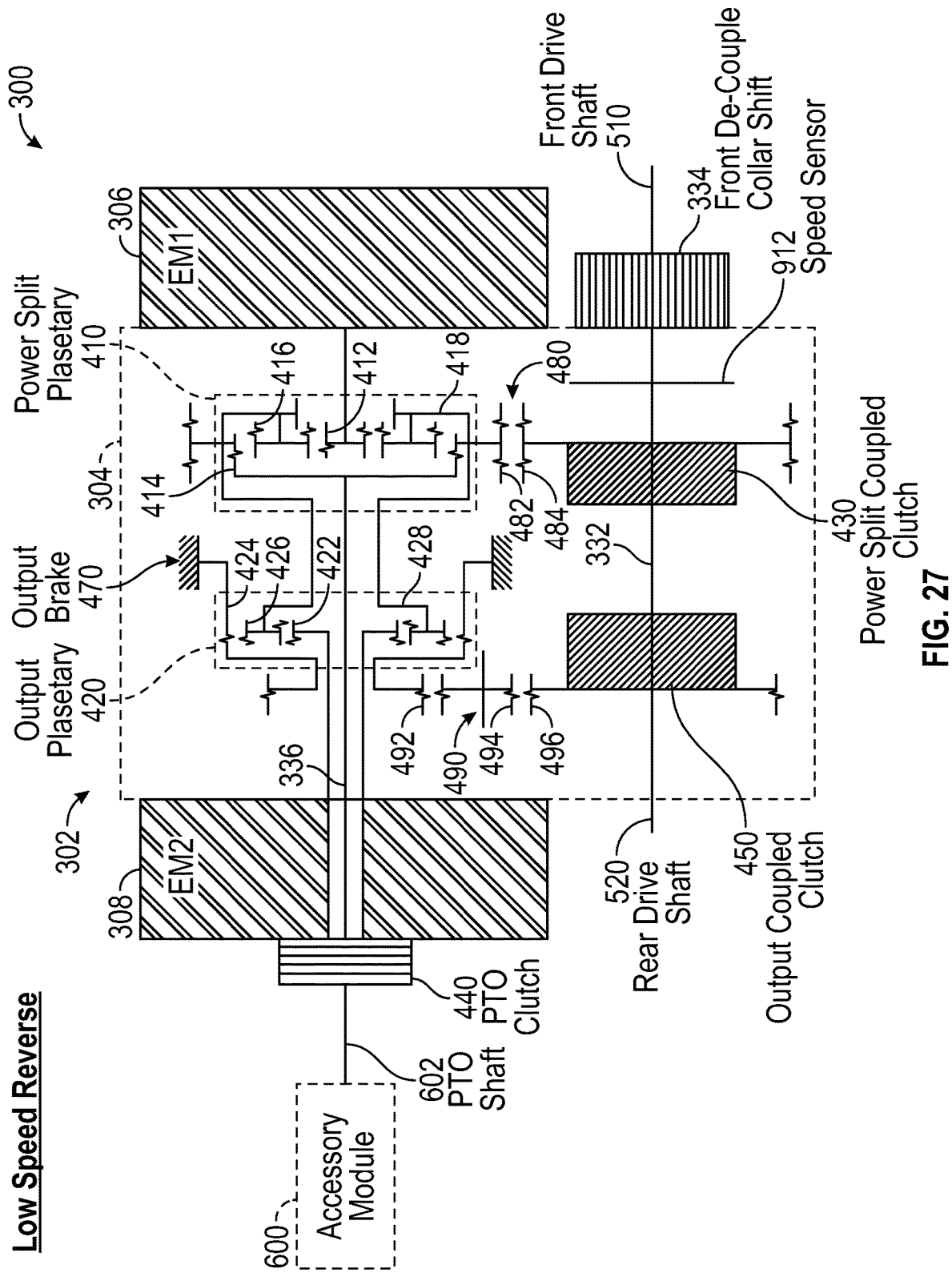
FIG. 27 is a detailed schematic view of the drive system of FIG. 12 configured in a low speed reverse mode of operation, according to an exemplary embodiment.

As shown in FIG. 27, the transmission 304 is selectively reconfigured into a low speed reverse mode of operation. In one embodiment, the second electromagnetic device 308 uses the electrical energy from the battery module 800 and provides a rotational mechanical energy input to the transmission 304 to drive at least one of the front axle assembly 500 and the rear axle assemblies 502 in a reverse direction (e.g., backwards, etc.) in the low speed reverse mode. The rotational mechanical energy input from the second electromagnetic device 308 may additionally drive the PTO shaft 602. In another embodiment, the first electromagnetic device 306 uses the electrical energy from the battery module 800 and provides a rotational mechanical energy input to the transmission 304 to drive at least one of the wheel and tire assemblies 508 and the wheel and tire assemblies 508 in a reverse direction and/or to drive the PTO shaft 602 in the low speed reverse mode. In another embodiment, both the first electromagnetic device 306 and the second electromagnetic device 308 provide a rotational mechanical energy input to the transmission 304 in the low speed reverse mode. In still another alternative embodiment, one or both of the first electromagnetic device 306 and the second electromagnetic device 308 operate as a generator in the low speed reverse mode.

As shown in FIG. 27 and Table 1, the power split coupled clutch 430 and the output coupled clutch 450 are engaged when the transmission 304 is configured in the low speed reverse mode. As shown in FIG. 27, the low speed reverse mode is substantially similar to the low range mode of FIG. 23 in that the power split coupled clutch 430 and the output coupled clutch 450 couple both the gear set 480 and the gear set 490 to the output shaft 332. In the low speed reverse mode, the first electromagnetic device 306 and/or the second electromagnetic device 308 may provide a rotational mechanical energy input to the transmission 304 in an opposite direction as compared to the low range mode of FIG. 23.

Figure 28:
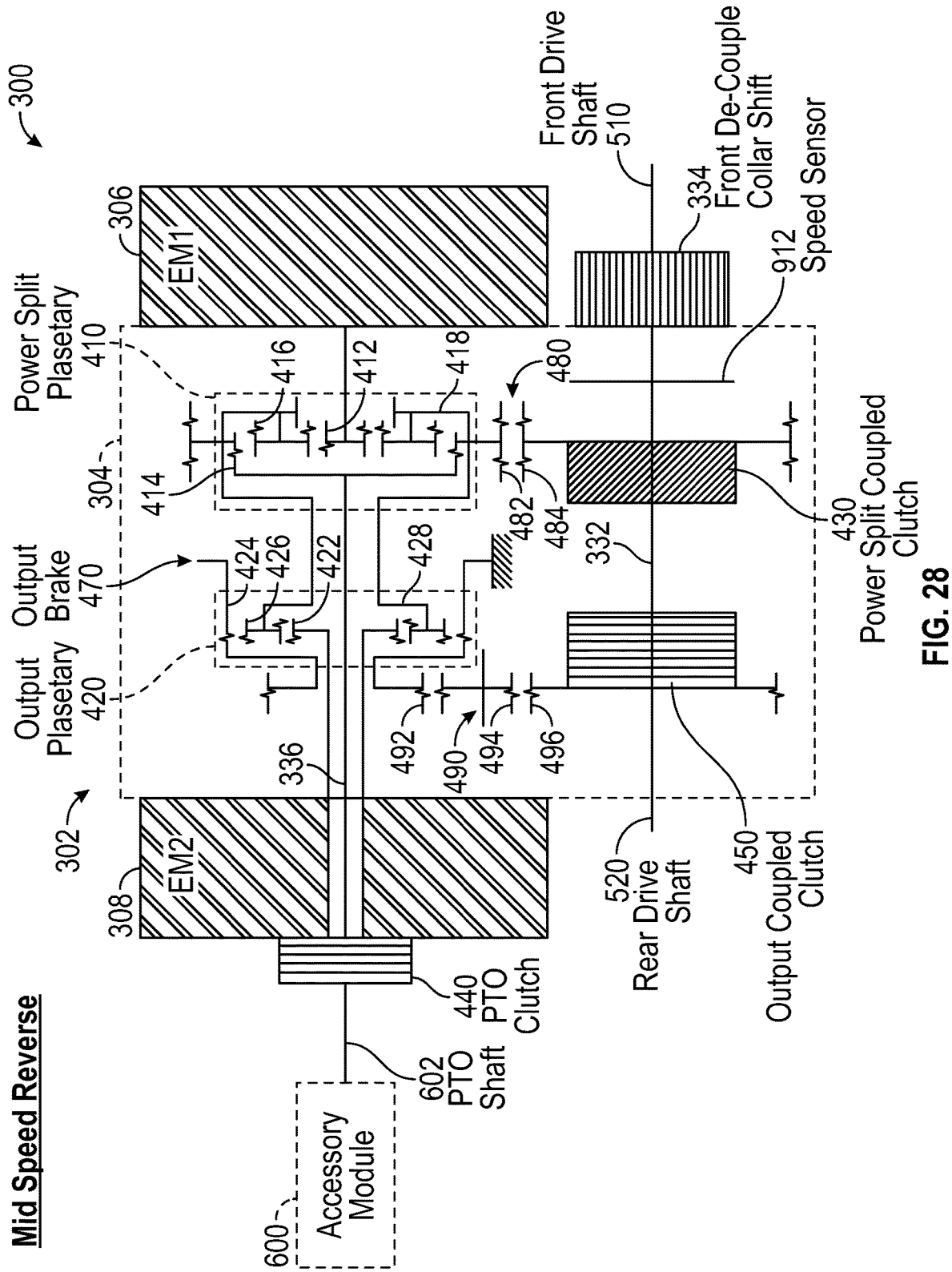
FIG. 28 is a detailed schematic view of the drive system of FIG. 12 configured in a mid speed reverse mode of operation, according to an exemplary embodiment.

As shown in FIG. 28, the transmission 304 is selectively reconfigured into a mid speed reverse mode of operation such that the transmission 304 allows for a moderate reverse output speed operation. In one embodiment, the second electromagnetic device 308 uses the electrical energy from the battery module 800 and provides a rotational mechanical energy input to the transmission 304 to drive at least one of the front axle assembly 500 and the rear axle assemblies 502 in a reverse direction in the mid speed reverse mode. The rotational mechanical energy input from the second electromagnetic device 308 may additionally drive the PTO shaft 602. In another embodiment, the first electromagnetic device 306 uses the electrical energy from the battery module 800 and provides a rotational mechanical energy input to the transmission 304 to drive at least one of the wheel and tire assemblies 508 and the wheel and tire assemblies 508 in a reverse direction and/or to drive the PTO shaft 602 in the mid speed reverse mode. In another embodiment, both the first electromagnetic device 306 and the second electromagnetic device 308 provide a rotational mechanical energy input to the transmission 304 in the mid speed reverse mode. In still another alternative embodiment, one or both of the first electromagnetic device 306 and the second electromagnetic device 308 operate as a generator in the mid speed reverse mode.

As shown in FIG. 28 and Table 1, the power split coupled clutch 430 and the output brake 470 are engaged when the transmission 304 is configured in the mid speed reverse mode. As shown in FIG. 28, the mid speed reverse mode is substantially similar to the mid range mode of FIG. 24 in that the output brake 470 inhibits the rotation of the gear set 490 (e.g., the gear 492, the gear 494, the gear 496, etc.) and rotationally fixes the ring gear 424. In the mid speed reverse mode, the first electromagnetic device 306 and/or the second electromagnetic device 308 may provide a rotational mechanical energy input to the transmission 304 in an opposite direction as compared to the mid range mode of FIG. 24.

Battery Module

In some embodiments, the battery module 800 provides all of the energy used to power the concrete mixer truck 10 in at least one mode of operation. In some such embodiments, the battery module 800 provides all of the energy used to power the concrete mixer truck 10 in all modes of operation, except when the battery module 800 is being charged by an outside power source (e.g., mains power from the power grid, etc.). As described above, such a concrete mixer truck 10 may be a pure electric vehicle. In other such embodiments, an onboard engine (e.g., an internal combustion engine) provides some or all of the energy used to power the concrete mixer truck 10 in some modes of operation. Such a concrete mixer truck 10 may be a hybrid vehicle.

In modes of operation where the battery module 800 provides all of the energy used to power the concrete mixer truck 10, the battery module 800 provides electrical energy to drive the first electromagnetic device 306 and/or the second electromagnetic device 308. As described in detail above, the first electromagnetic device 306 and/or the second electromagnetic device 308 may use the electrical energy to provide rotational mechanical energy to the transmission 304. The transmission 304, the front drive shaft 510, the rear drive shaft 520, and the rear drive shaft 524 transfer a first portion of the rotational mechanical energy to the front axle assembly 500 and the rear axle assemblies 502, which propel the concrete mixer truck 10. The transmission 304 and the PTO shaft 602 transfer a second portion of the rotational mechanical energy to the accessory module 600. The accessory module 600 consumes the second portion of the rotational mechanical energy and provides flows of pressurized working fluid (e.g., pressurized hydraulic fluid and compressed gas) and/or electrical energy. The flows of pressurized hydraulic fluid drive the drum drive motor 252, the hopper actuator 260, the chute height actuator 280, the chute rotation actuator 282, and the chute folding actuators 284. Flows of compressed air drive the airbags 530 and the brakes 532. A flow of compressed refrigerant drives a climate control system. The electrical energy from the accessory module 600 charges the battery 642 and powers various systems of the concrete mixer truck 10.

In some embodiments, one or more of the drum drive motor 252, the hopper actuator 260, the chute height actuator 280, the chute rotation actuator 282, and the chute folding actuators 284 are electrically driven (i.e., powered using electrical energy) rather than hydraulically driven (i.e., powered using pressurized hydraulic fluid). By way of example, one of the actuators may be replaced with an electric motor or an electric motor coupled to a device that converts rotational movement into linear movement, such as a lead screw. Such electrically driven actuators may be powered using electrical energy from the battery module 800 or electrical energy from the alternator 640 and/or battery 642. In some embodiments, the drum drive pump 620 and/or the accessory pump 622 may be omitted. In one embodiment, the drum drive motor 252, the hopper actuator 260, the chute height actuator 280, the chute rotation actuator 282, and the chute folding actuators 284 are all electrically driven. In such an embodiment, both the drum drive pump 620 and the accessory pump 622 may be omitted.

In some embodiments, one or more of the airbags 530 and the brakes 532 are electrically driven (i.e., powered using electrical energy) rather than pneumatically driven (i.e., powered using compressed gas). By way of example, the airbags 530 may be replaced with an electric motor or an electric motor coupled to a device that converts rotational movement into linear movement, such as a lead screw. Such electrically driven actuators may be powered using electrical energy from the battery module 800 or electrical energy from the alternator 640 and/or battery 642. In some embodiments, the drivetrain compressor 630 may be omitted.

In other embodiments, one or more components of the accessory module 600 (e.g., the drum drive pump 620, the accessory pump 622, the drivetrain compressor 630, the air conditioning compressor 632, the alternator 640) are decoupled from the PTO shaft 602 and driven by an electric motor. Such an electric motor may be driven by electrical energy from the battery module 800 or by electrical energy from the alternator 640.

Frame

Figure 29:
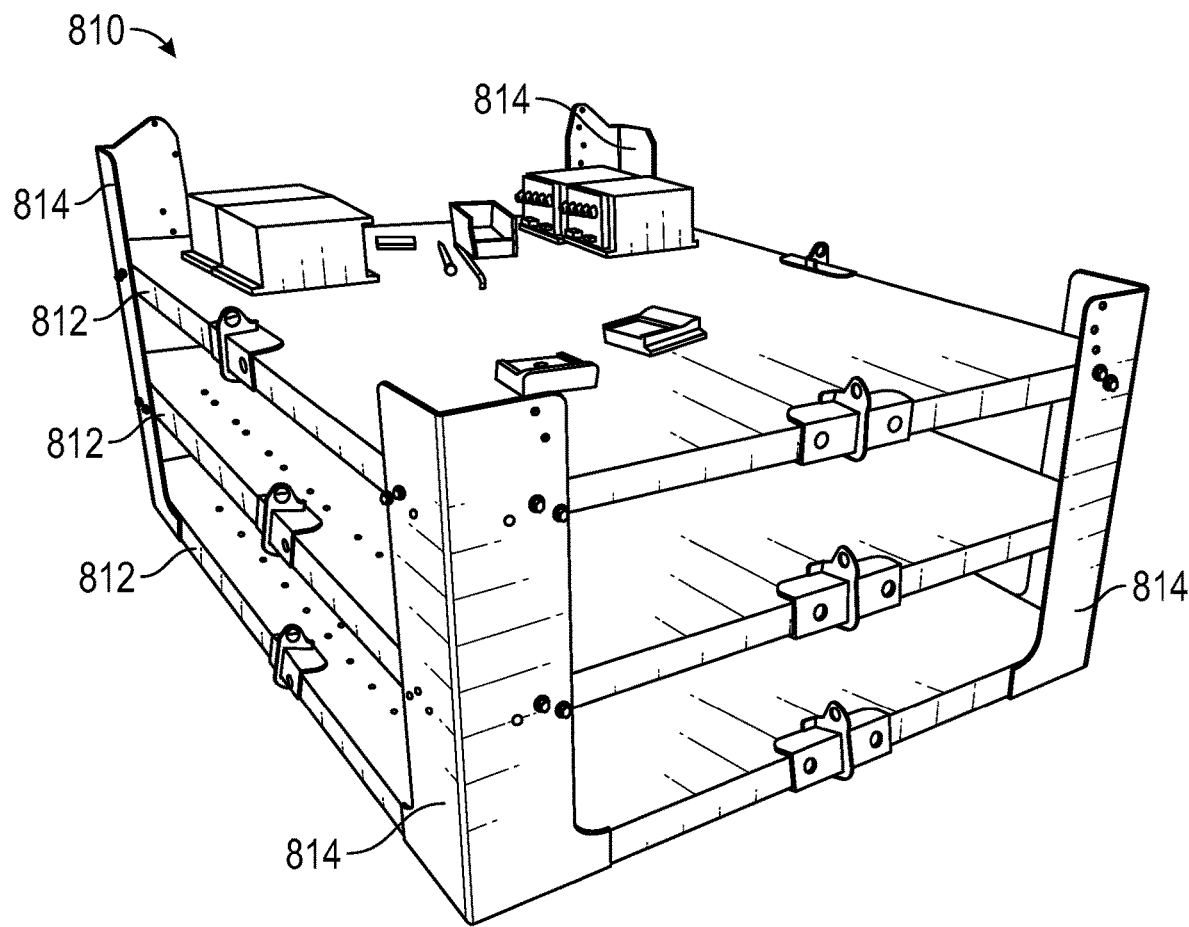
FIGS. 29, 30A, and 30B are perspective views of a frame of a battery module of the concrete mixer truck of FIG. 1, according to an exemplary embodiment.
Figure 30A:
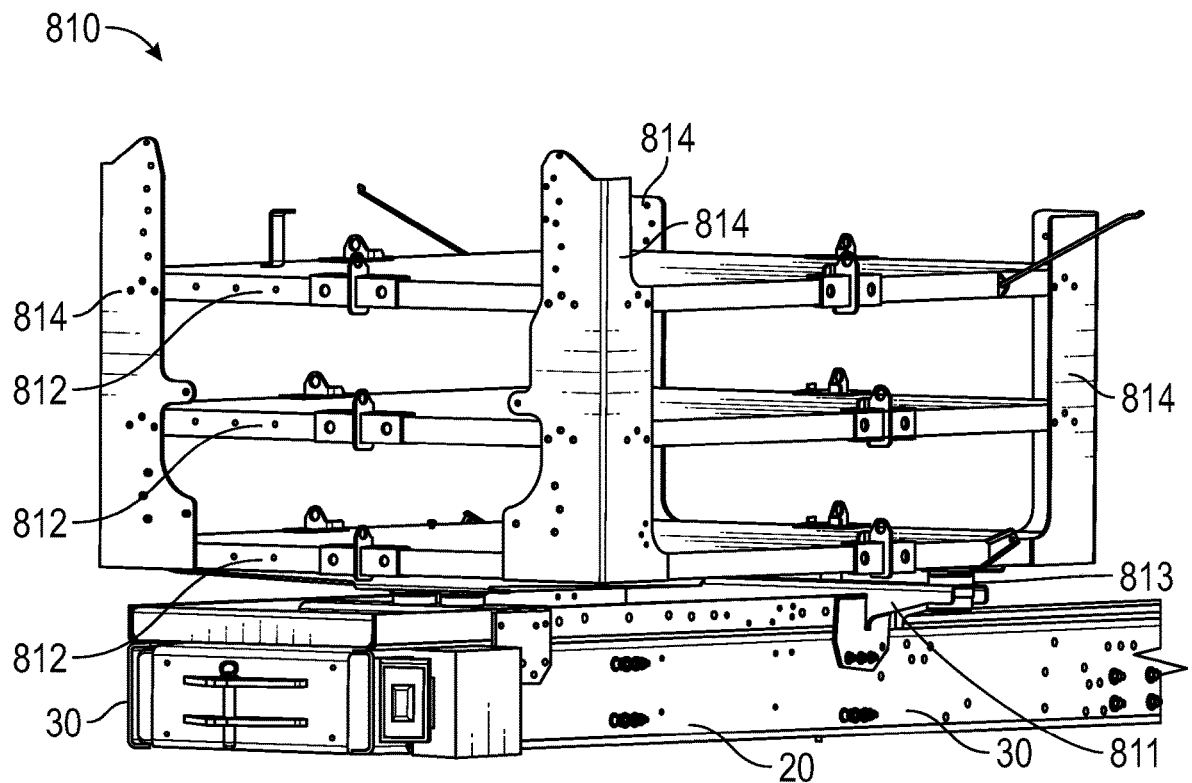
Figure 30B:
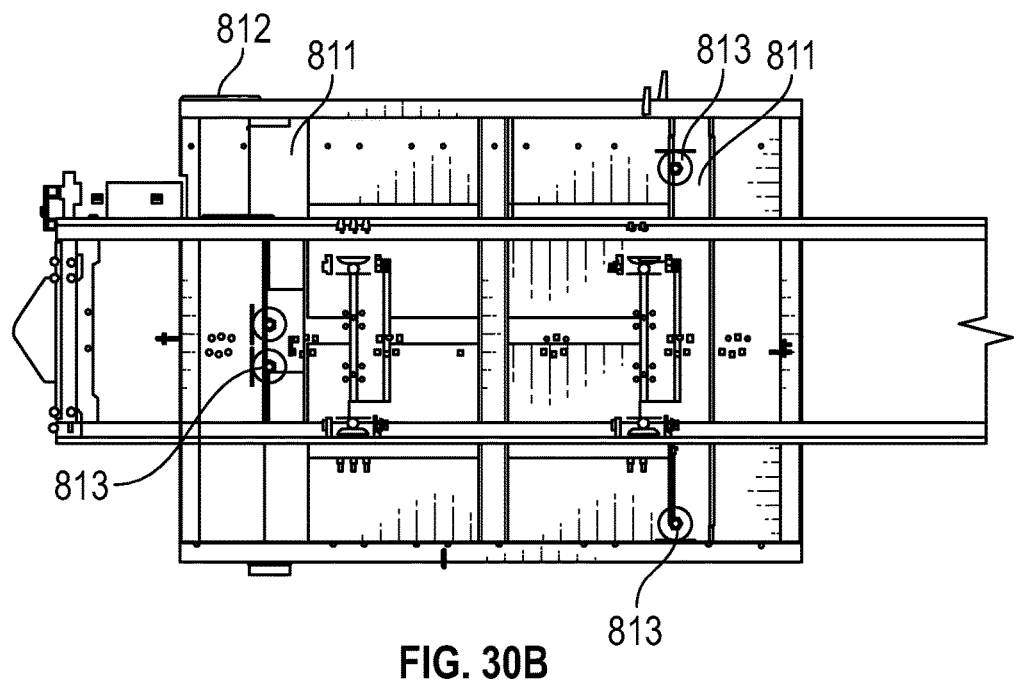

Referring to FIGS. 29, 30A, and 30B, the battery module 800 includes a frame, shown as battery module frame 810. The battery module frame 810 is coupled to the chassis 20 near the rear end 24. The battery module frame 810 is configured to releasably support any number of different types of primary power sources. The battery module frame 810 includes three panels or platforms, shown as base portions 812. The base portions 812 are each vertically offset from one another to provide spaces to place components. The base portions 812 are each coupled to a series of structural members or supports, shown as vertical supports 814. The vertical supports 814 are positioned at the corners of the base portions 812 and couple the base portions 812 to one another. As shown in FIG. 1, the battery module frame 810 is covered by a shroud or housing, shown as battery module cover 816. In some embodiments, battery module cover 816 may be removable.

As noted above, the battery module frame 810 is positioned rearward relative to the rear axle assembly 502, such that the weight of the battery module frame 810 and battery module 800 supported thereon offsets the weights of the cab 100, the drive system 300 (described in more detail above), and the mixing drum 202 which are each positioned forward of the rear axle assembly 502. Specifically, as illustrated in FIG. 1, in some embodiments, the center of gravity of the cab 100 (offset a distance $D_3$ rearward from a center of the front axle assembly 500), the drive system 300 (offset a distance $D_5$ rearward from a center of the front axle assembly 500), and the mixing drum 202 (offset a distance $D_6$ rearward from a center of the front axle assembly 500) are each positioned forward of a point $P_{RT}$ centered between the rear axle assembly 502, and the center of gravity of the battery module frame 810 and attached battery module 800 (offset a distance $D_{12}$ rearward from a center of the front axle assembly 500) is positioned rearward of the point $P_{RT}$. Accordingly, the moments of the weights of the cab 100, the drive system 300, and the mixing drum 202 about the point $P_{RT}$ oppose the moments of the weight of the battery module frame 810 and attached battery module 800 about the point $P_{RT}$. This ensures that the weight of the concrete mixer truck 10 and its payload is substantially evenly distributed between the front axle assembly 500 and rear axle assembly 502. This also ensures that the front axle assembly 500 is not lifted away from the ground due to the moment effect of the weight of the battery module frame 810 and attached battery module 800 about the point $P_{RT}$, which may otherwise make the concrete mixer truck 10 more difficult to steer.

Mounting Structure

Illustrated in FIGS. 30A and 30B is one exemplary embodiment of a battery module frame 810 that may be used to support one or more battery assemblies 820 of the battery module 800. As shown in FIG. 30A, in some embodiments the battery module frame 810 includes support members 811 to which the base portion 812 is releasably secured, as briefly described above. In this manner, battery module frame 810 may be releasably secured to the chassis 20 via the support members 811. The support members 811 may be attached permanently (e.g. via welding) or non-permanently (via any number of known attachment arrangements) to the chassis 20. Provided along the base portion 812 and support members 811 are any number of, and combination of, various engagement structures 813 that are configured to releasably secure the base portion 812 and the support members 811 to one another.

In embodiments in which a first battery module 800 or other primary power source (e.g., an internal combustion engine) is to be replaced with a second, different type of primary power source or battery module 800, the support members 811 may be modified to conform to the shape and structure of the battery module 800 or primary power source to ensure a secure connection of the second battery module 800 to the concrete mixer truck 10. Alternatively, in some embodiments, the support members 811 may be entirely replaced with second, new support members 811, configured to securely support the second battery module 800 or the primary power source may instead be provided with the battery module 800 or primary power source. In some such embodiments, the second, new support members 811 may include the same type, spacing and configuration (and optionally the same number) of engagement structures 813 as were provided on the first support members 811, such that the new support members 811 and base portion 812 may be securely connected to one another using substantially the same engagement structures 813.

In other embodiments, the battery module frame 810 may be defined by any number of other, different arrangements that are configured to releasably secure the battery module 800 to the chassis 20 and which allow for easy and quick removal of the battery module 800 from the concrete mixer truck 10. For example, according to some embodiments, the battery module frame 810 may comprise only the base portion 812 securely attached to the chassis 20, with the battery module 800 being configured to be directly and releasably be coupled to the base portion 812 of the battery module frame 810. In yet other embodiments, the battery module frame 810 may be configured to be releasably secured directly to the chassis 20 of the concrete mixer truck 10 via engagement structures 813.

Figure 31A:
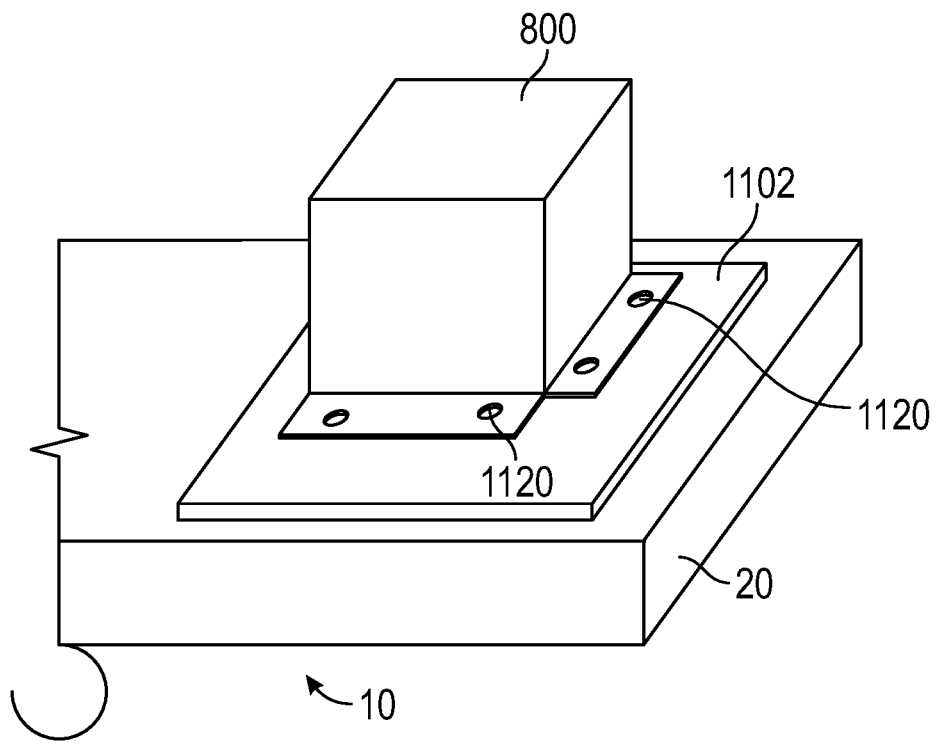
FIGS. 31A and 31B are views of a mounting assembly for the battery module, according to an exemplary embodiment.
Figure 31B:
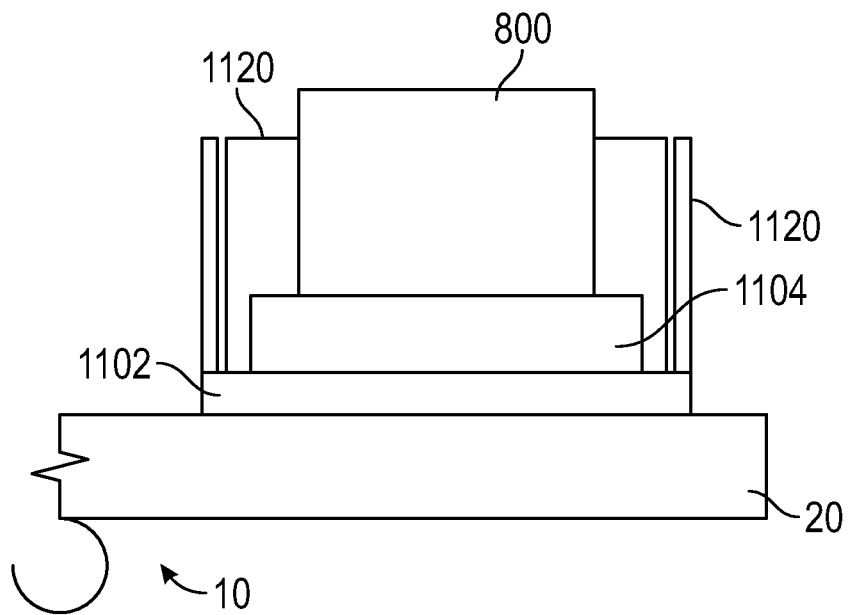

Referring now to FIG. 31A, an alternate embodiment is shown, in which the battery module 800 is supported by a mounting plate 1102 rather than by support members 811. In some embodiments, another type of primary power source, such as an internal combustion engine, may be supported by the mounting plate 1102. Alternatively, as illustrated in FIG. 31B, according to other embodiments, the battery module frame 810 may additionally include a second support plate 1104 releasably attached to the mounting plate 1102 or the support members 811, with the battery module 800 being releasably, or alternatively irremovably, attached to the support plate 1104 or the support members 811. Similar, in some embodiments, another type of primary power source, such as an internal combustion engine, may be releasably, or alternatively irremovably, attached to the support plate 1104 or the support members 811.

In some embodiments, one or more attachment structures 1120 are configured to securely, but releasably engage the battery module 800 and/or one or more of the mounting elements defining the battery module frame 810 relative to the concrete mixer truck 10. In some such embodiments, the attachment structures 1120 may be functionally similar to or the same as engagement structure 813. As will be understood, any number of, or combination of attachment structures 1120 may be used to secure the battery module 800 relative to the concrete mixer truck 10 until it is desired to remove the battery module 800 from the concrete mixer truck 10. For example, as shown in FIG. 31A, in some embodiments, the attachment structure may include one or more fastening assemblies. In such embodiments, the fastening assemblies may comprise any number of, or combination of, fastening elements formed along or defined by a first mounting element defining the battery module frame 810 (e.g. along the mounting structure) that are configured to engage with corresponding fastening structures that are provided as discrete elements (e.g. bolts, etc.) and/or are formed along or defined by another element of the mounting assembly (e.g. the support plate 1104).

Referring to FIGS. 31B, according to other embodiments, the battery module frame 810 may be defined by a post, door, or other retaining structure that is configured to act as barrier that blocks movement of the battery module 800. In such embodiments, the battery module frame 810 is configured to be detached, slid, pivoted, or otherwise moved relative to at least one mounting element defining the battery module frame 810, to allow the battery module 800 to be removed from the concrete mixer truck 10. For example, as shown in FIG. 1, in some such embodiments, the attachment structure may include an optionally provided battery module cover 816 configured to secure the battery module 800 to the concrete mixer truck 10 when the cover is attached to the chassis (or other portion of the concrete mixer truck 10), with the removal of the battery module cover 816 being configured to allow the battery module 800 to be removed from the concrete mixer truck 10.

In some embodiments, the attachment structures 1120 are only intended and configured to releasably secure the battery module 800 to the concrete mixer truck 10. However, as will be described in more detail below, according to other embodiments, in addition to securing the battery module 800 to the concrete mixer truck 10 during use of the concrete mixer truck 10, the attachment structures 1120 may additionally be configured to define a component of, or otherwise be usable with, the removal assembly 1200 to remove the battery module 800 from the concrete mixer truck 10.

Removal Assembly

Although the various embodiments of removal assemblies 1200 described herein may refer to a particular mounting assembly arrangement via which the battery module 800 is attached to the concrete mixer truck (e.g. via a support plate 1104 releasably attached to a battery module frame 810; via a direct and releasable attachment to the battery module frame 810; etc.), it is to be understood that in other embodiments, any of the removal assemblies 1200 described herein may be modified so as to remove a battery module 800 secured to the concrete mixer truck 10 via any other battery module frame 810 arrangement. Additionally, although the various embodiments of removal assemblies 1200 described herein may refer to the removal assembly 1200 being configured to engage one or more specific mounting elements (e.g. the support plate 1104, the battery module frame 810, etc.) and/or the battery module 800 during removal, it is to be understood that in other embodiments (such as, e.g., when a different battery module frame 810 arrangement is used to secure the battery module 800 to the concrete mixer truck 10), any of the removal assemblies 1200 described herein may be modified such that the removal assembly 1200 engages any other combination of one or more mounting elements and/or the battery module 800 during the removal of the battery module 800 form the concrete mixer truck 10.

The removal assembly 1200 is configured to facilitate removal of the battery module 800 from the concrete mixer truck 10. As will be described in more detail below, the removal assembly 1200 may be defined by a variety of removal elements configured to interact with one another to remove the battery module 800 from the concrete mixer truck 10, and, in some embodiments, to transfer the battery module 800 to a charging location. According to various embodiments, the removal assembly 1200 may additionally be configured to attach the battery module 800 to the concrete mixer truck 10. It will be appreciated that, while the removal assembly 1200 is described herein for removing or attaching the battery module 800 to the concrete mixer truck 10, the removal assembly 1200 may also be configured to remove and/or attach a different primary power source (e.g., an internal combustion engine) from the concrete mixer truck 10. In this manner, the removal assembly 1200 may facility the retrofitting of the battery module 800 to the concrete mixer truck 10.

In some embodiments, the removal assembly 1200 may be entirely defined by removal elements supported by the concrete mixer truck 10. In other embodiments, the removal assembly 1200 may additionally include one or more externally provided removal elements. In some such embodiments, the externally provided removal elements may be defined by existing devices and/or structures that are incorporated into, or utilized with, the removal assembly 1200. In other embodiments, the externally provided removal elements may be defined by devices and/or structures that have been specifically made or adapted to be used in the removal assembly 1200.

According to various embodiments, the removal assembly 1200 may be configured to remove the battery module from the concrete mixer truck at a location that generally corresponds to the charging location. In some such embodiments, once the removal assembly 1200 has removed the battery module 800 from the concrete mixer truck 10, the battery module 800 may remain attached to or otherwise supported by a portion of the removal assembly 1200, such that the removal assembly 1200 also defines a charging station. For example, according to some embodiments, the removal assembly 1200 may include a support structure having a support surface that is configured to engage the removed battery module 800. In other embodiments, once the battery module 800 has been removed, the removal assembly 1200 may be configured to set the battery module 800 onto any number of existing, non-specific support surfaces (e.g., a floor surrounding the removal assembly 1200, a loading dock surface, etc.) that extend adjacent the location of the removal assembly 1200.

Figure 32A:
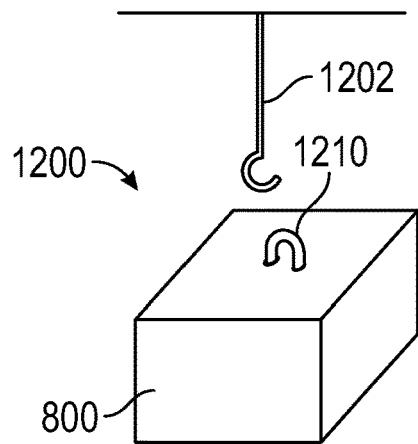
FIGS. 32A-40 illustrate removal assemblies for the battery module, according to various exemplary embodiments.
Figure 32B:
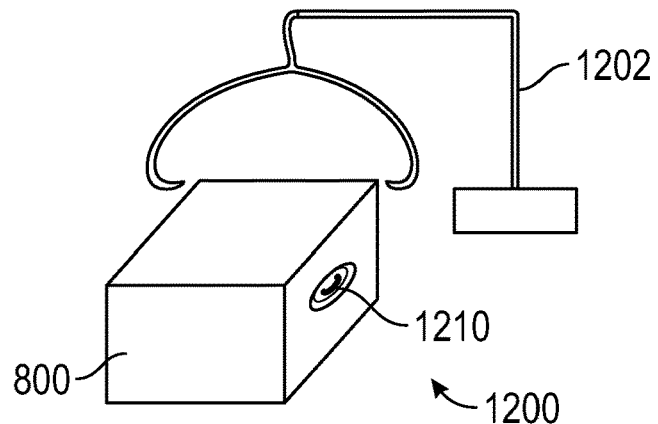
Figure 32C:
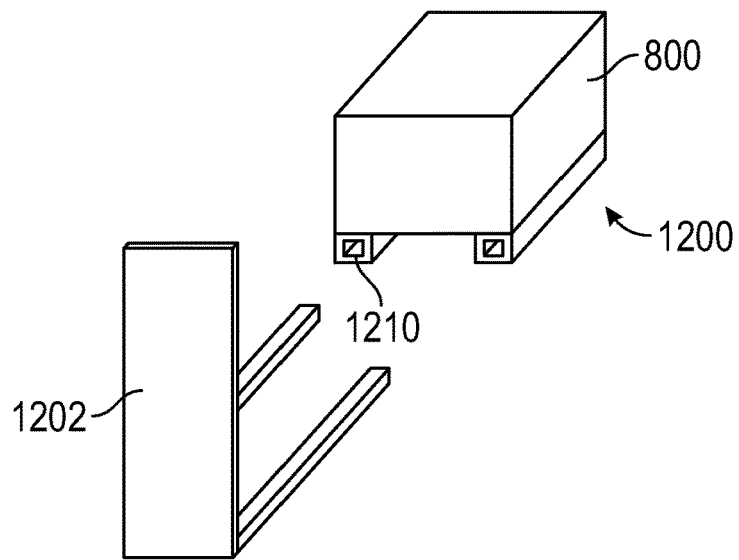

Referring to FIGS. 32A-32C, exemplary embodiments of removal assembly 1200 comprising one or more externally provided removal elements are illustrated. As shown in FIGS. 32A-32C, according to some such embodiments, the externally provided removal elements may be defined by any number of various external lift devices 1202, such as, e.g., a fork, hoist, crane, jack, boom, etc. In such embodiments, these lift devices 1202 are configured to engage one or more engagement elements 1210 provided along the battery module 800 to lift the battery module 800 off of the concrete mixer truck 10. The engagement elements 1210 may be defined by any number of, and combination of, different configurations. Non-limiting examples of such engagement element 1210 configurations are representatively illustrated in FIGS. 32A-32C, and may include, e.g., handles (such as, e.g., shown in FIG. 32A); recesses (such as, e.g. shown in FIG. 32B); channels (such as, e.g., shown in FIG. 32C), etc. Upon removal of the battery module 800 from the concrete mixer truck 10, the externally provided lift device 1202 may additionally be configured to transfer the battery module 800 to a charging location, either directly by the lift device 1202 itself, or via one or more transport devices to which the battery module 800 is transferred by the lift device 1202.

According to other embodiments, instead of relying on the availability and/or accessibility of an externally provided lift device 1202, the removal assembly 1200 may instead include one or more lift devices 1202 provided as a part of the concrete mixer truck 10. The lift device 1202 may be defined by any number of powered and/or manually operated devices, such as, e.g. a jack lift, a lift cylinder, etc. In some embodiments, the lift device 1202 may be releasably attached to the battery module 800, with the lift device 1202 being disengaged from the battery module 800 prior to the concrete mixer truck 10 being driven away from the removed battery module 800. In other embodiments, the lift device 1202 may instead be fixedly attached to the battery module 800 and releasably attached to the concrete mixer truck 10, with the lift device 1202 remaining with the removed battery module 800 after the concrete mixer truck 10 is driven away.

Figure 33A:
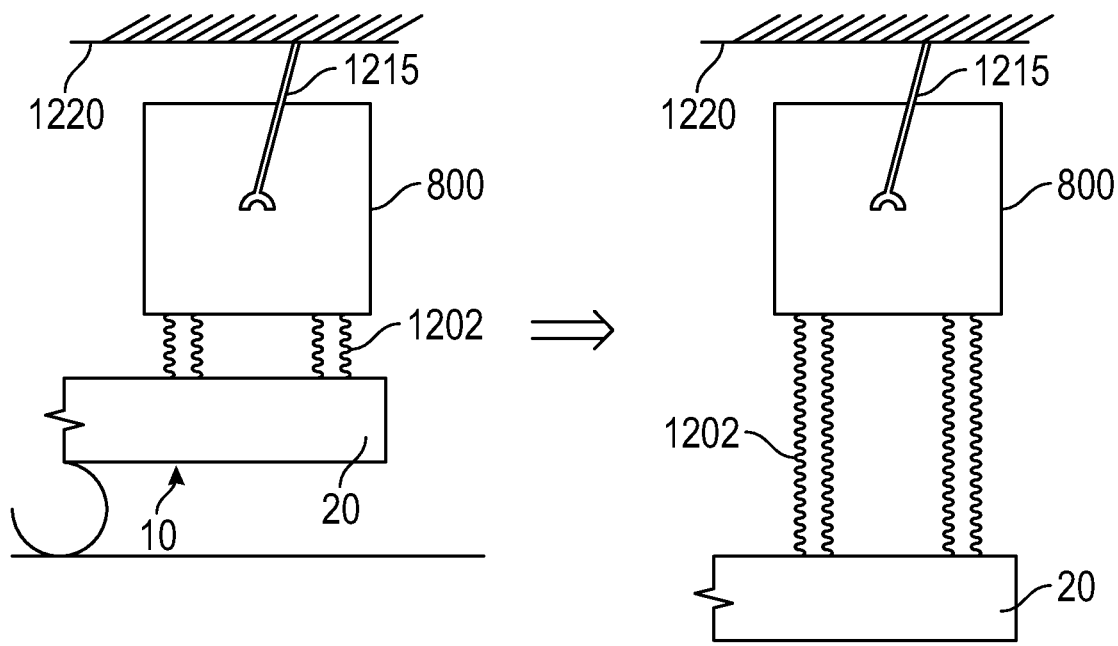
Figure 33B:
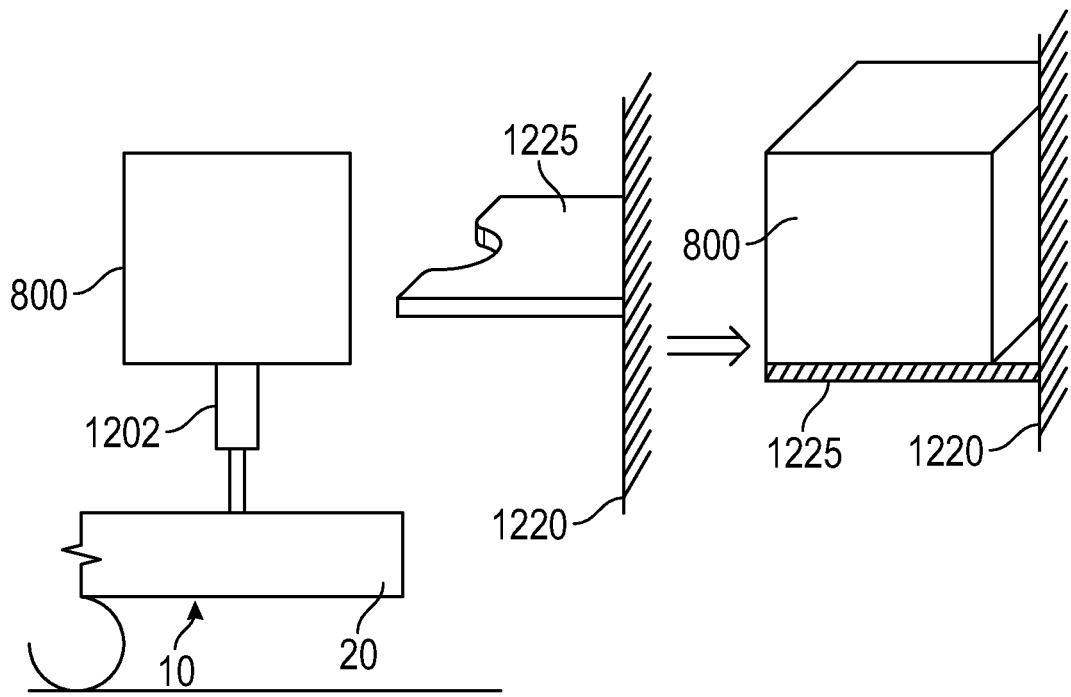

In embodiments in which the removal assembly 1200 includes a lift device 1202 provided by the concrete mixer truck 10, the removal assembly 1200 may additionally include one or more support structures 1220 configured to support the battery module 800 such that the concrete mixer may be driven away once the battery module 800 has been sufficiently raised by the lift device 1202. Referring to FIGS. 33A and 33B, in some embodiments, the support structure 1220 may be externally provided. In such embodiments, any number of different types of, or configurations of, engagement elements 1210 may be used to attach the battery module 800 to the externally provided support structure 1220. For example, as shown in FIG. 33A, in some embodiments, hook or handle shaped engagement elements 1210 formed on one of the battery module 800 and the external support structure 1220 may be configured to engage a corresponding retention elements 1215 formed on the other of the external support structure 1220 and battery module 800.

Turning to FIG. 33A-33B, in other embodiments in which the removal assembly 1200 includes a lift device 1202 supported by the concrete mixer truck 10, support of the battery module 800 in the elevated position relative to the concrete mixer truck 10 may alternatively, or additionally, be accomplished by placing the battery module 800 atop an externally provided support structure 1220. As illustrated in FIG. 33B, according to some embodiments, once the battery module 800 has been elevated by the lift device 1202, a movable support structure 1220 defining a support surface 1225 may be positioned underneath the elevated battery module 800 so as to allow the battery module 800 to be supported thereon. In some embodiments, the movable support structure 1220 may be entirely mobile, allowing the battery module 800 to be removed from the concrete mixer truck 10 at any location at which the mobile support structure 1220 may be used. In other embodiments the support structure 1220 may be partially mobile, with support surface 1225 of the support structure 1220 being movable relative to a stationary portion of the support structure 1220. In such embodiments, once the concrete mixer truck 10 has been positioned near support structure 1220, the support surface 1225 may be moved as necessary into alignment with the battery module 800. As illustrated in FIG. 33B, in yet other embodiments, the support structure 1220 may be entirely stationary, with the concrete mixer truck 10 being brought into proximity with the support structure 1220 and aligned with the support surface 1225 of the support structure 1220 to remove the battery module 800.

Figure 34A:
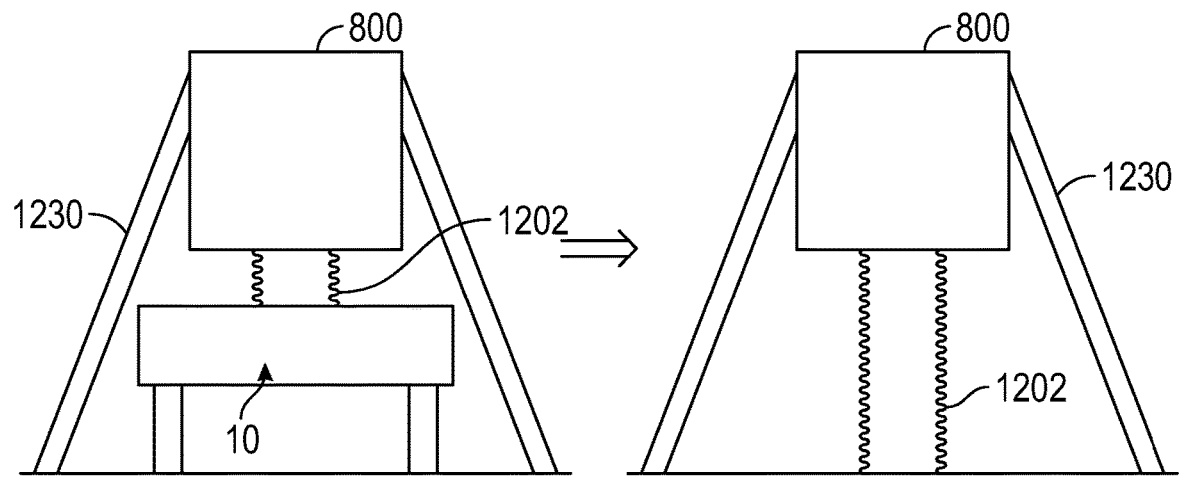
Figure 34B:
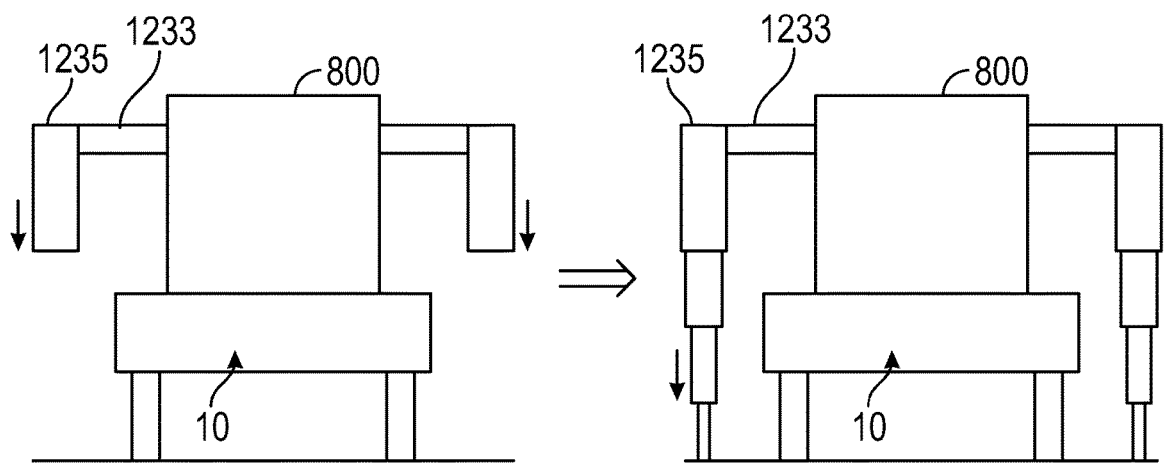

Referring to FIGS. 34A and 34B, according to some embodiments, in addition to the lift device 1202 being supported by the concrete mixer truck 10, the support structures 1220 of the removal assembly 1200 may additionally also be supported by the concrete mixer truck 10 so as to define a removal assembly 1200 entirely supported by the concrete mixer truck 10. As will be understood, removal assembly 1200 embodiments such as those illustrated in FIGS. 34A and 34B, which do not rely on any external removal elements to remove the battery module 800, advantageously free the battery module 800 to be removed from the concrete mixer truck 10 at substantially any location and in any situation.

As shown in FIG. 34A, according to one embodiment of a self-supported removal assembly 1200, the lift device 1202 is initially operated to raise the battery module 800 to an elevated position, following which a pair of fixed or adjustable length leg elements 1230 may be attached, pivoted downward, or otherwise engaged to the battery module 800 and so as to bring the lower surfaces of the leg elements 1230 into contact with the ground on either side of the concrete mixer truck 10. Once the leg elements 1230 have been engaged with the ground, the concrete mixer truck 10 may be driven away, leaving the battery module 800 supported by the leg elements 1230.

Turning to FIG. 34B, in some self-supported removal assembly 1200 embodiments, instead of the lift device 1202 and the leg elements 1230 being discrete removal elements, the lift device 1202 and one or more of the leg elements 1230 of the removal assembly 1200 may instead (or additionally) be integrated into a single structure. As illustrated in FIG. 34B, the integrated leg/lift elements 1235 may be defined by a telescoping, articulating, or otherwise expandable structure. When it is desired to remove the battery module 800, the expandable leg/lift elements 1235 are actuated, thereby initiating an extension of the leg/lift elements 1235. The leg/lift elements 1235 continue to extend in a generally downwards direction until the leg/lift elements 1235 come into contact with the ground, at which point continued extension of the leg/lift elements 1235 causes the battery module 800 to be lifted upwards relative to the concrete mixer truck 10. Once the battery module 800 has been raised to provide sufficient clearance relative to the concrete mixer truck 10, the concrete mixer truck 10 may be driven away, leaving the battery module 800 supported by the integrated leg/lift elements 1235.

As also shown in FIG. 34B, in concrete mixer truck 10 embodiments in which a width of the rear portion of the concrete mixer truck 10 is greater than the width of the battery module 800, fixed length or telescoping horizontal extension elements 1233 may be attached on either side of the battery module 800 to extend the width of the battery module 800 such that the leg elements 1230 engaged to the battery module 800 may clear the sides of the concrete mixer truck 10 and be brought into contact with the ground.

As shown in FIGS. 33A and 35A, according to some embodiments in which the removal assembly 1200 includes a concrete mixer truck 10 supported lift device 1202 that remains attached to the battery module 800 upon removal of the battery module 800 from the concrete mixer truck 10, once the battery module 800 has been engaged by the support structure 1220 to support the battery module 800 so as to allow the concrete mixer truck 10 to drive away, the lift device 1202 may optionally be configured to be further extended until the lift device 1202 is brought into contact with the ground, thus providing additional support for the weight of the removed battery module 800 in addition to that provided by the externally provided support structure 1220 and/or the support structure 1220 provided as part of the concrete mixer truck 10 (e.g. leg elements 1230 and/or leg/lift elements 1235).

As will be understood, in embodiments in which the configuration of the rear end of the concrete mixer truck 10 is such that the battery module 800 does not need to be elevated relative to the concrete mixer truck 10 to permit the concrete mixer truck 10 to be driven away, the lift device 1202 may optionally be omitted from the removal assembly 1200. For example, in some such embodiments, the removal assembly 1200 may instead rely solely on the battery module 800 being supported via the engagement between the engagement elements 1210 provided along one of the battery module 800 and external support structure 1220 and the retention elements 1215 provided along the other of the battery module 800 and external support structure 1220.

Figure 35:
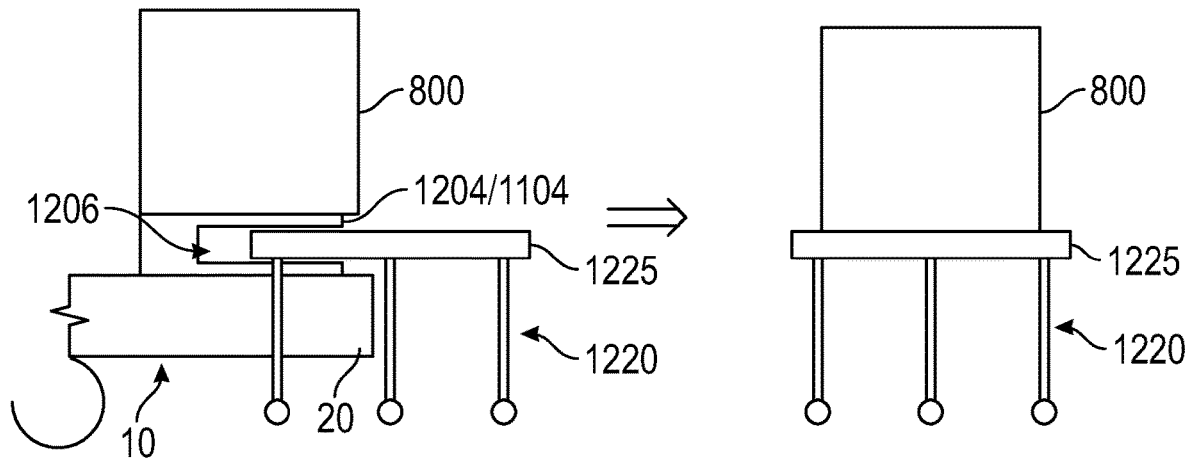

In other embodiments, instead of entirely omitting a lift device 1202 from the removal assembly 1200, the lift device 1202 may instead be replaced by an elevated structure 1204, with the battery module 800 being supported atop the elevated structure 1204 such that a lower surface of the battery module 800 is positioned vertically above any structures of the concrete mixer truck 10 rear portion, thereby allowing the concrete mixer truck 10 to be driven away once that battery module 800 has been engaged to an appropriate support structure 1220. As will be understood, in some such embodiments, the elevated structure 1204 of the removal assembly 1200 may be defined as a structure that is distinct and discrete from any of the mounting elements defining the battery module frame 810. In other embodiments, the elevated structure 1204 may instead be defined by one or more of the mounting elements of the battery module frame 810. For example, as illustrated in FIG. 35, in some embodiments, a mobile support structure 1220 including a support surface 1225 may be positioned into a gap 1206 defined by a U-shaped elevated structure 1204 that is also defines the support plate 1104 of the battery module frame 810 atop which the battery module 800 is supported.

According to yet other embodiments, the removal assembly 1200 may be defined by any number of other configurations and structures configured to move the battery module 800 along any one of, or any combination of, a lateral axis, a longitudinal axis, and/or a vertical axis relative to the battery module frame 810 and concrete mixer truck 10 to remove the battery module 800 from the concrete mixer truck 10.

Figure 36:
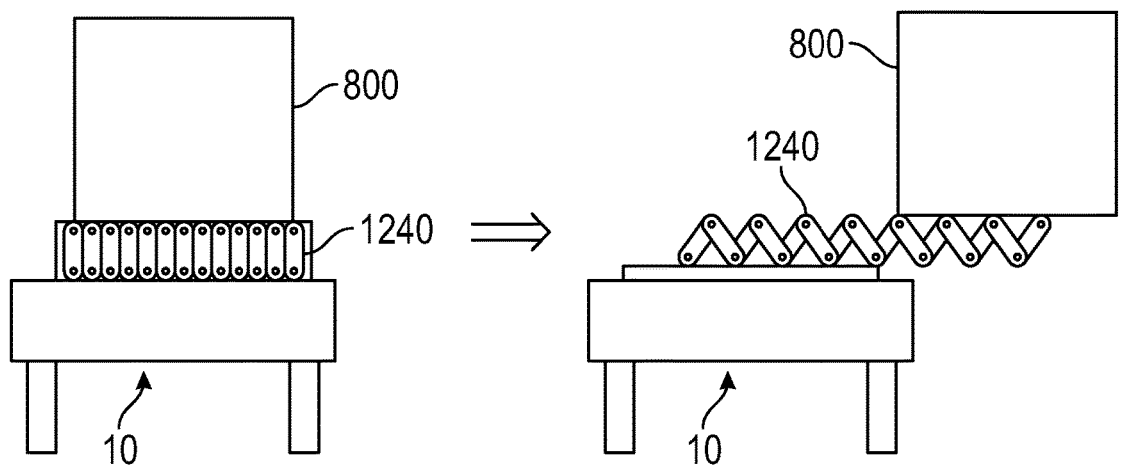

For example, as illustrated in FIG. 36, in some embodiments, the removal assembly 1200 may include a telescoping, articulating, or otherwise expandable structure 1240 to which the battery module 800 is attached, and via which the battery module 800 may be removed from the concrete mixer truck 10. When it is desired to remove the battery module 800, attachment structures 1120 of the battery module frame 810 are unsecured, and the expandable structure 1240 is extended from its constrained, transport configuration into an extended removal configuration. As the expandable structure 1240 is extended, the attached battery module 800 is moved outwards relative to the rear and/or a left of right side of the concrete mixer truck 10, from where the battery module 800 may be transferred to a support surface 1225 of a support structure 1220 located adjacent a rear and/or side of the concrete mixer truck 10.

Once the battery module 800 has been transferred to the support surface 1225, the battery module 800 may be disengaged from the expandable structure 1240 and/or the expandable structure 1240 may be disengaged from the battery module frame 810 (or other portion of the concrete mixer truck 10 to which the expandable structure 1240 is attached), thereby removing the battery module 800 from the concrete mixer truck 10 and allowing the concrete mixer truck 10 to drive off. The support surface 1225 onto which the battery module 800 is transferred may in some embodiments define the charging location of the battery module 800, or may be a temporary location from which the battery module 800 is subsequently transferred (using any number of or combination of devices) to the charging location.

Figure 37A:
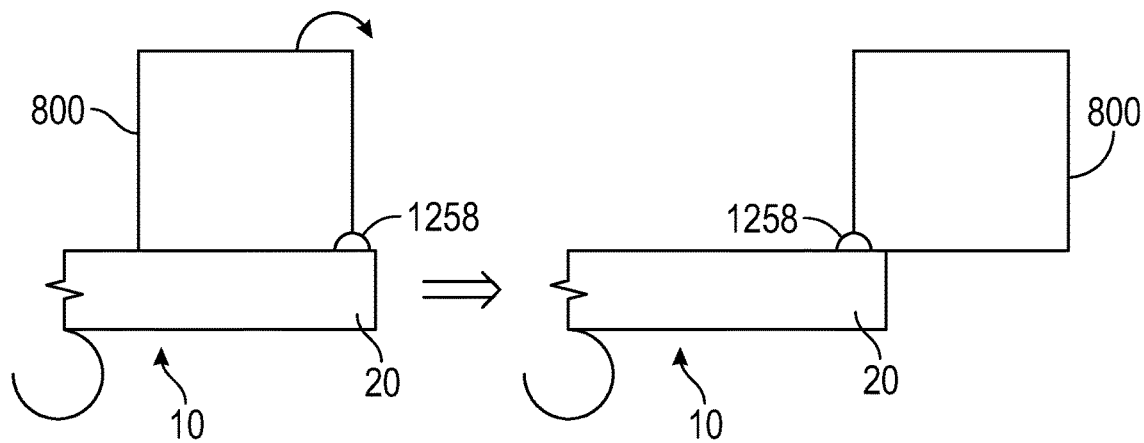
Figure 37B:
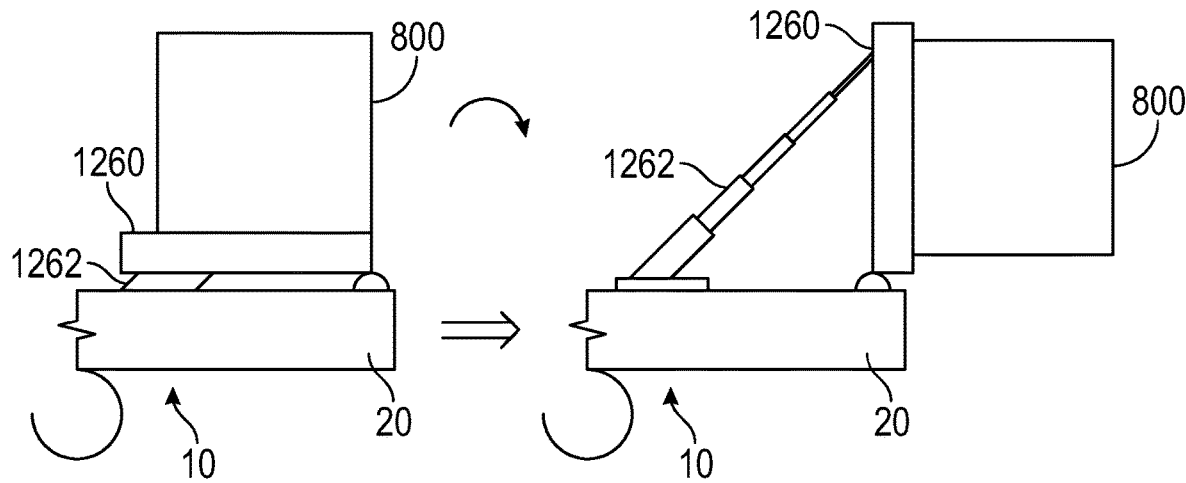
Figure 37C:
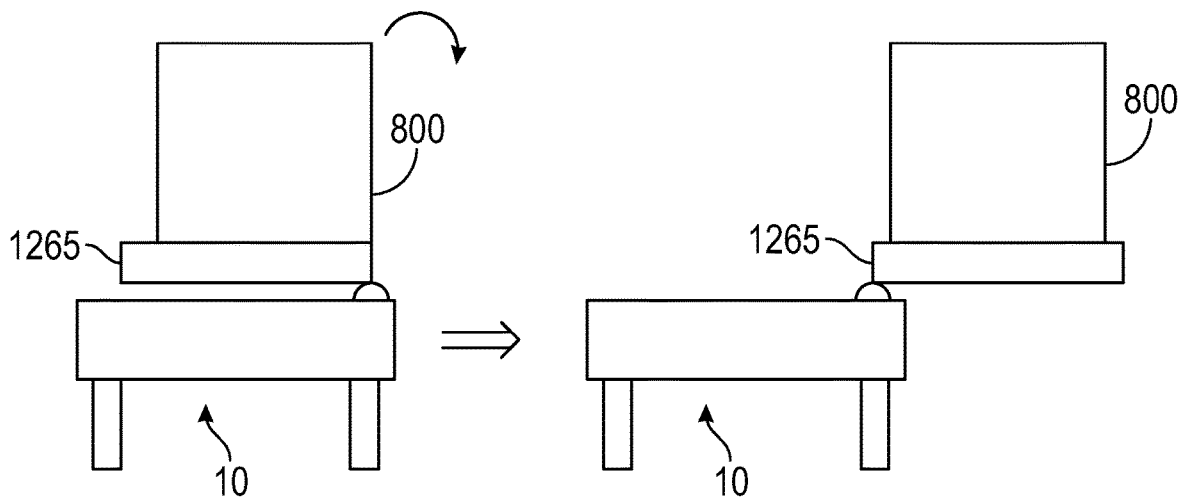

Referring to FIGS. 37A-37C, in other embodiments, the removal assembly 1200 may be configured to pivot the battery module 800 about the horizontal axis or the vertical axis to transfer the battery module 800 onto a support surface 1225 of a support structure 1220 extending along a rear and/or side of the concrete mixer truck 10. As illustrated in FIG. 37A, according to some embodiments, the removal assembly 1200 may include a hinged connector 1258 along which the battery module 800 is attached to a side or a rear edge of the battery module frame 810. When it is desired to remove the battery module 800, an edge of the battery module 800 located opposite the battery module 800 edge attached to the hinged connector 1258 may be raised, causing the battery module 800 to be pivoted about the hinged connector and onto a support surface 1225 provided alongside the concrete mixer truck 10. Once the battery module 800 has been transferred to the support surface 1225, battery module may be disengaged from the hinged connector 1258 and/or the hinged connector 1258 is disengaged from the battery module frame 810.

As shown in FIG. 37B, according to yet other embodiments, the pivoting of the battery module 800 off of the concrete mixer truck 10 and onto a support structure 1220 may be accomplished via a lift plate 1260 attached hingedly to the battery module frame 810 at a first end and attached to the battery module frame 810 via an extendable leg 1262 at a second end. The battery module 800 is supported on the lift plate 1260 such that upon actuation of the lift plate 1260 to extend the extendable leg, the lift plate 1260 (with attached battery module 800) is pivoted relative to the concrete mixer truck 10.

As shown yet other embodiments (not shown), the removal assembly 1200 may include a pin provided on one or both of a left side and a right side and/or on one or both of a front surface and rear surface of the battery module 800. The pin is configured to travel along an arcuate groove defined by a side wall structure, thereby facilitating the pivoting transfer of the battery module onto a support surface 1225 provided alongside the concrete mixer truck 10. Once the battery module 800 has been transferred to the support surface 1225, the pin may be disengaged from the side wall structure 1256 and/or the battery module 800 may be disengaged from the pin.

In other embodiments, instead of pivoting the battery module 800 about a horizontal axis to remove the battery module 800 from the concrete mixer truck 10, the battery module 800 may instead be removed from the concrete mixer truck 10 by pivoting the battery module 800 relative to the vertical axis. As shown in FIG. 37C, according to one such embodiment, the battery module 800 may be attached to the concrete mixer truck 10 via a pivoting plate 1265. In some embodiments, the pivoting plate 1265 may be a structure discrete from and independent of the battery module frame 810. In other embodiments, the pivoting plate 1265 may define an additional mounting element of the battery module frame 810. The pivoting plate 1265 may be pivotally attached to the concrete mixer truck at one or more locations about the perimeter of the pivoting plate 1265 to allow the pivoting plate 1265 and attached battery module to be moved outwards relative to a side and/or rear of the concrete mixer truck 10. As will be understood, in embodiments in which the pivoting plate 1265 is pivotally attached to the concrete mixer truck 10 at one or more locations, a user may selectively disengage all but a single pivotable connection depending on the location of the support surface 1225 relative to the concrete mixer truck 10, thus allowing the pivoting plate 1265 to be used to remove the battery module 800 irrespective of the positioning the concrete mixer truck 10 relative to the support structure 1220.

According to some embodiments, the battery module 800 is configured to be removed from the battery module frame 810 by sliding, pushing, rolling or otherwise moving the battery module 800 laterally off of the battery module frame 810 and onto a support surface 1225 of a support structure 1220 of the removal assembly 1200. More specifically, in such embodiments, when it is desired to remove the battery module 800 from the concrete mixer truck 10, the rear of the concrete mixer truck 10 is brought into proximity to the support structure 1220 (e.g., by backing the concrete mixer truck 10 up towards the support structure 1220 and/or by bringing a mobile support structure 1220 towards the rear of the concrete mixer truck 10). Once the rear of the concrete mixer truck 10 and the support structure 1220 have been so aligned and the battery module frame 810 unsecured, the battery module 800 is moved off of the battery module frame 810 of the concrete mixer truck 10 and onto the support structure.

Referring to FIGS. 38A-38D, according to some embodiments, the battery module 800 may be secured to the concrete mixer truck 10 by a load handling system (LHS). In some embodiments, the LHS is a hydraulic or electric hooklift system for hooking, lifting, and/or hoisting the battery module 800 onto the rear end 24 of the concrete mixer truck 10. The LHS may include at least a controller 1282 and an arm 1280. The LHS may also include a series of hydraulic actuators configured to actuate the arm 1280 (not shown).

Figure 38A:
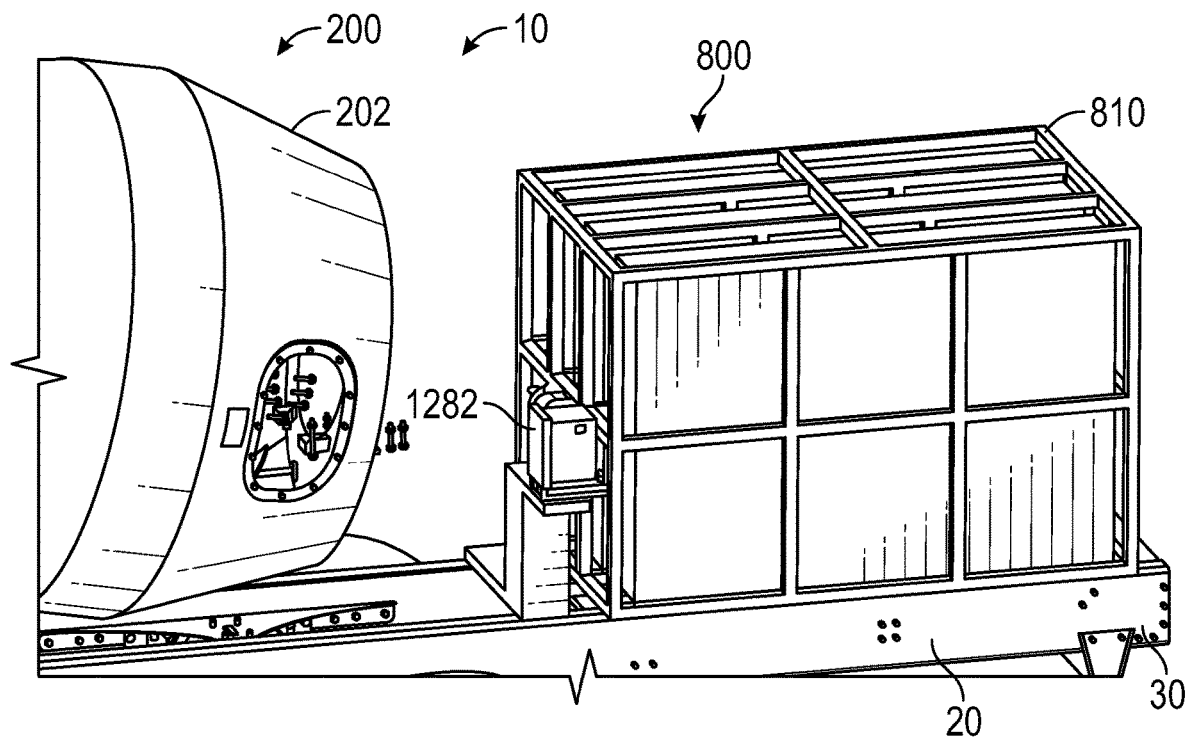
Figure 38B:
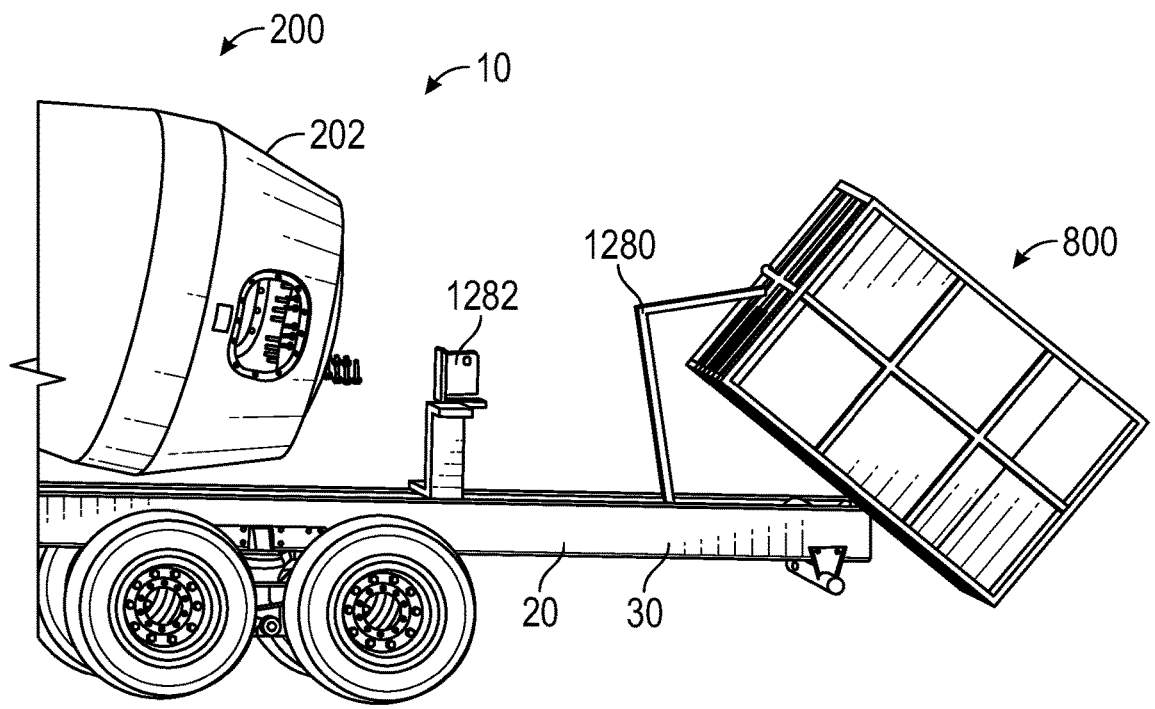

The arm 1280 may be configured to actuate to engage the battery module 800, as shown in FIG. 38B. For example, the arm 1280 may pivot at one or more joints and/or about one or more horizontal or vertical axes to engage the battery module 800. In such embodiments, a hook or other suitable member at a distal end of the arm 1280 may engage a corresponding ring, hook, etc. on the battery module 800. The arm 1280 may then actuate to move the battery module 800 onto the concrete mixer truck 10.

Figure 38C:
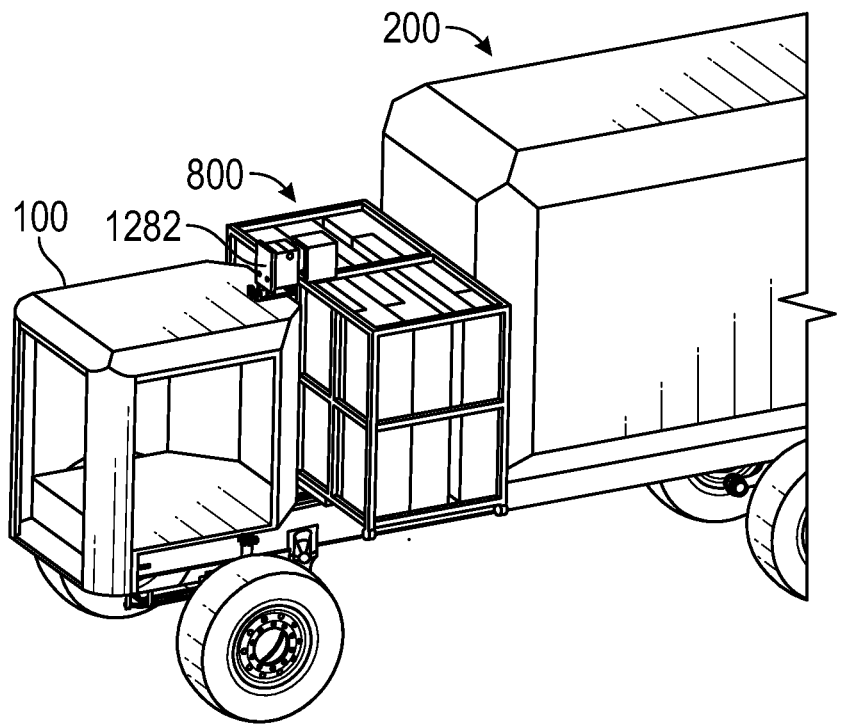
Figure 38D:
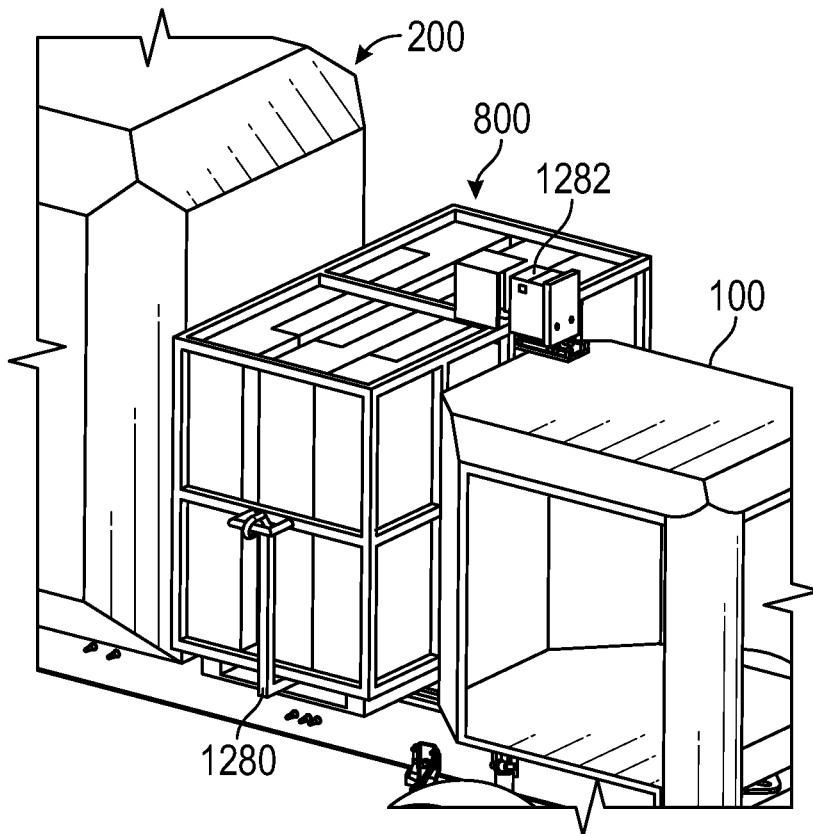

As shown in FIGS. 38C-38D, in some embodiments, the battery module 800 may be located behind the cab 100 of the concrete mixer truck 10 rather than at a rear end of the concrete mixer truck 10. The battery module 800 may be behind the cab 100 for rear discharge concrete mixer trucks, for example. In such embodiments, the LHS may be configured to engage the battery module 800 from a left or right side of the vehicle. For example, as shown in FIG. 38D, the battery module may be loaded and/or unloaded from the concrete mixer truck 10 from a left (i.e., driver's side) of the concrete mixer truck 10.

Figure 39A:
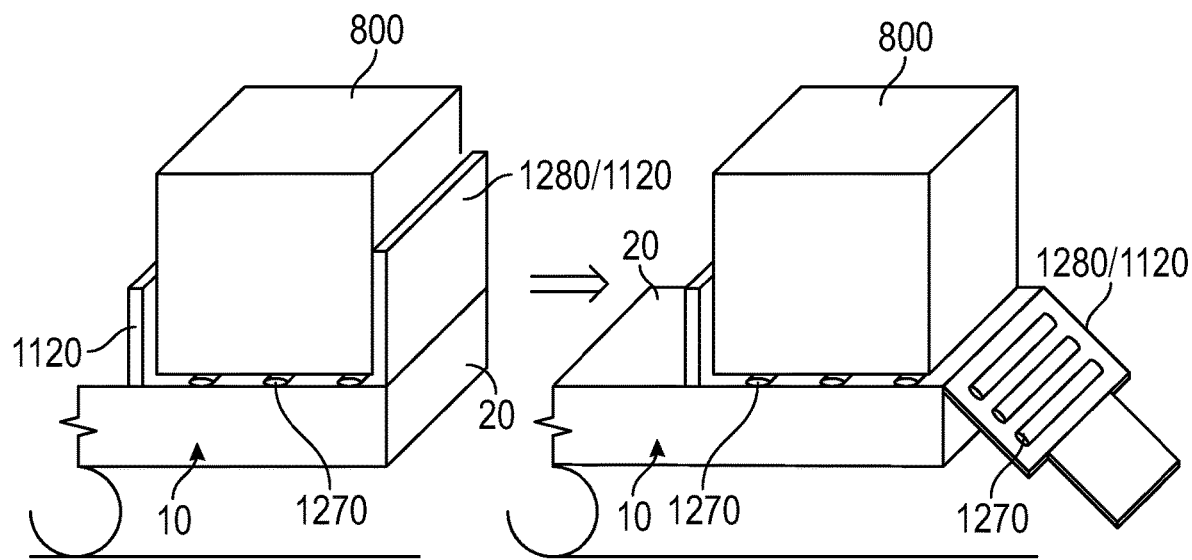
Figure 39B:
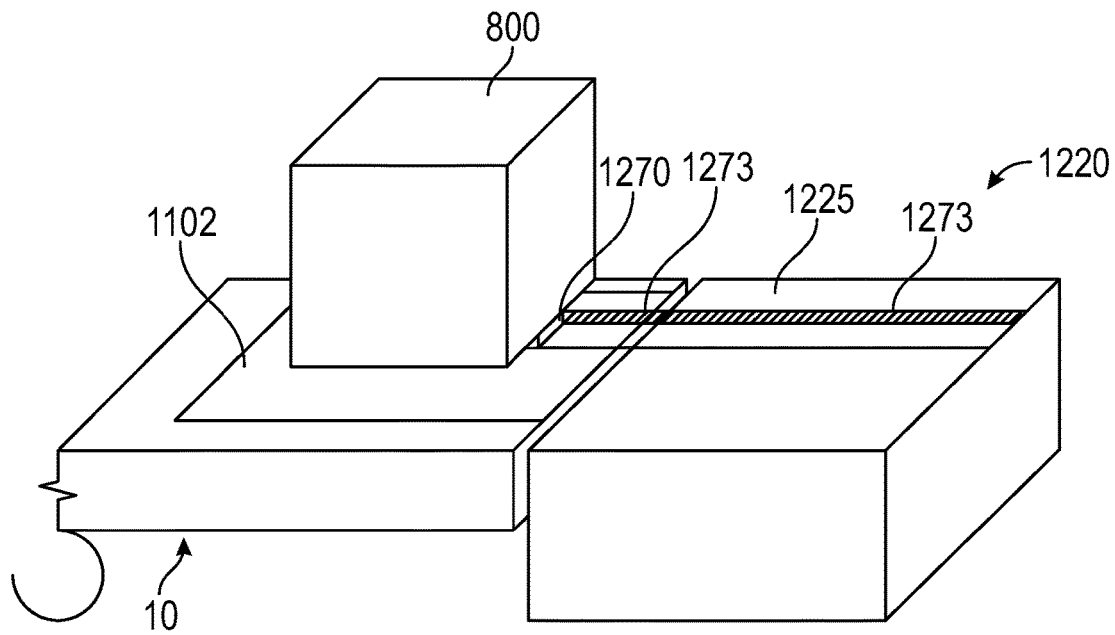

According to various such embodiments, one or more transfer elements 1270 configured to facilitate the lateral movement of the battery module 800 off of the concrete mixer truck 10 may be provide along one or both of the battery module 800 and the battery module frame 810. For example, as shown in FIGS. 39A and 39B, according to various embodiments, the transfer elements 1270 may be defined by structures such as wheels, linear bearings, rollers, or any other number of rolling structures configured to allow the battery module 800 to be rolled across a surface. In other embodiments, the transfer elements 1270 may additionally, or alternatively, be defined by a continuous track or belt assembly.

As shown in FIG. 39A, according to some embodiments, the transfer elements 1270 may be configured to allow the battery module 800 to be moved in an unrestricted, or substantially unconstrained manner relative to the concrete mixer truck 10. In other embodiments, such as, e.g. illustrated in FIG. 39B, transfer elements 1270 provided on one of the battery module 800 and the battery module frame 810 may alternatively be configured to travel along a track 1273 or other structure formed on the other of the battery module frame 810 and battery module 800, and which is configured to guide the movement of the transfer elements 1270 along a predetermined path. As also shown in FIG. 39B, according to some such embodiments, a support structure 1220 of a removal assembly 1200 may additionally include transfer element 1270 or a track 1273 formed about the support surface 1225, so as to further facilitate removal of the battery module 800.

In some situations, it may not be possible to bring the concrete mixer truck 10 and the support structure 1220 close enough to one another so as to define a substantially uninterrupted surface extending between the upper surface of the battery module frame 810 and the support surface. For example, the lower surface of the battery module 800 may extend at a different height than the support surface 1225; the configuration of the support structure 1220 and/or the rear of the concrete mixer truck 10 may prevent the rear of the concrete mixer truck 10 and the support structure 1220 from being brought into close proximity with one another; etc. Accordingly, in some embodiments, an optional extension surface 1280 may be provided to bridge any gap between the support surface 1225 and the battery module 800, thus providing a substantially continuous surface along which the battery module 800 may be moved. According to some embodiments, the extension surface 1280 may optionally include one or more of the same transfer elements 1270 as those provided along the battery module and/or battery module frame 810.

In some embodiments, the extension surface 1280 may be provided as an unattached, free structure. In other embodiments, the extension surface 1280 may be attached along at least a first end to a structure of the concrete mixer truck 10. For example, as illustrated in FIG. 39A, in some embodiments, the extension surface 1280 may be attached to a portion of the battery module frame 810, and in some embodiments, may additionally define the battery module frame 810 of the battery module frame 810. During use of the concrete mixer truck 10, the extension surface 1280 may be arranged to extend relative to the battery module 800 in such an arrangement as to prevent movement of the battery module 800 relative to the battery module frame 810. When it is desired to remove the battery module, the extension surface 1280 may be unsecured, resulting in both the battery module 800 being freed to be removed from the concrete mixer truck 10 and, if desired, in the extension surface 1280 being capable of being used to bridge a gap extending between the concrete mixer truck 10 and the support structure 1220.

As described herein, according to various removal assembly 1200 embodiments, the battery module 800 is configured to be removed from the concrete mixer truck 10 by moving the battery module 800 in a specific direction (e.g. rearwards, to a side, etc.) relative to the concrete mixer truck 10. As will be understood, in certain situations, it may not be possible to align the concrete mixer truck 10 relative to the support structure 1220 in such a manner as wound be required to remove the battery module 800 from the concrete mixer truck 10 using the removal assembly 1200. As such, according to various embodiments, the battery module frame 810 may be configured to rotatably attached the battery module 800 to the concrete mixer truck 10, such that the battery module 800 may be rotated as needed to align the one or more removal assembly 1200 components to allow the battery module 800 to be removed from the concrete mixer truck.

Figure 40:
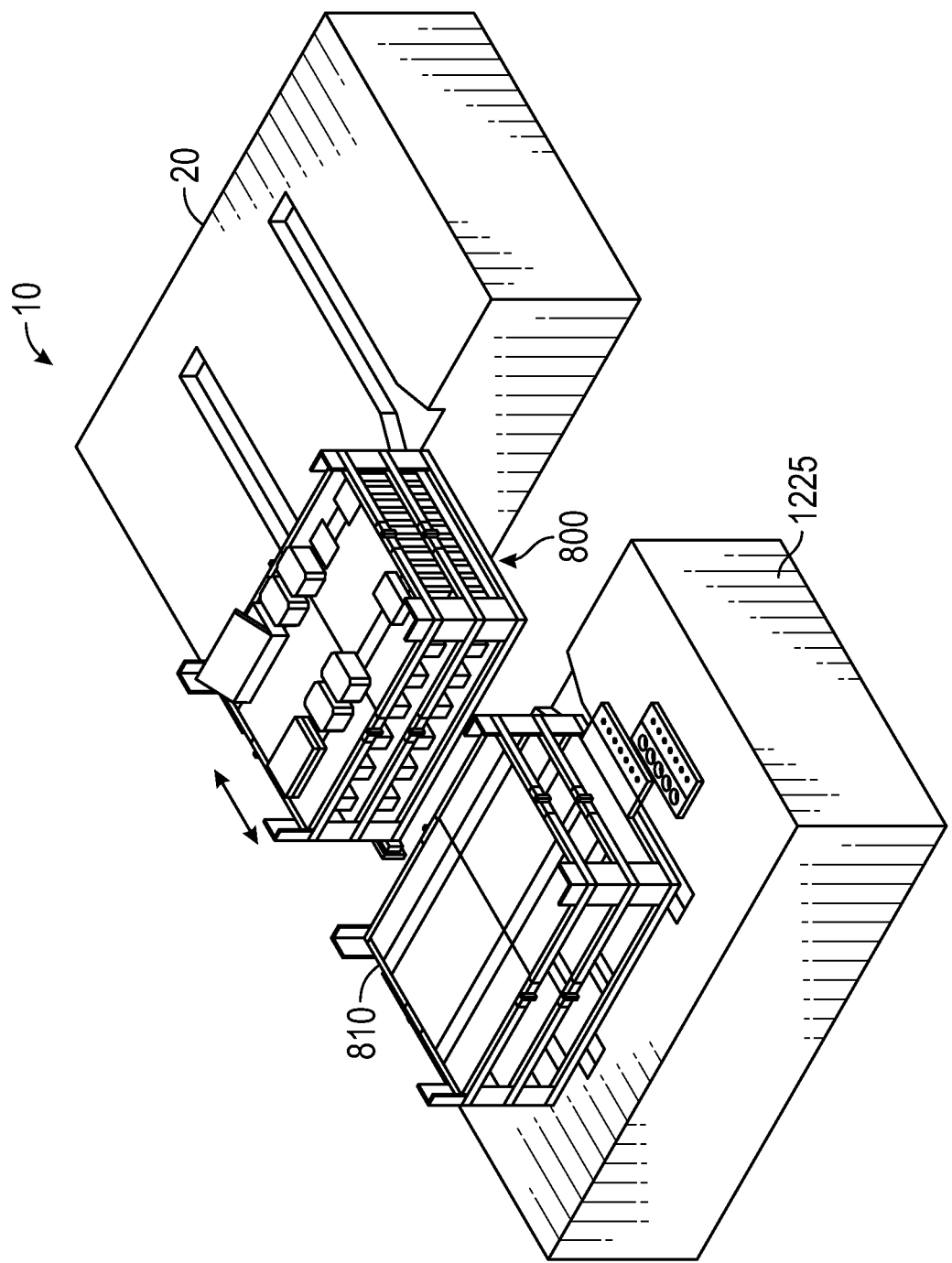

In some embodiments, the battery module 800 may be lifted, slid, or otherwise moved on to or off of the concrete mixer truck 10, as shown in FIG. 40. In such embodiments, for example, the concrete mixer truck 10 may pull into a designated spot (e.g., a loading bay) within proximity of the support surface 1225 (e.g., a loading dock, a raised platform, etc.). In some embodiments, the battery module 800 may be transferred between the concrete mixer truck 10 and the support surface 1225 by the transfer element 1270 or a track 1273, as described above. In other embodiments, another mechanism may be used to slide or move the battery module 800 between the support surface 1225 and the concrete mixer truck 10. For example, any of the methods and systems described herein may be used to transfer the battery module 800 between the support surface 1225 and the concrete mixer truck 10, as shown in FIG. 40.

Figure 41:
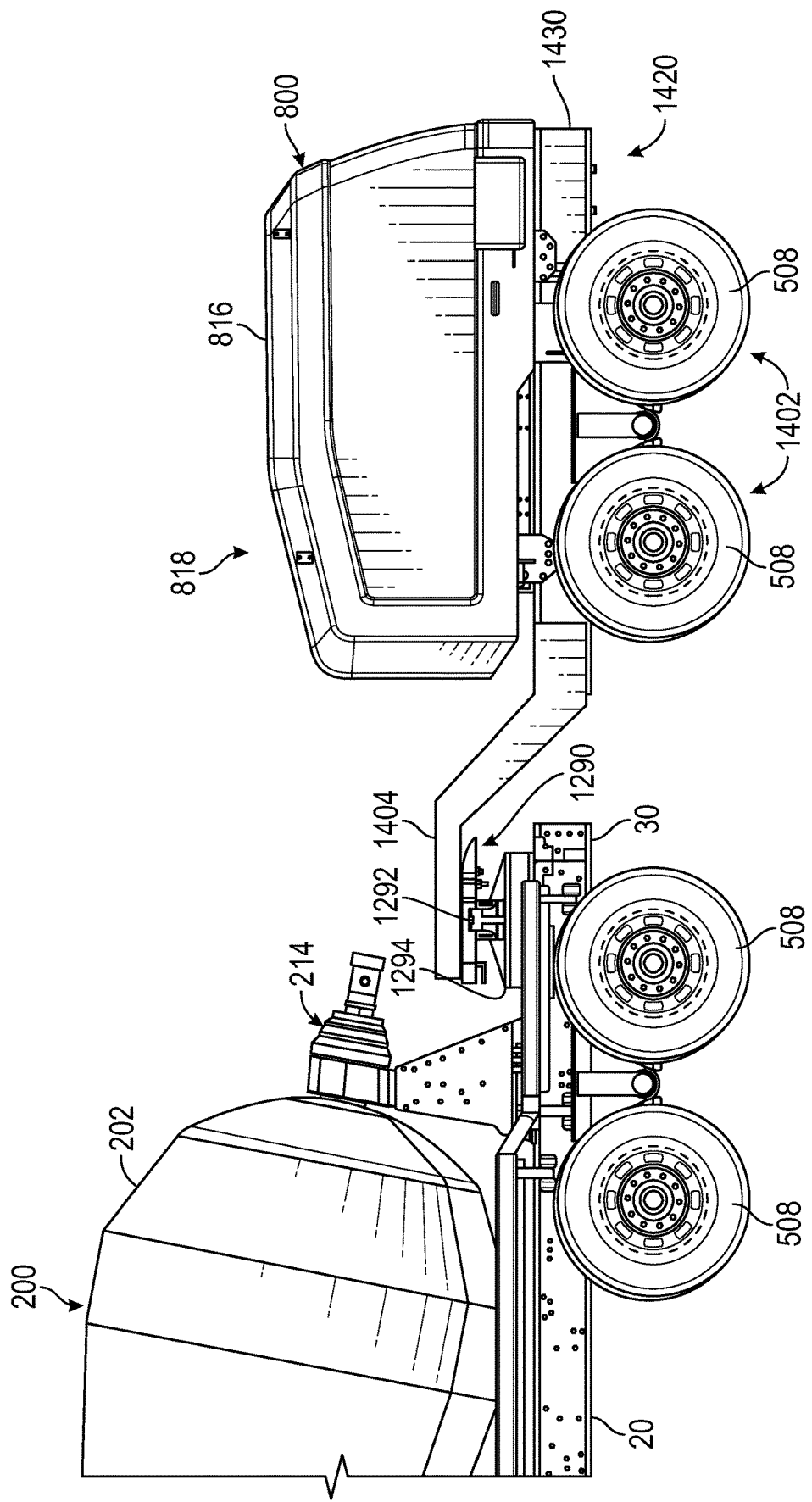
FIGS. 41-42B illustrate the battery module configured as a trailer, according to various exemplary embodiments.
Figure 42A:
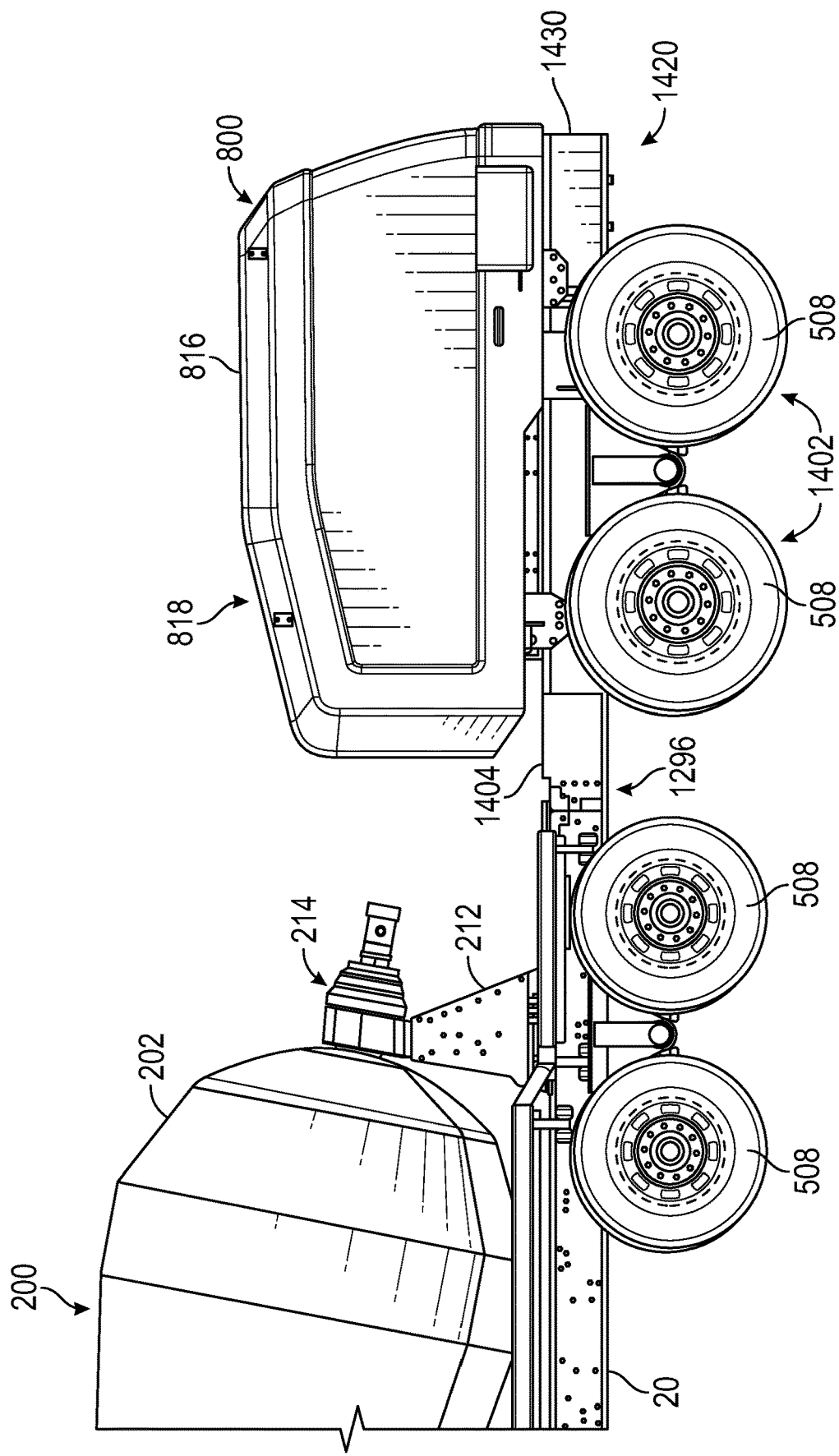
Figure 42B:
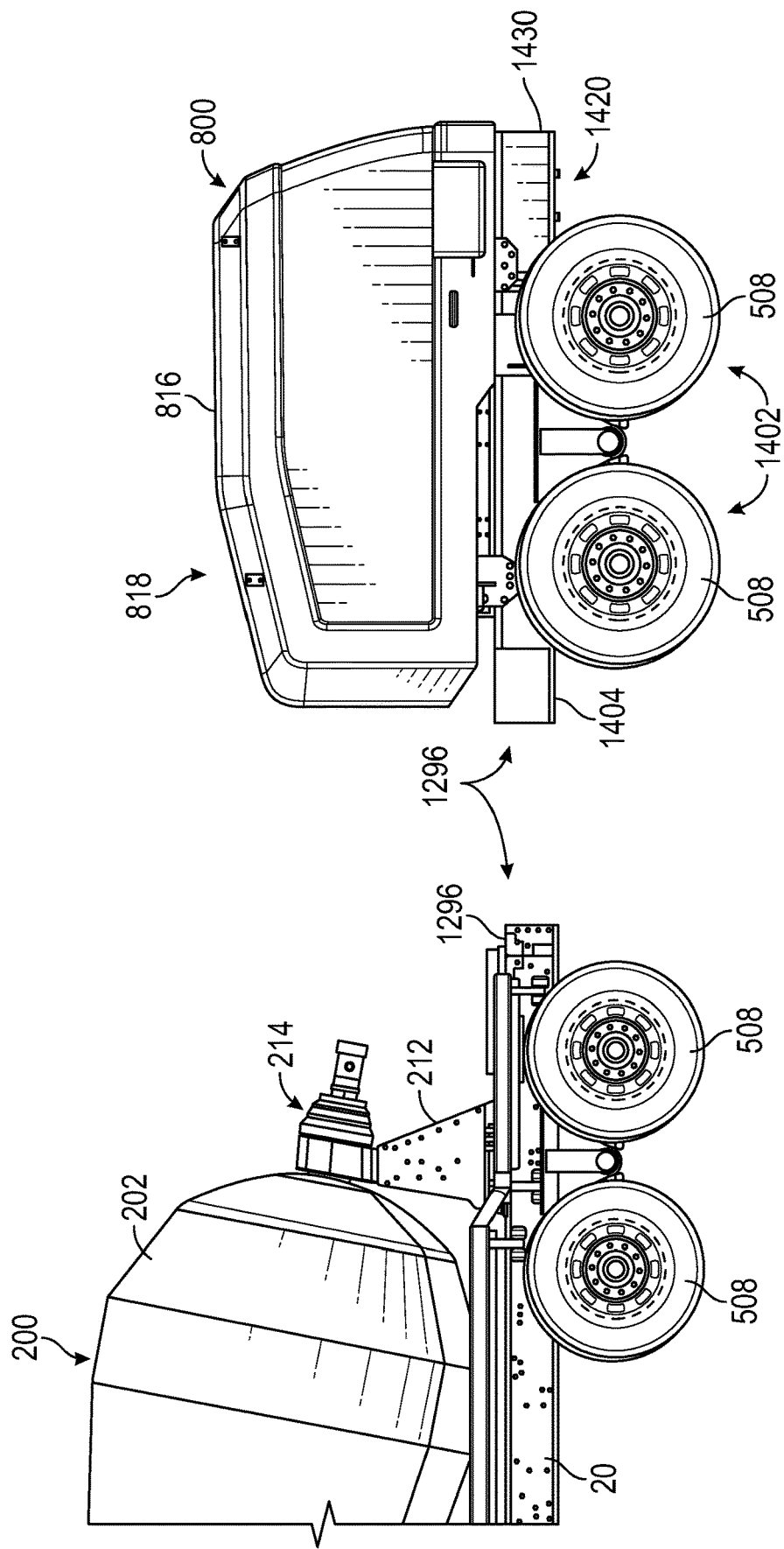

Referring now to FIGS. 41-42B, the battery module 800 may be configured to be carried (i.e., transported) by a trailer, in some embodiments. As shown in FIGS. 41-42B, for example, the battery module 800 may be fixedly or removably coupled to a battery module trailer 818. In such embodiments, coupling the battery module 800 to the battery module trailer 818 may allow the battery module 800 to be selectively coupled to the concrete mixer truck 10. In this manner, the battery module 800 may be decoupled from the concrete mixer truck 10 in order to charge or replace the battery module 800. Advantageously, the battery module trailer 818 may provide a quick and easy method for replacing depleted battery modules 800. For example, during operations of the concrete mixer truck 10, a low or depleted battery module 800 may be replaced by decoupling a first battery module trailer 818 from the concrete mixer truck 10 and subsequently coupling a second battery module trailer 818 to the concrete mixer truck 10.

The battery module trailer 818 includes a chassis 1420 configured to support the various components of the battery module 800. The chassis 1420 includes a pair of frame rails 1430 coupled with intermediate cross members, according to an exemplary embodiment. As shown in FIG. 41, the frame rails 1430 extend in a generally-horizontal and longitudinal direction (e.g., extend within 10 degrees of perpendicular relative to a vertical direction, extend within ten degrees of parallel relative to a ground surface when the battery module trailer 818 is positioned on flat ground, etc.) between a front end and a rear end of the battery module trailer 818. The frame rails 1430 may be elongated "C"-channels or tubular members, according to various exemplary embodiments. In other embodiments, the frame rails 1430 include another type of structural element (e.g., monocoque, a hull, etc.). In still other embodiments, the frame rails 1430 include a combination of elongated C-channels, tubular members, a monocoque element, and/or a hull element.

The battery module trailer 818 is shown to include a pair of tractive assemblies, shown as trailer axle assemblies 1402. The trailer axle assemblies 1402 may be spaced apart so that the battery module trailer 818 may be freestanding when decoupled from the concrete mixing truck 10. In some embodiments, the trailer axle assemblies are non-driven or non-powered. In other embodiments, the trailer axle assemblies 1402 may be driven, such as by the drive system 300 or by a separate motor or prime mover of the battery module trailer 818. For example, in some embodiments, the battery module trailer 818 may include one or more motors (e.g., electric motors) for driving the trailer axle assemblies 1402.

The trailer axle assemblies 1402 may include brakes (e.g., disc brakes, drum brakes, air brakes, etc.), gear reductions, steering components, wheel hubs, wheels, tires, and/or other features. As shown in FIG. 41, for example, the trailer axle assemblies 1402 each include tractive elements, shown as wheel and tire assemblies 508. In other embodiments, the trailer axle assemblies 1402 include a different type of tractive element (e.g., a track, etc.). In some embodiments, the trailer axle assemblies 1402 may be coupled to the frame rails 1430 via a suspension system. In such embodiments, the suspension system may include numerous components including shocks, struts, springs, leaf springs, etc.

As described with respect to FIGS. 30A and 30B, the battery module frame 810 may include support members 811 to which the base portion 812 is releasably secured, as briefly described above. With respect to the battery module trailer 818 described herein, the support members 811 may be attached permanently (e.g. via welding) or non-permanently (via any number of known attachment arrangements) to the chassis 1420 the battery module trailer 818 rather than, or in addition to, the chassis 20 of the concrete mixer truck 10. In this manner, battery module frame 810 may be releasably secured to the chassis 1420 via the support members 811.

As shown in FIG. 41, for example, the battery module trailer 818 may be configured to be rotatably and removably coupled to the concrete mixer truck 10. In this example, the battery module trailer 818 includes a frame member shown as tongue 1404. In various embodiments, the tongue 1290 may be fixed, detachable, or foldable and may be configured in any suitable style. An end of the tongue 1404 may include a first coupling member 1292, such as a kingpin, that may selectively engage with a second coupling member 1294 (e.g., a fifth-wheel coupling) to rotatably couple the first coupling member 1292 to the second coupling member 1294 about a vertical axis. Together, the first coupling member 1292 and the second coupling member 1294 form a coupling assembly 1290 that allows the battery module trailer 818 to pivot with respect to the concrete mixer truck 10. In some embodiments, the coupling assembly 1290 is powered (e.g., hydraulically, electrically, etc.) to couple the battery module trailer 818 to the concrete mixer truck 10. In other embodiments, the coupling assembly 1290 is not powered and may be manually engaged/disengaged to couple/decouple the battery module trailer 818 and the concrete mixer truck 10.

In some embodiments, the battery module trailer 818 may be configured as a non-pivoting trailer, as shown in FIGS. 42A and 42B. In other words, the battery module trailer 818 may be fixedly and removably coupled to the concrete mixer truck 10 such that the battery module trailer 818 has a fixed position and orientation relative to the concrete mixer truck 10. In some embodiments, the battery module trailer 818 may be configured without the tongue 1404. In such embodiments, the frame rails 1430 of the battery module trailer 818 may align with the frame rails 30 of the concrete mixer truck. The frame rails 1430 may be coupled to the frame rails 30 by any suitable method. For example, the frame rails 1430 may be bolted to the frame rails 30 or may be connected by a coupling assembly. In other embodiments, where the battery module trailer 818 includes the tongue 1404, the tongue 1404 may include a coupling assembly 1296 that selectively and removably couples the battery module trailer 818 to the concrete mixer truck 10.

The coupling assembly 1296 may include any suitable components for removably coupling the battery module trailer 818 to the concrete mixer truck 10. In one non-limiting example, the coupling assembly 1296 may couple battery module trailer 818 to the concrete mixer truck 10 in a manner similar to a removable gooseneck trailer. In this example, a portion of the coupling assembly 1296 connected to the rear end 24 of the concrete mixer truck 10 may include a hook, latch, or locking tab assembly, while a portion of the coupling assembly 1296 connected to a corresponding end of the frame 1420 of the battery module trailer 818 may include a plurality of alignment protrusions. The battery module trailer 818 may then be coupled to the concrete mixer truck 10 by aligning the alignment protrusions with corresponding openings in the portion of the coupling assembly 1296 connected to the rear end 24 of the concrete mixer truck 10 and engaging the hook, latch, or locking tab assembly (e.g., manually such as by inserting a rod, by engaging an actuator, hydraulically, etc.).

When configured as a non-pivoting trailer, as shown in FIGS. 42A and 42B, the battery module trailer 818 may act as a dolly, similar to a load span tag axle. The battery module trailer 818 may act to distribute the weight of the concrete mixer truck 10 and the battery module 800 more evenly and/or across additional axles (e.g., trailer axle assemblies 1402). In some embodiments, the weight distribution and additional axle assemblies associated with the battery module trailer 818 may allow for heavier battery modules (e.g., battery module 800) such that the capacity of the battery module 800 may be increased, leading to increased operational capacity (e.g., increased runtime).

Figure 43B:
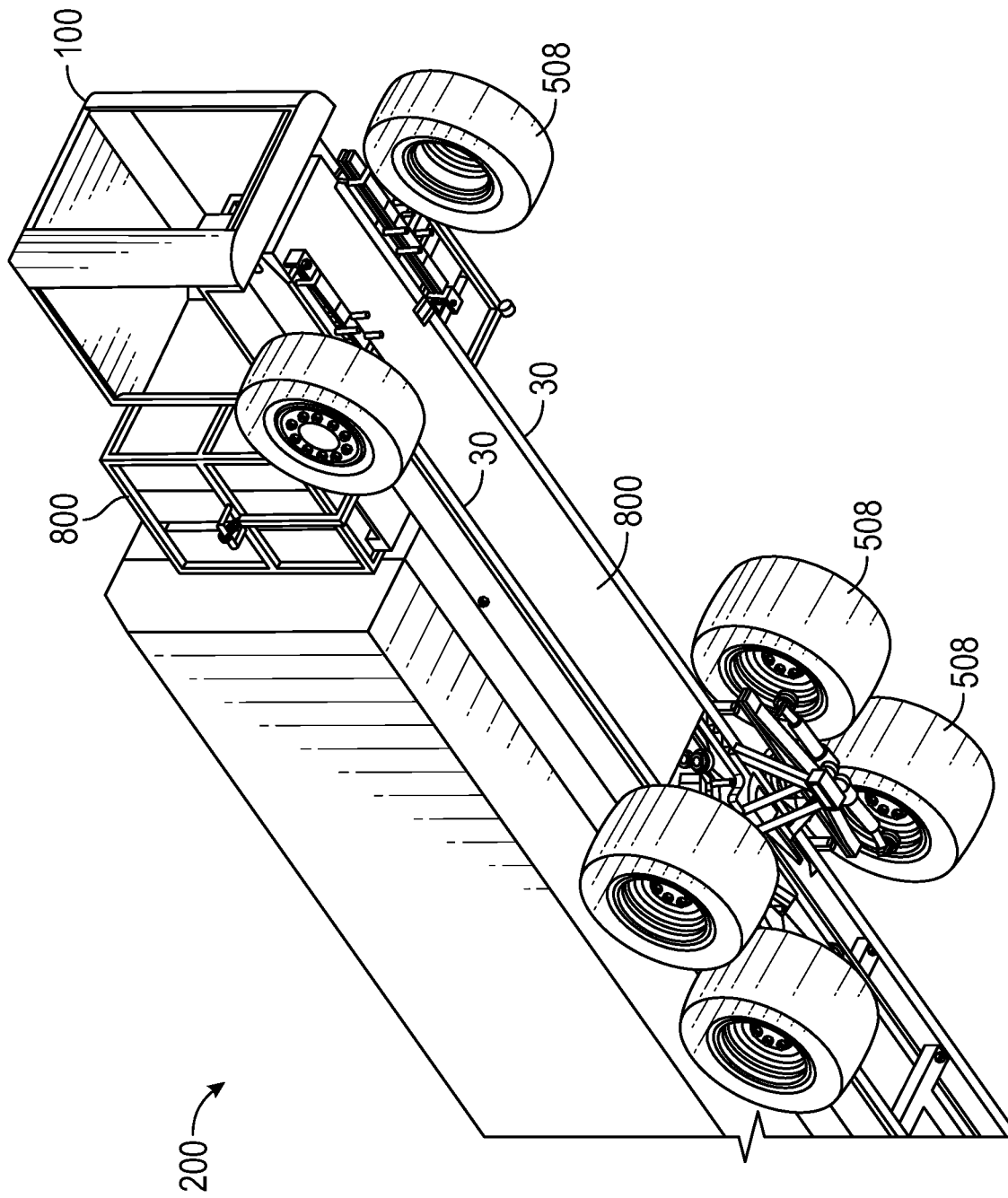
Figure 43C:
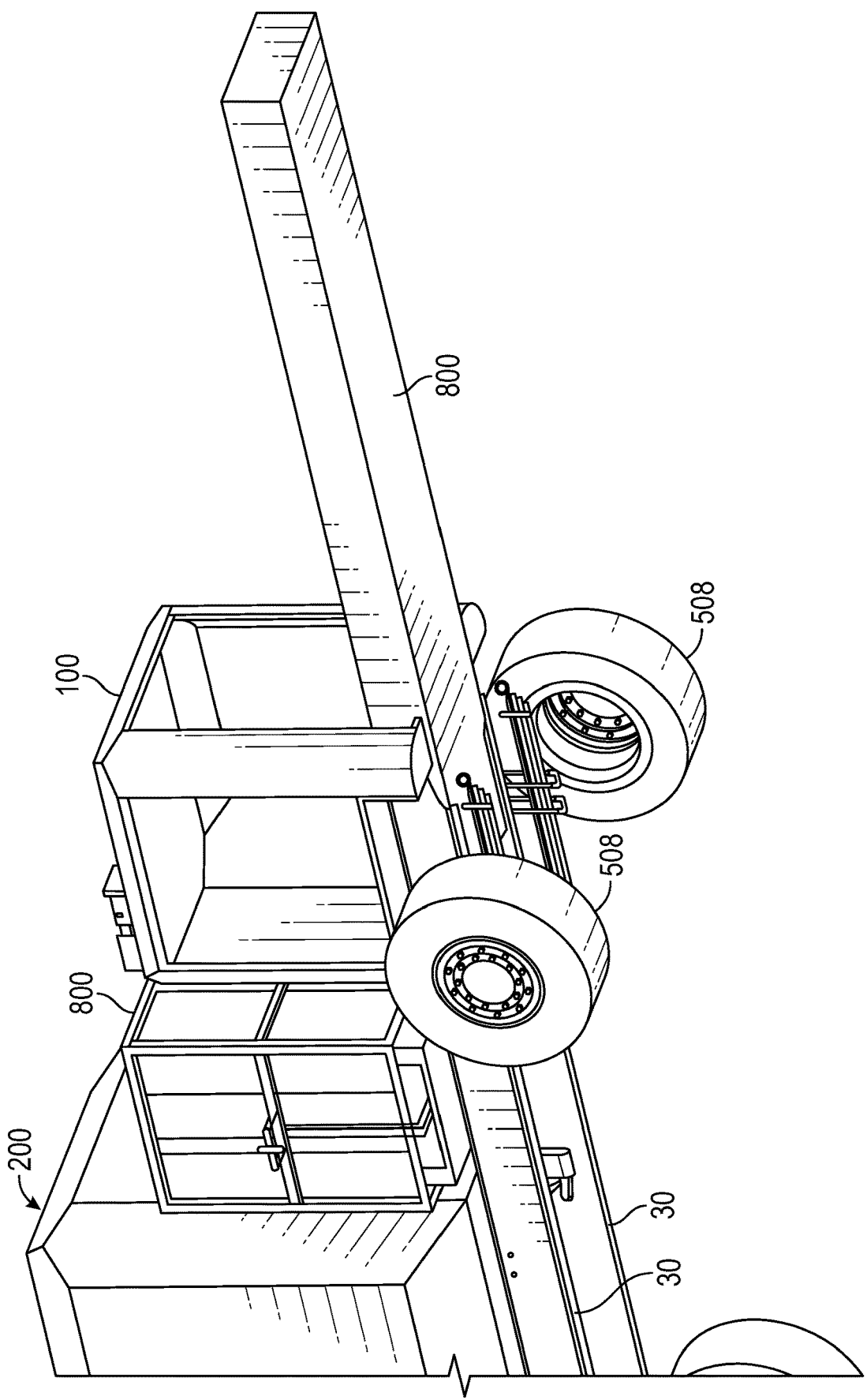

Referring now to FIG. 43A-43C, the battery module 800 may be configured as a frame slide-out, in some embodiments. The battery module 800 may be configured as a frame slide-out for rear discharge concrete mixer trucks, for example. As shown, for example, the battery module 800 may be configured to mount between the frame rails 30 of the concrete mixer truck 10. In some embodiments, the battery module 800 may span the length of the concrete mixer truck 10, thereby distributing the weight of the battery module 800. In other embodiments, the battery module 800 may be located near a center point of the concrete mixer truck 10, or near the rear end 24 of the concrete mixer truck 10. In some embodiments, the battery module 800 located underneath the concrete mixer truck 10 is a primary or a secondary battery module, where a second battery module (e.g., a second one of the battery module 800) may be mounted on the concrete mixer truck 10. The second battery module 800 may be located behind the cab 100, as shown, for example, or may be located at the rear end 24 of the concrete mixer truck 10, and may be configured as the primary or the secondary battery.

In one example, the battery module 800 located underneath the concrete mixer truck 10 (e.g., between frame rails 30) may be a primary battery, configured to provide energy for normal or reduced operations of the concrete mixer truck 10 (e.g., moving the concrete mixer truck 10 around a storage yard). In this example, the second battery module 800, shown behind the cab 100, may be selectively loaded to increase the operational capacity of the concrete mixer truck. For example, a second battery module may be loaded onto the concrete mixer truck 10 in order to extend the range or the operating time of the concrete mixer truck 10.

In some embodiments, the battery module 800 may be removed (e.g., for charging or replacement) or installed by sliding the battery module 800 out of the front end 22 or the rear end 24 of the concrete mixer truck 10. As shown in FIG. 43C, for example, the battery module 800 may be removed by sliding the battery module 800 forward, between the frame rails 30, and out the front end 24 of the concrete mixer truck. In some such embodiments, removing the battery module 800 may include removing a front cover or a front bumper of the concrete mixer truck. In other embodiments, the battery module 800 may be mounted below a front bumper or front cover the concrete mixer truck 10 to facilitate battery module removal or replacement.

Secondary Battery System

As noted above, in some situations a user may be provided with two or more battery modules 800, allowing a depleted battery module 800 to be replaced with a charged battery module 800 as needed using any of the battery module 800 removal assemblies 1200 described herein. In such situations, the replacement of the depleted battery module 800 with a charged battery module 800 allows the user to continue operating the concrete mixer truck 10 as desired.

However, a replacement battery module 800 may not always be available to a user. Accordingly, in various embodiments, the concrete mixer truck 10 may be provided with one or more features configured to allow for at least a limited degree of use of the concrete mixer truck 10 while the battery module 800 is being charged.

According to various embodiments, the concrete mixer truck 10 may be provided with a secondary battery 1160 configured as backup source of power that may be used to power some or all of the components of the concrete mixer truck 10 when the battery module 800 has been removed for charging and/or in other situations in which the battery module 800 is not able to power the concrete mixer truck 10. According to some embodiments, the secondary battery 1160 may be configured to power some or all of the concrete mixer truck 10 components only when the concrete mixer truck 10 is not being powered by the battery module 800. In other embodiments, the secondary battery 1160 may be used to power some or all of the concrete mixer truck 10 components simultaneously with the use of the battery module 800 to power the concrete mixer truck 10.

In some embodiments, the secondary battery 1160 may be entirely separate and discrete from the battery module 800. In some such embodiments, the secondary battery 1160 may additionally be located at an entirely discrete location of the concrete mixer truck 10 (not shown). In such embodiments, the secondary battery 1160 may optionally be integrated into and substantially irremovable from the concrete mixer truck 10. In other embodiments, despite being separate and discrete from the battery module 800, the secondary battery 1160 may be mounted to the concrete mixer truck 10 at a location that is substantially similar to the location at which the battery module 800 is mounted. In such embodiments, the secondary battery 1160 may optionally be configured to be attached physically and/or operatively to the same power hub (e.g. battery cooling system, power distribution system, etc.) to which the battery module 800 is attached. As will be understood, according to such embodiments in which the secondary battery 1160 is entirely separate and discrete from the battery module 800, the secondary battery 1160 remains attached to the concrete mixer over substantially the entire use of the concrete mixer truck 10.

Figure 44:
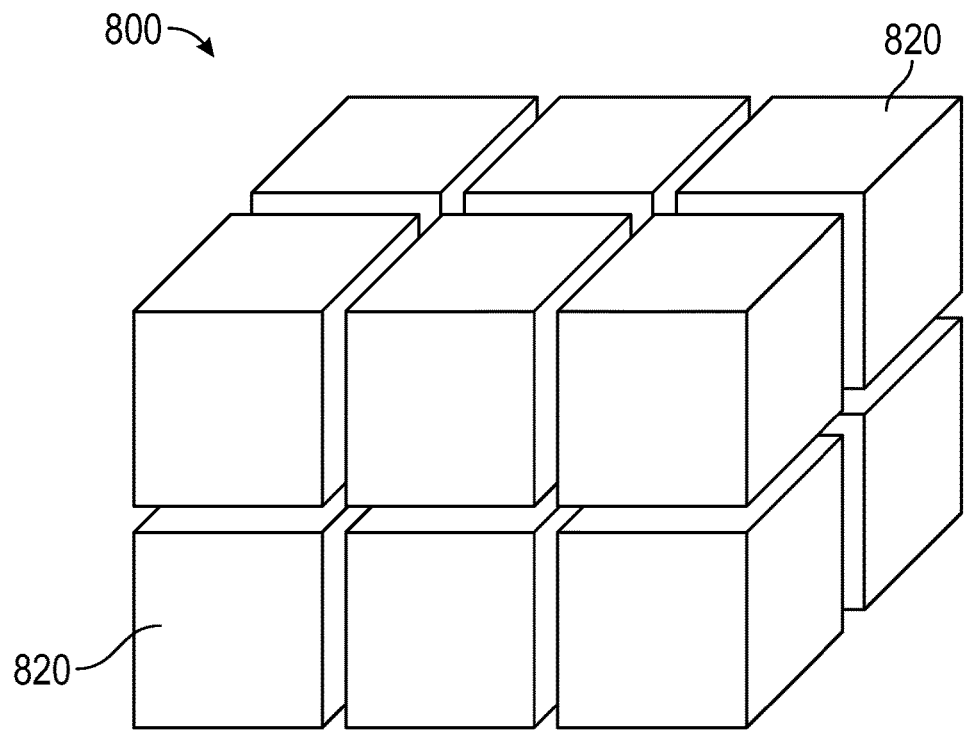
FIG. 44 is a perspective view of the battery module, according to an exemplary embodiment.

In some embodiments, the secondary battery 1160 may be defined by a portion of the battery module 800. As shown in FIG. 44 and described in detail with respect to FIGS. 49-53, according to various embodiments, the battery module 800 may be defined by a plurality of interconnected, detachable battery assemblies 820. In some such embodiments, one or more of the battery assemblies 820 defining the battery module 800 may selectively define the secondary battery 1160 over the course of use of the concrete mixer truck 10. More specifically, according to some embodiments, the removal assembly 1200 may be configured to selectively remove only a portion of the battery assemblies 820 defining the battery module 800 for charging, while leaving one or more battery assemblies 820 attached to the battery module frame 810. In such embodiments, those battery assemblies 820 left attached to the battery module frame 810 may define the secondary battery 1160 that is configured to continue to power some or all of the operations of the concrete mixer truck 10 as the remaining battery assemblies 820 are charged. In order to allow for such a selective removal of battery assemblies 820 from the concrete mixer truck 10, according to various embodiments, the removal assembly 1200 may include one or more of the same or different removal elements configured to assist in removing select battery assemblies 820.

Figure 45:
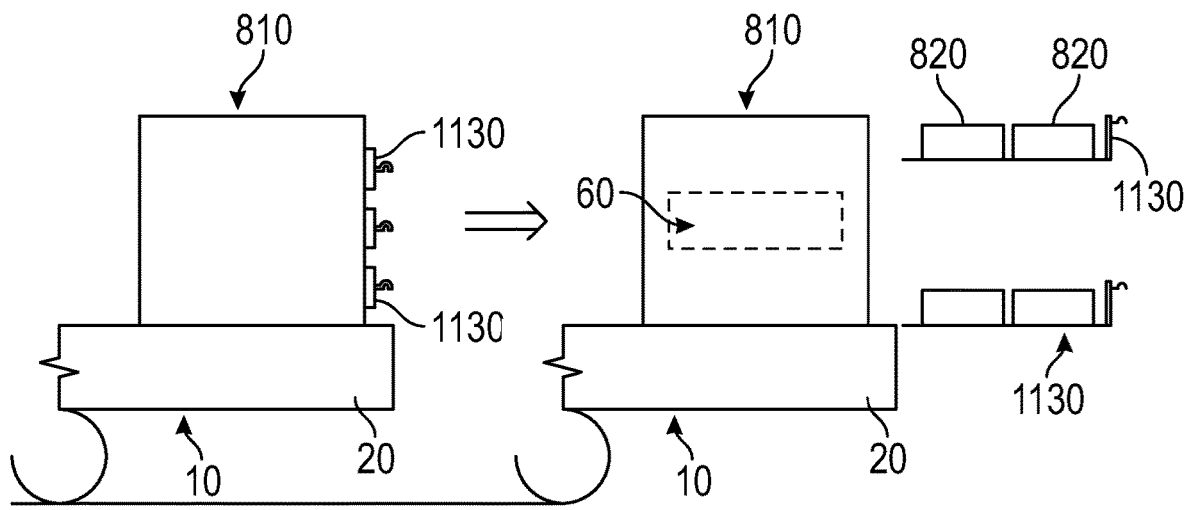
FIG. 45 is a view of a removal assembly for a secondary battery, according to an exemplary embodiment.

For example, as shown in FIG. 45 in some embodiments in which the secondary battery 1160 is defined by one or more of the battery assemblies 820 of the battery module 800, the battery module 800 may be defined by two or more stacked layers of battery assemblies 820, with one or more battery assemblies 820 being supported by support shelves 1130 of the battery module frame 810. In some such embodiments, the removal assembly may include transfer elements 1270 defined by tracks attached to the walls extending between adjacent support shelves 1130. Formed along the sides of the battery assemblies 820 may be transfer elements 1270 defined by one or more rollable elements configured to slide along the tracks attached to the walls 1135 of the mounting assembly. When it is desired to charge the battery module 800, one or more of the battery assemblies 820 may be removed from the battery module frame 810 by sliding the battery assemblies 820 outward from the battery module frame 810 and onto a support surface, while leaving at least one battery assembly 820 attached to the battery module frame 810 to define the secondary battery 1160. In a subsequent charging event, the one or more battery assemblies 820 that defined the secondary battery 1160 may be removed for charging, while leaving one or more of the previously charged battery assemblies 820 to define the secondary battery 1160.

According to various embodiments, besides providing a removal assembly 1200 configured to allow the selective removal of a portion of the battery assemblies 820 from the concrete mixer truck, the concrete mixer truck 10 may additionally be provided with one or more features to prevent or avoid situations in which the concrete mixer truck 10 is left without sufficient power required for it operation. In some embodiments, the battery module frame 810 and/or removal assembly 1200 may be configured to as to prevent, or initially block, a user from removing all of the battery assemblies 820 from the battery module frame 810, so as to avoid an unintentional situation in which the concrete mixer truck 10 is left without power. For example, in the embodiment described with reference to FIG. 45, according to some embodiments, the removal assembly 1200 and/or battery module frame 810 may include one or more features that would prevent all of the battery assemblies 820 being slid outwards from the shelves via the removal assembly 1200 transfer elements 1270 simultaneously unless overridden by a user. In such an embodiment, upon removal of the penultimate battery assembly 820 from its support shelf 1130, a lock prevents movement of the transfer elements 1270 of the remaining, unremoved battery assembly 820 may be triggered, thereby preventing the last battery assembly 820 from being removed from the concrete mixer truck 10.

According to other embodiments, the concrete mixer truck 10 may be provided with a power control module via which the user may select whether the secondary battery 1160 is to be used simultaneously with or independent of the use of the battery module 800 and/or via which the user may be able to select which, if any, of the components of the concrete mixer truck 10 are to be operated using the secondary battery 1160. In yet other embodiments, the concrete mixer truck 10 may optionally also, or alternatively, include a low-power mode that is automatically activated in response to the available power from the battery module 800 and/or secondary battery 1160 decreasing below a predetermined threshold. For example, in embodiments in which the secondary battery 1160 is used exclusively or primarily as a backup power source, upon detection of the battery module 800 being below a predetermined capacity, the secondary battery 1160 may be configured to limit the supply of power to certain non-critical components of the concrete mixer truck 10 until the battery module 800 has been replaced/recharged and/or the low-power mode has been overridden by a user. In yet other embodiments in which the secondary battery 1160 is used exclusively or primarily as a backup power source, the secondary battery 1160 may optionally also, or alternatively, be configured to prevent removal of the battery module 800 if the capacity of the secondary battery 1160 is detected to be below a threshold level (or unless the overridden by a user). In such a manner, situations in which the concrete mixer truck 10 is rendered entirely inoperable shortly and/or immediately after removing the battery module 800 may be prevented or minimized.

Exemplary Method of Replacing the Primary Power Source

As described herein, the concrete mixer truck 10 battery module frame 810 and accessory module 600 are each configured to facilitate the ability of a user to replace a first primary power source (e.g., an internal combustion engine, a first battery module) with a second, different type of primary power source (e.g., battery module 800) with a minimal amount of effort, time, and money. In particular, the easily accessible arrangement of the primary power source at the rear of the concrete mixer truck 10 (as opposed to, e.g., conventional concrete mixer vehicle configurations in which the power source is integrated within the concrete mixer vehicle) provides a user to with easy access to the primary power source without requiring disassembly of the concrete mixer truck 10.

The attachment of the battery module 800 to the concrete mixer truck 10 using a releasable battery module frame 810 as described above further facilitates the removal of the battery module 800 from the concrete mixer truck 10. In addition to allowing the battery module 800 to be easily detached and removed from the concrete mixer truck 10, the engagement structures 813 allow the user to easily reuse at least a portion of the battery module frame 810 to support a second, different type of battery module 800, thus obviating the need to make any structural modifications to the chassis 20 when it is desired to replace the primary power source with a new, different type of primary power source.

Additionally, the centralized, substantially universal arrangement and integration of drive elements provided by the accessory module 600 minimizes, or obviates, the need for a user to disassemble, replace, reconfigure and/or modify the concrete mixer truck 10 to accommodate the various drive elements that would otherwise be necessitated by the substitution of a first type of primary power source with a second, different type of primary power source.

According to various embodiments, the initial configuration of the concrete mixer truck 10 may include an accessory module (e.g., the accessory module 600) that is provided according to varying levels of completeness. For example, in some embodiments, the concrete mixer truck 10 may be provided with a fully integrated and assembled accessory module 600, in which all of the drive elements of the concrete mixer truck 10 are operably coupled to second end 605 of a PTO shaft 602 extending from the transmission 304. In such embodiments, when it is desired to retrofit the concrete mixer truck 10 with a second, different type of primary power source, the conversion of the concrete mixer truck 10 may require only that a user remove the primary power source (e.g., a first battery module 800) from the battery module frame 810, and reattach to the battery module frame 810 the second primary power source.

According to other embodiments, the accessory module 600 may be provided in a partially arranged configuration in which a portion of the drive elements of the concrete mixer truck 10 are operably attached to the second end 605 of the PTO shaft 602 in an initial configuration of the concrete mixer truck 10. In such embodiments, some or all of the remaining drive elements may be structurally or otherwise operably attached to the first primary power source, such that the removal of the primary power source results in the removal of these drive elements from the concrete mixer truck 10 as well. Accordingly, in some embodiments, the process of retrofitting the concrete mixer truck 10 to include a second, different type primary power source may include incorporating some or all of the drive elements removed with the primary power source into the accessory module 600. As will be understood, in embodiments in which not all of the removed drive elements are incorporated into the accessory module 600, some or all of these drive elements that are not incorporated into the accessory module 600 may instead be attached to or otherwise operably connected to the new, second primary power source. As will be understood, in embodiments in which the second primary power source of the concrete mixer truck 10 is replaced one or more times, any drive elements that are removed with the replaced primary power source may similarly either be incorporated into the accessory module 600, or may be attached to the replacement primary power source.

In yet other embodiments, the concrete mixer truck 10 may initially be provided without an accessory module 600. In such embodiments, upon replacement of the first primary power source, the concrete mixer truck 10 may be provided with an accessory module 600 by operably attaching a first end 603 of a PTO shaft 602 to the transmission 304, and attaching some or all of the drive elements removed with the removal of the first battery primary power source to a second end 605 of the PTO shaft 602. The PTO shaft 602 may be provided either as a new, discrete structure, or as a modified existing structure of the concrete mixer truck 10 (e.g. as a shortened a drive shaft that was operably attached to a removed engine-based primary power source). Any remaining drive elements may be attached to the second primary power source. With subsequent replacements of the primary power source, some or all of the drive elements removed with the removal of the primary power source may be added to the accessory module or may be reincorporated into the concrete mixer truck 10 via an attachment to the replacement primary power source.

Figure 46A:
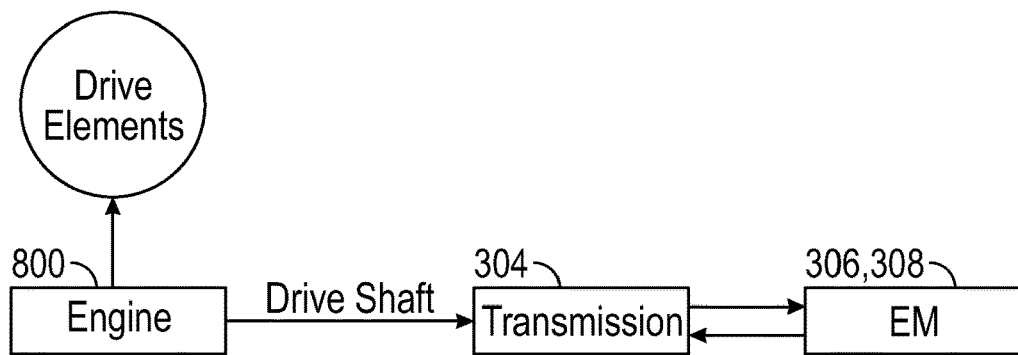
FIG. 46A is a block diagram of the concrete mixer truck having an engine-defined primary power source, according to an exemplary embodiment.
Figure 46B:
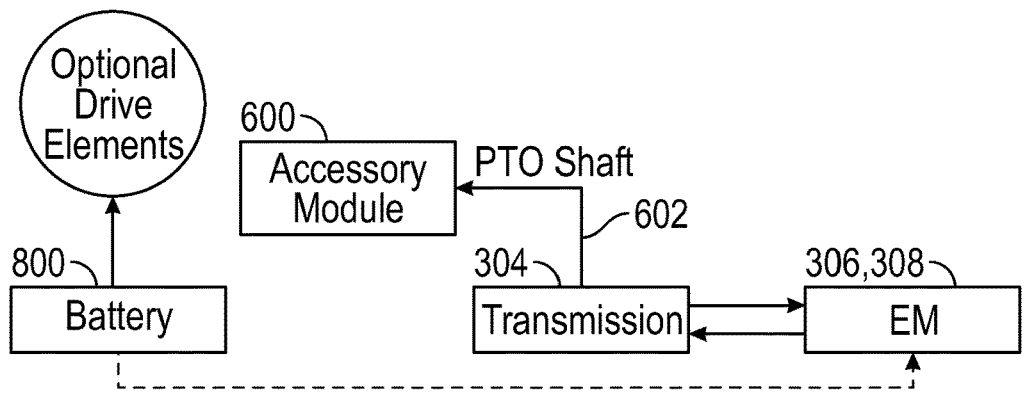
FIG. 46B is a block diagram of the concrete mixer truck of FIG. 46A that has been converted to include a battery module-based primary power source, according to an exemplary embodiment.

Referring to FIGS. 46A and 46B, a block diagram illustrating a method according to one exemplary embodiment of converting an engine-based concrete mixer truck 10 to being powered by a battery module is shown. Referring to FIG. 46A, in an initial, engine-based configuration of the concrete mixer truck 10, a drive shaft operably connects the engine to the transmission 304, and optionally to the one or more electromagnetic devices 306, 308. As also shown in FIG. 46A, according to some embodiments of a concrete mixes truck 10 having an initial configuration defined by an engine-based primary power source, all of the drive elements of the concrete mixer truck may be directly of otherwise operably attached to the engine, such that the concrete mixer truck 10 does not initially includes an accessory module. As shown in FIG. 46B, upon replacing the engine with a battery module that is operably attached to the electromagnetic device 306, 308, the drive shaft may be removed from the concrete mixer truck 10, with a first end 603 of a PTO shaft being reattached to the transmission 304 in place of the drive shaft. Alternatively, in some embodiments, the drive shaft may be shortened (e.g. by cutting, using a telescoping structure, etc.) to convert the drive shaft into the PTO shaft 602. The drive elements removed with the removal of the engine-based primary power source may then be supported by the frame and operably attached to the second end 605 of the PTO shaft 602. In embodiments in which not all of the drive elements are integrated into the accessory module, some or all of the remaining drive elements may be operably attached to the battery-module based primary power source.

Figure 47A:
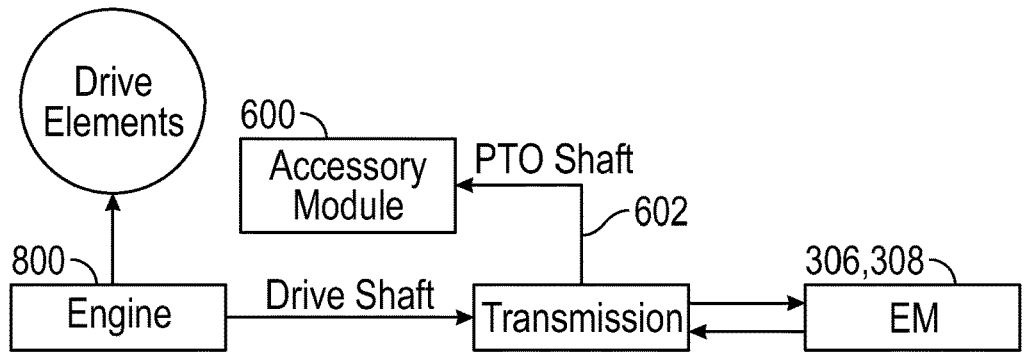
FIG. 47A is a block diagram of a concrete mixer truck having an engine-defined primary power source, according to an exemplary embodiment.
Figure 47B:
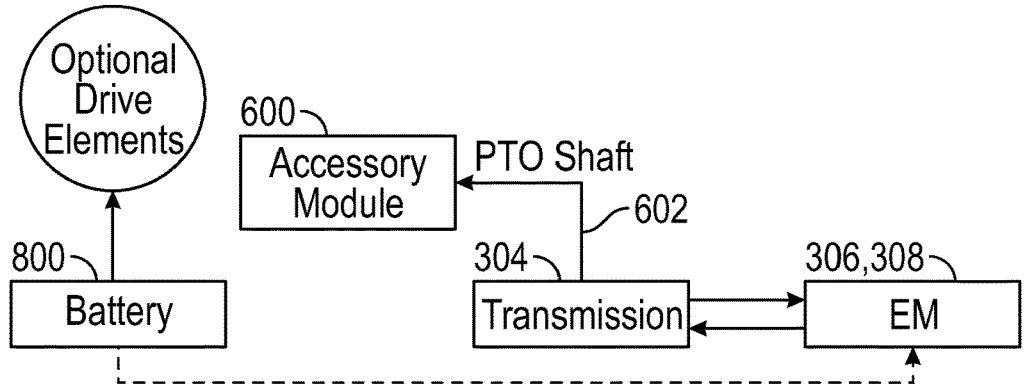
FIG. 47B is a block diagram of the concrete mixer truck of FIG. 47A that has been converted to include a battery module-based primary power source, according to an exemplary embodiment.

In some embodiments, it may be anticipated that a concrete mixer truck including an initially engine-based primary power source may eventually be converted into an exclusively electric powered vehicle having a battery-module based primary power source (e.g., battery module 800). Accordingly, as illustrated in FIGS. 47A and 47B, in some embodiments, the concrete mixer truck 10 may include at least a partially configured accessory module 600 provided with the initial engine-based primary power source. As shown in FIG. 47A, in such embodiments, the PTO shaft 602 operably attached to the transmission 304 may be provided in addition to a drive shaft extending between the transmission 304 and the engine. In some such embodiments, all of the drive elements may be attached to the engine in the original configuration of the concrete mixer truck 10, with some or all of the drive elements being integrated into the accessory module 600 with the conversion of the concrete mixer truck 10 to a battery-module based primary power source, as e.g. illustrated in FIG. 47B. Alternatively, in some embodiments, at least some of the drive elements may initially be operably attached to the PTO shaft 602 in the initial engine-based concrete mixer truck 10 configuration, with some or all of the remaining drive elements being integration into the accessory module 600 with the substitution of the engine with a battery module. In yet other embodiments, all of the drive elements may be operably attached to the PTO shaft 602 in the engine-based concrete mixer truck 10 configuration. As will be understood, in such embodiments, once it is desired to convert the concrete mixer truck 10 to an exclusively electric-powered, battery module-based vehicle, it may be sufficient to remove and replace the engine and attached drive shaft with a battery module (e.g., battery module 800).

Power Management

Figure 48:
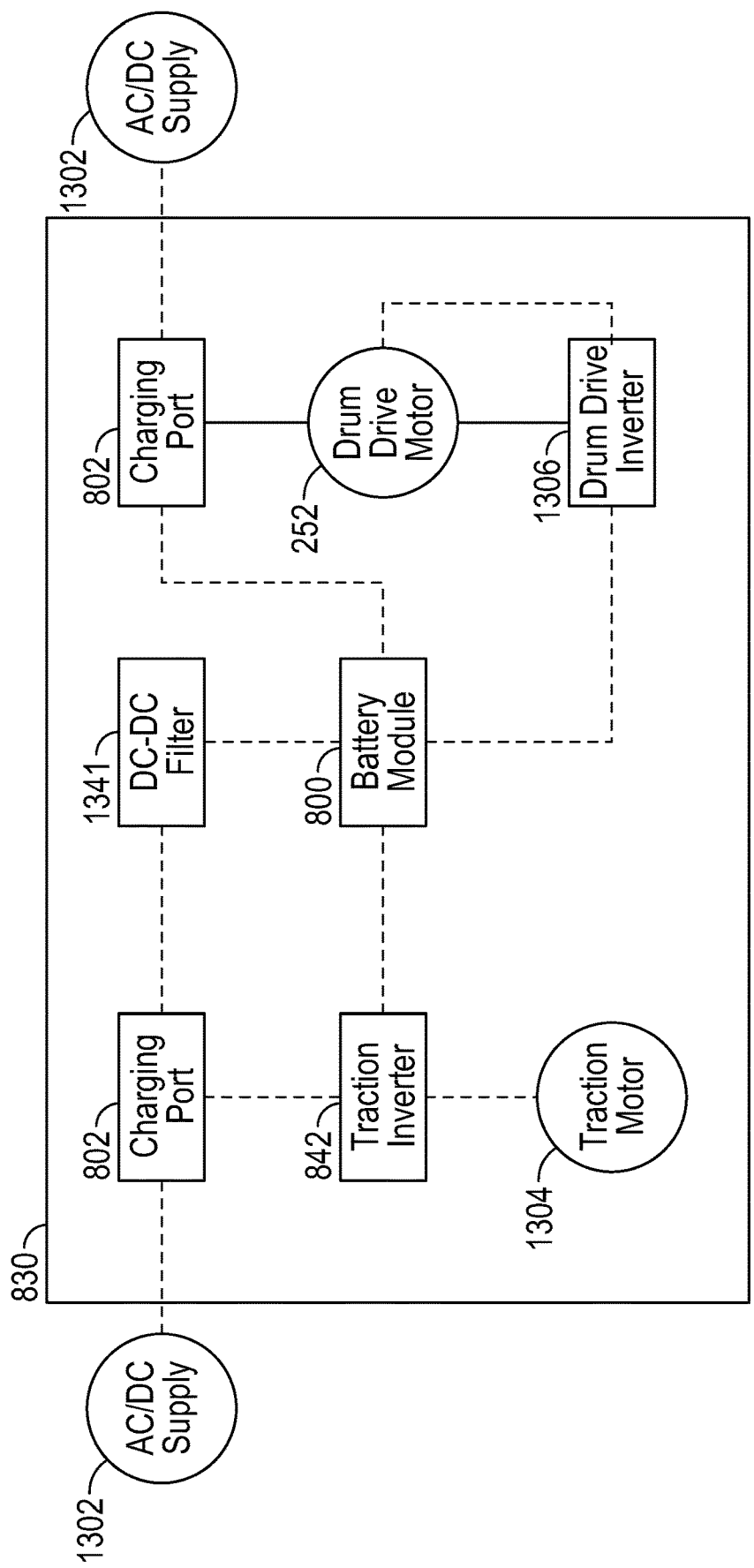
FIG. 48 is a block diagram of a power management system, according to an exemplary embodiment.

Turning to the block diagram of FIG. 48, according to various embodiments, a power management system 830 is defined by a battery module 800, a charging port 802, a traction inverter 842, and a traction motor 1304. In various embodiments, the traction motor 1304 may comprise two or more electromagnetic devices, such as the first electromagnetic device 306 and/or the second electromagnetic device 308. For example, the traction motor 1304 may be functionally similar to or the same as at least a portion of drive systems 300 or 1000. As also shown in FIG. 48, the power management system 830 may optionally also include a drum drive inverter 1306 and the drum drive motor 252 of the concrete mixer truck 10. The drum drive inverter 1306, for example, may be included when the drum driver 214 is electrically powered. As will be described with more reference to FIGS. 57-66 below, according to various embodiments, the power management system 830 may include any number of, or combination of additional components configured to filter or otherwise modify the flow of electricity through the power management system 830.

In addition to the one or more filtering or otherwise charge modifying elements that may be incorporated into the power management system 830, according to various embodiments, any number of other additional systems or components may also be incorporated into and/or used with the power management system 830. For example, the power management system 830 may include a junction box that may include couplers, such as, e.g., bus bars that electrically couple various components of the power management system 830. The junction box may also include one or more power disconnect devices, such as, e.g., breakers, fuses, etc. configured to electrically decouple components when needed, such as, e.g., when the current flowing therethrough exceeds a threshold level. In various embodiments, the power management system 830 may also include any number of different cooling system components and arrangements that are configured to remove thermal energy from one or more of the other components of the power management system 830.

The battery module 800, as described herein, may be defined by one or more individual battery units (e.g., lithium ion batteries, lead acid batteries, nickel-cadmium batteries, etc.) that store energy chemically. Alternatively, or additionally, the battery module 800 may include one or more capacitors or supercapacitors. In some embodiments in which the battery module 800 is defined by a plurality of battery units, the power management system 830 may include one or more battery disconnect units configured to selectively electrically couple/decouple one or more of the battery units from the rest of the power management system 830. The battery module 800 of the power management system 830 may be defined having any desired capacity. For example, in some embodiments, the battery module 800 may have a capacity of approximately 300 kilowatt hours. In other embodiments, the battery module 800 may have a capacity greater than or less than 300 kilowatt hours.

According to various embodiments, the power management system 830 may include a battery management controller configured to control operation of the flow of current during charging of the battery module 800 and/or during use of the battery module 800 to power the operation of any one or more components of the concrete mixer truck 10. The battery management controller may comprise any number of switches or other elements configured to selectively couple and/or decouple one or more components of the power management system 830 from other components of the power management system 830, such as, e.g., the battery module 800. In various embodiments, the battery management controller may be configured to selectively couple and/or decouple the various components of the power management system 830 so as to enable operation of the concrete mixer truck 10 according to any number of different operating modes, including any of the various operating modes described below with reference to FIGS. 67-69D. In embodiments in which the battery module 800 is defined by a plurality of battery units connected to one another via one or more battery disconnect units, the battery management controller may also optionally be configured to provide selective control over the operation of the battery disconnect units. In yet other embodiments, the battery management controller may be configured to additionally, or alternatively, also monitor the health of the battery module 800.

Figure 51:
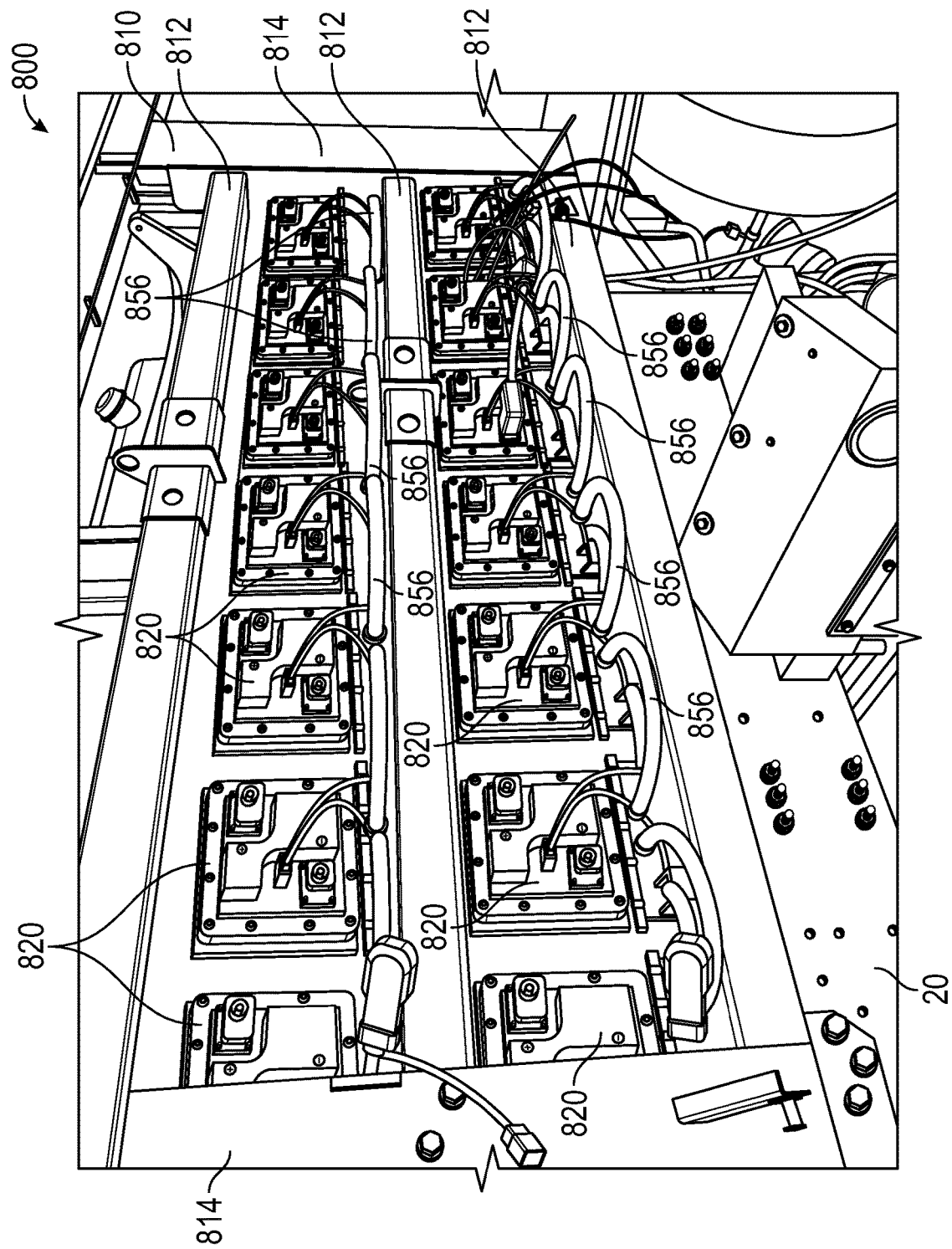
FIGS. 51-53 are perspective views of battery assemblies of a battery module on the frame of FIGS. 29-30B, according to an exemplary embodiment.
Figure 52:
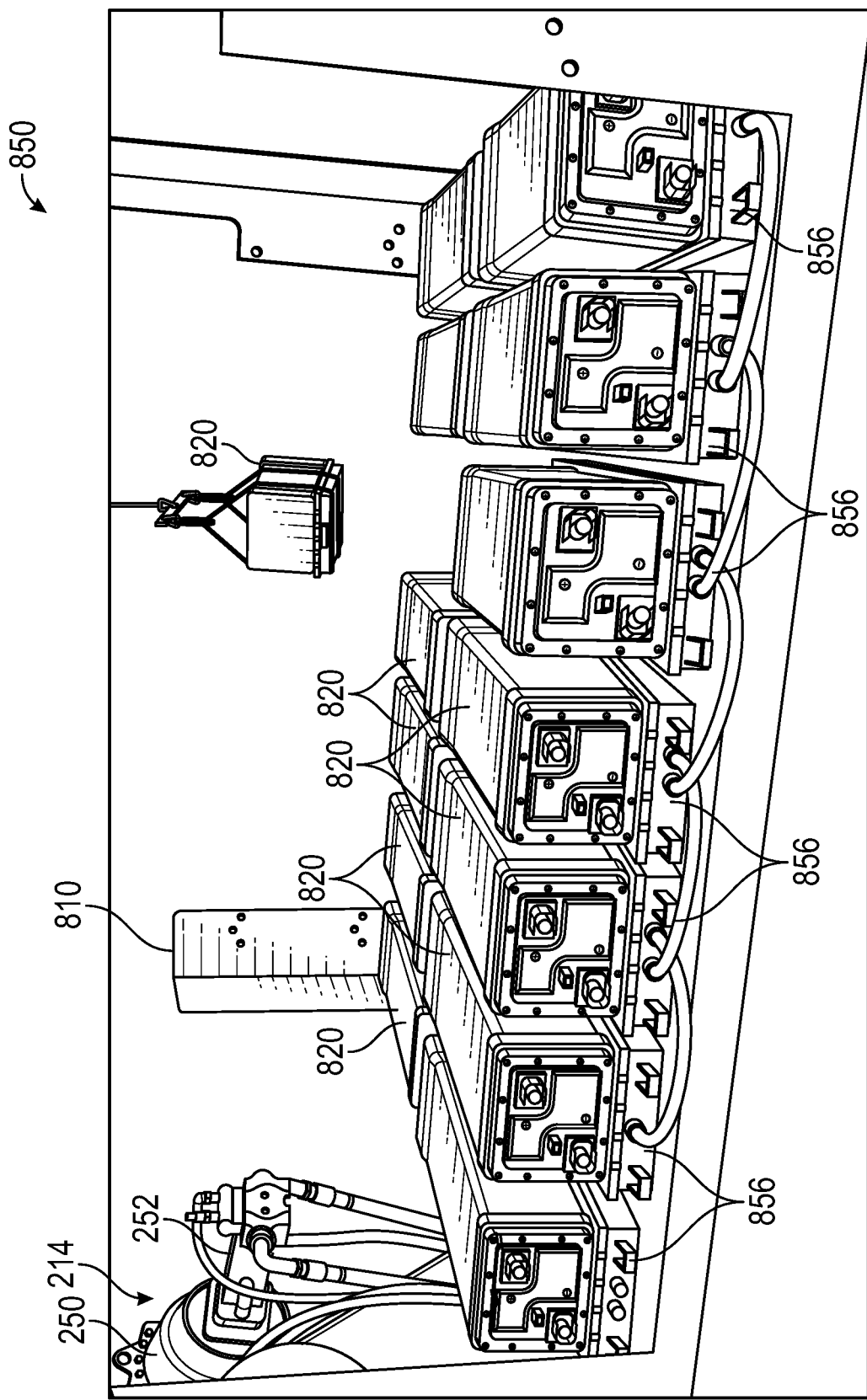
Figure 53:
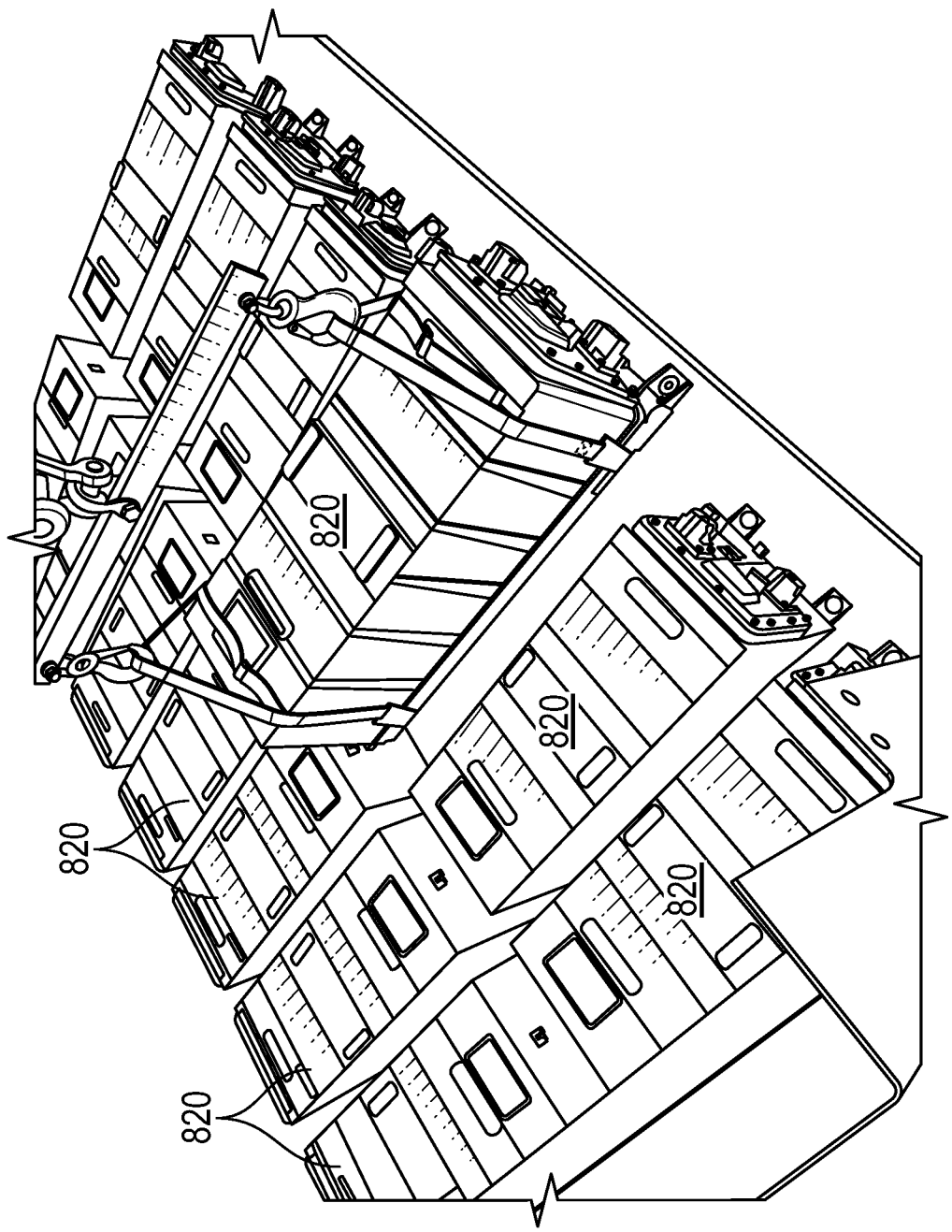

Referring to FIGS. 49-53, the battery module 800 further includes a series of energy storage devices, shown as battery assemblies 820. Each battery assembly 820 is configured to store, and subsequently provide, electrical energy that is used to power the first electromagnetic device 306 and the second electromagnetic device 308. The battery assemblies 820 may contain one or more individual batteries (e.g., lithium ion batteries, lead acid batteries, nickel-cadmium batteries, etc.) that store energy chemically. The battery assemblies 820 may additionally or alternatively include one or more capacitors or supercapacitors. The battery assemblies 820 are coupled to the battery module frame 810. Specifically, the battery assemblies 820 are placed atop the bottom two of the base portions 812. As shown in FIGS. 51-53, two rows, each with seven battery assemblies 820, are placed atop each support plate 1104 for a total of twenty eight battery assemblies 820. In other embodiments, the battery module 800 includes more or fewer battery assemblies 820. In one embodiment, the battery module 800 has a capacity of approximately 300 kilowatt hours. In other embodiments, the battery module 800 has a capacity greater than or less than 300 kilowatt hours. In some embodiments, each battery assembly 820 includes a battery controller configured to control operation of the battery assembly 820. By way of example, the battery controller may be configured to control which battery cells are being charged and/or drawn from. By way of another example, the battery controller may be configured to interact with one or more sensors to determine the health of the battery assembly 820. In one embodiment, such a controller is controlled with a 24 volt circuit.

Figure 54:
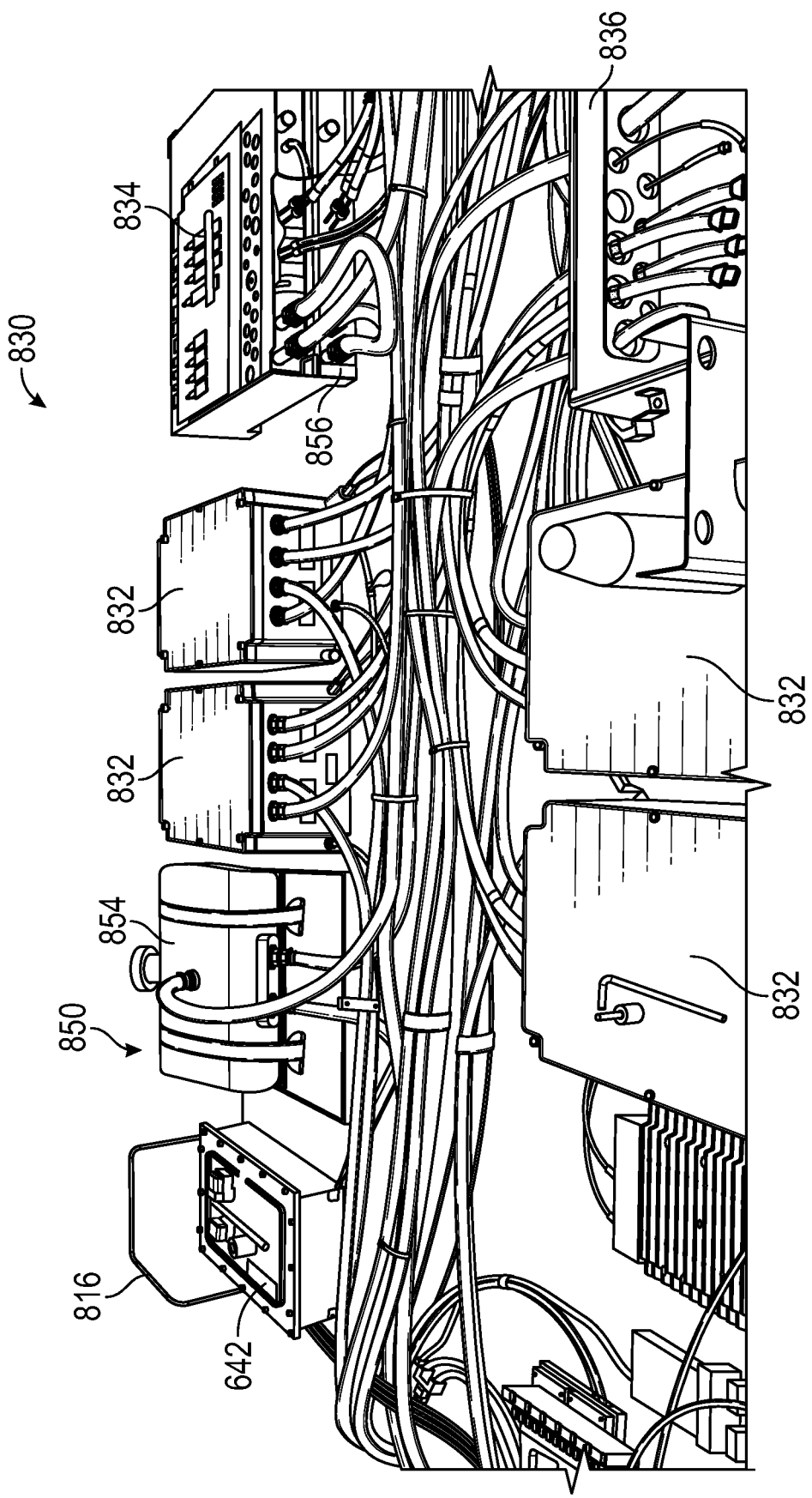
FIGS. 54-56 are perspective views of the power management system of the battery module arranged on the frame of the battery module, according to an exemplary embodiment.
Figure 55:
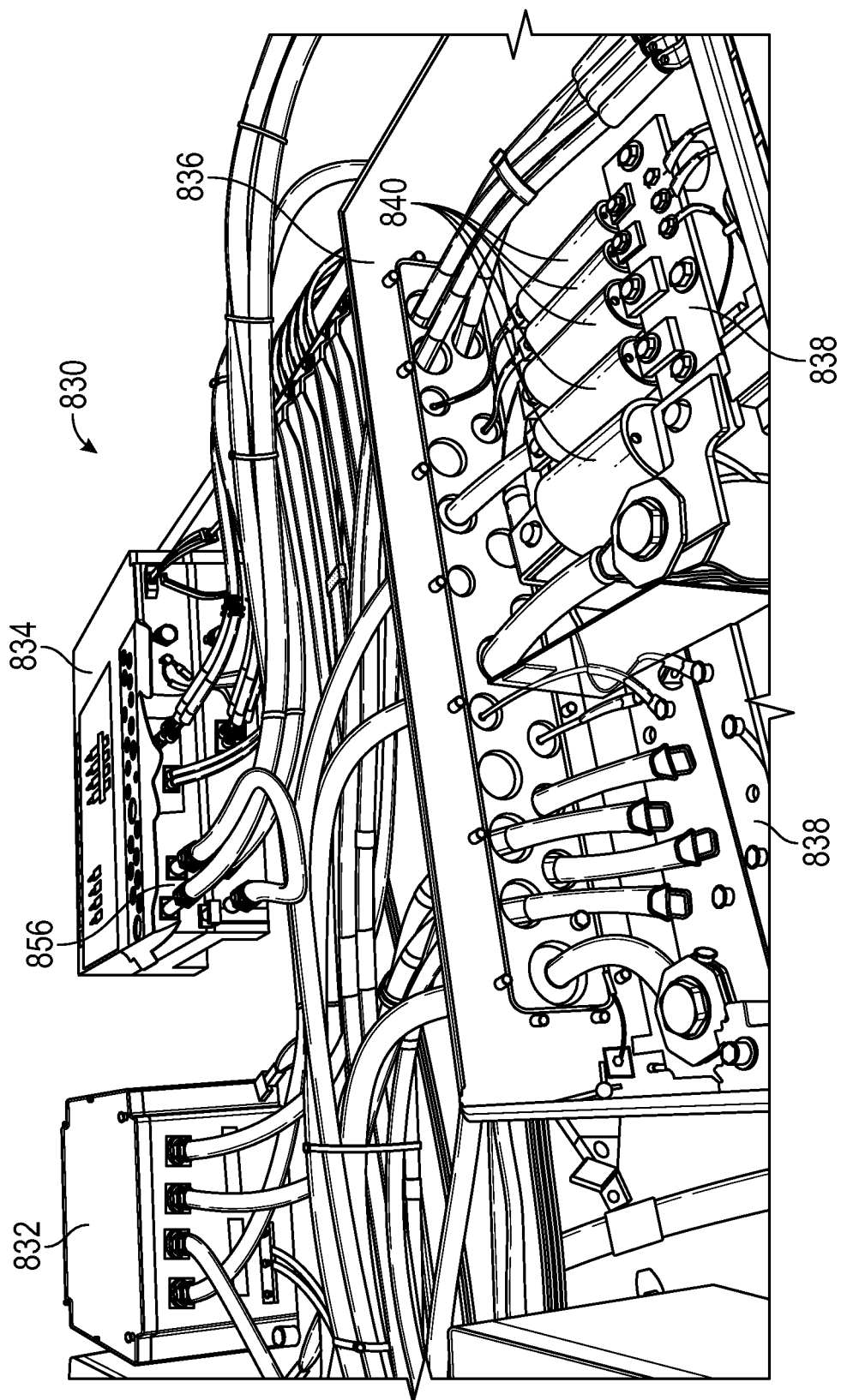
Figure 56:
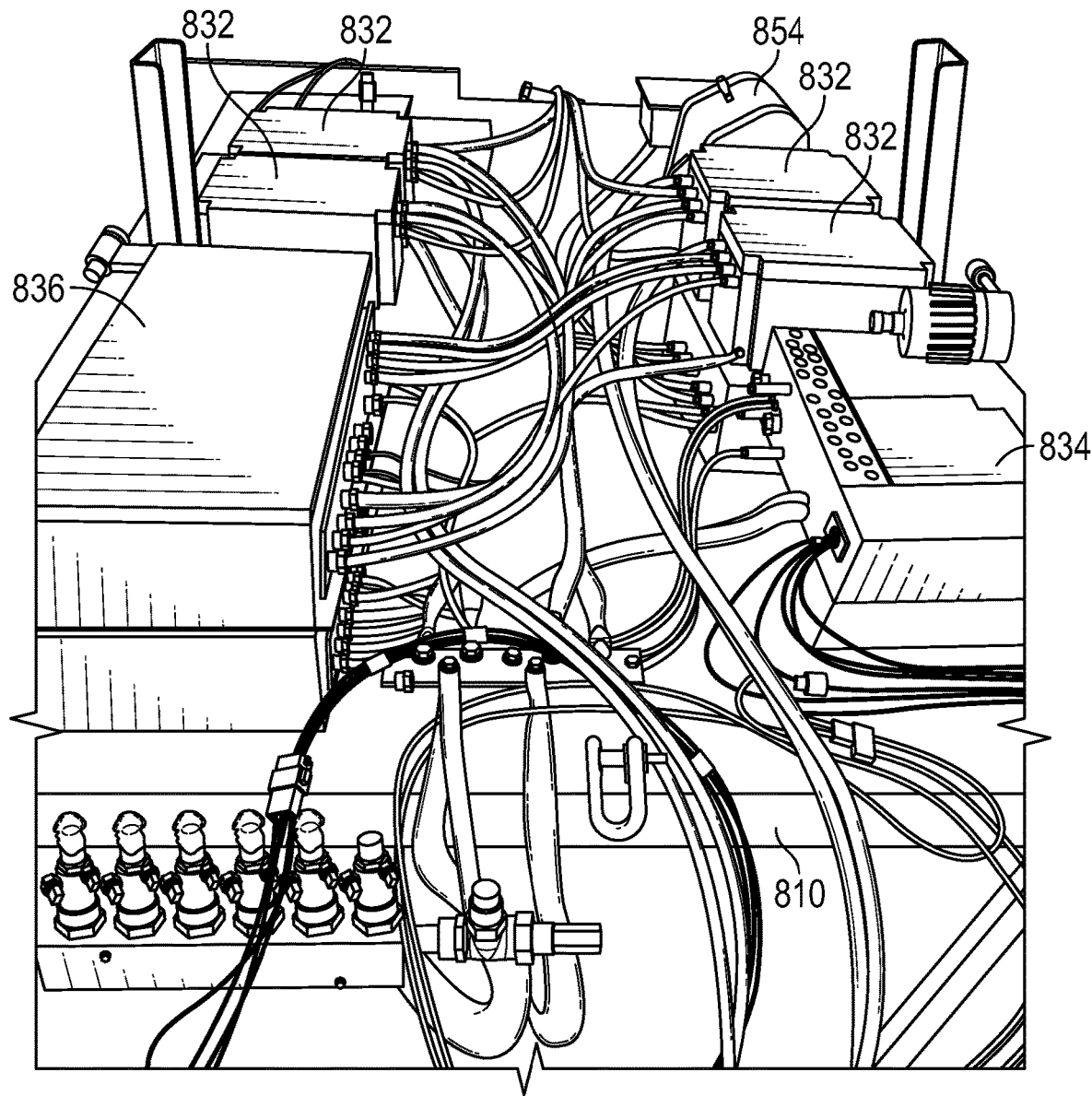

Referring to FIGS. 54-56, the battery module 800 further includes a power management system 830 configured to condition, convert, distribute, or otherwise manage the electrical energy flowing to and from the battery assemblies 820. The power management system 830 is electrically coupled to the battery assemblies 820, the charging port 802, the first electromagnetic device 306, and the second electromagnetic device 308.

The power management system 830 includes a variety of power management devices electrically coupled to one another. The power management system 830 includes a series of first power management devices, shown as battery disconnect units 832. Each battery disconnect unit 832 is configured to selectively electrically decouple one or more of the battery assemblies 820 from the rest of the power management system 830 (i.e., isolate one or more of the battery assemblies 820). The battery disconnect units 832 may be activated to isolate the battery assemblies 820 during maintenance of the battery module 800. The power management system 830 further includes a power management device, shown as inverter 834. The inverter 834 is electrically coupled to the charging port 802 and the battery assemblies 820. The inverter 834 is configured to convert alternating current electrical energy from an outside power source (e.g., the power grid, a generator, etc.) received through the charging port 802 to direct current electrical energy to charge the battery assemblies 820. The power management system 830 further includes a power management or power distribution device, shown as junction box 836. The junction box 836 is configured to distribute electrical energy throughout the concrete mixer truck 10 (e.g., between the inverter 834, the battery assemblies 820, the first electromagnetic device 306, and the second electromagnetic device 308, etc.). The junction box 836 includes couplers, shown as bus bars 838 that electrically couple various components. The junction box 836 also includes power disconnect devices (e.g., breakers, fuses, etc.), shown as fuses 840. The fuses 840 are configured to electrically decouple components when the current flowing therethrough exceeds a threshold level. The battery disconnect units 832, the inverter 834, and the junction box 836 rest atop and are coupled to the top one of the base portions 812.

Referring again to FIG. 11, the concrete mixer truck 10 further includes a power management device, shown as traction inverter 842. The traction inverter 842 is coupled to the chassis 20 beneath the mixing drum 202. The traction inverter 842 is electrically coupled to the battery module 800, the first electromagnetic device 306 and the second electromagnetic device 308. Specifically, the traction inverter 842 is electrically coupled to the battery assemblies 820. The traction inverter 842 is configured to convert direct current electrical energy from the battery assemblies 820 to alternating current electrical energy to power the first electromagnetic device 306 and the second electromagnetic device 308. In some embodiments, the traction inverter 842 is additionally configured to convert alternating current electrical energy (e.g., produced by the first electromagnetic device 306 and/or the second electromagnetic device 308 during regenerative braking, etc.) to direct current to recharge the battery assemblies 820.

When charging the battery assemblies 820, the charging port 802 is configured to receive alternating current electrical energy from an outside source (e.g., the power grid, etc.) and supply the alternating current electrical energy to the inverter 834. In some embodiments, the inverter 834 is configured to receive 480 volt, three phase, alternating current electrical energy through the charging port 802. In some embodiments, the inverter 834 is configured to receive electrical energy at a current of up to 80 amps. The inverter 834 is configured to convert the alternating current electrical energy to direct current electrical energy, which is supplied to the battery assemblies 820 to charge the battery assemblies 820.

When operating the concrete mixer truck 10, the battery assemblies 820 are drained, providing direct current electrical energy to the traction inverter 842. The traction inverter 842 converts the direct current electrical energy from the battery assemblies 820 to alternating current electrical energy, which is supplied to the first electromagnetic device 306 and/or the second electromagnetic device 308 to power the power plant module 302. In one embodiment, the first electromagnetic device 306 and the second electromagnetic device 308 are configured to receive 700 volt alternating current electrical energy.

Traction Inverter

The traction inverter 842 is configured to transfer energy stored in the battery module 800 to the traction motor 1304 to provide power to the tractive assembly of the concrete mixer truck 10 during transport. In embodiments in which the traction motor 1304 is powered using an alternating current, the traction inverter 842 is configured to convert direct current from the battery module 800 into the alternating current used by the traction motor 1304. According to various embodiments, the traction motor 1304 may be configured to receive 700-volt alternating current electrical energy from the traction inverter 842. In some embodiments, the traction inverter 842 is configured to receive electrical energy at a current of up to 80-amps.

Figure 57:
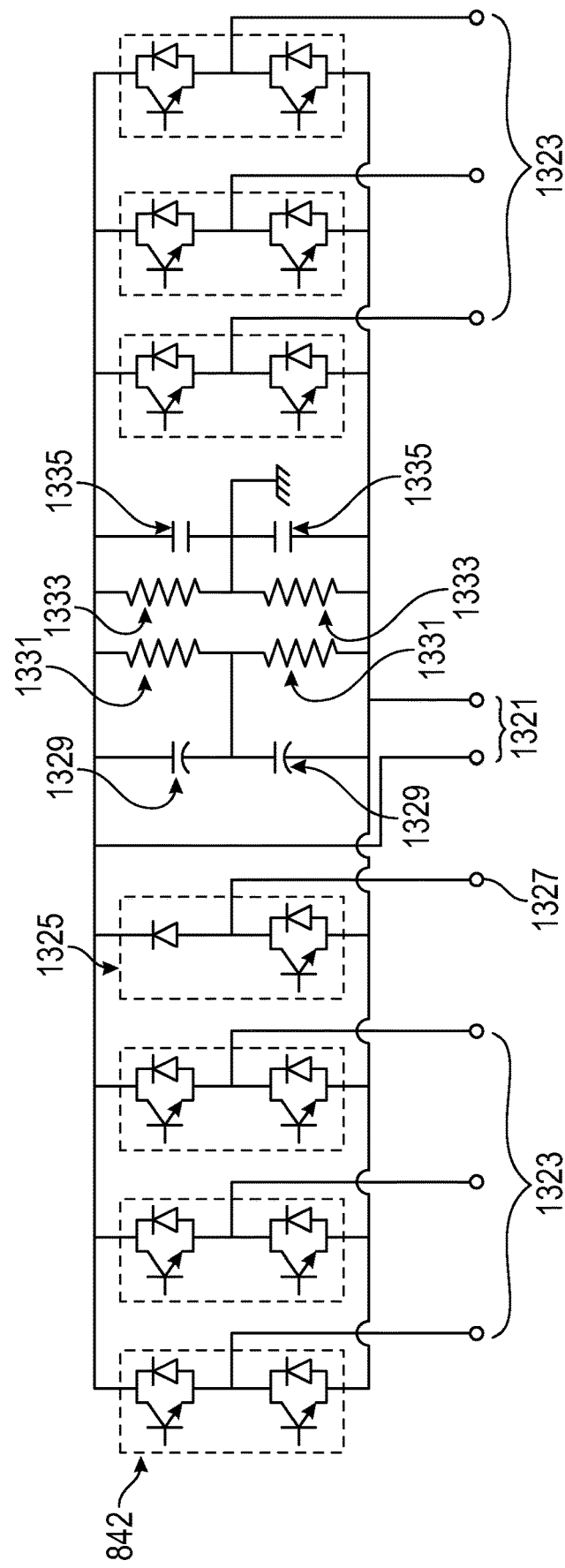
FIG. 57 is a topology of a traction inverter circuit, according to an exemplary embodiment.

Referring to FIG. 57, one exemplary embodiment of a traction inverter 842 that may be utilized in the power management system 830 is illustrated. As illustrated by FIG. 57, according to various embodiments, the traction inverter 842 may be defined as a dual-three phase H-bridge inverter having a DC input 21 and two motor outputs 23. As also illustrated by the traction inverter 842 embodiment of FIG. 57, according to various embodiments, the traction inverter 842 may optionally additionally include any one or more of: a brake chopper circuit 1325 and brake chopper output 1327, DC-bus capacitors 1329, balance/bleed resistors 1331, a DC-bus voltage measurement circuit 1333; EMI filters 1335, etc. As will be understood, according to other embodiments, any number of other, different traction inverter 842 arrangements may be used as desired.

As noted above, according to various embodiments, the power management system 830 is configured to minimize the components required to power the concrete mixer truck 10 to advantageously minimize both costs and additional weight associated with the incorporation of additional elements into a vehicle by reutilizing one or more of the components of the power management system 830 to serve different functions during different operating modes of the concrete mixer truck 10. Accordingly, in addition to being used to convert direct current received from the battery module 800 into alternating current that is supplied to the traction motor 1304, according to various embodiments the traction inverter 842 may additionally be used during the charging of the battery module 800 using externally sourced electrical energy received via the charging port 802.

In particular, the power management system 830 may be configured to receive externally sourced electrical energy (either as alternating current or as direct current) via the charging port 802 from an external power grid or other source. In some embodiments, the charging port 802 may be configured to receive 480-volt, three phase alternating current to power the battery module 800. The charging port 802 may be configured to receive electrical energy from Level 1, Level 2, and/or Level 3 charging stations and/or any other source of electric energy. As will be described in more detail below, the traction inverter 842 alone, or optionally in combination with one or more of the filtering or other charge modifying elements (e.g., motor windings, inductors, diodes, etc.) optionally included as part of the power management system 830, may be used to convert the received externally sourced electrical energy into direct current which may be used to charge the battery module 800.

As noted above, according to some embodiments, the power management system 830 may additionally include the drum drive motor 252 and drum drive inverter 1306 of the concrete mixer truck 10. According to some such embodiments, the power management system 830 may include an additional charging port 802 configured to receive externally sourced alternating current and/or direct current that may be use to power the drum drive motor 252 and/or to charge the battery module 800 during one or more operating modes of the concrete mixer truck 10.

Alternatively, in order to further minimize the amount of components of the concrete mixer truck 10, according to some embodiments, the battery management controller may be configured to allow for the selective coupling of the traction inverter 842 to the drum drive motor 252. As will be understood, according to such embodiments, the drum drive inverter 1306 may optionally be omitted from the concrete mixer truck 10. Additionally, or alternatively, in some embodiments, the battery management controller may be configured to selectively couple the mixing assembly of the concrete mixer truck to the traction motor 1304, allowing the operation of the mixing assembly to be effectuated using the traction motor 1304, and thus allowing one or both of the drum drive inverter 1306 and/or drum drive motor 252 to be omitted from the concrete mixer truck 10.

Figure 58:
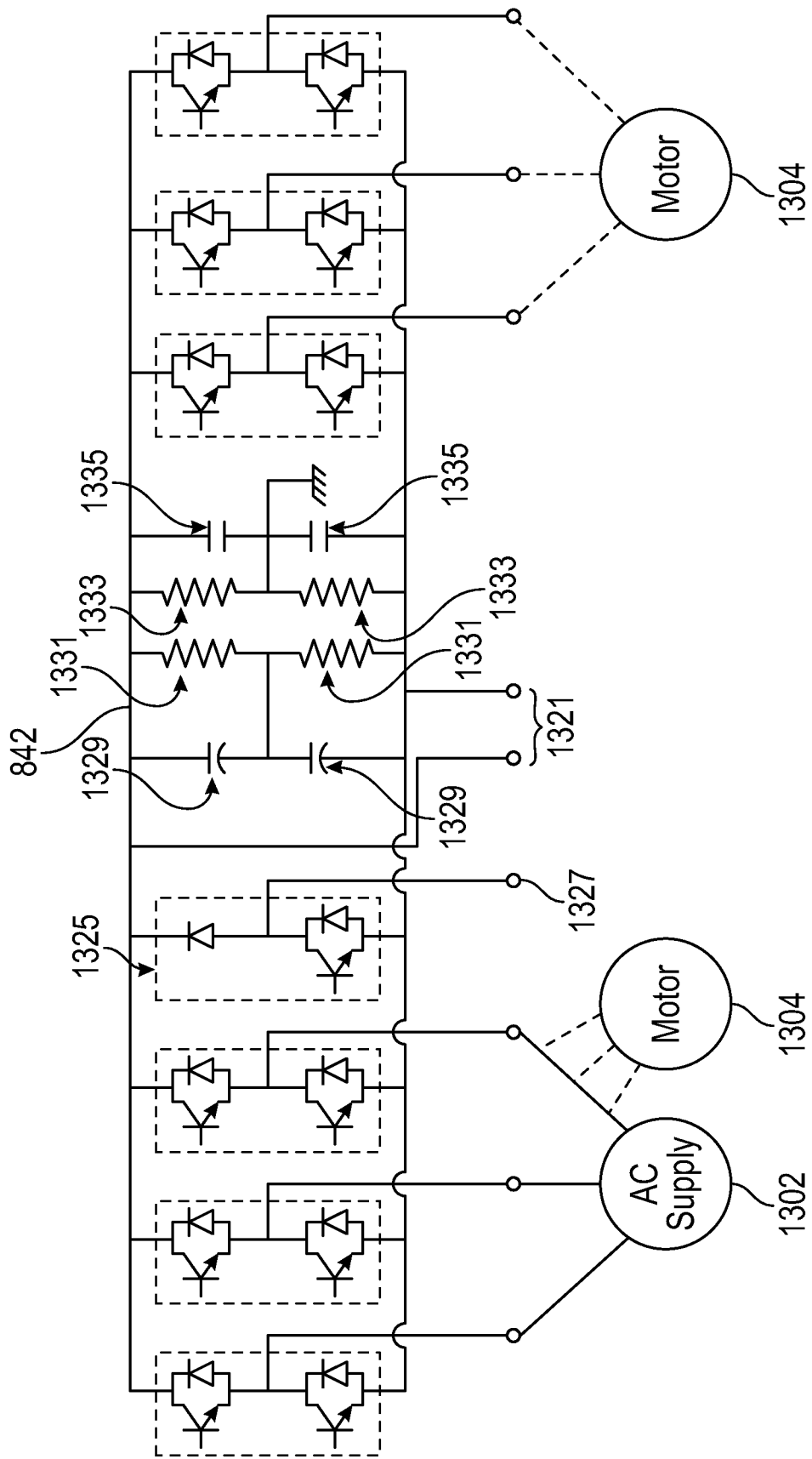
Figure 59:
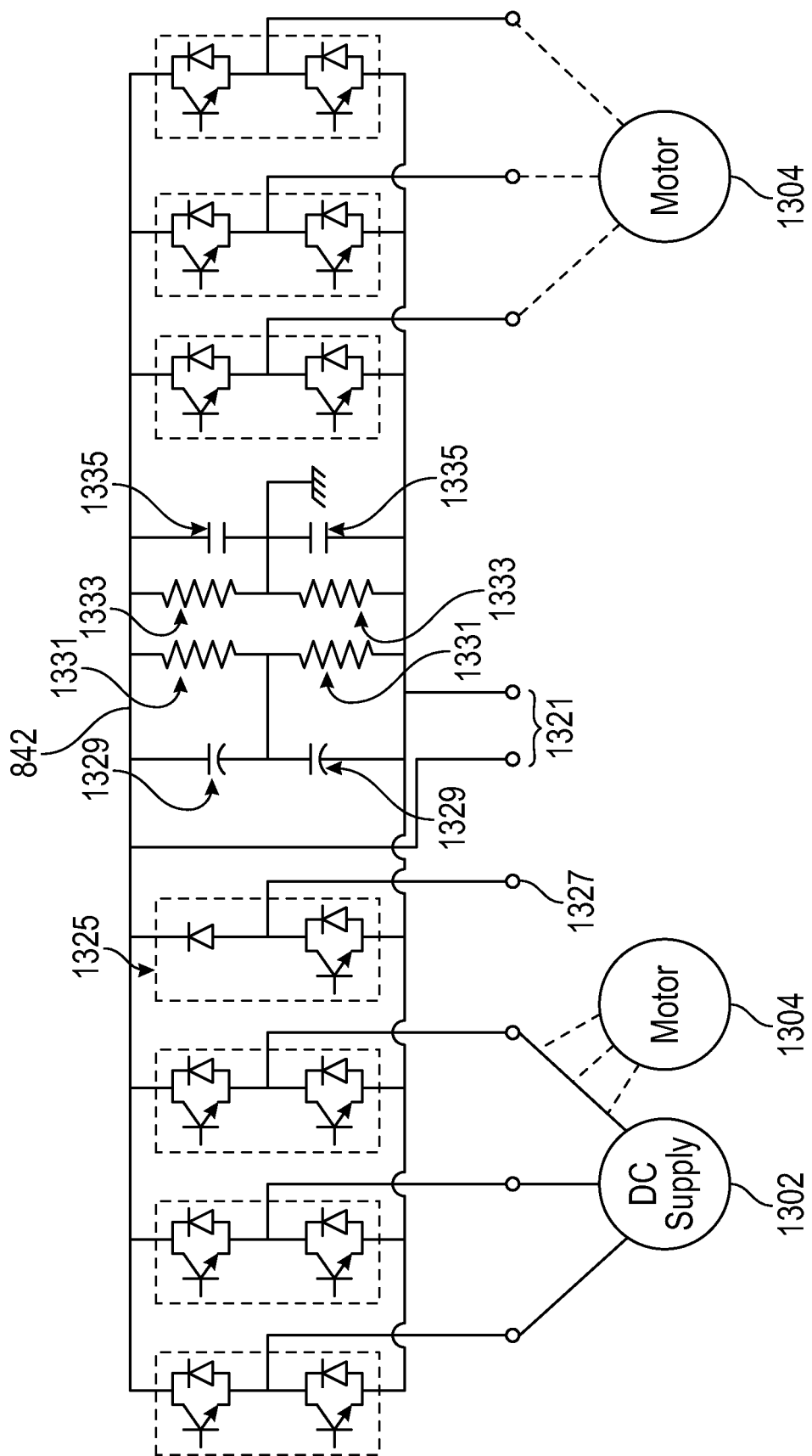

Turning to FIGS. 57-66, power management system 830 topologies according to a variety of exemplary embodiments are illustrated. As discussed above, according to various embodiments, externally sourced alternating current and/or direct current is supplied to the power management system 830 via the charging port 802. As shown in FIG. 58, according to various embodiments, a traction inverter 842, such as, e.g., the traction inverter 842 illustrated in the embodiment of FIG. 57, may operate to pass externally received direct current received at a motor output 1323 of the traction inverter 842 to the battery module 800 at a voltage level input equal to that of the externally sourced direct current input into the power management system 830. As shown in FIG. 59, in some embodiments, the traction inverter 842 may operate to rectify externally sourced alternating current input into the motor output 1323 of the traction inverter 842, with the rectified direct current output by the traction inverter 842 having a voltage level equal to that of the externally sourced alternating currently received via the charging port 802.

Alternatively, as noted above, according to various embodiments, one or more filters or other charge modifying elements (e.g., motor windings, inductors, diodes, etc.) included as part of the power management system 830 may be used with (or as a part of) the traction inverter 842 during the charging of the battery module 800 to filter or otherwise modify the electrical charge input into the power management system 830 via charging port 802. According to various embodiments, some or all of the traction inverter 842 and/or other power management system 830 elements used during battery module 800 charging may also be used to filter or otherwise modify the direct current supplied by the battery module 800 to the traction inverter 842 during operation of the concrete mixer truck 10 in a transport mode.

For example, as illustrated by the various power management system 830 topologies of FIGS. 60-66, in various embodiments, together with the traction inverter 842, the one or more additional power management system 830 elements (and/or reutilized portions of one or more existing power management system 830 components) may be configured to: maintain the DC-link voltage supplied to and/or received from the battery module 800 at a constant voltage; provide the power management system 830 with boost/buck functionality that allows surplus energy (generated e.g., as a result of regenerative braking) to be stored and subsequently used to operate the concrete mixer truck 10; regulate current and/or voltage supplied to the battery so as to, e.g., prevent overcharging of the battery module 800 using pulse width modulation; etc.

Figure 60:
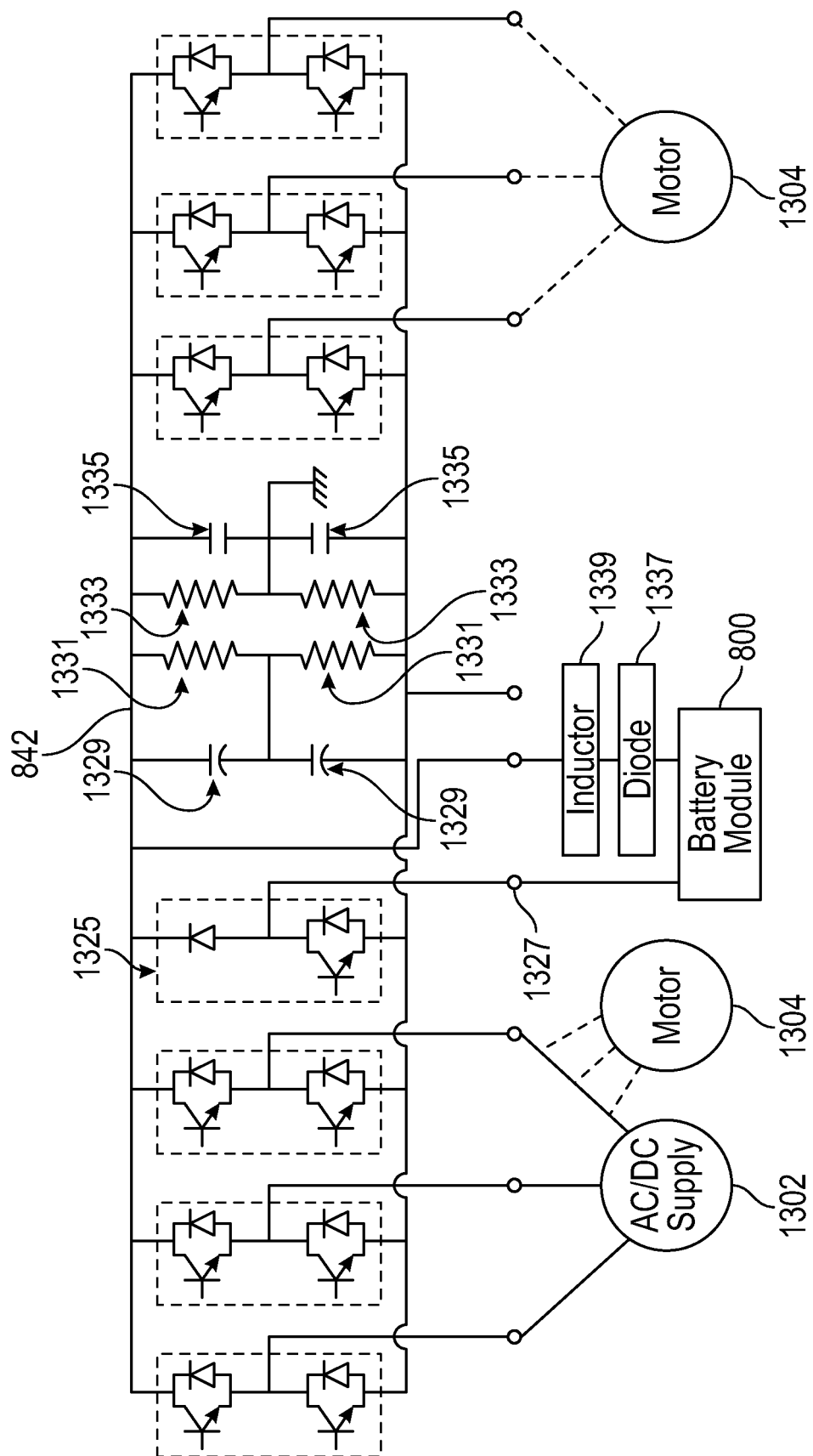
Figure 61:
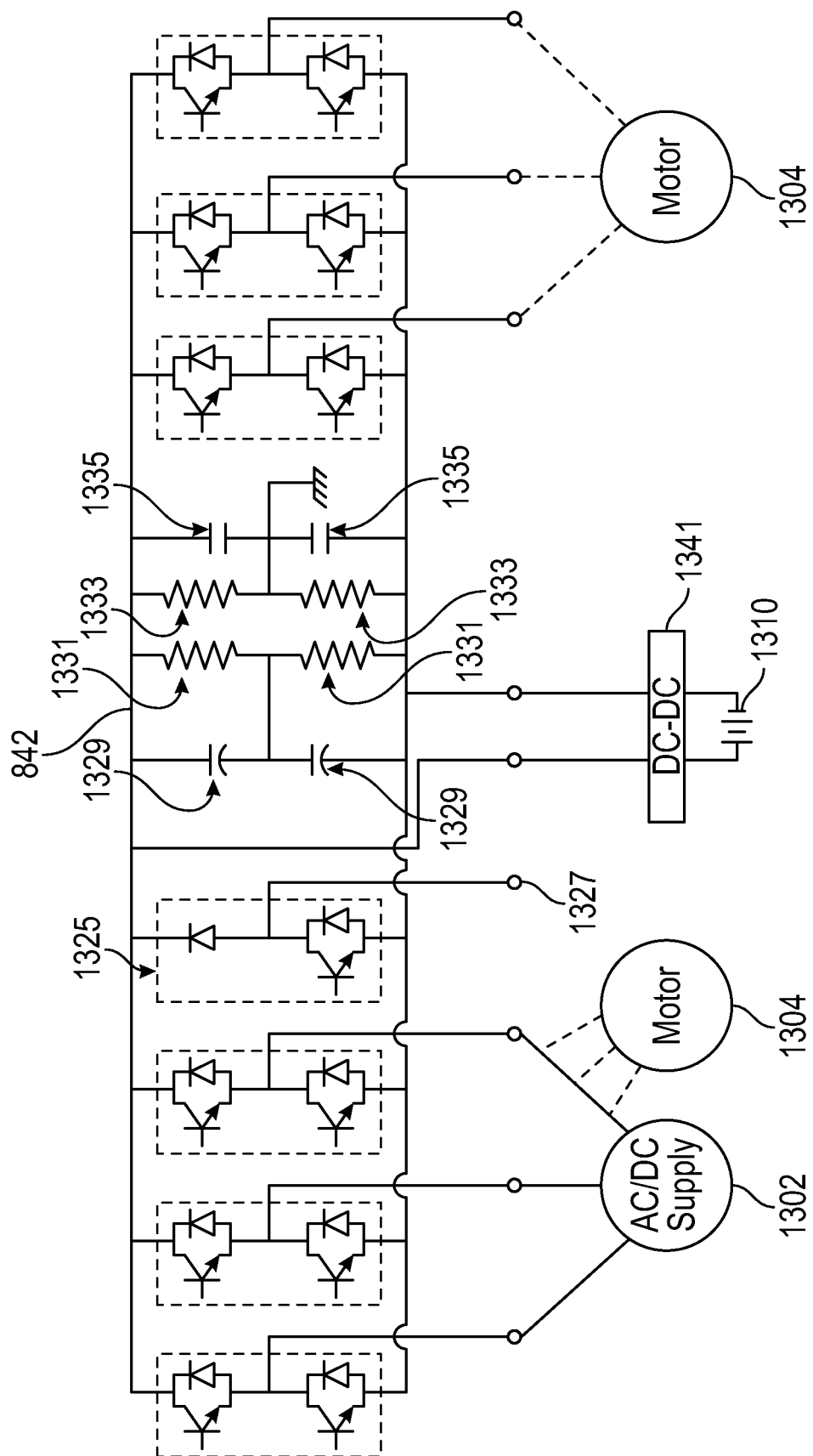

As shown in FIG. 60, according to some embodiments, a power management system 830 including a traction inverter 842 such as, e.g. that illustrated by the embodiment of FIG. 57, may be provided with buck/boost capability via the incorporation of an external diode 1337 and inductor 1339. Turning to FIG. 61, according to another embodiment, any number of DC-DC converters 1341 (e.g., forward, flyback, non-isolated, isolated, bi-directional, etc.) may be utilized with the traction inverter 842 to regulate voltage to the DC-link.

Figure 62A:
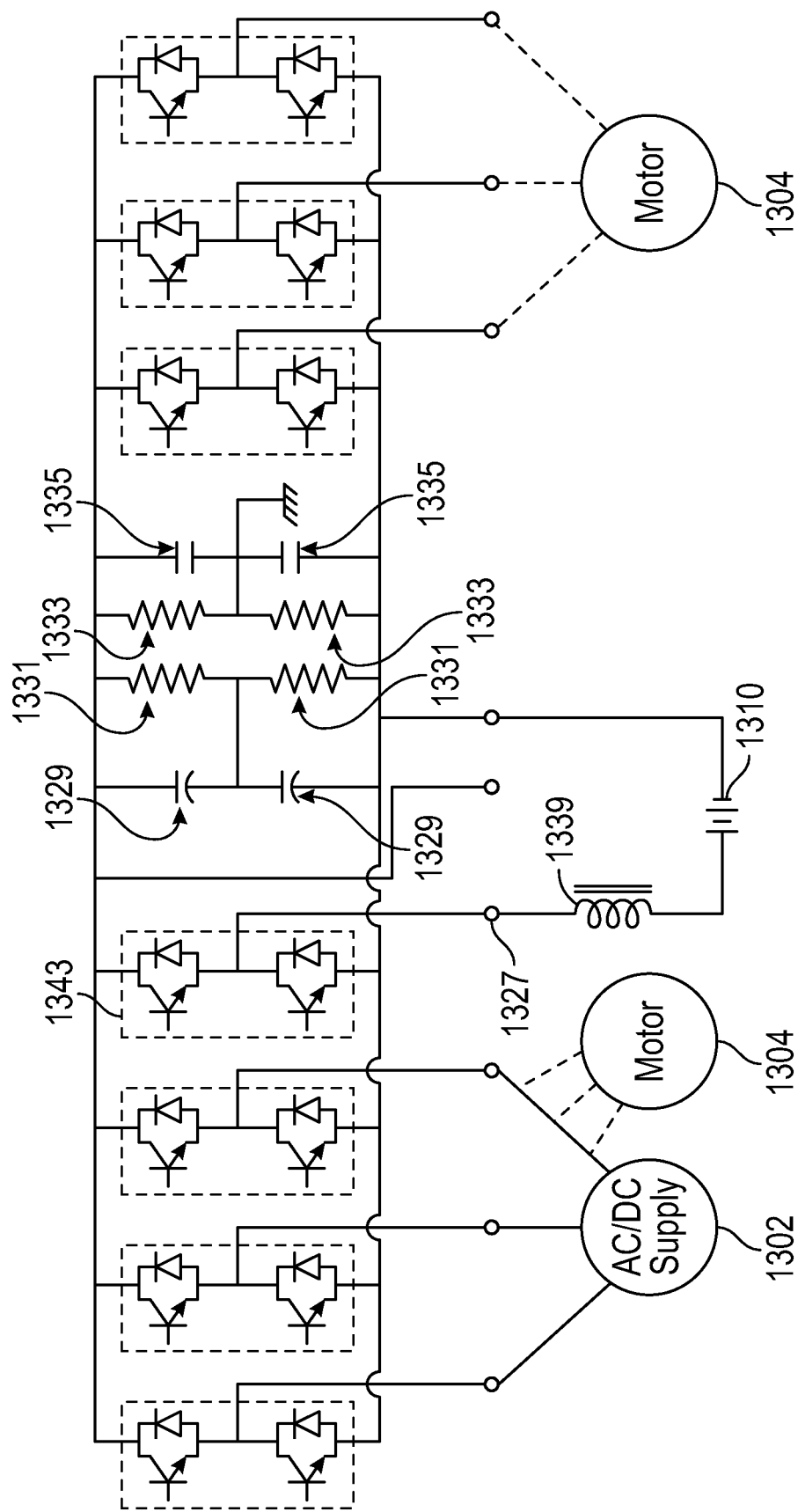
Figure 62B:
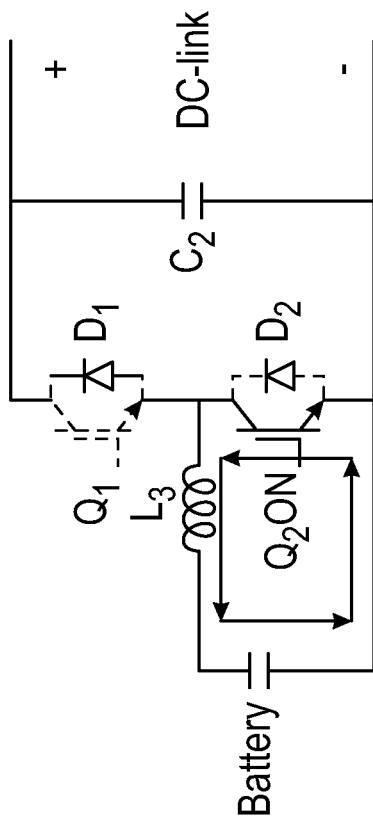
FIGS. 62B-62E illustrate various operational modes of the power management system circuit of FIG. 58, according to exemplary embodiments.
Figure 62C:
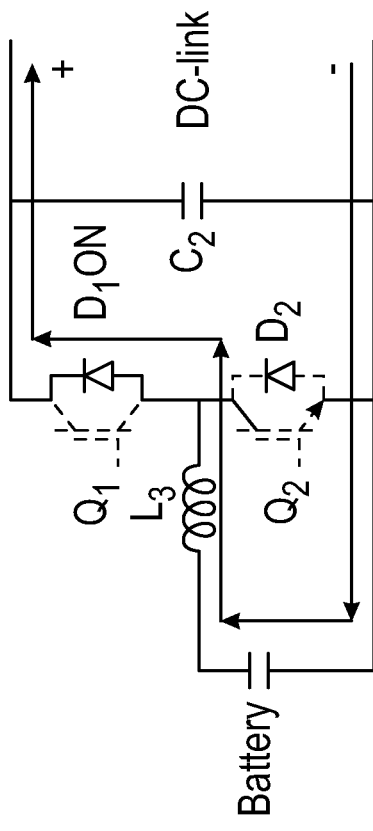
Figure 62D:
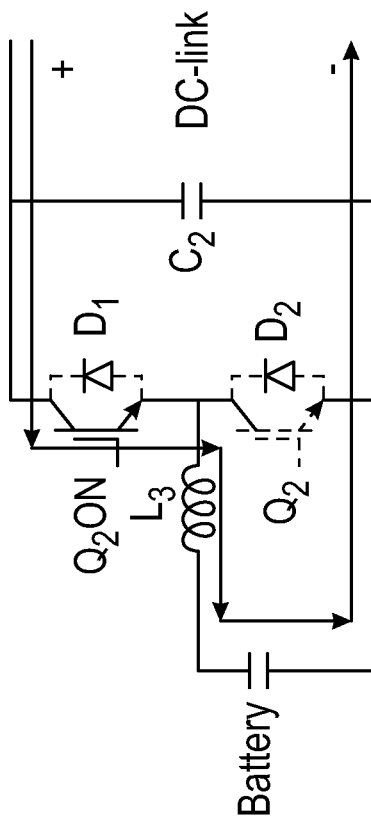
Figure 62E:
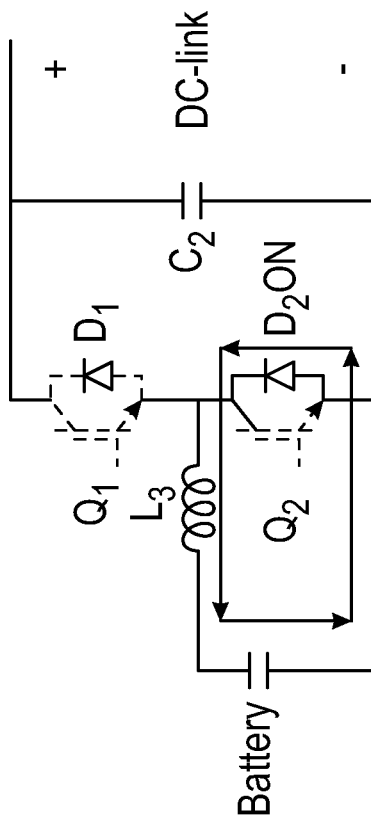

Referring to FIG. 62A, in some power management system 830 embodiments, boost and bucking of charge voltage may be achieved by modifying the traction inverter 842 illustrated in FIG. 57 by replacing the brake chopper circuit 1325 with an additional IGBT module 1343, adding an inductor 1339 to the brake chopper output 1327, and attaching the battery module 800 to the brake chopper output 1327. As shown in FIGS. 62B-62E, according to such embodiments, the power management system 830 may be configured to operate in a boost mode in which the inductor is charged (representatively illustrated in FIG. 62B); a charging mode in which energy stored in the inductor is supplied to the DC-link (representatively illustrated in FIG. 62C); a buck mode in which surplus energy from the power management system 830 is transferred to the battery module 800, such as, e.g., may occur as a result of regenerative braking (representatively illustrated in FIG. 62D); and a fourth mode as representatively illustrated in FIG. 62E.

Figure 63:
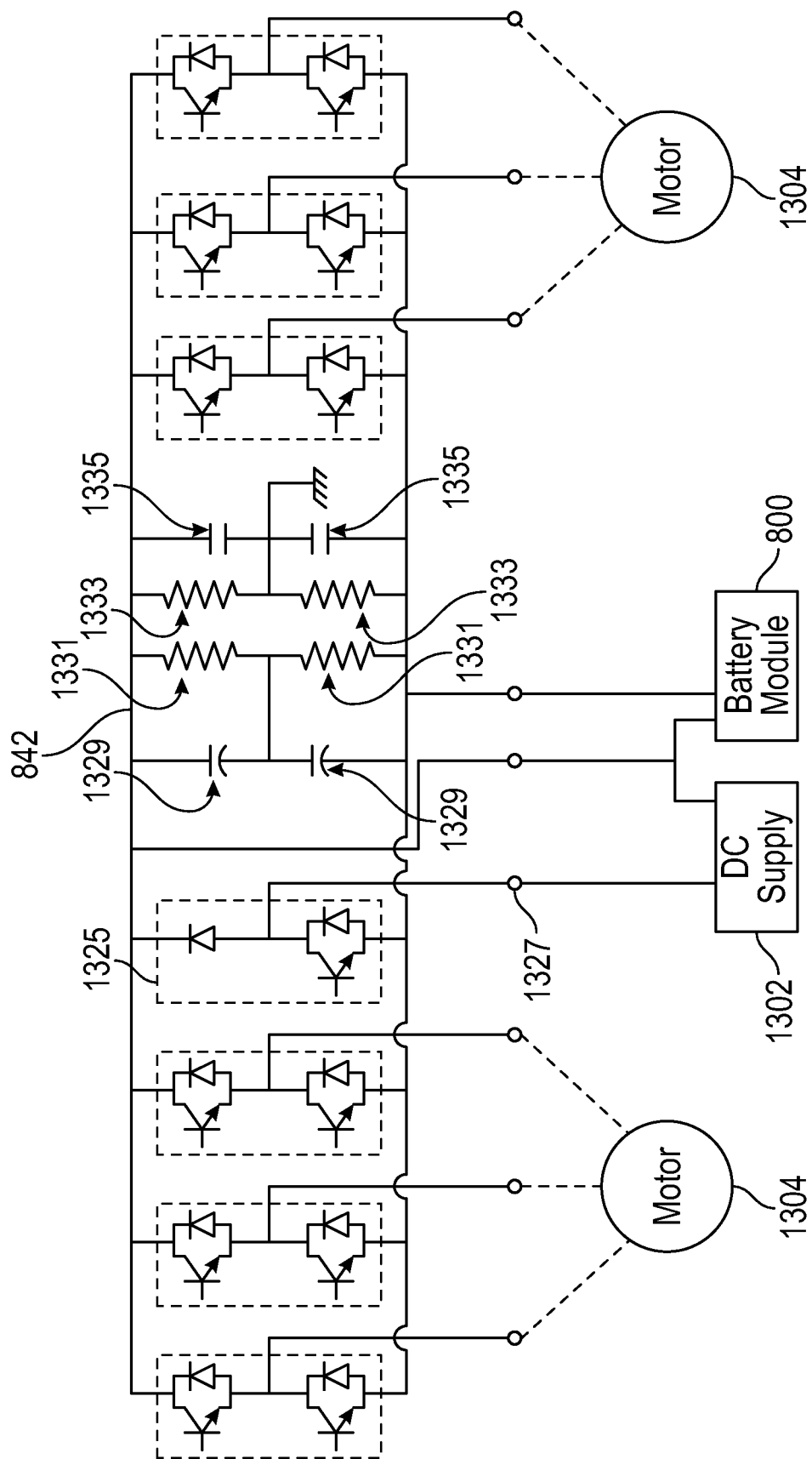
FIGS. 63-66 are topologies of a power management system circuit, according to exemplary embodiments.

As shown in FIG. 63 according to some embodiments, externally sourced direct current may be fed into the brake chopper output 1327 of a traction inverter 842 similar to the traction inverter 842 of the embodiment of FIG. 62, with the brake chopper circuit 1325 of the traction inverter 842 being used for pulse width modulation to regulate current and/or voltage supplied to the battery module 800.

Figure 64:
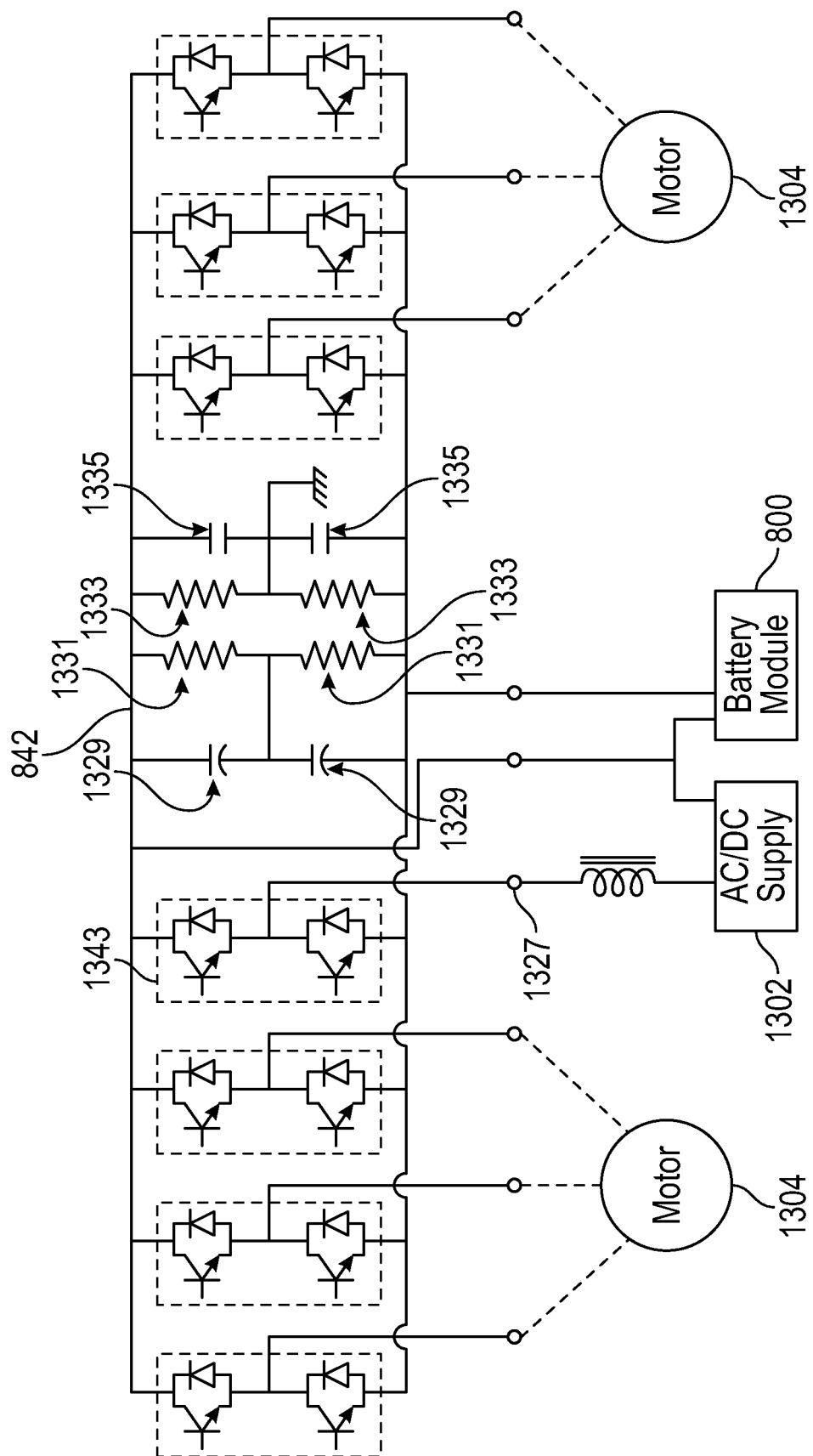
Figure 65:
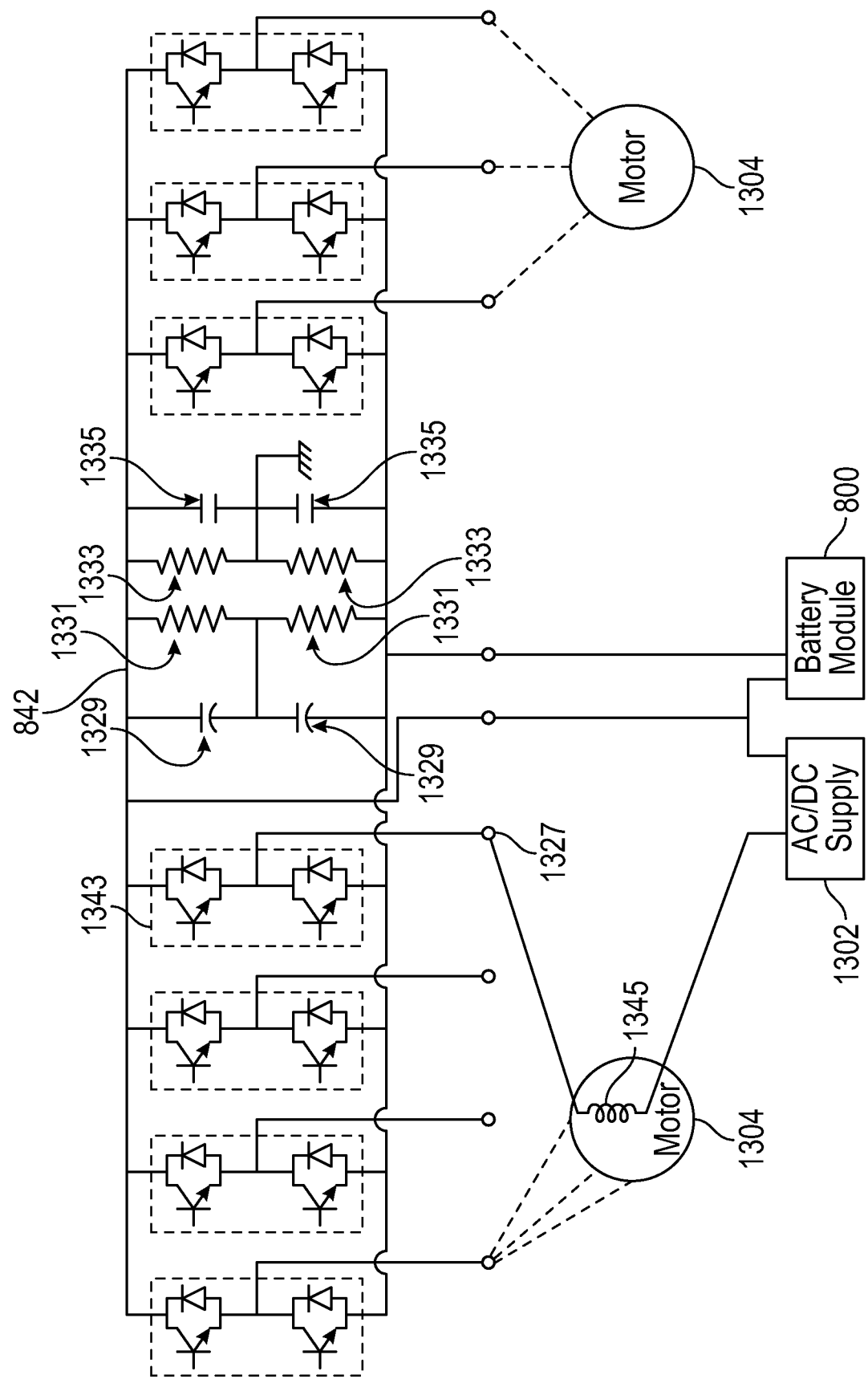

According to other embodiments, the power management system 830 may optionally include an AC filter. Illustrated in FIGS. 64 and 65 are representative embodiments of power management system 830 topologies incorporating such an AC filter. As shown in FIGS. 64 and 65, the power management system 830 may include a traction inverter 842 similar to that of the embodiment FIG. 57, with the exception of the brake chopper circuit 1325 is replaced with an additional IGBT module 1343. In each of the embodiments of FIG. 64 and FIG. 65, the externally sourced alternating current received via the charging port 802 is shown as being input into the brake chopper output 1327 of the traction inverter 842.

Figure 66:
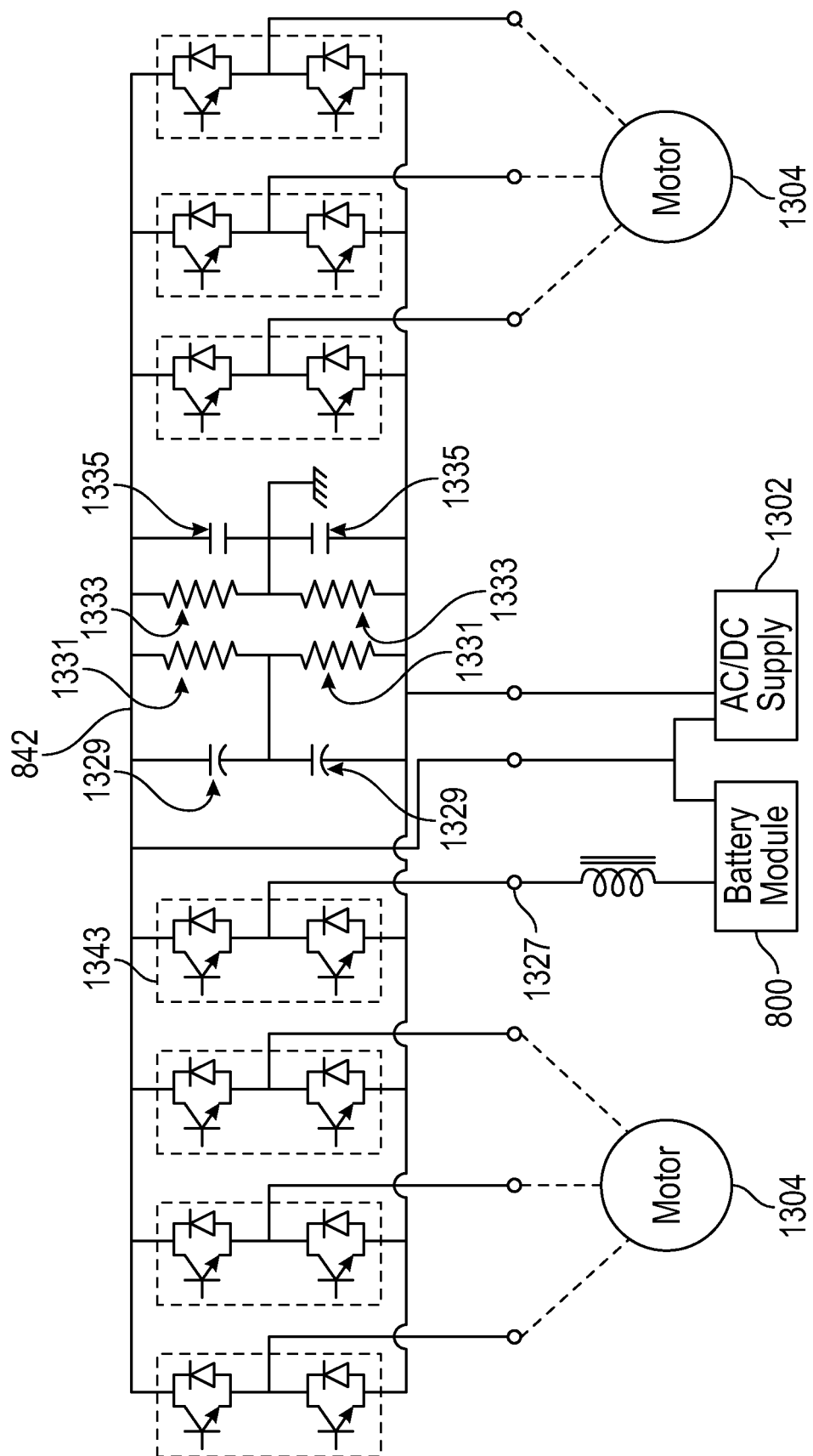

As illustrated in FIG. 64, according to some embodiments, the AC filter may be provided in the form of an additional inductor 1339 provide in series between the brake chopper output 1327 and the additional IGBT module 1343. Alternatively, as illustrated by the embodiment of FIG. 65, in some embodiments, the power management system 830 may alternatively reutilize the windings 1345 of the traction motor 1304 as an AC filter. In such embodiments, when in a charging mode, the brake management controller may optionally be configured to electrically decouple the traction motor 1304 from the motor output 1323 of the traction inverter 842, and instead couple the traction motor 1304 to the brake chopper output 1327 as shown in FIG. 65. Referring to FIG. 66, yet another power management system 830 topology including an inductor 1339 is illustrated according to another embodiment.

Although the coils in the power management system 830 topologies illustrated in FIGS. 62A, 64, and 65 have been described as inductors 1339, according to various embodiments, the coils in these power management systems 830 may alternatively be used as transformers, thereby allowing the power management system 830 to be isolated from the externally sourced electrical energy during charging of the battery module 800. According to some such embodiments, such isolation of the power management system 830 from the externally sourced electrical energy may advantageously allow the power management system 830 to act as a Level 3 supercharger, via which externally sourced alternating current received at a voltage of, e.g., 120-volts or 240-volts, via the charging port 802 may be used to fast charge the battery module 800 by rectifying and boosting the received alternating current into direct current having a voltage of, e.g., approximately 480-volts or greater.

As will be understood, any additional number of power management system 830 topologies, including any number of additional features and/or combinations of elements, may be used to operate the concrete mixer truck 10. For example, according to various embodiments, any of the power management system 830 embodiments as representatively illustrated in FIGS. 58-66 may incorporate traction inverters 842 having topologies different than that of the traction inverter 842 embodiment illustrated in FIG. 57.

Furthermore, as noted above, according to various embodiments, the power management system 830 may optionally also include the drum drive inverter 1306 and drum drive motor 252 of the concrete mixer truck 10. Accordingly, in various embodiments, any of the power management system 830 topologies illustrated in and described with reference to FIGS. 58-66 may optionally also be modified to include the drum drive inverter 1306 and/or drum drive motor 252 of the concrete mixer truck 10. In such embodiments, the drum drive inverter 1306 may be defined by a topology similar to that of the traction inverter 842, or may be defined by any number of other topologies.

Operational Modes

As described above, the power management system 830 may be configured (using, e.g., the battery management controller) to operate the concrete mixer truck 10 according to any number of different operating modes through the selective coupling and decoupling of one or more of the components of the power management system 830. According to various embodiments, the concrete mixer truck 10 may be operated according to: a charging mode, a transport mode, and one or more mixing modes. In some embodiments, the concrete mixer truck 10 may additionally be operated according to an optional regenerative mode and/or vehicle-2-grid mode, so as to allow the concrete mixer truck 10 to take advantage of any surplus energy that may be generated during operation of the concrete mixer truck 10 (e.g., energy generated as a result of regenerative braking).

Figure 67:
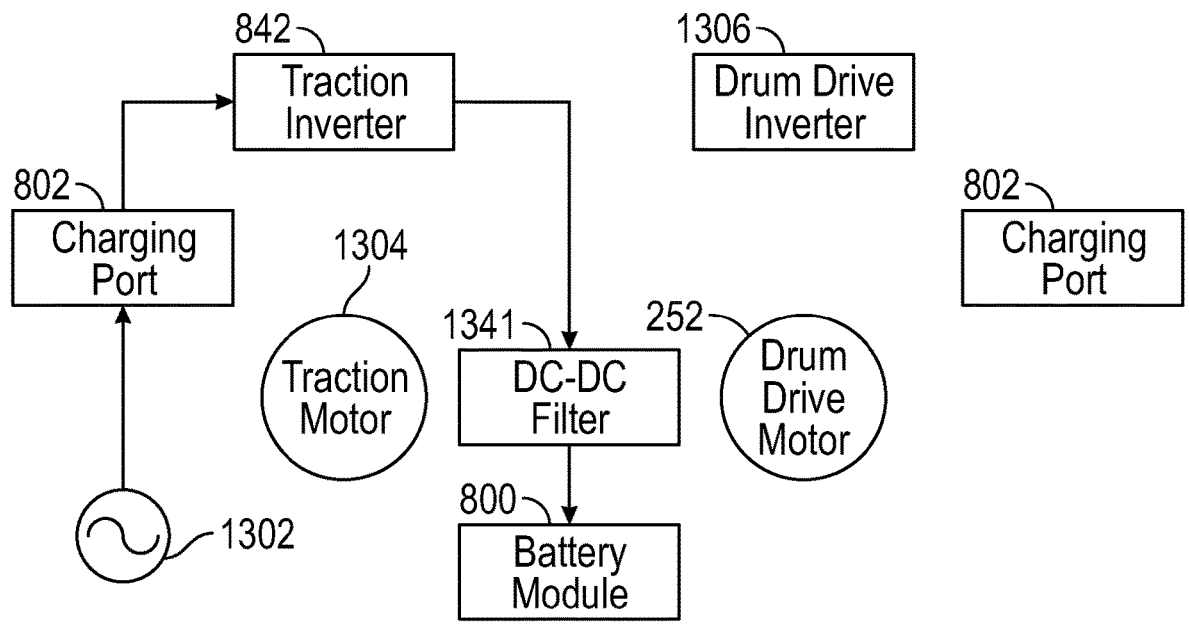
FIG. 67 is a block diagram illustrating the flow of electrical energy within the power management system of FIG. 48 during a charging operation mode, according to an exemplary embodiment.

As illustrated by the exemplary embodiment of FIG. 67, in the charging mode, the battery module 800 may be charged using externally sourced alternating current or direct current. As noted above, the charging port 802 of the power management system 830 may be configured to receive alternating current and/or direct current. As also noted above, according to various embodiments, any of the power management system 830 topologies discussed above, or any other number of power management system 830 topologies may be used to charge the battery module 800 using the externally sourced electrical energy received via the charging port 802.

The externally sourced alternating current or direct current may be received by the charging port 802 from any number of different external chargers, including Level 1, Level 2, or Level 3 external chargers. As discussed above, according to various embodiments, the power management system 830 provided by the concrete mixer truck 10 may advantageously be configured to function as an onboard Level 3 charger in which externally sourced alternating current received at a voltage of, e.g., 120-volt or 240-volt (received, e.g., from a Level 2 external charger) may be converted into direct current having, e.g., a voltage up to or greater than 480-volts, thus enabling fast charging of the battery module 800. By configuring the power management system 830 to operate as an onboard Level 3 fast charger, DC-fast charging of the concrete mixer truck 10 may be accomplished using a standard Level 2 external charger. As will be understood, such an arrangement may allow for fast charging of the concrete mixer truck 10 irrespective of the availability and/or accessibility of a Level 3 external supercharging station.

As illustrated by the various representative power management system 830 topologies of FIGS. 58-64 and FIG. 66, according to various embodiments, the externally sourced alternating current or direct current received by the charging port 802 may be fed directly into the traction inverter 842 via any of the motor output 1323, brake chopper output 1327, and/or DC input 21 of the traction inverter 842. Alternatively, as representatively illustrated by the power management system 830 embodiment of FIG. 65, in some embodiments, the externally sourced electrical energy may be fed to the traction inverter 842 via the windings 1345 of the traction motor 1304. In such embodiments, the traction motor 1304 may optionally be configured to be disengaged from the battery module 800 (using, e.g., the battery management controller) during the charging mode for safety purposes.

In embodiments in which the power management system 830 optionally includes the drum drive motor 252 and/or drum drive inverter 1306 of the concrete mixer truck 10, charging of the battery module 800 may additionally, or alternatively, be effectuated by supplying externally sourced electrical energy received from the charging port 802 directly to the drum drive inverter 1306 and/or to the drum drive motor 252. According to some such embodiments, the power management system 830 may comprise a single charging port 802 that may selectively be coupled (using, e.g., the battery management controller) to the traction inverter 842 (directly or via the traction motor 1304), and/or to the drum drive inverter 1306 (directly or via the drum drive motor 252). In other embodiments, the power management system 830 may include a plurality of charging ports 802, with a first charging port 802 being configured to deliver externally sourced electrical energy to the traction inverter 842 (directly or via the traction motor 1304) and a second charging port 802 being configured to deliver externally sourced electrical energy to the drum drive inverter 1306 (directly or via the drum drive motor 252). In yet other embodiments, the power management system 830 may optionally include the drum drive motor 252, with the traction inverter 842 being configured to be used with each of the drum drive motor 252 and the traction motor 1304. In some such embodiments, externally sourced electrical energy received by one or more charging ports 802 may be fed into the traction inverter 842 via either the traction motor 1304 or the drum drive motor 252 during charging of the battery module 800.

Figure 68:
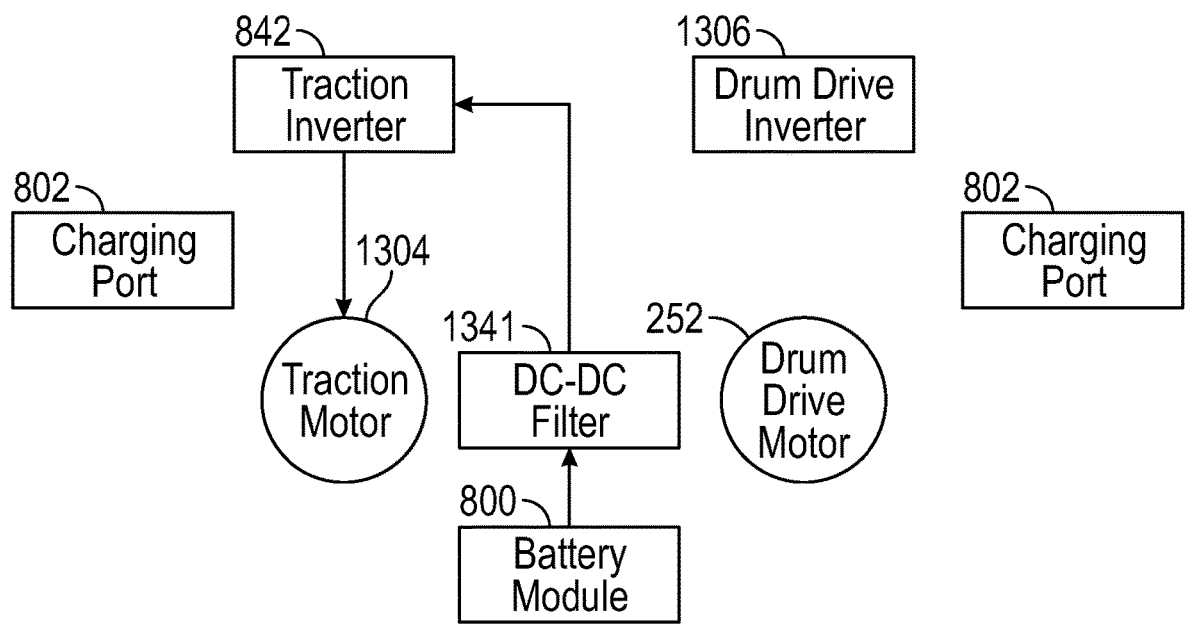
FIG. 68 is a block diagram illustrating the flow of electrical energy within the power management system of FIG. 48 during a transport operation mode, according to an exemplary embodiment.

Referring to FIG. 68, in the transport mode, energy stored in the battery module 800 is transferred to the traction inverter 842 as direct current, which may then be converted by the traction inverter 842 to power the traction motor 1304.

Figure 69A:
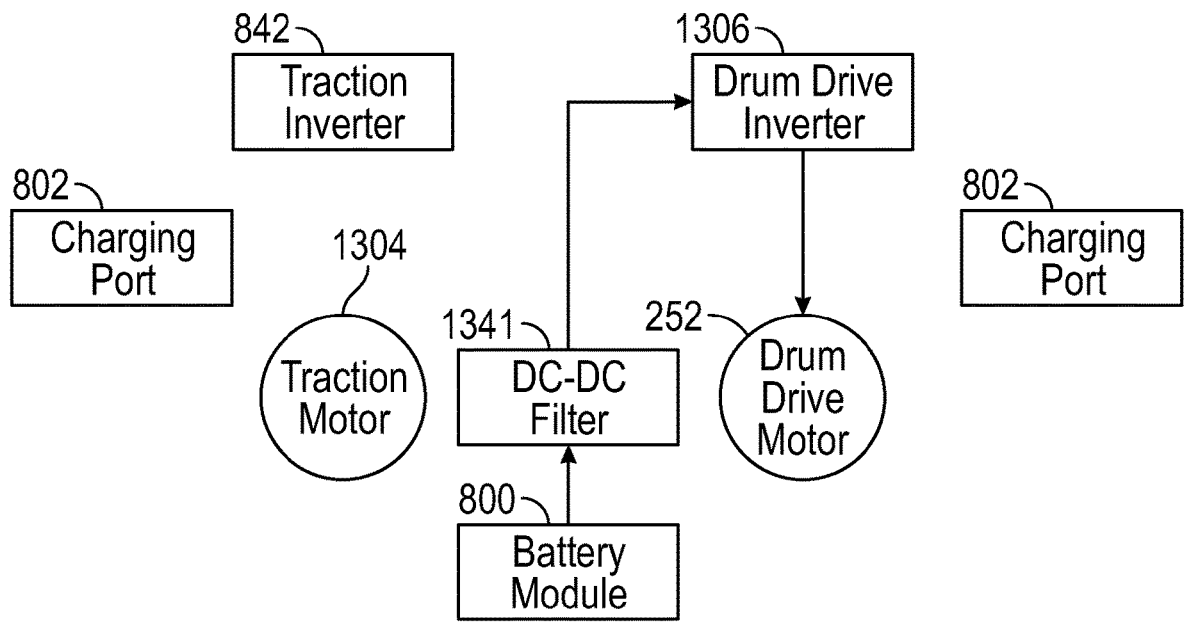
FIGS. 69A-69D are block diagrams illustrating the flow of electrical energy within the power management system of FIG. 48 during various mixing operation modes, according to exemplary embodiments.

As illustrated by the representative embodiments of FIGS. 69A-69D, the concrete mixer truck 10 may be configured to operate according to one or more mixing modes. In certain situations, an external charger or power source may not be available at the location at which concrete is to be mixed and dispensed by the concrete mixer truck 10. Accordingly, as shown in FIG. 69A, in various embodiments, the concrete mixer truck 10 may include a battery-powered mixing mode in which energy stored in the battery module 800 is transferred to the drum drive inverter 1306 as direct current, which may then be converted by the drum drive inverter 1306 to power the drum drive motor 252. As will be understood, in embodiments in which the traction inverter 842 alone, or in combination with the traction motor 1304, is configured to power both the tractive assembly and the mixing assembly of the concrete mixer truck 10, the battery management controller may be configured to selectively couple the traction inverter 842 (and optionally the traction motor 1304) to each of the tractive assembly and the mixing assembly of the concrete mixer vehicle.

In certain situations, an external charger configured to deliver externally sourced alternating current and/or direct current to the power management system 830 may be available at a location at which the concrete mixer truck 10 is to be used to mix and/or dispense concrete. Accordingly, as illustrated in FIG. 69B, in various embodiments, in order to conserve the power stored by the battery module 800, the power management system 830 may be operated according to an externally-powered mixing mode in which the operation of the mixing assembly is partially, or entirely, powered using the external power source.

In such embodiments, externally sourced alternating current may be supplied by the charging port 802 directly to the drum drive motor 252, or may alternatively optionally be routed by the battery management controller through one or more filter or other current and/or voltage modifying elements prior to delivering the alternating current to the drum drive motor 252. In embodiments in which the external charger is configured to provide the power management system 830 with direct current, the battery management controller may be configured to route the direct current received via the charging port 802 through the drum drive inverter 1306 (which may be the same as, or discrete from the traction inverter 842) and one or more optional filter and/or other charge modifying elements.

Figure 69B:
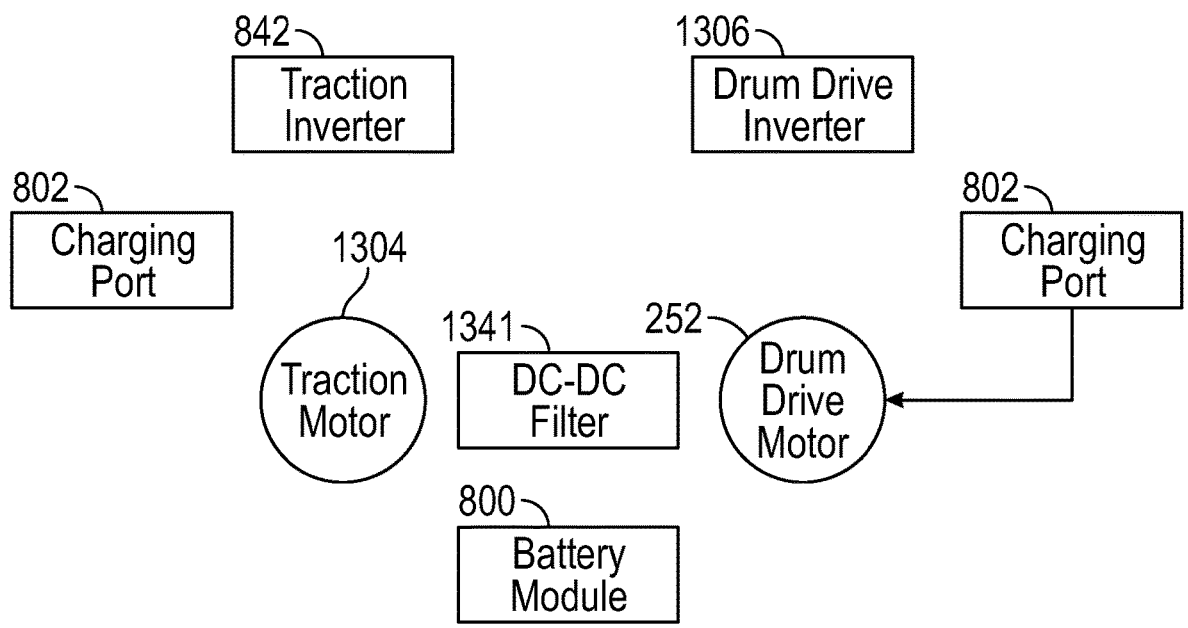
Figure 69C:
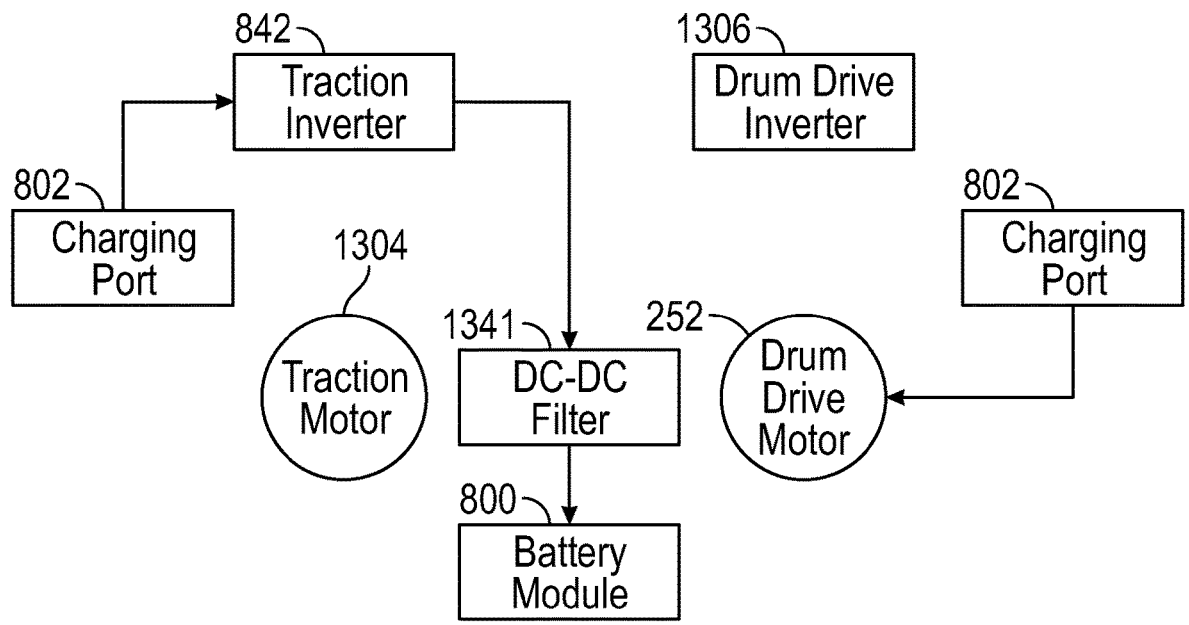
Figure 69D:
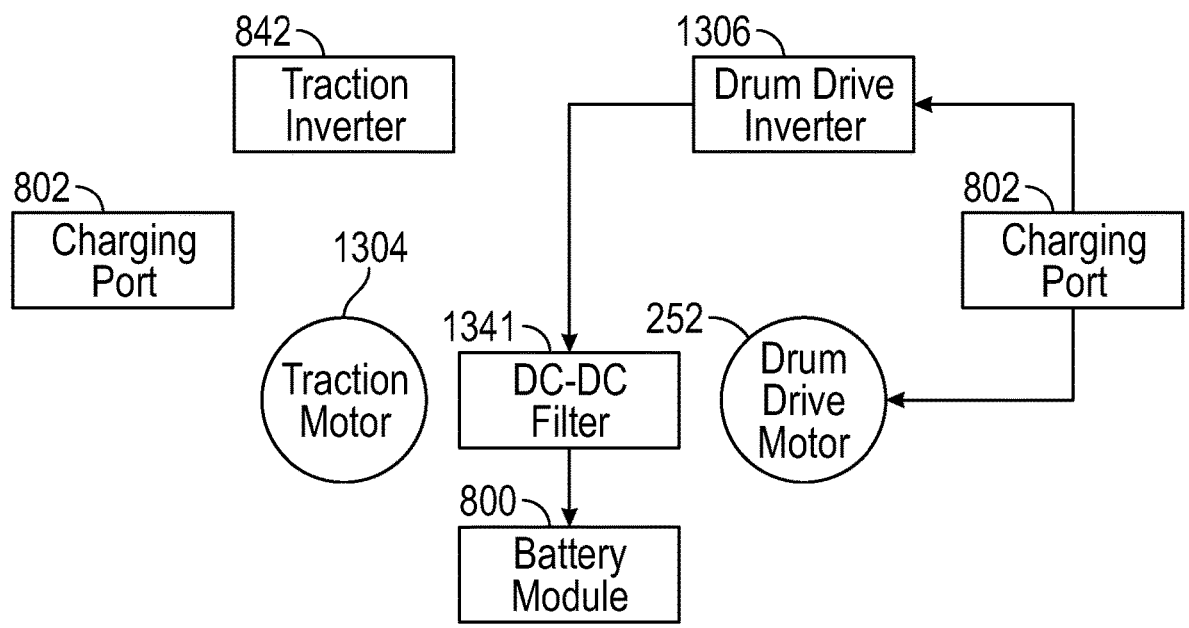

As shown in FIG. 69B, according to some embodiments of the externally-powered mixing operating mode, the external charger may be used exclusively to power the operation of the drum drive motor 252. Alternatively, as illustrated in FIGS. 69C and 69D, in various embodiments, the externally-powered mixing mode may define a combined mixing/charging mode in which the externally sourced alternating current or direct current may be used to both charge the battery module 800 and to power the drum drive motor 252. According to some such combined mixing/charging operating mode embodiments, the battery management controller may be configured to simultaneously route the externally sourced electrical charge to each of the battery module 800 and the drum drive motor 252. In other such combined mixing/charging operating mode embodiments, the battery management controller may be configured to alternate the delivery of the externally sourced alternating current or direct current to each of the battery module 800 and the drum drive motor 252.

As illustrated in FIG. 69C, in some embodiments in which the power management system 830 includes a first charging port 802 configured to deliver externally sourced electrical charge to the traction inverter 842 (either directly or via the traction motor 1304) and a second charging port 802 configured to deliver externally source electrical charge to the drum drive inverter 1306 (either directly or via the drum drive motor 252), the combined mixing/charging operating mode may include operating the battery management controller to utilize electrical energy received via the first charging port 802 to charge the battery module 800, and utilizing the second charging port 802 to power the drum drive motor 252. Alternatively, as illustrated in FIG. 69D, electrical energy received via the first charging port 802 may be used to both charge the battery module 800 and to power the drum drive motor 252.

As described above, in certain situations, (e.g. during braking of the concrete mixer truck 10), the operation of the concrete mixer truck 10 may result in surplus energy being delivered to the power management system 830. Accordingly, in various embodiments, the power management system 830 may advantageously include a power regeneration mode in which the surplus energy may be stored by the battery module 800 for future use by the concrete mixer truck 10. According to some embodiments in which the power management system 830 is configured to be operated according to an optional vehicle-2-grid mode, the surplus energy stored in the battery module 800 (and/or energy stored in the battery module 800 from a prior charging of the battery module 800) may be fed into the grid via the charging port 802.

Temperature Management

Throughout operation of the concrete mixer truck 10 (e.g., charging of the battery assemblies 820, driving of the first electromagnetic device 306 and the second electromagnetic device 308, etc.), electricity flowing throughout the battery module 800 experiences resistance, generating thermal energy. Referring to FIGS. 51, 52, 54, and 70, to prevent the thermal energy from damaging components of the battery module 800, the battery module 800 further includes a temperature regulation assembly, shown as cooling system 850. The cooling system 850 is configured to remove thermal energy from components of the battery module 800 and expel the thermal energy into the surrounding atmosphere. In one embodiment, the cooling system 850 is entirely contained within the battery module 800.

The cooling system 850 includes a driver, shown as coolant pump 852, which is configured to circulate a coolant (e.g., water, a mixture of water and antifreeze, etc.) throughout the cooling system 850. In some embodiments, the coolant pump 852 is an electrically driven pump that is powered by electrical energy from the battery assemblies 820 and/or the battery 642. The coolant pump 852 is fluidly coupled to a reservoir, shown as coolant tank 854. The coolant tank 854 is configured to store a volume of the coolant for use in the rest of the cooling system 850. In some embodiments, the coolant tank 854 includes an aperture that facilitates adding coolant to the cooling system 850. Conduits, such as pipes or hoses, may be used to fluidly couple the components of the cooling system 850 (e.g., to fluidly couple the coolant pump 852 and the coolant tank 854, etc.).

Each of the battery assemblies 820 includes a heat transfer device, shown as heat sink 856. Each heat sink 856 includes a coolant passage fluidly coupled to the coolant pump 852 such that the coolant passes through the heat sink 856. The heat sinks 856 include a thermally conductive material (e.g., copper, aluminum, steel, etc.) extending between the portions of the battery assemblies 820 that generate the thermal energy (e.g., the battery cells, etc.) and the coolant passage. The heat sinks 856 are configured to transfer the thermal energy from the battery assembly 820 to the coolant within the coolant passage, heating the coolant. The heated coolant then flows out of the heat sink 856, removing the thermal energy from the battery assembly 820. The inverter 834 also includes a heat sink 856 configured to transfer thermal energy from the inverter 834 into the coolant. In other embodiments, other components of the battery module 800 (e.g., the battery disconnect units 832, etc.) include heat sinks 856 fluidly coupled to the coolant pump 852.

The heat sinks 856 are fluidly coupled to a heat transfer device, shown as radiator assembly 860, such that the radiator assembly 860 receives the heated coolant. The radiator assembly 860 is configured to transfer thermal energy from the heated coolant to the atmosphere surrounding the radiator assembly 860, cooling the coolant. In one embodiment, the radiator assembly 860 includes a radiator having fins formed from a conductive material. The fins are configured to increase the surface area of the radiator that is contacted by air from the surrounding atmosphere, maximizing heat transfer from the coolant to the air. The radiator assembly 860 may also include a fan that forces air across the radiator, further increasing the heat transfer. After the coolant is cooled by the radiator assembly 860, the coolant passes back through the coolant tank 854 and to the coolant pump 852, which recirculates the coolant through the cooling system 850.

Figure 71:
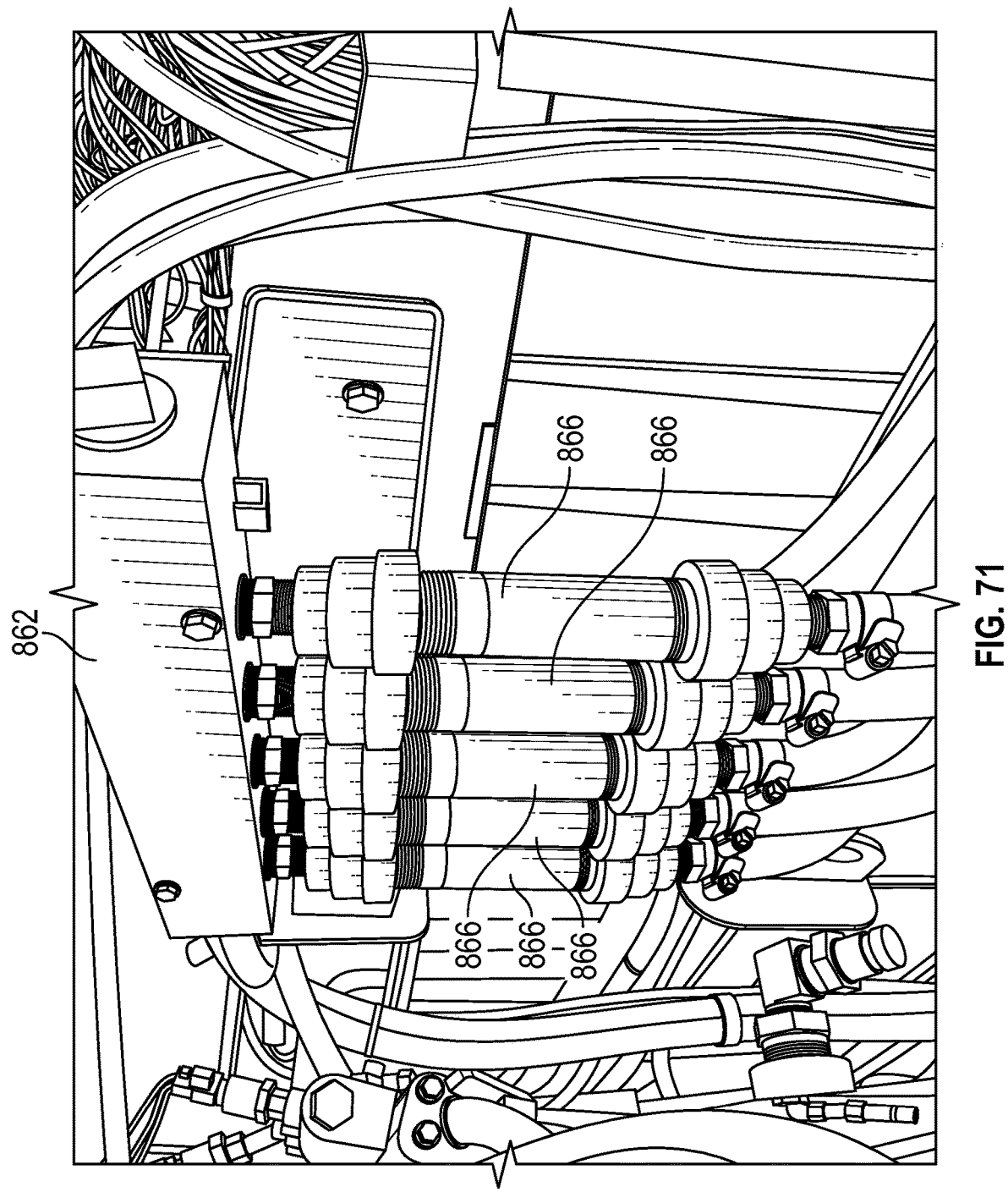

The cooling system 850 may include other components that facilitate operation and maintenance of the cooling system 850. As shown in FIGS. 70 and 71, the cooling system 850 includes flow dividers or flow uniters, shown as manifolds 862. One manifold 862 is configured to split the flow of coolant from the radiator assembly 860 into multiple flow paths, each flowing through a separate group of the heat sinks 856. In one embodiment, the manifold 862 splits the flow into five paths: one path flowing through the heat sink 856 of the inverter 834 and four paths each flowing through a subset of the heat sinks 856 of the battery assemblies 820. After the coolant flows through the heat sinks 856, a second manifold 862 reunites the flows prior to the coolant entering the coolant tank 854. In other embodiments, the coolant flows along different flow paths between the radiator assembly 860 and the coolant pump 852. The cooling system 850 may additionally include one or more measurement devices. As shown in FIG. 56, the cooling system 850 includes pressure gauges 864 configured to measure the pressure of the coolant at various points in the cooling system 850. As shown in FIG. 71, the cooling system 850 further includes flowmeters 866 configured to measure the flow rate of coolant along each of the split flow paths.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or movable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A vehicle, comprising:
a chassis including a frame rail extending longitudinally between a front end and a rear end of the chassis;
a plurality of tractive elements coupled to the chassis;
a first electric motor coupled to the chassis and coupled to the tractive elements such that the first electric motor drives the tractive elements to propel the vehicle;
a first shaft coupling the first electric motor to the tractive elements, the first shaft extending along the frame rail toward the tractive elements in a first longitudinal direction;
an accessory module coupled to the chassis and coupled to an output of the first electric motor, wherein the accessory module is configured to receive mechanical energy provided by the first electric motor and provide at least one of electrical energy, compressed gas, or pressurized liquid in response to receiving the mechanical energy provided by the first electric motor;
a second shaft coupling the output of the first electric motor to the accessory module, the second shaft extending along the frame rail toward the accessory module in a second longitudinal direction opposite the first longitudinal direction;
a second electric motor coupled to the chassis; and
at least one planetary gear set mechanically coupling an output of the second electric motor to the first electric motor and the accessory module, such that the accessory module is mechanically driven through the at least one planetary gear set.

2. The vehicle of claim 1, wherein the accessory module includes a compressor coupled to the output of the first electric motor and configured to receive the mechanical energy from the first electric motor and provide the compressed gas.

3. The vehicle of claim 2, wherein the accessory module includes a pump coupled to the output of the first electric motor and configured to receive the mechanical energy from the first electric motor and provide the pressurized liquid.

4. The vehicle of claim 3, wherein the accessory module includes an electrical energy generator coupled to the output of the first electric motor and configured to receive the mechanical energy from the first electric motor and provide the electrical energy.

5. The vehicle of claim 4, wherein the accessory module includes an input shaft coupling the compressor, the pump, and the electrical energy generator to the second shaft, and wherein at least two of the compressor, the pump, or the electrical energy generator are offset from the input shaft.

6. The vehicle of claim 5, further comprising a belt coupling the compressor, the pump, and the electrical energy generator to the input shaft.

7. The vehicle of claim 2, wherein the compressor is an air conditioning compressor configured to receive rotational mechanical energy from the first electric motor and provide compressed refrigerant for use in an air conditioning system.

8. The vehicle of claim 1, wherein the vehicle is a concrete mixer truck, further comprising a mixing drum rotatably coupled to the chassis.

9. The vehicle of claim 1, wherein the at least one planetary gear set is configured to transfer the mechanical energy from the first electric motor to the accessory module to mechanically drive the accessory module.

10. A vehicle, comprising:
a chassis including a frame rail extending longitudinally;
a tractive element coupled to the chassis and configured to propel the vehicle;
an electrical energy generator coupled to the chassis and configured to provide electrical energy;
a pump coupled to the chassis and configured to provide pressurized liquid;
a compressor coupled to the chassis and configured to provide compressed gas;
a first electric motor configured to drive the tractive element, the electrical energy generator, the pump, and the compressor;
a first shaft mechanically coupling the first electric motor to the tractive element, the first shaft extending along the frame rail and away from the first electric motor in a first direction;
a second shaft mechanically coupling the first electric motor to the electrical energy generator, the pump, and the compressor, the second shaft extending along the frame rail and away from the first electric motor in a second direction opposite the first direction;
a second electric motor; and
at least one planetary gear set mechanically coupling the second electric motor to the first electric motor, the electrical energy generator, the pump, and the compressor, such that the electrical energy generator, the pump, and the compressor are mechanically driven through the at least one planetary gear set.

11. The vehicle of claim 10, wherein the electrical energy generator, the pump, and the compressor are longitudinally offset from the first electric motor in the first direction.

12. A vehicle, comprising:
a chassis including a frame rail extending longitudinally between a front end and a rear end of the chassis;
a tractive element coupled to the chassis and configured to propel the vehicle;
an accessory module including at least one of (a) an electrical energy generator coupled to the chassis and configured to provide electrical energy, (b) a pump coupled to the chassis and configured to provide pressurized liquid, or (c) a compressor coupled to the chassis and configured to provide compressed gas;

a transmission;

a first electric motor and a second electric motor coupled to the transmission and configured to drive the transmission;

a first shaft mechanically coupling the transmission to the tractive element, the first shaft extending along the frame rail and away from the transmission in a first longitudinal direction; and a second shaft mechanically coupling the transmission to the accessory module, the second shaft extending along the frame rail and away from the transmission in a second longitudinal direction opposite the first longitudinal direction, wherein the second shaft is configured to transfer rotational mechanical energy from the transmission to the accessory module.

13. The vehicle of claim 12, wherein the transmission includes at least one planetary gear set.

14. The vehicle of claim 12, wherein in at least one mode of operation, the transmission couples the first electric motor to the second shaft without coupling the second electric motor to the second shaft.

15. The vehicle of claim 12, wherein in at least one mode of operation, the transmission supplies rotational mechanical energy to the first shaft without supplying rotational mechanical energy to the second shaft.

16. The vehicle of claim 12, wherein in at least one mode of operation, the transmission supplies rotational mechanical energy to the second shaft without supplying rotational mechanical energy to the first shaft.

17. The vehicle of claim 12, wherein in at least one mode of operation, the transmission supplies rotational mechanical energy to both the first shaft and the second shaft.

18. The vehicle of claim 12, wherein the first shaft has a first axis of rotation, wherein the second shaft has a second axis of rotation, wherein the first axis of rotation is not aligned with the second axis of rotation, and wherein the first axis of rotation and the second axis of rotation extend substantially longitudinally.

19. The vehicle of claim 12, wherein the first electric motor is longitudinally offset from the second electric motor, and wherein the transmission extends between the first electric motor and the second electric motor.

20. The vehicle of claim 12, wherein the frame rail is a first frame rail, wherein the chassis further includes a second frame rail laterally offset from the first frame rail, and wherein the accessory module, the transmission, the first electric motor, the second electric motor, the first shaft, and the second shaft are positioned between the first frame rail and the second frame rail.

* * * * *